US012207292B2

(12) United States Patent
Atefi

(10) Patent No.: US 12,207,292 B2
(45) Date of Patent: *Jan. 21, 2025

(54) APPARATUSES, METHODS, AND COMPUTER-READABLE MEDIUM FOR COMMUNICATION IN A WIRELESS LOCAL AREA NETWORK

(71) Applicant: Communication Systems LLC, Solana Beach, CA (US)

(72) Inventor: Ali Atefi, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/952,229

(22) Filed: Sep. 24, 2022

(65) Prior Publication Data

US 2023/0039035 A1  Feb. 9, 2023

Related U.S. Application Data

(63) Continuation of application No. 17/157,956, filed on Jan. 25, 2021, now Pat. No. 11,483,857.

(60) Provisional application No. 63/075,196, filed on Sep. 6, 2020, provisional application No. 63/035,803, filed on Jun. 7, 2020, provisional application No. 62/965,986, filed on Jan. 26, 2020.

(51) Int. Cl.
| | |
|---|---|
| H04W 4/00 | (2018.01) |
| H04W 28/06 | (2009.01) |
| H04W 48/16 | (2009.01) |
| H04W 74/00 | (2009.01) |
| H04W 84/12 | (2009.01) |

(52) U.S. Cl.
CPC ......... *H04W 74/002* (2013.01); *H04W 28/06* (2013.01); *H04W 48/16* (2013.01); *H04W 84/12* (2013.01)

(58) Field of Classification Search
CPC ... H04W 74/002; H04W 48/16; H04W 28/06; H04W 84/12
USPC .......................................................... 370/329
See application file for complete search history.

*Primary Examiner* — Temica M Beamer

(57) ABSTRACT

Many aspects pertaining to various apparatuses, methods, and computer-readable medium are described herein. Some aspects pertain to wireless communication between various apparatuses, which may include one or more access points (APs) and/or one or more stations (STAs). The one or more APs and/or one or more STAs may have one or more radios. Some aspects pertain to various features related to such one or more radios. Some aspects pertain to certain technologies related to uplink (UL) communication(s) and/or downlink (DL) communication(s). The written description and appended drawings provide detailed descriptions regarding these and many other aspects.

48 Claims, 6 Drawing Sheets

APPARATUSES, METHODS, AND COMPUTER-READABLE MEDIUM FOR COMMUNICATION IN A WIRELESS LOCAL AREA NETWORK

CROSS-REFERENCE TO RELATED APPLICATION(S)

The present application claims the benefit of and right of priority to U.S. patent application Ser. No. 17/157,956, titled "APPARATUSES, METHODS, AND COMPUTER-READABLE MEDIUM FOR COMMUNICATION IN A WIRELESS LOCAL AREA NETWORK," filed Jan. 25, 2021, which claims the benefit of and right of priority to U.S. Provisional Patent Application No. 63/075,196, titled "APPARATUSES, METHODS, AND COMPUTER-READABLE MEDIUM FOR COMMUNICATION IN A WIRELESS LOCAL AREA NETWORK," filed Sep. 6, 2020, U.S. Provisional Patent Application No. 63/035,803, titled "APPARATUSES, METHODS, AND COMPUTER-READABLE MEDIUM FOR COMMUNICATION IN A WIRELESS LOCAL AREA NETWORK," filed Jun. 7, 2020, and U.S. Provisional Patent Application No. 62/965,986, titled "APPARATUSES, METHODS, AND COMPUTER-READABLE MEDIUM FOR COMMUNICATION IN A WIRELESS LOCAL AREA NETWORK," filed Jan. 26, 2020, the entirety of all of which is hereby expressly incorporated by reference herein.

TECHNICAL AREA

The present disclosure, generally, pertains to communication and, more specifically, to apparatuses, methods, and computer-readable medium for communication in a wireless local area network.

BACKGROUND

A wireless local area network (WLAN) may refer to a network that wirelessly connects two or more devices in a coverage area. A WLAN can be deployed in many types of environments, such as residential, commercial, and/or public. Devices can be moved around in the coverage area of the WLAN while maintaining a wireless connection. A WLAN may be utilized to access a local intranet and/or the Internet. Devices in a WLAN can communicate with each other using various protocols. Improvements to such protocols may enable relatively faster download and/or upload of information, relatively less latency, and/or relatively less power consumption, which may provide various technical benefits and may improve the overall user experience.

BRIEF DESCRIPTION OF THE DRAWINGS

The drawings are not intended to limit the scope of the present disclosure nor any aspect of the claims. The drawings are provided solely to illustrate a few aspects that may be described in greater detail throughout the present disclosure. Some aspects described throughout the present disclosure may not be illustrated in the drawings.

DETAILED DESCRIPTION

Figure 1:
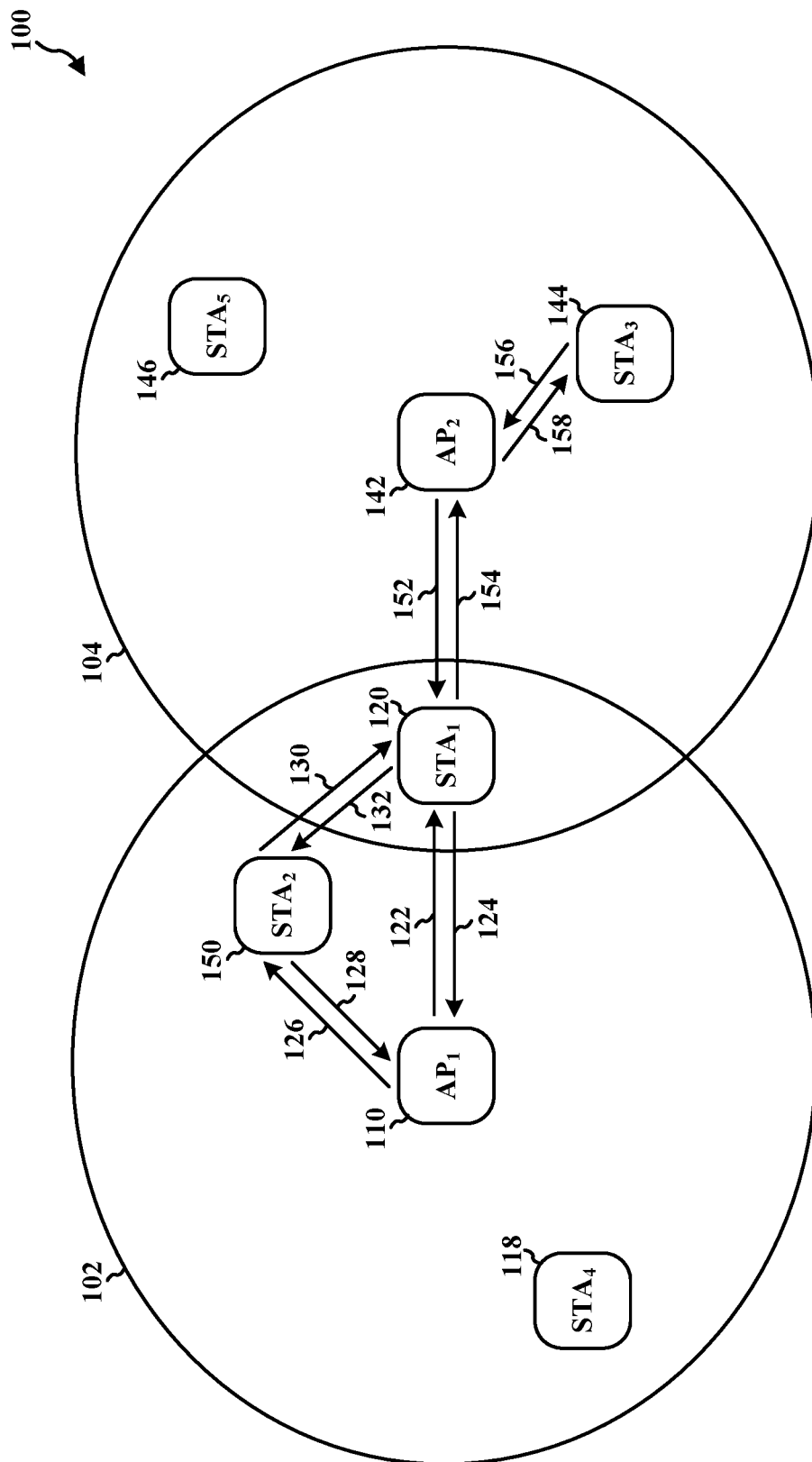
FIG. 1 is a diagram illustrating a non-limiting example of at least one wireless local area network (WLAN) according to some aspects of the present disclosure.

A wireless local area network (WLAN) may include one or more access points (APs) and/or one or more stations (STAs). In some aspects, the term(s) 'AP,' 'apparatus' (e.g., an apparatus of an AP), and/or 'computer-readable medium' (e.g., a computer-readable medium of an AP) may be, may reside within, and/or may refer to a router, a base station, a transmitter (TX), a receiver (RX), a base transceiver station, a radio, a radio base station, a radio transceiver, a network, a basic service set (BSS), an extended service set, a computing device, a user equipment (UE), a phone, a node, a mesh node, a Node B, a relay, a range extender, a peer, a device, a scheduler, one or more software modules, one or more computer-executable code/instructions, one or more computer-readable medium, one or more memory, one or more processor, one or more hardware components, one or more circuits or modules, any combination of any one or more of the foregoing items, and/or any other suitable term(s), any one or more of which may be suitable for performing any one or more of the methods, operations, steps, functions, features, and/or aspects described herein, e.g., with respect to AP 110.

In some aspects, the term(s) 'STA,' 'apparatus' (e.g., an apparatus of an STA), and/or 'computer-readable medium' (e.g., a computer-readable medium of an STA) may be, may reside within, and/or may refer to a laptop computer, a mobile phone, a cellular phone, a mobile station, a UE, a phone, a handset device, a subscriber station, a mobile unit, a wireless device, a smartphone, a remote device, a tablet device, a desktop computer, a terminal, a mobile client, a client device, a stationary device, a mesh node, a relay, a range extender, a peer device, a netbook, a notebook, a projector, a payment device, a display device, a global positioning system device, a multimedia device, a game console, a camera, a video-recorder, an entertainment device, an virtual reality device, an augmented reality device, a wearable computing device, glasses, a watch, headphones, computer peripherals, garage doors, garage door openers, wireless computer peripherals (e.g., mouse, keyboard, etc.), an exercise device, an appliance, a transport vehicle, a car, a sensor, a stationary battery-powered device, a device with a sensor, office equipment, home equipment, industrial equipment, a low-power device, an inventory tracking device, an Internet-of-Things (IoT) device, a smart-home device, a system-on-a-chip (SoC), a consumer electronics device, a schedule, an inventory monitoring device, a home environment monitoring device, an outdoor/environment monitoring device, a device used in automation, a device used in transportation, a TX, an RX, a radio, a radio transceiver, one or more software modules, one or more computer-executable code/instructions, one or more computer-readable medium, one or more memory, one or more processor, one or more hardware components, one or more circuits or modules, any combination of any one or more of the foregoing items, and/or any other suitable term(s), any one or more of which may be suitable for performing any one or more of the methods, operations, steps, functions, features, and/or aspects described herein, e.g., with respect to, e.g., STA(s) 120, 150.

An AP may be configured to communicate downlink (DL) signals to one or more other apparatuses, such as one or more STAs. An STA may be configured to communicate uplink (UL) signals to one or more other apparatuses, such as one or more APs and/or one or more other STAs. In some aspects, a transmission from an AP to one or more STAs may be characterized as DL, and a transmission from an STA to one or more APs may be characterized as UL. In some aspects, DL communication may refer to any communication initiated by, originated at, communicated from, generated by, and/or transmitted by an AP and destined for, intended for, and/or received by an STA. In some aspects, UL communication may refer to any communication initiated by, originate at, communicated from, generated by, and/or transmitted by an STA and destined for, intended for, and/or received by an AP. An AP and STA may implement various communications protocols to implement the methods, operations, steps, functions, features, and/or aspects described herein without deviating from the scope of the present disclosure.

FIG. 1 is a diagram 100 illustrating a non-limiting example of at least one WLAN according to some aspects of the present disclosure. In the example illustrated in FIG. 1, $AP_1$ 110 has a coverage area 102 that at least partially overlaps with a coverage area 104 of $AP_2$ 142. The coverage area 102 of $AP_1$ 110 includes $STA_1$ 120, $STA_2$ 150, and $STA_4$ 118. The coverage area 104 of $AP_2$ 142 includes $STA_1$ 120, $STA_3$ 144, and $STA_B$ 146. FIG. 1 illustrates many DL communications 122, 126, 152, 158 and many UL communications 124, 128, 154, 156. Additionally or alternatively, STAs may communicate with each other via peer-to-peer transmissions 130, 132. Additional description related to certain communications is provided throughout the present disclosure.

Figure 2:
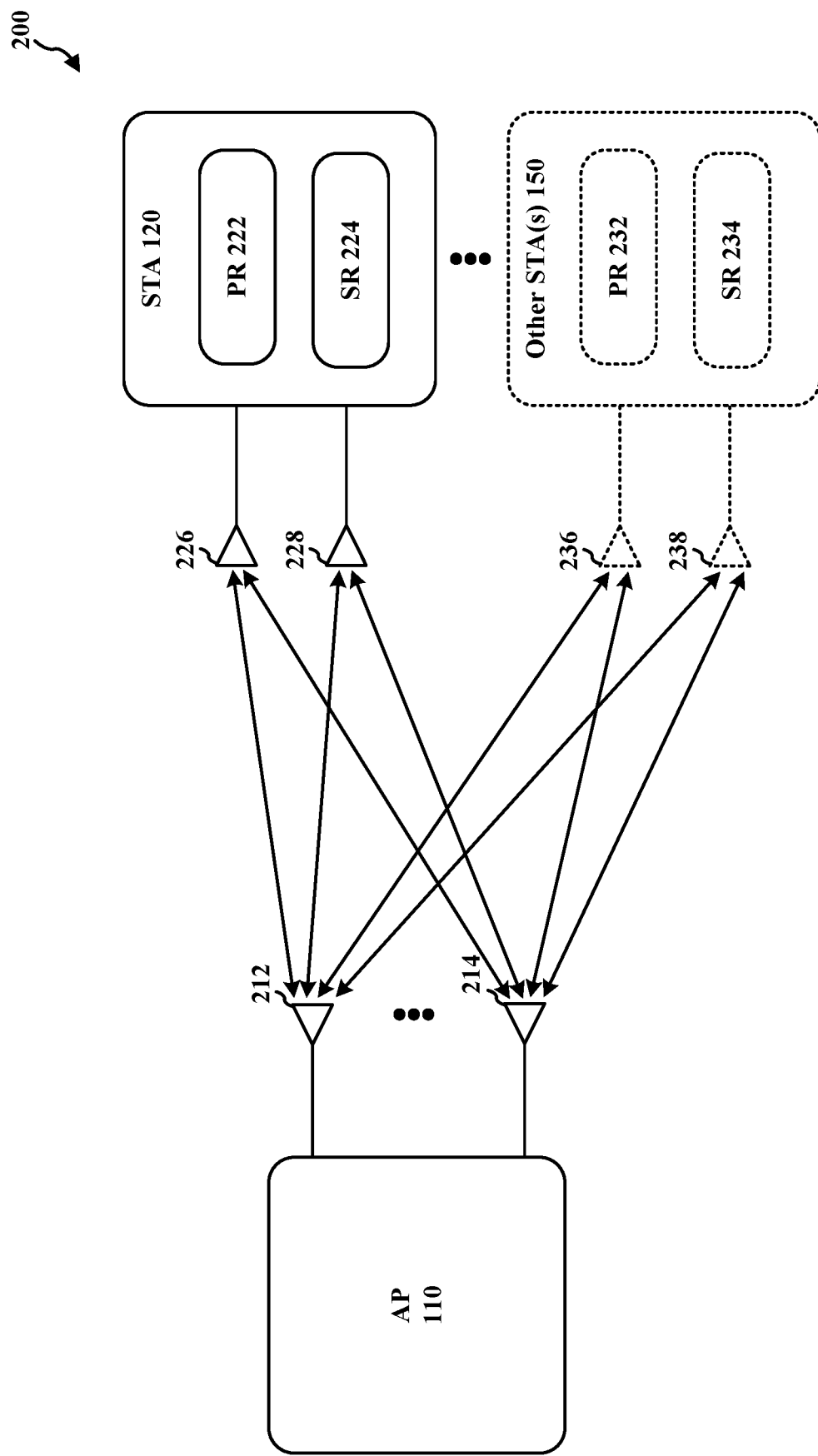
FIG. 2 is a diagram illustrating a non-limiting example of wireless communication between an access point (AP) and one or more stations (STAs) according to some aspects of the present disclosure.

FIG. 2 is a diagram 200 illustrating a non-limiting example of wireless communication between an AP and one or more STAs according to some aspects of the present disclosure. AP 110 may have one or more radios. AP 110 may have one or more antennas 212, 214. STA(s) 120, 150 may include a primary radio (PR) 222, 232 and a secondary radio (SR) 224, 234. STA(s) 120, 150 may include one or more antennas 226, 228. In some aspects, without deviating from the scope of the present disclosure, STA(s) 120, 150 may have one or more PRs 222, 232 and/or one or more SRs 224, 234. Although the foregoing aspects may exist in some examples, additional examples exist in which such aspects do not exist or exist in varying forms, configurations, and/or combinations.

A radio may communicate (e.g., transmit and/or receive data/information) using a wireless communication medium with another apparatus. As used herein, in some aspects, without deviating from the scope of the present disclosure, the term 'radio' may refer to any set of one or more components that can be utilized to generate radio waves. Such components may include any one or more structures, modules, circuits, processors, algorithms, computer-readable medium, memory, interfaces, transceivers, antennas, and/or various other aspects, regardless of whether described herein, that can implement the various features, functions, operations, elements, methods, and/or aspects described herein. Non-limiting examples of such one or more components are described herein with reference to FIGS. 5 and 6 for AP 110 and STA(s) 120, 150, respectively. The various features, functions, operations, elements, methods, and/or aspects described herein may be implemented in varying designs for different radios without necessarily deviating from the scope of the present disclosure. As used herein, in some aspects, without deviating from the scope of the present disclosure, the term 'radio' may alternatively or interchangeably be referred to as receiver, transmitter, transceiver, transceiver circuit, radio circuit, link, link circuit, channel, channel circuit, communication circuit, and/or various other suitable terms, including station (STA), STA radio, STA receiver, STA transmitter, STA transceiver, STA transceiver circuit, STA radio circuit, STA link, STA link circuit, STA channel, STA channel circuit, STA communication circuit, access point (AP), AP radio, AP receiver, AP transmitter, AP transceiver, AP transceiver circuit, AP radio circuit, AP link, AP link circuit, AP channel, AP channel circuit, AP communication circuit, entity (e.g., communication entity) radio, entity (e.g., communication entity) receiver, entity (e.g., communication entity) transmitter, entity (e.g., communication entity) transceiver, entity (e.g., communication entity) transceiver circuit, entity (e.g., communication entity) radio circuit, entity (e.g., communication entity) link, entity (e.g., communication entity) link circuit, entity (e.g., communication entity) channel, entity (e.g., communication entity) channel circuit, entity (e.g., communication entity) communication circuit, and/or various other suitable terms. Accordingly, in some aspects, any one or more aspect described herein with respect to any one or more of the foregoing terms can apply the same, similarly, or equivalently with respect to any one or more of the other foregoing terms without deviating from the scope of the present disclosure. In some aspects, the following terms may in some aspects be interchangeable without deviating from the scope of the present disclosure: apparatus, AP, STA, entity (e.g., communication entity), radio, link, link circuit, channel, channel circuit, transceiver, receiver, transmitter, transceiver circuit, radio circuit, communication circuit, and/or various other suitable terms. Accordingly, in some aspects, any one or more aspect described herein with respect to any one or more of the foregoing terms can apply the same, similarly, or equivalently with respect to any one or more of the other foregoing terms without deviating from the scope of the present disclosure.

Although various examples provided herein describe STA(s) 120, 150 as including two radios (e.g., PR 222, SR 224, PR 232, SR 234), STA(s) 120, 150 may include any number of radios (e.g., one radio or more than two radios) without necessarily deviating from the scope of the present disclosure. As illustrated in FIG. 1, STA(s) 120, 150 may communicate wirelessly with AP 110, and AP 110 may communicate wirelessly with STA(s) 120, 150 and, possibly, other STA(s) 150, which may have its/their own PR (e.g., PR 232, including or using antenna 236) and/or SR (SR 234, including or using antenna 238). Such communication(s) may include concurrent and/or independent streams (e.g., of data/information) to and from one or more apparatuses. Additional description related to various structures, modules, circuits, processors, algorithms, computer-readable medium, memory, interfaces, transceivers, antennas, and various other aspects of AP 110 and STA(s) 120, 150 is provided throughout the present disclosure, including description provided herein with respect to FIG. 5 and FIG. 6, respectively.

Figure 3:
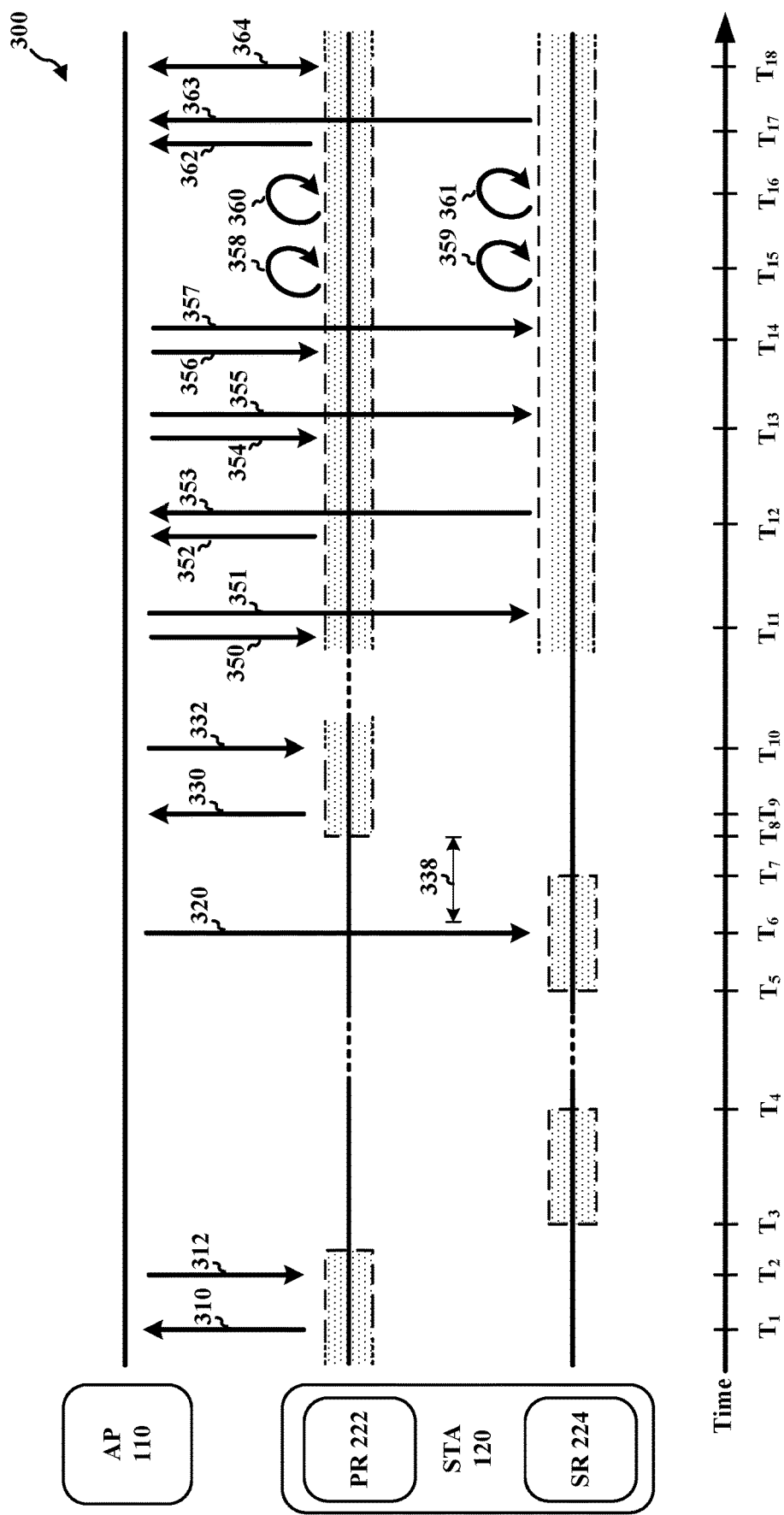
FIG. 3 is a diagram illustrating a non-limiting example of various communications at various times according to some aspects of the present disclosure.

FIG. 3 is a diagram 300 illustrating a non-limiting example of various communications at various times according to some aspects of the present disclosure. FIG. 3 is a diagram 300 illustrating non-limiting examples of various communications between AP 110 and STA(s) 120, 150 according to various aspects of the present disclosure. In some aspects, at one or more times (e.g., including $T_1$ and/or $T_2$), AP 110 may communicate with STA(s) 120, 150. In some aspects, such communications may pertain to capabilities, parameters, settings, configurations, and other aspects that may affect one or more states, modes, configurations, parameters and/or future communications between AP 110 and STA(s) 120, 150.

In some aspects, AP 110 and STA(s) 120, 150 may negotiate various parameters, settings, and/or configurations, which may relate to operation(s) of AP 110, STA(s) 120, STA(s) 150, PR 222, PR 232, SR 224, and/or SR 234. In some aspects, at time $T_1$, STA(s) 120, 150, may transmit and AP 110 may receive an UL communication 310. In some aspects, the UL communication 310 may be or include a request, a request packet, a timing management signal, a timing signal, and other suitable terms without deviating from the scope of the present disclosure. Various aspects related to such UL communication 310 are provided in greater detail throughout the present disclosure. In some aspects, at time $T_2$, AP 110 may transmit and STA(s) 120, 150 may receive a DL communication 312. In some aspects, the DL communication 312 may be or include a response, a response packet, a timing management signal, timing signal, and other suitable terms without deviating from the scope of the present disclosure. Various aspects related to such DL communication 312 are provided in greater detail throughout the present disclosure.

Although UL communication 310 is illustrated as a single communication, and DL communication 312 is illustrated as a single communication, multiple UL communications and/or multiple DL communications can be implemented without deviating from the scope of the present disclosure. Any or all aspects described herein with reference to an 'UL communication 310' and/or 'DL communication 312' can be respectively included in a singular DL communication 312 and/or singular UL communication 310 (as shown in FIG. 3) or alternatively included in discrete/separate UL communications and/or discrete/separate DL communications taking place at varying times (even though not shown in FIG. 3) without deviating from the scope of the present disclosure. In other words, any description provided herein with reference to an 'UL communication 310' may be included in a singular UL transmission or included in different UL communications occurring at different times, and/or any description provided herein with reference to 'DL communication 312' may be included in a singular DL transmission or included in different DL communications occurring at different times.

In some aspects, STA(s) 120, 150 may utilize PR(s) 222, 232 for UL communication 310 and/or DL communication 312, but STA(s) 120, 150 may alternatively utilize its SR(s) 224, 234 for UL communication 310 and/or DL communication 312 without deviating from the scope of the present disclosure. Although the illustration provided in FIG. 3 depicts that, in some aspects, such UL communication 310 may occur prior to such DL communication 312, this may not necessarily be a limitation of the present disclosure. For example, in some aspects, such DL communication 312 may occur prior to such UL communication 310 without deviating from the scope of the present disclosure. Although the illustration in FIG. 3 depicts that, in some aspects, both UL communication 310 and such DL communication 312 can occur, this may not necessarily be a limitation of the present disclosure. For example, in some aspects, such UL communication 310 may occur without such DL communication 312 ever occurring, and, in some other aspects, such DL communication 312 may occur without such UL communication 310 ever occurring.

In some aspects, certain communications (e.g., DL communication 312 and/or UL communication 310) may occur while PR(s) 222, 232 is in a high power state/mode. In some aspects, certain communications (e.g., DL communication 312 and/or UL communication 310) may occur while the SR(s) 224, 234 is in a low power state/mode. Generally, the term 'high power state/mode' may alternatively or interchangeably be referred to as an active state/mode, awake state/mode, an on state/mode, a powered up/on state/mode, a turned up/on state/mode, and/or various other suitable terms without deviating from the scope of the present disclosure. In some aspects, the term 'high power state/mode' may refer to a state/mode in which the power utilized (e.g., by PR 222, PR 232, SR 224, and/or SR 234) is above or greater than a certain threshold value (e.g., threshold power value). Generally, the term 'low power state/mode' may alternatively or interchangeably be referred to as a doze state/mode, a power-save state/mode, an off state/mode, a powered down/off state/mode, a turned down/off state/mode, and/or various other suitable terms without deviating from the scope of the present disclosure. In some aspects, the term 'low power state/mode' may be referred to as a state/mode in which no/zero power is utilized (e.g., by PR 222, PR 232, SR 224, and/or SR 234). In some aspects, the term 'low power state/mode' may refer to a state/mode in which the power utilized (e.g., by PR 222, PR 232, SR 224, and/or SR 234) is below or less than a certain threshold value (e.g., threshold power value).

In some aspects, the PR(s) 222, 232 may sometimes alternate between a high power state/mode and a low power state/mode. Such alternating may occur when STA(s) 120, 150 or its PR(s) 222, 232 is in a power-save state/mode or a duty cycle state/mode. Although such alternating is illustrated in FIG. 3, in some aspects, the PR(s) 222, 232 may not perform such alternating and may be in a, e.g., continuous high power state/mode (e.g., without the low power state/mode). In some aspects, the SR(s) 224, 234 may sometimes alternate between a high power state/mode and a low power state/mode. Such alternating may occur when STA(s) 120, 150 or its SR(s) 224, 234 is in a power-save state/mode or a duty cycle state/mode. Although such alternating is illustrated in FIG. 3, in some aspects, the SR(s) 224, 234 may not perform such alternating and may be in a, e.g., continuous high power state/mode (e.g., without the low power state/ mode). Various aspects pertaining to certain states, modes, configurations, and parameters associated with operation(s) of STA(s) 120, 150, the PR(s) 222, 232, and/or the SR(s) 224, 234 is provided throughout the present disclosure.

In some aspects, an apparatus (e.g., STA(s) 120, 150) may include one or more receivers and/or antennas (e.g., PR(s) 222, 232 and/or SR(s) 224, 234). In some aspects, the apparatus (e.g., STA(s) 120, 150) may have one or more primary/main receivers (e.g., PR(s) 222, 232) and/or one or more secondary receivers (SR(s) 224, 234). In some aspects, a secondary receiver (e.g., SR(s) 224, 234) may also be referred to by various terms, such as an awaken radio/receiver, a low-power radio/receiver, and/or other terms. In some aspects, the secondary receiver(s)/radio(s) (e.g., SR(s) 224, 234) may consume and/or utilize less power, resources, etc. than the primary receiver(s)/radio(s). In some aspects, the secondary receiver(s) (e.g., SR(s) 224, 234) may be configured to awaken one or more primary/main receivers (e.g., PR(s) 222, 232) under certain circumstances, such as after/upon receiving a certain type of packet (e.g., an awaken packet, packet 320). In some aspects, an apparatus (e.g., STA(s) 120, 150) may include one or more receivers and/or antennas (e.g., PR(s) 222, 232 and/or SR(s) 224, 234).

One of ordinary skill in the art will understand that certain terms described/mentioned herein may be interchangeable without necessarily deviating from their respective meaning. The terms packet, frame, beacon, signal, transmission, communication, and/or various other suitable terms may be interchangeable without necessarily deviating from the scope of the present disclosure and/or without necessarily deviating from their respective meaning. The terms awaken packet, request packet, awaken request packet, and/or various other suitable terms may be interchangeable without necessarily deviating from the scope of the present disclosure and/or without necessarily deviating from their respective meaning. The terms request packet, awaken response packet, and/or various other suitable terms may be interchangeable without necessarily deviating from the scope of the present disclosure and/or without necessarily deviating from their respective meaning.

In some aspects, the apparatus (e.g., STA(s) 120, 150) may utilize one or more of the secondary receivers (e.g., awaken radio(s)/receiver(s)) (e.g., SR(s) 224, 234) to receive a packet (e.g., packet 320) while its primary/main receiver(s)/radio(s) (e.g., PR(s) 222, 232) is turned/powered off or in a low-power mode/state. In some aspects, the received packet (e.g., packet 320) may be (1) configured to trigger, awaken, turn on, and/or cause a high(er) power mode to occur for one or more of the receivers/radios (e.g., one or more primary/main radios/receivers) (e.g., PR(s) 222, 232) of the apparatus (e.g., STA(s) 120, 150), and/or (2) configured to trigger a response packet (e.g., response/message 330). After, in response to, and/or in association with receiving such a packet (e.g., packet 320), the apparatus (e.g., STA(s) 120, 150) may (1) awaken the one or more primary/main radios/receivers (e.g., PR(s) 222, 232), and/or (2) cause a response packet (e.g., response/message 330) to be communicated. If the main/primary radio(s)/receiver(s) (e.g., PR(s) 222, 232) is turned/powered off or in the low-power state/mode, the apparatus (e.g., STA(s) 120, 150) may refrain or be unable to transmit a corresponding transmission (e.g., response, such as response/message 330). In some aspects, the apparatus (e.g., STA(s) 120, 150) may transmit a power save poll frame. In some aspects, after transmitting such a frame, the apparatus (e.g., STA(s) 120, 150) may receive a data packet (e.g., packet 320) and subsequently transmit an acknowledgement frame/packet (e.g., response/message 330).

In some aspects, the receiver/STA (e.g., STA(s) 120, 150) may receive a packet (e.g., packet 320). The packet (e.g., packet 320) may or may not include a preamble. The packet (e.g., packet 320) may be or include an awaken packet, a data packet, an uplink transmission request (ULTR) (as described in greater detail herein), a trigger packet, a beacon, and/or various other types of packets. In some aspects, the packet (e.g., packet 320) may be and/or may be an orthogonal frequency division multiplexing (OFDM) and/or an orthogonal frequency division multiple access (OFDMA) packet. In some aspects, the packet (e.g., packet 320) may be modulated using various keying/modulation techniques, such as frequency shift keying, amplitude shift keying, phase shift keying, on off keying, quadrature amplitude modulation, and/or various other types of modulation or keying/modulation techniques.

In some aspects, the awaken request packet may include various fields, parameters, indications, data, and/or other information without deviating from the scope of the present disclosure. In some aspects, the awaken request packet may include a field/parameter/indication/data/information indicating/corresponding to/associated with an indication, purpose, intention, objective, and/or other state/mode/configuration associated with the STA(s) that receives that awaken request packet. In some aspects, such indication, purpose, intention, objective, or other state/mode/configuration of the STA(s) (e.g., STA(s) 120, 150) may include a transmission, e.g., an UL transmission, of information/data, which may be corresponding to or be after, in response to, and/or in association with receipt of the awaken request packet. In such aspects, the STA(s) (e.g., STA(s) 120, 150) may communicate/transmit UL data/information without/before polling, or transmitting a poll message (e.g., a power save poll) to, the apparatus (e.g., AP 110) that communicated the awaken request packet, and/or without/before receiving a poll message (e.g., an uplink data poll) from the apparatus (e.g., AP 110) that communicated the awaken request packet.

In some aspects, such an indication, purpose, intention, objective, and/or other state/mode/configuration of the STA(s) (e.g., STA(s) 120, 150) may include a setting, configuration, or initialization of certain parameters of the STA(s) (e.g., STA(s) 120, 150) that may have received the awaken request packet. In such aspects, the STA(s) (e.g., STA(s) 120, 150) may communicate/transmit information indicating or corresponding to one or more preferences of the STA(s) (e.g., STA(s) 120, 150) (e.g., one or more preferences associated with settings/parameters/configurations of UL communication) without polling, or transmitting a poll message (e.g., a power save poll) to the apparatus (e.g., AP 110) that communicated the awaken request packet, and/or without/before receiving, from the apparatus (e.g., AP 110) that communicated the awaken request packet, information indicating or corresponding to one or more preferences of the STA(s) (e.g., STA(s) 120, 150) (e.g., one or more preferences associated with settings/parameters/configurations of UL communication).

In some aspects, STA(s) 120, 150 may await receipt, e.g., at/including times $T_3$, $T_4$ and $T_5$, which may be while the PR(s) 222, 232 is in the low power state/mode. In some aspects, at time $T_6$, AP 110 may transmit and STA(s) 120, 150 may receive a packet 320. In some aspects, the SR(s) 224, 234 receives the packet 320 while the SR(s) 224, 234 is in a high power state/mode. In some aspects, the PR(s) 222, 232 may be in a low power state/mode when AP 110 transmits and STA(s) 120, 150 (e.g., utilizing SR(s) 224, 234) receives the packet 320. In some aspects, as described herein, the packet 320 may alternatively or interchangeably be referred to as an awaken packet, an awake packet, an awaken request packet, and/or various other suitable terms without deviating from the scope of the present disclosure. Various aspects related to the packet 320 and operations by STA(s) 120, 150 in relation to the packet 320 are provided throughout the present disclosure.

In some aspects, following communication of the packet 320, STA(s) 120, 150 may initiate, e.g., at time $T_7$, a transition of the PR(s) 222, 232 from a low power state/mode to a high power state/mode. For example, after a transition period 338, the PR(s) 222, 232 may be in a high power state/mode by time $T_8$. In some aspects, the SR(s) 224, 234 may be in a low power state/mode after the PR(s) 222, 232 transitions to a high power state/mode. In some aspects, at time $T_9$, STA(s) 120, 150 (e.g., utilizing PR(s) 222, 232) may transmit and AP 110 may receive a message 330. In some aspects, at time $T_{10}$, AP 110 may transmit and STA(s) 120, 150 (e.g., utilizing PR(s) 222, 232) may receive a response packet 332. Various aspects pertaining to such packets 330, 332 are provided throughout the present disclosure.

In some aspects, at any one or more of time(s) $T_{11\text{-}17}$, AP 110 and STA(s) 120, 150 (or its PR(s) 222, 232 and/or SR(s) 232, 234) may perform UL and/or DL communication of various information, possibly including data packets with payloads. In some aspects, at time $T_{11}$, $AP_1$ 110 may transmit DL communications(s) 350, 351 to STA(s) 120, 150 (or its PR(s) 222, 232 and/or SR(s) 232, 234), and various aspects pertaining to such DL communications(s) 350, 351 are provided in greater detail herein. In some aspects, such DL communication(s) 350, 351 may be configured to cause STA(s) 120, 150 (or its PR(s) 222, 232 and/or SR(s) 232, 234) to transmit various UL communication(s), as described in greater detail herein. In some aspects, at time $T_{12}$, STA(s) 120, 150 (or its PR(s) 222, 232 and/or SR(s) 232, 234) may transmit UL communication(s) 352, 353 to AP 110, and various aspects pertaining to such UL communication(s) 352, 353 are provided in greater detail herein. In some aspects, such UL communication(s) 352, 353 may be configured to protect various DL communication(s) (e.g., DL multiuser communication(s) 354, 355) to STA(s) 120, 150 (or its PR(s) 222, 232 and/or SR(s) 232, 234), as described in greater detail herein. In some aspects, at time $T_{13}$, AP 110 may transmit DL multiuser communication(s) 354, 355 222 to STA(s) 120, 150 (or its PR(s) 222, 232 and/or SR(s) 232, 234), and various aspects pertaining to such DL multiuser communication(s) 354, 355 are provided in greater detail herein. In some aspects, the DL multiuser communication(s) 354, 355 may include data and/or information destined/intended for a plurality apparatuses (e.g., STA(s) 120, 150, or its PR(s) 222, 232 and/or SR(s) 232, 234), as described in greater detail herein.

In some aspects, at time $T_{14}$, AP 110 may transmit DL communication(s) 356, 357 to STA(s) 120, 150 (or its PR(s) 222, 232 and/or SR(s) 232, 234), and various aspects pertaining to such DL communication(s) 356, 357 are provided in greater detail herein. In some aspects, the DL communication(s) 356, 357 may be or include a single or same set of DL transmission(s) (e.g., destined/intended for STA(s) 120, 150, or its PR(s) 222, 232 and/or SR(s) 232, 234). In some aspects, the DL communication(s) 356, 357 may be or include two or more sets of transmissions (e.g., one set of one or more DL communication(s) 356, 357 destined/intended for STA 120 or its PR(s) 222 and/or SR(s) 224, and another set of one or more DL communication(s) 356, 357 destined/intended for STA 150 or its PR(s) 232 and/or SR(s) 234); in some aspects, such two or more sets of transmissions may or may not vary from each other with respect to content (e.g., data/information) and/or timing (e.g., transmission time) without deviating from the scope of the present disclosure. In some aspects, the DL communication(s) 354, 355 may be included as a part of another DL communication (e.g., DL multiuser communication(s) 354, 355) without deviating from the scope of the present disclosure. In some aspect, the DL communication(s) 356, 357 may be configured to trigger one or more UL transmission(s) by one or more STAs, as described in greater detail herein.

In some aspects, at time $T_{17}$, STA(s) 120, 150 (or its PR(s) 222, 232 and/or SR(s) 232, 234) may transmit one or more UL communications 362, 363 to AP 110, and various aspects pertaining to such one or more UL communications 362, 363 are provided in greater detail herein. In some aspects, prior to such one or more UL communications 362, 363 at time $T_{17}$, STA(s) 120, 150 (or its PR(s) 222, 232 and/or SR(s) 232, 234) may (1) at time $T_{15}$, enable/perform various features, operations, functions, and/or aspects 358, 359 related to carrier sensing and/or one or more network allocation vector(s) (NAV(s)), as described in greater detail herein, and/or (2) at time $T_{16}$, may enable/perform various features, operations, functions, and/or aspects 360, 361 related to random access, as also described in greater detail herein. In some aspects, at time $T_{18}$, AP 110 and STA(s) 120, 150 (e.g., or its PR(s) 222, 232) may communicate information configured to suspend or disregard certain negotiated parameters, settings, and/or configurations, which may relate to operation(s) of AP 110, STA(s) 120, 150, PR(s) 222, 232 and/or SR(s) 224, 234.

Although FIG. 3 depicts various aspects, including various communications possibly occurring at various times (e.g., $T_1, T_2, \ldots T_{18}$) while one or more radios (e.g., PR(s) 222, 224 and/or SR(s) 232, 234) of STA(s) 120, 150 may be in various states/modes, modes, or configurations, such various aspects are provided to facilitate description of just a few of the many combinations, mixtures, and permutations of such various aspects that can exist without deviating from the scope of the present disclosure. In some aspects, fewer than all of such various aspects can exist without deviating from the scope of the present disclosure, and any combination, mixture, or permutation of any one or more of such various aspects is within the scope of the present disclosure. For example, although FIG. 3 depicts that various communications may occur, it is possible for one or more of such communications to not occur without deviating from the scope of the present disclosure, and it is alternatively or additionally possible for one or more additional communications (not explicitly illustrated in FIG. 3 but described herein) to occur without deviation from the scope of the present disclosure. Any indications of time are merely provided for illustrative purposes, and such indications are not necessarily to scale, not necessarily intended to limit the sequence or order of such communications, nor necessarily provided to suggest that certain communications have to occur at certain specific times.

Figure 4:
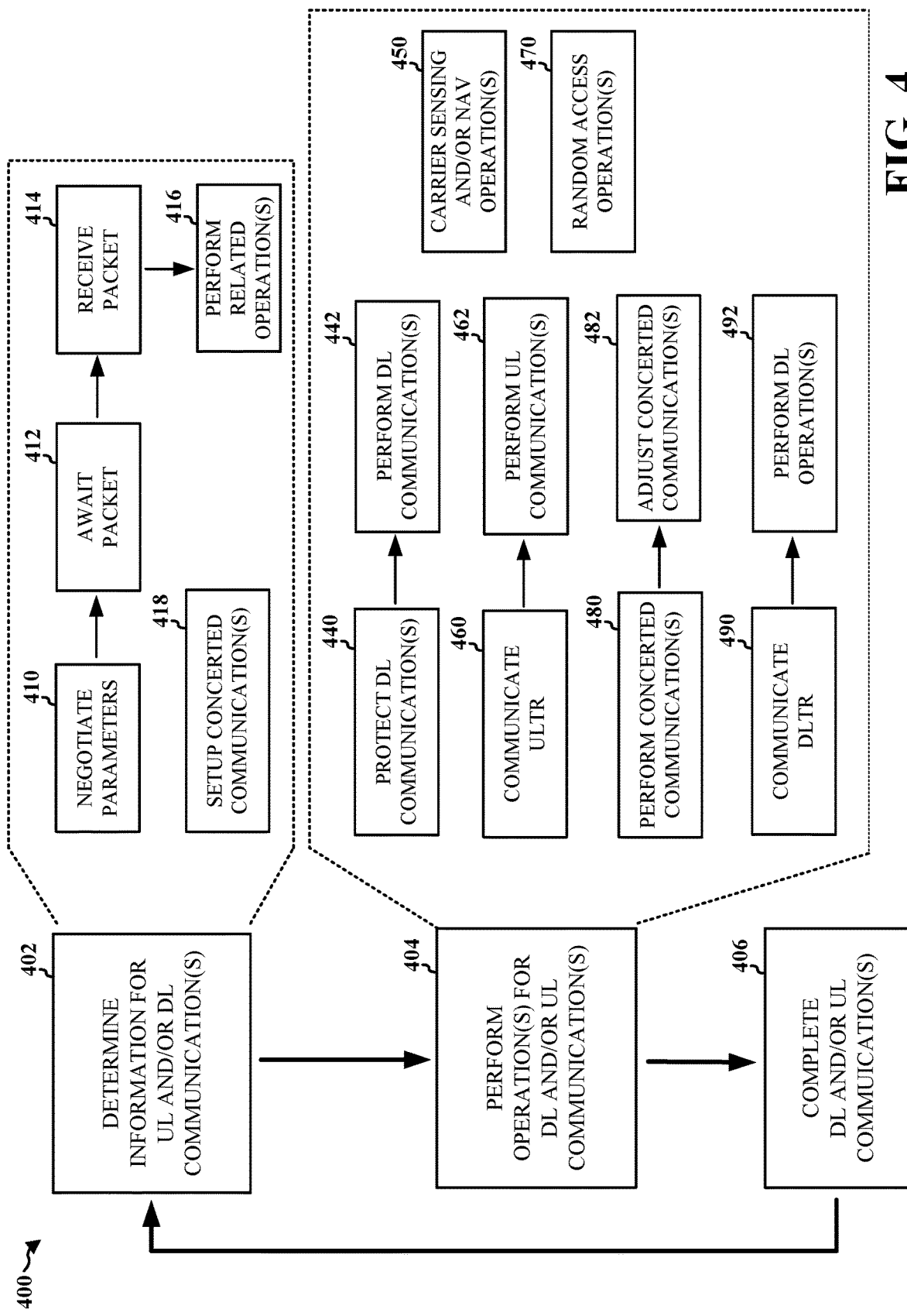
FIG. 4 is a diagram illustrating a non-limiting example of various operations according to some aspects of the present disclosure.

FIG. 4 is a diagram 400 illustrating a non-limiting example of various operations according to some aspects of the present disclosure. In some aspects, at block 402, an apparatus (e.g., AP 110 and/or STA(s) 120, 150, or its PR(s) 222, 232 and/or SR(s) 224, 234) may determine information for UL and/or DL communication(s). Generally, determining information for UL and/or DL communication(s) prepares an apparatus (e.g., AP 110 and/or STA(s) 120, 150, or its PR(s) 222, 232 and/or SR(s) 224, 234) for performing one or more operations for such DL and/or UL communication(s). More specifically, non-limiting examples of determining information for UL and/or DL communication(s) may include (but may not necessarily include in all examples) any one or more of the following: negotiating parameters (e.g., block 410), awaiting receipt of a packet (e.g., block 412), receiving such packet (e.g., block 414), performing related operations (e.g., block 416), and/or setting up parameter/configurations for concerted communication (block 418). Details pertaining to these blocks are provided throughout the present disclosure. In reviewing the entirety of the present disclosure, one of ordinary skill in the art will appreciate that many aspects described herein (including aspects described about DL communication(s) 312, 320, 332, 351, 355, 357, UL communication(s) 310, 330, 352, 353, 362, 363, and/or other aspects 358-361) relate generally to block 402 and/or or more specifically to other blocks 410, 412, 414, 416, 418, even if such blocks may not be always explicitly referenced in the description of the aspects to which they relate. One of ordinary skill in the art will also appreciate that certain aspects described in the present disclosure do not necessitate every (or, in some cases any) of the foregoing blocks 402, 410, 412, 414, 416, 418.

In some aspects, at block 404, an apparatus (e.g., AP 110 and/or STA(s) 120, 150, or its PR(s) 222, 232 and/or SR(s) 224, 234) may perform operations for DL and/or UL communication(s). Generally, such operations enable or result in the DL and/or UL communication(s) by an apparatus (e.g., AP 110 and/or STA(s) 120, 150, or its PR(s) 222, 232 and/or SR(s) 224, 234) via a wireless communication medium. More specifically, non-limiting examples of operations for DL and/or UL communication(s) may include (but may not necessarily include in all examples) any one or more of the following: protecting DL communication(s) (e.g., block 440), performing DL communication(s) (e.g., block 442), carrier sensing and/or NAV-related operations (block 450), communicating an ULTR (block 450), performing UL communication(s) (block 462), random access operations (e.g., block 470), performing concerted communication(s) (e.g., block 480), adjusting configuration(s) for concerted communication(s) (block 482), communicating a DL transmission request (DLTR) (block 490), and/or for performing various DL operation(s) (block 492). Details pertaining to these blocks are provided throughout the present disclosure. In reviewing the entirety of the present disclosure, one of ordinary skill in the art will appreciate that many aspects described herein (including aspects described about DL communication(s) 312, 320, 332, 351, 355, 357, UL communication(s) 310, 330, 352, 353, 362, 363, and/or other aspects 358-361) relate generally to block 404 and/or or more specifically to other blocks 440, 442, 450, 460, 462, 470, 480, 482, 490, 492, even if such blocks may not be always explicitly referenced in the description of the aspects to which they relate. One of ordinary skill in the art will also appreciate that certain aspects described in the present disclosure do not necessitate every (or, in some cases any) of the foregoing blocks 404, 440, 442, 450, 460, 462, 470, 480, 482, 490, 492.

Lastly, at block 406, an apparatus (e.g., AP 110 and/or STA(s) 120, 150, or its PR(s) 222, 232 and/or SR(s) 224, 234) may perform operations for completing DL and/or UL communication(s) and, subsequently, possibly determining information for UL and/or DL communication(s) (block 402), as indicated in FIG. 4. Details pertaining to block 406 are provided throughout the present disclosure. Aspects relevant to performing such operations will be apparent to one of ordinary skill in the art in view of the present disclosure, even if such block may not be always explicitly referenced in the description of the aspects to which they relate. One of ordinary skill in the art will also appreciate that certain aspects described in the present disclosure do not necessitate every (or, in some cases any) of block 406.

As mentioned above, at block 410, an apparatus (e.g., AP 110 and/or STA 120, or its PR(s) 222, 232 and/or SR(s) 224, 234) may negotiate various parameters, settings, and/or configurations, which may relate to operation(s) of AP 110, STA 120, PR 222, and/or SR 224. Various aspects described below will provide non-limiting examples of some aspects pertaining to block 410 (even if block 410 may not be explicitly referenced in every instance), and one of ordinary skill in the art will appreciate that such aspects may additionally or alternatively pertain to other blocks illustrated in FIG. 4 without deviating from the scope of the present disclosure. In some aspects, the UL communication 310 may be or include a request packet. In some aspects, the DL communication 312 may be or include a response packet. In some aspects, STA(s) 120, 150 may use PR(s) 222, 232 to transmit, and AP 110 may receive, a request packet. After or in response to transmitting the request packet, AP 110 may transmit and STA(s) 120, 150 may use PR(s) 222, 232 to receive a response packet. In some aspects, the request packet and/or the response packet include information corresponding to or configured for negotiating one or more parameters associated with one or more power modes, states, or configurations of SR(s) 224, 234. In some aspects, the request packet and/or the response packet include information corresponding to a duty cycle of at least some radios (e.g., SR(s) 224, 234). In some aspects, the duty cycle of SR(s) 224, 234 includes turning/powering on/off the SR(s) 224, 234 or it entering into a low/lower state mode and/or a high/higher power state/mode. In some aspects, the request packet and/or the response packet includes information corresponding to timing for turning on SR(s) 224, 234 entering/being in a high power state/mode.

In some aspects, the apparatus (e.g., AP 110) may transmit a packet (e.g., packet 320), such as a request packet (e.g., an awaken request packet). After, in response to, and/or in association with transmitting such a packet (e.g., packet 320), the apparatus (e.g., AP 110) may receive a response packet (e.g., an awaken response packet) (e.g., response 330). In some aspects, the communication (e.g., reception and/or transmission) of such a request packet (e.g., packet 320) and/or such a response packet (e.g., response 330) may be performed using the main/primary receiver(s)/radio(s) (e.g., PR(s) 222, 232). In some aspects, the communication (e.g., reception and/or transmission) of such a request packet (e.g., packet 320) and/or such a response packet (e.g., response 330) may be performed using the secondary radio(s)/receiver(s) (e.g., SR(s) 224, 234). In some aspects, such a request packet (e.g., packet 320) and/or response packet (e.g., response 330) may include information (e.g., one or more fields) corresponding to awakening one or more primary/main receivers (e.g., PR(s) 222, 232) of the apparatus (e.g., STA(s) 120, 150) under certain circumstances, such as after/upon receiving a certain type of packet (e.g., an awaken packet) (e.g., packet 320). In some aspects, such a packet (e.g., awaken packet) (e.g., packet 320) may be (1) configured to trigger, awaken, turn on, and/or cause a high(er) power mode to occur for one or more of the receivers/radios (e.g., one or more primary/main radios/receivers) (e.g., PR(s) 222, 232) of the apparatus (e.g., STA(s) 120, 150), and/or (2) configured to trigger a response packet (e.g., response 330). As described above, after, in response to, and/or in association with receiving such a packet (e.g., packet 320), the apparatus (e.g., STA(s) 120, 150) may (1) awaken the one or more primary/main radios/receivers (e.g., PR(s) 222, 232), and/or (2) cause a response packet (e.g., response 330) to be communicated.

In some aspects, the request packet (e.g., awaken request packet) (e.g., packet 320) and/or response packet (e.g., awaken response packet) (e.g., response 330) may include information corresponding to, be communicated for, and/or configured for negotiating/determining one or more parameters (e.g., duration (e.g., of one or more communications described herein), timing (e.g., of one or more communications described herein), acknowledgement policy/protocol/procedure (e.g., of one or more communications described herein), an (awaken) beacon interval (described herein) (e.g., when, how often, and/or for how long an awaken beacon is communicated, e.g., by the secondary receiver(s)/radio(s), even though the awaken request packet and/or awaken response packet may be communicated using/utilizing the primary receiver(s)/radio(s)), duty cycle, timeout interval (e.g., between two awaken packets, etc.) associated with communication of an awaken packet, one or more power states/modes (e.g., turned on/off, etc.) of the primary receiver(s)/radio(s) and/or secondary receiver(s)/radio(s), and/or various other suitable aspects of communication be the primary and/or secondary receiver(s)/radio(s) of the apparatus. In some aspects, such a request packet and/or such a response packet may include one or more fields. In some aspects, such field(s) may include information corresponding to one or more awaken actions, one or more awaken modes, one or more awaken responses, an identifier (e.g., token, key, ID, etc.) corresponding to and/or identifying a communication and/or a transaction associated with the aforementioned request packet and/or response packet, information corresponding to timing for turning on a primary and/or secondary radio(s)/receiver(s) of the apparatus when/if/following/upon/after receiving an awaken packet by the apparatus, information corresponding to a duty cycle of (e.g., turning/power on or off, entering into a low(er)/high(er) power mode, etc.) the primary and/or secondary receiver(s)/radio(s) of the apparatus. As described herein, non-limiting examples of such primary/main receiver(s)/radios may include PR(s) 222, 232 of STA(s) 120, 150 and of such secondary receiver(s)/radio(s) may include SR(s) 232, 234 of STA(s) 120, 150.

In some aspects, an apparatus (e.g., STA(s) 120, 150) may receive and/or transmit a frame configured to communicate mode signaling or a request by the apparatus (e.g., STA(s) 120, 150) to enter/exit/switch-to (or to be signaled to enter) a particular mode (e.g., an awaken mode, as described herein). In some aspects, the apparatus (e.g., STA(s) 120, 150) may enter/exit/switch-to a particular mode (e.g., an awaken mode, as described herein) without explicit signaling (e.g., without receiving and/or transmitting a particular frame configured to communicate mode signaling or a request by the apparatus (e.g., STA(s) 120, 150) to enter/exit/switch-to (or to be signaled to enter) a particular mode. In some aspects, an apparatus (e.g., STA(s) 120, 150) may receive a packet (e.g., an awaken request packet, as described herein; e.g., packet 320) (e.g., using its secondary/awaken radio/receiver; e.g., SR(s) 224, 234), while in an awaken mode (as described herein). After, in response to, and/or in association with receiving the awaken request packet (e.g., packet 320), the apparatus (e.g., STA(s) 120, 150) may enter into an active/normal mode (or power up/on or put in a non-low (e.g., normal/high) power state its main/primary radio/receiver) and initiate communication (e.g., DL and/or UL) with another apparatus (e.g., AP 110). In some aspects, the apparatus (e.g., STA(s) 120, 150) may receive data (e.g., a data packet/frame, perhaps with a data subfield in the data packet/frame set/equal to zero), e.g., using it primary/main radio/receiver. After, or in response to, and/or in association with receiving that data/data-packet/data-frame, without explicit signaling to/from the other apparatus (e.g., AP 110) (e.g., without receiving a signal/frame/packet indicating or requesting a transition/switch/change of a mode of operation (e.g., a transition/switch to or from an awaken mode) of the apparatus (e.g., STA(s) 120, 150)), the apparatus (e.g., STA(s) 120, 150) may switch-to/transition (back)/(re)enter an awaken mode (as described herein), e.g., if/only-if/provided-that an operating parameter of the secondary/awaken radio/receiver (e.g., SR(s) 224, 234) has not been changed/altered to require otherwise.

In some aspects, an apparatus (e.g., STA(s) 120, 150) may be ready (e.g., have in its queue) for UL transmission/communication of a packet/frame while in an awaken mode (as described in herein). In such aspects, without explicit signaling to/from the other apparatus (e.g., AP 110) (e.g., without receiving a signal/frame/packet indicating or requesting a transition/switch/change of a mode (of operation) (e.g., a transition/switch to or from an awaken mode) of the apparatus (e.g., STA(s) 120, 150)), the apparatus (e.g., STA(s) 120, 150) may transmit the data (e.g., data packet/frame) buffered/ready for UL transmission/communication (e.g., to the other apparatus (e.g., AP 110)) (e.g., following a contention period). After communicating/transmitting the buffered/ready data, the apparatus may receive an acknowledgement (ACK) message from the other apparatus (e.g., AP 110). After, in response to, and/or in association with receiving the (e.g., DL) acknowledgement (ACK) message from the other apparatus (e.g., AP(s) 110 and/or STA(s) 120, 150), e.g., using it primary/main radio/receiver (e.g., PR(s) 222, 232), without explicit signaling to/from the other apparatus (e.g., AP(s) 110 and/or STA(s) 120, 150) (e.g., without receiving a signal/frame/packet indicating or requesting a transition/switch/change of a mode (of operation) (e.g., a transition/switch to or from an awaken mode) of the apparatus (e.g., STA(s) 120, 150)), the apparatus (e.g., STA(s) 120, 150) may switch-to/transition (back)/(re)enter an awaken mode (as described herein), e.g., if/only-if/provided-that an operating parameter of the secondary/awaken radio/receiver has not been changed/altered to require otherwise.

In some aspects, one or more identifiers (e.g., the first identifier and/or the second identifier) that identify/identifies the receiver (e.g., STA(s) 120, 150) (e.g., an intended/destined receiver) of that packet (e.g., awaken packet, awaken request packet, etc.) (e.g., packet 320) may include an identifier (e.g., awaken(ed) receiver identifier) that is unique/specific to a particular receiver within a particular BSS. In some aspects, one or more identifiers (e.g., the first identifier and/or the second identifier) that identify/identifies the transmitter (e.g., AP 110) (e.g., that transmitted the packet, awaken packet, awaken request packet, etc.) may include, correspond to, be associated with, or bear a relationship to a BSS identifier and/or BSS color/category/grouping with which the transmitter (e.g., AP 110) and/or receiver (e.g., STA(s) 120, 150) is associated.

In some aspects, the UL communication 310 may be or include a timing management signal. In some aspects, STA(s) 120, 150 may transmit, and AP 110 may receive, a timing management signal configured to set or affect timing information, including a duration of time to operate SR(s) 224, 234 in a high power state/mode or to maintain or power on/up SR(s) 224, 234 (e.g., in a high power state/mode), corresponding to communication of the packet 320 (e.g., awaken packet) and/or its response 330 (e.g., response to awaken packet). In some aspects, STA(s) 120, 150 may transmit, and AP 110 may receive, a timing management signal configured to set or affect a timing aspect, including a duration of time to operate SR(s) 224, 234 in a high power state/mode or to maintain or power on/up SR(s) 224, 234 (e.g., in a high power state/mode). In some aspects, STA(s) 120, 150 may transmit and AP 110 may receive a timing management signal configured to set or affect timing aspects, including a start time, a duration, and/or an end time, of operating SR(s) 224, 234 in a high power state/mode or powering/turning on/up SR(s) 224, 234 (e.g., in a high power state/mode).

In some aspects, the DL communication 312 may be or include a timing management signal. In some aspects, AP 110 may transmit and STA(s) 120, 150 may (e.g., using PR(s) 222, 232) receive a timing management signal configured to set or affect a beginning time corresponding to receiving of the packet 320 (e.g., awaken request packet). In some aspects, AP 110 may transmit and STA(s) 120, 150 may (e.g., using PR(s) 222, 232) receive a timing management signal and, based on the received timing management signal, set or affect timing aspects, including a beginning time, a duration, and/or an end time, of operating SR(s) 224, 234 in a high power state/mode or of powering/turning up/on SR(s) 224, 234 (e.g., in a high power state/mode). In some aspects, AP 110 may transmit and STA(s) 120, 150 may (e.g., using PR(s) 222, 232) receive a timing management signal configured to set or affect timing information, including a duration of time to operate SR(s) 224, 234 in a high power state/mode or to maintain or power on/up SR(s) 224, 234 (e.g., in a high power state/mode), corresponding to communication of the packet 320 (e.g., awaken packet) and/or its response 330 (e.g., response to awaken packet). In some aspects, the timing management signal (e.g., of the UL communication 310 and/or DL communication 312) includes a sequence modulated by on off keying.

In some aspects, the apparatus (e.g., STA(s) 120, 150, using e.g., PR(s) 222, 232 and/or SR(s) 224, 234) may receive a timing management signal. The timing management signal may include, be utilized for, and/or be configured to set, modify, adjust, confirm, and/or otherwise affect timing information (e.g., a start/starting time, a beginning time, an end/ending time, a duration, a time period, a timing offset, timing information or a start time of a subsequent timing management signal, a duration of time to maintain or power/turn on/up a primary/main radio(s)/receiver(s) (e.g., PR(s) 222, 232) and/or secondary radio(s)/receiver(s) (e.g. SR(s) 224, 234), etc.) corresponding to communication (e.g., reception/transmission) of the (e.g., current or one or more subsequent) awaken packet(s) and/or response packet(s) by the apparatus (e.g., STA(s) 120, 150). In some aspects, the apparatus (e.g., STA(s) 120, 150) may set, modify, adjust, confirm, and/or otherwise affect a timing aspect e.g., a start/starting time, a beginning time, an end/ending time, a duration, a time period, a timing offset, timing information or a start time of a subsequent timing management signal, a duration of time to maintain or power/turn on/up a primary/main radio(s)/receiver(s) (e.g., PR(s) 222, 232) and/or secondary radio(s)/receiver(s) (e.g. SR(s) 224, 234), etc.) of powering/turning/keeping-powered on/up of the primary/main radio(s)/receiver(s) (e.g., PR(s) 222, 232) and/or secondary radio(s)/receiver(s) (e.g. SR(s) 224, 234) based on the timing management signal.

In some aspects, the timing management signal may comprise a sequence modulated by any of the keying/modulation techniques, such as frequency shift keying, amplitude shift keying, phase shift keying, on off keying, quadrature amplitude modulation, and/or various other types of modulation or keying/modulation techniques. In some aspects, the timing management signal may be detected by the secondary radio(s)/receiver(s) (e.g. SR(s) 224, 234) without utilizing the primary/main radio(s)/receiver(s) (e.g., PR(s) 222, 232) (e.g., while the primary/main radio(s)/receiver(s) (e.g., PR(s) 222, 232) is powered/turned off/down). In some aspects, the timing management signal may be communicated (e.g., received) periodically. In some aspects, the apparatus (e.g., STA(s) 120, 150) may detect/determine that the timing management signal was not received (e.g., during an expected time/time-period, based on its periodicity). In response, the apparatus (e.g., STA(s) 120, 150) may modify, update, revise, and/or alter a timing aspect (e.g., a start/starting time, a beginning time, an end/ending time, a duration, a time period, a timing offset, etc.) of its primary/main receiver(s)/radio(s) (e.g., PR(s) 222, 232) and/or secondary receiver(s)/radio(s) (e.g. SR(s) 224, 234). In some aspects, this may be performed in a manner that increases a likelihood that a subsequent timing management signal will be received/detected by the apparatus (e.g., STA(s) 120, 150) and/or its primary/secondary radio(s)/receiver(s) (e.g., PR(s) 222, 232). In some aspect, the likelihood may be increased by increasing the power on/up duration/period of the primary/main radio(s)/receiver(s) and/or secondary radio(s)/receiver(s) (relative to a preceding power on/up duration/period of the primary/main radio(s)/receiver(s) and/or secondary radio(s)/receiver(s)).

In some aspects, the DL communication 312 includes a packet (e.g., request packet) that includes a parameter corresponding to a mode/state associated with STA(s) 120, 150. In some aspects, AP 120 transmits and STA(s) 120, 150 receives (e.g., using PR(s) 222, 232) the packet (e.g., request packet) that includes the parameter corresponding to a mode associated with STA(s) 120, 150, and STA(s) 120, 150 waits, based on the received parameter, to operate PR(s) 222, 232 in a high power state/mode or to turn on/up PR(s) 222, 232 until a time that corresponds to that mode/state.

As described herein, a packet (e.g., awaken request packet) may sometimes be referred to as a frame (e.g., awaken frame), beacon (e.g., awaken beacon), signal (e.g., awaken signal), transmission (e.g., awaken transmission), communication (e.g., awaken communication), and/or various other suitable terms without necessarily deviating from the scope of the present disclosure. In some aspects, a packet (e.g., awaken request packet) and/or a beacon (e.g., awaken beacon) may include a field/parameter/indication/data/information indicating/corresponding to/associated with an indication, purpose, intention, objective, and/or other state/mode/configuration associated with the STA(s) that receives that packet and/or beacon. After, in response to, and/or in association with receiving such and/or based on such field/parameter/indication/data/information, an apparatus (e.g., STA(s) may wait to turn-on/activate/enable/duty-cycle-on/power-up/power-on its primary/main radio/receiver and/or secondary radio/receiver until a time/duration/period that corresponds to the indication, purpose, intention, objective, or other state/mode/configuration. For example, if such indication, purpose, intention, objective, and/or other state/mode/configuration indicates a time/duration/period that a subsequent/next/later DL communication of interest will be transmitted from one apparatus (e.g., AP 110) to another apparatus (e.g., that/those STA(s) 120, 150), then the apparatus (e.g., STA(s) 120, 150) may determine to not turn-on/activate/enable/duty-cycle-on/power-up/power-on its primary/main and/or its secondary radio/receiver until a time/period/duration that corresponds to that DL communication of interest, which can conserve power that might otherwise be expended during a corresponding duration/period of time.

Such subsequent/next/later DL communication may or may not be the DL communication that immediately follows DL communication of the aforementioned packet (e.g., awaken request packet) and/or beacon (e.g., awaken beacon). For instance, one or more DL communications (e.g., not of interest to that/those STA(s) 120, 150) may occur in between that packet/beacon and the DL communication of interest. Non-limiting examples of such DL communication(s) of interest may include but may not be limited to another packet, another beacon, another signal, another transmission, which may or may not include information/parameter/field/indication corresponding to traffic information (e.g., traffic information message), delivery information (e.g., delivery traffic information message), a group identifier/address information (e.g., associated identifier message), receiver/reception information (e.g., receiver/reception indication), on-duration information (e.g., a duration/period of time to maintain one or more of its radio(s)/receiver(s) in an on/powered-on/powered-up), and/or various other suitable types of information.

In some aspects, the DL communication 312 may be or include a packet (e.g., request packet) (e.g., packet 320) that includes an indication that indicates a process to perform in relation to awakening PR(s) 222, 232. In some aspects, awakening PR(s) 222, 232 may refer to transitioning PR(s) 222, 232 from being in a low/lower power state/mode to a high/higher power state/mode. In some aspects, awakening PR(s) 222, 232 may refer to switching from operating PR(s) 222, 232 in a low/lower power state/mode to operating PR(s) 222, 232 in a high/higher power state/mode. As described in greater detail herein, in some aspects, a low/lower power state/mode may refer to operating a radio (e.g., PR(s) 222, 232 and/or SR(s) 224, 234) according to a power state/mode that is less than a threshold power value, and/or a high/higher power state/mode may refer to operating a radio (e.g., PR(s) 222, 232 and/or SR(s) 224, 234) according to a power state/mode that is greater than a threshold power value.

In some aspects, AP 110 may transmit and STA(s) 120, 150 may use SR(s) 224, 234 to receive a packet (e.g., request packet) that includes an indication that indicates a process to perform in relation to awakening PR(s) 222, 232. In some aspects, the process includes PR(s) 222, 232 and/or SR(s) 224, 234 entering into an awaken mode, in which at least PR(s) 222, 232 is in a high power state/mode or is powered up/on or SR(s) 224, 234 is in a low power state/mode or is powered down/off. In some aspects, the process includes using PR(s) 222, 232 to negotiate parameters with AP 110 for entering into an awaken mode, in which at least PR(s) 222, 232 is in a low power state/mode or is powered down/off or SR(s) 224, 234 is in a high power state/mode or is powered up/on. In some aspects, after performing such process, STA(s) 120, 150 may enter into the awaken mode.

In some aspects, the primary/main receiver/radio (e.g., PR(s) 222, 232) and/or secondary/awaken receiver/radio (e.g., SR(s) 224, 234) of an apparatus (e.g., STA(s) 120, 150) may receive an awaken request packet (e.g., packet 320) that includes an indication/indicia/field/frame/portion that indicates an action/process/operation to perform in relation to awakening the primary/main receiver/radio (e.g., PR(s) 222, 232) and/or secondary/awaken receiver/radio (e.g., SR(s) 224, 234). For example, such an action/process/operation may include that the apparatus (e.g., STA(s) 120, 150) or its primary/main radio (e.g., PR(s) 222, 232) and/or secondary/awaken radio (e.g., SR(s) 224, 234) will (1) enter into an awaken mode (e.g., a mode in which the primary/main radio/receiver (e.g., PR(s) 222, 232) and/or secondary/awaken radio/receiver (e.g., SR(s) 224, 234) is powered down/off (e.g., relatively low power state) or powered up/on (e.g., in a relatively high/normal power state)), (2) receive/transmit or negotiate (e.g., parameters) from/with another apparatus (e.g., AP 110) for entering into an awaken mode (as described herein), (3) (i) receive/transmit or negotiate (e.g., parameters) from/with another apparatus (e.g., AP 110) for entering into an awaken mode (as described herein)) and subsequently (ii) enter into an awaken mode (as described herein), or (4) terminate, end, or exit an awaken mode (as described herein).

In some aspects, AP 110 and STA(s) 120, 150 may utilize the UL communication 310 and/or DL communication 312 to communication information that is any one or more of the following: indicating a period of time (e.g., transition period 338) corresponding to transitioning from a first state comprising a doze state or low power state/mode to a second state comprising an awake state or a high power state/mode; channel information associated with SR(s) 224, 234; duty cycle information, which may include a duty cycle preferred by STA(s) 120, 150; beacon information; one or more class of operation; and/or one or more supported operations. In some aspects, in accordance with any one or more of such communicated information, STA(s) 120, 150 may transition from the first state to the second state.

In some aspects, an apparatus (e.g., AP 110 and/or STA(s) 120, 150) may transmit, receive, and/or negotiate a field, parameter, data, information, information element, or indication indicating a period of time corresponding to/associated with transitioning from a/one state (e.g., awake, doze, power save, or active state) to another state (e.g., awake, doze, power save, or active state) after, in response to, and/or in association with transmitting, receiving, and/or negotiating a particular packet, data packet, transmission, or other information, such as packet 320, an awaken packet, request packet, or awaken request packet. In some aspects, an apparatus (e.g., AP 110 and/or STA(s) 120, 150) may perform an operation (e.g., transition from one state/mode to another state/mode) in accordance with such field, parameter, data, information, information element, or indication.

In some aspects, an apparatus (e.g., AP 110 and/or STA(s) 120, 150) may transmit, receive, and/or negotiate a field, parameter, data, information, information element, or indication indicating one or more settings/parameters/capabilities of that apparatus (e.g., AP 110 and/or STA(s) 120, 150) in relation to a power mode, mode of operation, an operation, and/or communication parameters/settings while operating in or transition from/to a particular mode (e.g., power save mode, awake mode, doze mode, or active mode). Such settings/parameters/capabilities may include channel state information (e.g., associated with the main/primary and/or secondary radio/receiver), channel information (e.g., associated with the main/primary radio/receiver (e.g., PR(s) 222, 232) and/or secondary radio/receiver (e.g., SR(s) 224, 234)), a group identifier (e.g., a group of APs and/or STAs), an individual identifier (e.g., of the apparatus (e.g., a transmitting/receiving/destined/intended AP/STA), its primary/main radio/receiver (e.g., PR(s) 222, 232), or it secondary radio/receiver (e.g., SR(s) 224, 234)), duty cycle information (e.g., a preferred/requested duty cycle by the apparatus (e.g., STA(s) 120, 150), a mandatory/assigned duty cycle to the apparatus (e.g., STA(s) 120, 150), etc.) (wherein duty cycle information may include an absolute or relative period of time that the main/primary receiver/radio (e.g., PR(s) 222, 232) and/or secondary receiver/radio (e.g., SR(s) 224, 234) is ON in relation to or as compared to an absolute or relative period of time that the main/primary receiver/radio (e.g., PR(s) 222, 232) and/or secondary receiver/radio (e.g., SR(s) 224, 234) is OFF), symbol information, beacon information, a class of operations, supported operations, or other suitable aspects. In some aspects, an apparatus (e.g., AP 110 and/or STA(s) 120, 150) may perform an operation (e.g., transition from one state/mode to another state/mode, operate in a particular state/mode, etc.) in accordance with such field, parameter, data, information, information element, or indication.

In some aspects, an apparatus (e.g., AP 110 and/or STA(s) 120, 150) may receive/transmit information that incorporate, integrate, encode, combine, merge, embed, or otherwise include information associated with a BSS (e.g., to which that apparatus (e.g., AP 110) or another apparatus (e.g., that receiving STA 120, another STA 150, etc.) is associated) in/within/into a number, value, field, parameter, or other data portion (e.g., a data portion that is included in an end portion of a communication/transmission (e.g., instead of having an explicit data portion that includes only such information associated with the BSS)). In some aspects, such number, value, field, parameter, or other data portion includes information that serves more than one function, wherein one of the more than one function is to provide information associated with the BSS. Such number, value, field, parameter, or other data portion may be, for example, an error-detecting code/value/number, a cyclic redundancy check value/number/sequence/code, a frame check sequence/value/number/code. In some aspects, an apparatus (e.g., STA(s) 120, 150) may, based on such number, value, field, parameter, or other data portion, determine two or more information, wherein at least one of such information includes information associated with the BSS (e.g., the apparatus (e.g., STA(s) 120, 150) may determine whether the data packet, field, information, etc. that included such number, value, field, parameter, or other data portion was destined to that apparatus (e.g., the apparatus (e.g., STA(s) 120, 150) that received it) based on such information associated with the BSS) (e.g., the apparatus (e.g., STA(s) 120, 150) may determine whether the data packet, field, information, etc. that included such number, value, field, parameter, or other data portion is associated with the BSS to which the that apparatus (e.g., the apparatus (e.g., STA(s) 120, 150) that received it) is associated) (e.g., the apparatus (e.g., STA(s) 120, 150) may obtain or associate its BSS information from the BSS information included in the data packet, field, information, etc. that included such number, value, field, parameter, or other data portion was destined to that apparatus (e.g., the apparatus (e.g., STA(s) 120, 150) that received it)).

In some aspects, the UL communication 310 may be or include a field indicating a duration of time during which SR(s) 224, 234 will operate according to a high/higher power state/mode or on-mode during/for the one or more subsequent/future communications. Accordingly, in some aspects, STA(s) 120, 150 may transmit (e.g., using PR(s) 222, 232) and AP 110 may receive the field indicating a duration of time during which SR(s) 224, 234 will operate according to a high/higher power state/mode or on-mode during the one or more subsequent/future communications. In some aspects, such subsequent/future communications may include communication of the packet 320, and such high/higher power state/mode or on-mode may occur when SR(s) 224, 234 is in the high power states/modes.

In some aspects, e.g., utilizing UL communication 310 and/or DL communication 312, AP 110 and/or STA(s) 120, 150 may communicate a frame that includes a field indicating whether STA(s) 120, 150 is capable of receiving a first subsequent/future communication using a first attribute, including at least one of a communication channel, frequency range, center frequency, or bandwidth. In some aspects, the first subsequent/future communication comprises a beacon. In some aspects, AP 110 may transmit and STA(s) 120, 150 may receive a second subsequent/future communication using a second attribute that is different from the first attribute. For example, a value of at least one of a communication channel, a frequency range, a center frequency, and/or a bandwidth of the first subsequent/future communication may be different from a value of at least one of a communication channel, a frequency range, a center frequency, and/or a bandwidth of the second subsequent/future communication. In some aspects, the second subsequent/future communication may be different from the first subsequent/future communication. In some aspects, the second subsequent/future communication may include or may be the packet 320.

As described in greater detail herein, in some aspects, an apparatus (e.g., AP 110 and/or STA(s) 120, 150) may receive/transmit a communication/transmission (e.g., a packet, data packet, a frame, a data frame, an awaken packet, an awaken request packet, a request packet, a response packet, an awaken response packet, a beacon, and/or any various other suitable encapsulation of information), and such communication/transmission may include field(s), signal(s), bit(s), or portion(s) that includes any one or more of the various signals, parameters, values, or other indicia described in greater detail herein. In some aspects, a first communication/transmission may include one or more field(s), signal(s), bit(s), or portion(s) and/or signals, parameters, values, or other indicia that indicates a first/beginning/start time of one or more second/subsequent communications/transmissions (e.g., a packet, data packet, a frame, a data frame, an awaken packet, an awaken request packet, a request packet, a response packet, an awaken response packet, a beacon, and/or any various other suitable encapsulation of information) that are communicated according to a duty cycle. In some aspects, a first communication/transmission may include one or more field(s), signal(s), bit(s), or portion(s) and/or signals, parameters, values, or other indicia that indicates a duration of time between two sequential/consecutive second/subsequent communications/transmissions (e.g., a packet, data packet, a frame, a data frame, an awaken packet, an awaken request packet, a request packet, a response packet, an awaken response packet, a beacon, and/or any various other suitable encapsulation of information) that are communicated according to a duty cycle. In some aspects, a first communication/transmission may include one or more field(s), signal(s), bit(s), or portion(s) and/or signals, parameters, values, or other indicia that indicates a duration of time during which the primary receiver/transceiver/radio (e.g., PR(s) 222, 232) and/or the secondary receiver/transceiver/radio (e.g., SR(s) 224, 234) is/will/scheduled to operate according to an on-mode/state and/or a high/higher power state/mode during one or more second/subsequent communications/transmissions (e.g., a packet, data packet, a frame, a data frame, an awaken packet, an awaken request packet, a request packet, a response packet, an awaken response packet, a beacon, and/or any various other suitable encapsulation of information) that are communicated according to a duty cycle.

In some aspects, a first communication/transmission (e.g., a packet, data packet, a frame, a data frame, an awaken packet, an awaken request packet, a request packet, a response packet, an awaken response packet, a beacon, and/or any various other suitable encapsulation of information) may include one or more field(s), signal(s), bit(s), or portion(s) and/or signals, parameters, values, or other indicia that indicates a variation of an attribute (e.g., a bandwidth, a center frequency, or a frequency range) of a second/future communication/transmission (e.g., a packet, data packet, frame, data frame, awaken packet, awaken request packet, request packet, response packet, awaken response packet, a beacon, and/or any various other suitable encapsulation of information) relative to the first communication/transmission (e.g., a packet, data packet, a frame, a data frame, an awaken packet, an awaken request packet, a request packet, a response packet, an awaken response packet, a beacon, and/or any various other suitable encapsulation of information). In some aspects, such an indication of such a variation may be in the form of a bit, value, signal, or other indicia that is used to determine a shift, scaling, factor, offset, deviation, determination, calculation, look-up, and/or other suitable variation of such an attribute (e.g., a bandwidth, a center frequency, or a frequency range). For example, an apparatus (e.g., STA(s) 120, 150 or AP 110) may utilize such an indication to determine an extent/amount of variation, shift, scaling, factor, offset, deviation of such attribute for a second/future communication/transmission (e.g., a packet, data packet, a frame, a data frame, an awaken packet, an awaken request packet, a request packet, a response packet, an awaken response packet, a beacon, and/or any various other suitable encapsulation of information) (e.g., in relation to the same/similar attribute (e.g., a bandwidth, a center frequency, or a frequency range) of the first communication/transmission (e.g., a packet, data packet, a frame, a data frame, an awaken packet, an awaken request packet, a request packet, a response packet, an awaken response packet, a beacon, and/or any various other suitable encapsulation of information)). In some aspects, the determined extent/amount of variation, shift, scaling, factor, offset, deviation of such attribute (e.g., a bandwidth, a center frequency, or a frequency range) for the first communication/transmission (e.g., a packet, data packet, a frame, a data frame, an awaken packet, an awaken request packet, a request packet, a response packet, an awaken response packet, a beacon, and/or any various other suitable encapsulation of information) is relative to, based on, and/or not independent of/from such attribute (e.g., a bandwidth, a center frequency, or a frequency range) of the first communication/transmission (e.g., a packet, data packet, a frame, a data frame, an awaken packet, an awaken request packet, a request packet, a response packet, an awaken response packet, a beacon, and/or any various other suitable encapsulation of information).

In some aspects, a communication/transmission (e.g., a packet, data packet, a frame, a data frame, an awaken packet, an awaken request packet, a request packet, a response packet, an awaken response packet, a beacon, and/or any various other suitable encapsulation of information) may include one or more field(s), signal(s), bit(s), or portion(s) and/or signals, parameters, values, or other indicia that indicates whether an apparatus (e.g., STA(s) 120, 150 or AP 110) is capable of, is enabled to, is configured to, is willing to, or can/will communicate (e.g., transmit/receive) a first subsequent/future communication/transmission (e.g., a packet, data packet, a frame, a data frame, an awaken packet, an awaken request packet, a request packet, a response packet, an awaken response packet, a beacon, and/or any various other suitable encapsulation of information) using a first attribute (e.g., communication channel, frequency range, center frequency, bandwidth, etc.) and communicate (e.g., transmit/receive) a second subsequent/future communication/transmission (e.g., a packet, data packet, a frame, a data frame, an awaken packet, an awaken request packet, a request packet, a response packet, an awaken response packet, a beacon, and/or any various other suitable encapsulation of information) using a second attribute (e.g., communication channel, frequency range, center frequency, bandwidth, etc.) that is different from the first attribute. In some aspects, the first subsequent/future communication/transmission (e.g., a packet, data packet, a frame, a data frame, an awaken packet, an awaken request packet, a request packet, a response packet, an awaken response packet, a beacon, and/or any various other suitable encapsulation of information) is different from (e.g., not the same as, comprises different fields, portions, frames, etc.) the second subsequent/future communication/transmission (e.g., a packet, data packet, a frame, a data frame, an awaken packet, an awaken request packet, a request packet, a response packet, an awaken response packet, a beacon, and/or any various other suitable encapsulation of information).

As mentioned above, at block 412, an apparatus (e.g., AP 110 and/or STA 120, or its PR(s) 222, 232 and/or SR(s) 224, 234) may await receipt of a packet (e.g., packet 320), as described in greater detail herein. Various aspects described below (and elsewhere) will provide non-limiting examples of some aspects pertaining to block 412 (even if block 412 may not be explicitly referenced in every instance), and one of ordinary skill in the art will appreciate that such aspects may additionally or alternatively pertain to other blocks illustrated in FIG. 4 without deviating from the scope of the present disclosure. For example, STA(s) 120, 150 (or its PR(s) 222, 232 and/or SR(s) 224, 234) may await receipt from time $T_3$ to time $T_6$. In some aspects, though not illustrated in FIG. 3, AP 110 may transmit and STA(s) 120, 150 may receive (e.g., using SR(s) 224, 234) a beacon that includes information corresponding to timing information for synchronizing communications with AP 110. In some aspects, the beacon may be received using SR(s) 224, 234 when SR(s) 224, 234 is turned/powered on or in a high/higher power state/mode and/or while PR(s) 222, 232 is turned/powered off or in a low/lower power state/mode.

In some aspects, the apparatus (e.g., STA(s) 120, 150) may utilize its secondary radio(s)/receiver(s) (e.g., SR(s) 224, 234) and/or its primary radio(s)/receiver(s) (e.g., PR(s) 222, 232) to receive a beacon (e.g., an awaken beacon), which may include information corresponding to, be communicated for, and/or configured for maintaining connectivity with another apparatus (e.g., an access point, such as AP 110), timing information for synchronizing communications with another apparatus (e.g., an access point, such as AP 110), timing information for turning/powering on/off (e.g., entering into a low(er)/high(er) power mode/state) the primary radio(s)/receiver(s) (e.g., PR(s) 222, 232) and/or the secondary receiver(s)/radio(s) (e.g., SR(s) 224, 234), and/or various other suitable aspects of communication be the primary and/or secondary receiver(s)/radio(s) of the apparatus (e.g., STA(s) 120, 150).

In some aspects, such a beacon (e.g., awaken beacon) may be communicated/received using the secondary receiver(s)/radio(s) (e.g., SR(s) 224, 234) and/or when the secondary receiver(s)/radio(s) (e.g., SR(s) 224, 234) is turned/powered on (e.g., in a high(er) power mode/state), and while the primary/main receiver(s)/radio(s) (e.g., PR(s) 222, 232) is turned/powered off or in a low(er) power state/mode. In some aspects, such a beacon (e.g., awaken beacon) may be communicated/received using the primary/main receiver(s)/radio(s) (e.g., PR(s) 222, 232) and/or while/when the primary/main receiver(s)/radio(s) (e.g., PR(s) 222, 232) is turned/powered on (e.g., in a high(er) power mode/state), and while the secondary receiver(s)/radio(s) (e.g., SR(s) 224, 234) is turned/powered off or in a low(er) power state/mode.

As described herein, an apparatus (e.g., STA(s) 120, 150) may transmit a response packet (e.g., an awaken response packet) (e.g., response 330) at a time/period/duration that follows reception of an awaken packet (e.g., awaken request packet) (e.g., packet 320) or beacon (e.g., awaken beacon). In some aspects, that response packet (e.g., response 330) may be communicated/transmitted by that apparatus (e.g., STA(s) 120, 150) after, in response to, and/or in association with such an awaken packet (e.g., awaken request packet)

(e.g., packet 320) or beacon (e.g., awaken beacon). In some aspects, that response packet (e.g., response 330) may be communicated/transmitted by that apparatus (e.g., STA(s) 120, 150) after, in response to, and/or in association with receiving another packet (e.g., a subsequent packet received by that apparatus (e.g., STA(s) 120, 150) after that apparatus (e.g., STA(s) 120, 150) receives the awaken packet, such as the awaken request packet). In some aspects, that other packet (e.g., a subsequent packet received by that apparatus (e.g., STA(s) 120, 150) after that apparatus (e.g., STA(s) 120, 150) receives the awaken packet, such as the awaken request packet) may include information configured to cause/induce/trigger communication of that packet (e.g., awaken request packet) (e.g., packet 320). In some aspects, that other packet (e.g., a subsequent packet received by that apparatus (e.g., STA(s)) after that apparatus (e.g., STA(s) 120, 150) receives the awaken packet, such as the awaken request packet) may include information configured to solicit/inquire/determine certain information from that apparatus (e.g., STA(s) 120, 150), wherein such information pertains/relates/corresponds to a purpose/intention/objective/reason that that awaken packet (e.g., the awaken request packet) (e.g., packet 320) was initially/originally communicated/transmitted to that apparatus (e.g., STA(s) 120, 150).

In some aspects, the other packet (e.g., a subsequent packet received by that apparatus (e.g., STA(s) 120, 150) after that apparatus (e.g., STA(s) 120, 150) receives the awaken packet, such as the awaken request packet) may include information configured to solicit/inquire/determine certain information from that apparatus (e.g., STA(s) 120, 150), wherein such information pertains/relates/corresponds to a purpose/intention/objective/reason of/for that apparatus (e.g., STA(s) 120, 150) undergoing an awaken procedure (e.g., after, in response to, and/or in association with receiving the awaken packet, such as the awaken request packet). In some aspects, the response packet (e.g., awaken response packet) (e.g., response 330) includes certain information that pertains/relates/corresponds to a purpose/intention/objective/reason that that awaken packet (e.g., the awaken request packet) (e.g., packet 320) was initially/originally communicated/transmitted to that apparatus (e.g., STA(s) 120, 150) and/or pertains/relates/corresponds to a purpose/intention/objective/reason of/for that apparatus (e.g., STA(s) 120, 150) undergoing an awaken procedure (e.g., after, in response to, and/or in association with receiving the awaken packet, such as the awaken request packet or packet 320).

In some aspects, the awaken packet (e.g., awaken request packet) (e.g., packet 320) and/or beacon (e.g., awaken beacon) may be communicated/received by the apparatus (e.g., STA(s) 120, 150) using its secondary radio/receiver (e.g., SR(s) 224, 234). In some aspects, the response packet (e.g., awaken response packet) (e.g., response) may be communicated/transmitted by that apparatus (e.g., STA(s) 120, 150) using its main/primary radio/receiver (e.g., PR(s) 222, 232). In some aspects, the other packet (e.g., a subsequent packet received by that apparatus (e.g., STA(s) 120, 150) after that apparatus (e.g., STA(s) 120, 150) receives the awaken packet, such as the awaken request packet or packet 320) may be communicated/transmitted/received by the apparatus using its primary/main radio/receiver (e.g., PR(s) 222, 232). In some aspects, the other packet (e.g., a subsequent packet received by that apparatus (e.g., STA(s) 120, 150) after that apparatus (e.g., STA(s) 120, 150) receives the awaken packet, such as the awaken request packet or packet 320) may be communicated/transmitted/received by the apparatus (e.g., STA 120, 150) using its secondary radio/receiver (e.g., SR(s) 224, 234).

As mentioned above, at block 414, an apparatus (e.g., AP 110 and/or STA 120, or its PR(s) 222, 232 and/or SR(s) 224, 234) may await receipt of a packet (e.g., packet 320), as described in greater detail herein. Various aspects described below (and elsewhere) will provide non-limiting examples of some aspects pertaining to block 414 (even if block 414 may not be explicitly referenced in every instance), and one of ordinary skill in the art will appreciate that such aspects may additionally or alternatively pertain to other blocks illustrated in FIG. 4 without deviating from the scope of the present disclosure. For example, AP 110 may transmit and STA(s) 120, 150 (or its PR(s) 222, 232 and/or SR(s) 224, 234) may receive the packet 320. For example, at time $T_6$, SR(s) 224, 234 may receive the packet 320 communicated by AP 110. As described herein, the packet 320 may alternatively or interchangeably be referred to as an awaken packet, an awake packet, an awaken request packet, and/or various other suitable terms without deviating from the scope of the present disclosure. As illustrated in FIG. 3, in some aspects, the packet 320 may be received while SR(s) 224, 234 is in a high power state/mode and/or while PR(s) 222, 232 is in a low power state/mode. In some aspects, while PR(s) 222, 232 is in the low power state/mode, STA(s) 120, 150 is unable to transmit a response to the packet 320 using PR(s) 222, 232.

In some aspects, the packet 320 may be configured to or include information that informs a receiving apparatus (e.g., STA(s) 120, 150) that a transmitting apparatus (e.g., AP 110) is interested in communication with one or more STAs (e.g., STA(s) 120, 150), e.g., using the respective PR of such one or more STAs (e.g., STA(s) 120, 150). In some aspects, the packet 320 may be configured to or include information that informs a receiving apparatus (e.g., STA(s) 120, 150) that a transmitting apparatus (e.g., AP 110) has prepared for transmission at least one packet that the transmitting apparatus (e.g., AP 110) is interested in communicating to one or more STAs (e.g., STA(s) 120, 150), e.g., using the respective PR of the one or more STAs (e.g., STA(s) 120, 150). In some configurations, the packet 320 may be configured to awaken, turn on, or cause a high/higher power mode/state to occur for PR(s) 222, 232. In some aspects, the packet 320 may be configured to trigger a response to be communicated by STA(s) 120, 150.

As described in greater detail herein, in some aspects, an apparatus (e.g., AP 110 and/or STA(s) 120, 150) may receive/transmit a communication/transmission e.g., a packet, data packet, a frame, a data frame, an awaken packet, an awaken request packet, a request packet, a response packet, an awaken response packet, a beacon, and/or any various other suitable encapsulation of information), and such communication/transmission may include field(s), signal(s), bit(s), or portion(s) that includes any one or more of the various signals, parameters, values, or other indicia described in greater detail herein. In some aspects, such a communication/transmission may be configured to and/or include information that may inform, notify, and/or alert the receiving apparatus (e.g., STA(s) 120, 150 or AP 110) that another apparatus (e.g., transmitting apparatus, such as an AP 110 or STA(s) 120, 150) intends, wishes, plans, and/or is interested in communicating to/with one or more apparatus (e.g., STA(s) 120, 150 or AP 110), e.g., at least that receiving apparatus, using a primary radio/transceiver (e.g., PR(s) 222, 232) and/or a secondary radio/transceiver (e.g., SR(s) 224, 234) of such apparatus (e.g., STA(s) 120, 150 or AP 110). In some aspects, such a communication/transmission may be configured to and/or include information that may inform, notify, and/or alert the receiving apparatus (e.g., STA(s) 120, 150 or AP 110) that another apparatus (e.g., transmitting apparatus, such as an AP 110 or STA(s) 120, 150) has prepared for transmission (e.g., in its memory/cache/buffer) at least one frame, packet, and/or unit/encapsulation of data/information, e.g., that it intends, wishes, plans, and/or is interested in communicating to/with one or more apparatus (e.g., STA(s) 120, 150 or AP 110), e.g., at least that receiving apparatus, using a primary radio/transceiver (e.g., PR(s) 222, 232) and/or a secondary radio/transceiver (e.g., SR(s) 224, 234) of such apparatus (e.g., STA or AP).

In some aspects, such communication/transmission (e.g., a packet, data packet, a frame, a data frame, an awaken packet, an awaken request packet, a request packet, a response packet, an awaken response packet, a beacon, and/or any various other suitable encapsulation of information) and/or any one or more of its field(s), signal(s), bit(s), or portion(s)) may include an indication (e.g., a counter, counter value, etc., as described in greater detail herein) regarding (1) an availability of an updated identifier/value for one or more parameters of a BSS (e.g., to which the apparatus (e.g., STA(s) 120, 150 or AP 110) is or is not yet a member or assigned) and/or or (2) whether an updated identifier/value for one or more parameters of a BSS (e.g., to which the apparatus (e.g., STA(s) 120, 150 or AP 110) is or is not yet a member or assigned) is available for the apparatus (e.g., STA(s) 120, 150 or AP 110). The apparatus (e.g., STA(s) 120, 150 or AP 110) may utilize such an indicator (e.g., a counter, counter value, etc., as described in greater detail herein) to determine whether an updated identifier/value for one or more parameters of a BSS (e.g., to which the apparatus (e.g., STA(s) 120, 150 or AP 110) is or is not yet a member or assigned) is available for the apparatus (e.g., STA(s) 120, 150 or AP 110).

In some aspects, the packet 320 may be configured to awaken a single apparatus (e.g., STA 120). In some aspects, the packet 320 may be configured to awaken a plurality of apparatuses (e.g., STAs 120, 150) associated with or assigned a particular identifier. In some aspects, the packet comprises information indicating a time by which to complete an awaken procedure. In some aspects, such awakening comprises STA(s) 120, 150 altering a power state/mode or turning/powering on/up PR(s) 222, 232. In some aspects, the packet 320 includes information indicating or identifying which receiver(s) (e.g., STA(s) 120, 150, PR(s) 222, 232, SR(s) 224, 234) of that packet 320 is/are intended recipients. In some aspects, the information indicates that the packet 320 (e.g., awaken packet) is intended for a specific receiver, every/all receivers that receive that packet 320 (e.g., awaken packet), or a plurality of specific receivers that does not necessarily include all receivers that receive the packet 320 (e.g., awaken packet). In some aspects, the packet 320 includes information indicating whether to awaken, which may include transitioning from a low/lower power state/mode to a high/higher power state/mode. In some aspects, the packet 320 may include information indicating whether to communicate a response (e.g., response 330) to the packet 320.

In some aspects, the awaken packet (e.g., packet 320) may be configured to awaken a single apparatus (e.g., STA 120). In some aspects, the awaken packet may be configured to awaken a plurality of apparatuses (e.g., a plurality of apparatuses associated with or assigned a particular identifier (e.g., group identifier); e.g., STA(s) 120, 150). In some aspects, 'awaken' may include causing the apparatus (that received the awaken packet) to alter the power state or power/turn on/up the primary radio(s)/receiver(s) (e.g., PR(s) 222, 232), the secondary radio(s)/receiver(s) (e.g., SR(s) 224, 234), and/or any other component of the apparatus (e.g., STA(s) 120, 150). In some aspects, the awaken packet (e.g., packet 320) includes information indicating a time to begin a respective awaken procedure by one or more apparatus (e.g., STA(s) 120, 150). In some aspects, the awaken packet (e.g., packet 320) may include information indicating a time by which to complete a respective awaken procedure by each of the one or more apparatus (e.g., STA(s) 120, 150).

In some aspects, an awaken request packet (e.g., packet 320) may be configured to include various fields or information. In some aspects, such fields/information may include information indicating a time by which one or more receivers of the (respective) awaken request packet(s) (e.g., packet(s) 320) shall finish an awaken procedure that transitions that/those receiver(s), or any one or more of its receiver(s)/radio(s), from an off/inactive/doze/low-/lower-power state/mode/configuration to an on/active/high-/higher-power state/mode/configuration. In some aspects, an apparatus (e.g., receiver/recipient) of the awaken request packet may determine when (e.g., a specific time, perhaps in relation to the time of receiving the awaken request packet) (i) to perform an awaken procedure, (ii) to complete an awaken procedure, or (iii) to turn on or power on/up one or more of its receivers/radios. In some aspects, such fields/information may include information (e.g., one or more bits, a bitmap, etc.) indicating or identifying which specific receivers of that awaken request packet is/are the intended destination(s)/recipient(s). In some aspects, such fields/information may include information indicating that that awaken request packet (e.g., packet 320) is intended for a specific/individual receiver/recipient.

In some aspects, such fields/information may include information indicating that that awaken request packet is intended for all receivers/recipients that receive that awaken request packet. In such aspects, the awaken request packet may not include a specific identifier identifying a specific receiver/recipient of that awaken request packet. In some aspects, such fields/information may include information indicating that that awaken request packet is intended for a plurality of specific receivers/recipients, wherein that plurality of specific receivers/recipients is a subset (i.e., does not include all) of the recipients/receivers that receive that awaken request packet. In some aspects, such fields/information may indicate whether to perform one or more operations by a receiver/recipient of that awaken request packet. For example, such an operation may be to awaken (e.g., transition from an off/inactive/low-/lower-power state/mode/configuration to an on/active/high-/higher-power state/mode/configuration). As another example, such an operation may be to communicate (e.g., transmit) a response (e.g., response packet, awaken response packet, etc.) after, in response to, and/or in association with receiving the awaken request packet.

In some aspects, the packet 320 includes a portion that includes a plurality of identifiers. Each identifier may correspond to a value of an intended recipient apparatus (of the packet 320). In some aspects, the plurality of identifiers may be included in the portion of the packet 320 in a numerically ordered manner. In some aspects, the plurality of identifier may be included in the portion of the packet 320 in a numerically ascending or descending manner. STA(s) 120, 150 may have been assigned an identifier by AP 110 in a preceding communication. In some aspects, in response to processing an identifier (of the plurality of identifiers) that has a value not equal to and not less than a value of the identifier assigned to STA(s) 120, 150 may determine to not process any remaining ones of the plurality of identifiers (nor any remaining portion of the packet 320).

In some aspects, STA(s) 120, 150 may process individual ones of the plurality of identifiers of the portion until reaching an identifier that is greater than the identifier assigned to STA(s) 120, 150, at which time STA(s) 120, 150 may determine to not process any remaining ones of the plurality of identifiers (nor any remaining portion of the packet 320). In some aspects, upon reaching an end or final one of the plurality of identifiers without identifying any identifier (of the plurality of identifiers) that is greater than (or that is not equal to and not less than) the identifier assigned to STA(s) 120, 150 may determine to not process any remaining ones of the plurality of identifiers (nor any remaining portion of the packet 320). In some aspects, upon reaching an end or final one of the plurality of identifiers and determining that the end or final one of the plurality of identifiers comprises a value that is not equal to and not greater than the identifier assigned to STA(s) 120, 150 may determine to not process any remaining ones of the plurality of identifiers (nor any remaining portion of the packet 320).

As described in greater detail herein, in some aspects, an apparatus (e.g., AP 110 and/or STA(s) 120, 150) may receive/transmit a communication/transmission e.g., a packet, data packet, a frame, a data frame, an awaken packet, an awaken request packet, a request packet, a response packet, an awaken response packet, a beacon, and/or any various other suitable encapsulation of information), and such communication/transmission may include field(s), signal(s), bit(s), or portion(s) that includes any one or more of the various signals, parameters, values, or other indicia described in greater detail herein. In some aspects, a preamble, a header, a data, a signal, a payload, and/or one or more encapsulations of such field(s), signal(s), bit(s), or portion(s) may include a plurality of identifier.

In some aspects, the plurality of identifiers may each identify/correspond to a value or attribute of an apparatus (e.g., STA(s) 120, 150 or AP(s) 110) (that may (or may not) be a recipient of such communication/transmission). In some aspects, such plurality of identifiers (or their respective values, attributes, etc.) may be included in such preamble, header, data, signal, payload, and/or one or more encapsulations of such field(s), signal(s), bit(s), or portion(s) in an organized, non-random, systematized, consecutive, ascending/descending (e.g., numerically ascending/descending), deterministic, ordered (e.g., numerically ordered), or some other similar manner.

In some aspects, the apparatus (STA(s) 120, 150 or AP 110) may be assigned an identifier that is or is not included in the aforementioned plurality of identifiers. In some aspects, the apparatus (e.g., STA(s) 120, 150 or AP 150) may be assigned such an identifier (and any corresponding value/attribute/etc.) by/from another apparatus (e.g., AP 110 or STA(s) 120, 150) in a preceding transmission/communication (e.g., a packet, data packet, a frame, a data frame, an awaken packet, an awaken request packet, a request packet, a response packet, an awaken response packet, a beacon, and/or any various other suitable encapsulation of information including field(s), signal(s), bit(s), or portion(s) that includes any one or more of the various signals, parameters, values, or other indicia) or in a same/concurrent transmission/communication (e.g., a packet, data packet, a frame, a data frame, an awaken packet, an awaken request packet, a request packet, a response packet, an awaken response packet, a beacon, and/or any various other suitable encapsulation of information including field(s), signal(s), bit(s), or portion(s) that includes any one or more of the various signals, parameters, values, or other indicia) as that of the aforementioned transmission/communication (in which the aforementioned plurality of identifiers is included).

In some aspects, an apparatus (e.g., STA(s) 120, 150 or AP 110) may be configured to, after/upon or in response to receiving, demodulating, or processing such organized, non-random, systematized, consecutive, descending (e.g., numerically descending), ascending/descending (e.g., numerically ascending/descending), deterministic, and/or ordered (e.g., numerically ordered) preamble, header, data, signal, payload, and/or one or more encapsulations of such field(s), signal(s), bit(s), or portion(s), determine to not process/demodulate any remaining ones of the plurality of identifiers (if any) and/or any remaining portion(s) (if any) of such preamble, header, data, signal, payload, and/or one or more encapsulations of such field(s), signal(s), bit(s), or portion(s).

In some aspects, the apparatus (e.g., STA(s) 120, 150 or AP 110) may make such determination (to not process/demodulate any remaining ones of the plurality of identifiers (if any) and/or any remaining portion(s) (if any) of such preamble, header, data, signal, payload, and/or one or more encapsulations of such field(s), signal(s), bit(s), or portion(s)) in response to or upon/after determining/identifying/processing/demodulating an identifier (or a value/attribute/etc. thereof) (of the plurality of identifiers included in the communication/transmission) that is (or has/includes a value/attribute/etc. thereof) not equal to and not less than (e.g., greater than) the identifier (or a value/attribute thereof) assigned to the apparatus (e.g., STA(s) 120, 150 or AP 110) (that received that communication/transmission comprising such plurality of identifiers).

In some aspects, the apparatus (e.g., STA(s) 120, 150 or AP 110) may process/demodulate (individual/particular) ones of the plurality of identifiers (if any) and/or any remaining portion(s) (if any) of such preamble, header, data, signal, payload, and/or one or more encapsulations of such field(s), signal(s), bit(s), or portion(s) until/unless reaching/determining/identifying/processing/demodulating an identifier (or a value/attribute/etc. thereof) (of the plurality of identifiers included in the communication/transmission) that is (or has/includes a value/attribute/etc. thereof) not equal to and not less than (e.g., greater than) the identifier (or a value/attribute thereof) assigned to the apparatus (e.g., STA(s) 120, 150 or AP 110) (that received that communication/transmission comprising such plurality of identifiers), at which point/time the apparatus (STA(s) 120, 150 or AP 110) may make the aforementioned determination (to no longer or not process/demodulate any remaining ones of the plurality of identifiers (if any) and/or any remaining portion(s) (if any) of such preamble, header, data, signal, payload, and/or one or more encapsulations of such field(s), signal(s), bit(s), or portion(s)) in response to or upon/after determining/identifying/processing/demodulating an identifier (or a value/attribute/etc. thereof) (of the plurality of identifiers included in the communication/transmission) that is (or has/includes a value/attribute/etc. thereof) not equal to and not less than (e.g., greater than) the identifier (or a value/attribute thereof) assigned to the apparatus (e.g., STA(s) 120, 150 or AP 110) (that received that communication/transmission comprising such plurality of identifiers).

In some aspects, the apparatus (e.g., STA(s) 120, 150 or AP 110) may make the aforementioned determination (to not process/demodulate any remaining ones of the plurality of identifiers (if any) and/or any remaining portion(s) (if any) of such preamble, header, data, signal, payload, and/or one or more encapsulations of such field(s), signal(s), bit(s), or portion(s)) in response to or upon/after reaching/determining/identifying/processing/demodulating an end or final/last one of the plurality of identifiers (or a value/attribute/etc. thereof) (included in the communication/transmission) without processing/identifying/demodulating any identifier (of the plurality of identifiers) that is (or has/includes a value/attribute/etc.) not equal to and not less than (e.g., is not greater than) the identifier (or a value/attribute thereof) assigned to the apparatus (e.g., STA(s) 120, 150 or AP 110) (that received that communication/transmission comprising such plurality of identifiers). (At that point/time, the apparatus (STA(s) 120, 150 or AP 110) may make the aforementioned determination (to no longer or not process/demodulate any remaining ones of the plurality of identifiers (if any) and/or any remaining portion(s) (if any) of such preamble, header, data, signal, payload, and/or one or more encapsulations of such field(s), signal(s), bit(s), or portion(s)) in response to or upon/after determining/identifying/processing/demodulating an identifier (or a value/attribute/etc. thereof) (of the plurality of identifiers included in the communication/transmission) that is (or has/includes a value/attribute/etc. thereof) not equal to and not less than (e.g., greater than) the identifier (or a value/attribute thereof) assigned to the apparatus (e.g., STA(s) 120, 150 or AP 110) (that received that communication/transmission comprising such plurality of identifiers).)

In other words, in some aspects, the apparatus (e.g., STA(s) 120, 150 or AP 110) may make the aforementioned determination (to not process/demodulate any remaining ones of the plurality of identifiers (if any) and/or any remaining portion(s) (if any) of such preamble, header, data, signal, payload, and/or one or more encapsulations of such field(s), signal(s), bit(s), or portion(s)) in response to or upon/after reaching/determining/identifying/processing/demodulating an end or final/last one of the plurality of identifiers (or a value/attribute/etc. thereof) (included in the communication/transmission) and determining that such end or final/last one of the plurality of identifiers (or a value/attribute/etc. thereof) (included in the communication/transmission) comprises a value that is not equal to and/or not greater than (e.g., is less than) the identifier (or value/attribute thereof) assigned to the apparatus (e.g., STA(s) 120, 150 or AP 110) (that received the aforementioned communication/transmission comprising the aforementioned plurality of identifiers). (At that point/time, the apparatus (STA(s) 120, 150 or AP 110) may make the aforementioned determination (to no longer or not process/demodulate any remaining ones of the plurality of identifiers (if any) and/or any remaining portion(s) (if any) of such preamble, header, data, signal, payload, and/or one or more encapsulations of such field(s), signal(s), bit(s), or portion(s)) in response to or upon/after determining/identifying/processing/demodulating an identifier (or a value/attribute/etc. thereof) (of the plurality of identifiers included in the communication/transmission) that is (or has/includes a value/attribute/etc. thereof) not equal to and not less than (e.g., greater than) the identifier (or a value/attribute thereof) assigned to the apparatus (e.g., STA(s) 120, 150 or AP 110) (that received that communication/transmission comprising such plurality of identifiers).)

In some aspects, the packet 320 may include data, a payload, or a data packet. In some aspects, the packet 320 may be modulated using on off keying. In some aspects, the packet 320 may include a tail sequence that includes a frame check sequence. In some aspects, the packet 320 includes data associated with a configuration of STA(s) 120, 150. In some aspects, the packet 320 may include a synchronization signal (SS). In some aspects, a duration of the SS varies according to one or more factors, wherein such one or more factors may include a data rate of the communication that included the packet 320. In some aspects, STA(s) 120, 150 may, based on a duration of a bit/symbol in the packet 320, determine a magnitude of one or more factors, wherein the one or more factors may include a data rate of the packet 320. In some aspects, the SS may include information enabling or useful for a determination of a rate of transmission of information in the packet 320. In some aspects, the SS comprises information enabling or useful for an identification or determination of a boundary between a preamble of the packet 320 and another portion (e.g., data/payload) of the packet 320. In some aspects, this other portion (e.g., data/payload) follows (e.g., in time or sequence) the SS. In some aspects, the packet 320 lacks or is without a header between the SS and the data/payload.

In some aspects, the awaken request packet (e.g., packet 320) may include information indicating whether a transmitter/apparatus (e.g., AP 110) of the awaken request packet (e.g., packet 320) will transmit a response request packet to the apparatus/receiver (e.g., STA(s)) of the awaken request packet (e.g., packet 320). In some aspects, a response request packet may cause/induce/trigger that receiver/apparatus (e.g., STA(s) 120, 150) to transmit (e.g., via an UL transmission) an awaken response packet (e.g., ACK, NACK, other response, etc.) after, in response to, and/or in association with receiving the awaken request packet (e.g., packet 320). In some aspects, such an indication may be a bit/bitmap capable of having a first value (e.g., 1) indicating that the apparatus/transmitter (e.g., AP 110) of the awaken request packet (e.g., packet 320) will transmit the response request packet to that apparatus/receiver (e.g., STA(s)) of the awaken request packet (e.g., packet 230) and/or a second value (e.g., 0) indicating that the apparatus/transmitter (e.g., AP 110) of the awaken request packet (e.g., packet 320) will not transmit the response request packet to that apparatus/receiver (e.g., STA(s)) of the awaken request packet (e.g., packet 320). In some aspects, if/when the awaken request packet (e.g., packet 320) includes, e.g., the first value, the apparatus/receiver (e.g., STA(s) 120, 150) may not (or may refrain from) contending for a wireless communication channel for a period of time, e.g., in anticipation of, or at least until after receiving, the response request packet. In some aspects, if the apparatus/receiver (e.g., STA(s) 120, 150) does not receive the response request packet within such a period of time, the apparatus/receiver (e.g., STA(s) 120, 150) may initiate a process to contend for the wireless communication channel. In some aspects, if/when the awaken request packet (e.g., packet 230) includes, e.g., the second value, the apparatus/receiver (e.g., STA(s) 120, 150) may initiate a process to contend for the wireless communication channel, e.g., without waiting for such a period of time.

In some aspects, a packet (e.g., awaken packet, awaken request packet, etc.) may include one or more identifiers. In some aspects, the packet (e.g., awaken packet, awaken request packet, etc.) may include a first identifier associated with/corresponding to/indicating/identifying a transmitter of that packet (e.g., awaken packet, awaken request packet, etc.). In some aspects, the packet (e.g., awaken packet, awaken request packet, etc.) may include a second identifier (e.g., different from the first identifier) associated with/corresponding to/indicating/identifying a receiver (e.g., an intended/destined receiver) of that packet (e.g., awaken packet, awaken request packet, etc.). In some aspects, the packet (e.g., awaken packet, awaken request packet, etc.) includes an identifier (e.g., a single identifier) associated with/corresponding to/indicating/identifying a transmitter and a receiver (e.g., an intended/destined receiver) of that packet (e.g., awaken packet, awaken request packet, etc.).

In some aspects, a packet (e.g., awaken packet, awaken request packet, etc.) may include a group identifier, which may indicate an identifier with which a group of one or more receivers/apparatuses is/are associated. In some aspects, a packet (e.g., awaken packet, awaken request packet, etc.) may include an abbreviated/compressed BSS identifier. In some aspects, a packet (e.g., awaken packet, awaken request packet, etc.) may include type information associated with the data/information included in the packet (e.g., awaken packet, awaken request packet, etc.). In some aspects, a packet (e.g., awaken packet, awaken request packet, etc.) may include data/payload. In some aspects, a packet (e.g., awaken packet, awaken request packet, etc.) may include a tail sequence, such as a frame check sequence.

As described in greater detail herein, in some aspects, an apparatus (e.g., AP 110 and/or STA(s) 120, 150) may receive a communication/transmission (e.g., a packet, data packet, a frame, a data frame, an awaken packet, an awaken request packet, a request packet, and/or any other suitable encapsulation of information), and such communication/transmission may include field(s), signal(s), bit(s), or portion(s) that includes any one or more of the various signals, parameters, values, or other indicia described in greater detail herein. In some aspects, such field(s), signal(s), bit(s), or portion(s) may include or be a preamble, a header, a timing management signal, a synchronization value/counter/signal, and/or various other suitable types of information/data, as described in greater detail herein. In some aspects, the duration and/or information/values/data of such field(s), signal(s), bit(s), or portion(s) may be variable and/or may vary according to or depend on one or more factors. In some aspects, such one or more factors may include channel information of at least a portion of the transmission/communication, channel quality information of at least a portion of the transmission/communication, a rate (e.g., transmission/reception/data rate) of at least a portion of the transmission/communication, a frequency or frequency range/band of at least a portion of the transmission/communication, and/or various other suitable aspects related to at least a portion of the transmission/communication. Such at least a portion of the transmission/communication may include or comprise a portion of the transmission/communication that is the same as or different from the aforementioned preamble, header, timing management signal, synchronization value/counter/signal, and/or various other suitable types of information/data, as described in greater detail herein. For example, in some aspects, such at least a portion of the transmission/communication may include, refer to, or comprise a payload/data portion of the transmission/communication.

In some aspects, the information/values/data of such field(s), signal(s), bit(s), or portion(s) may include a first set/sequence/structure of values/bits/data if/when the value/magnitude of such one or more such factors is relatively lower/low (e.g., lesser than a threshold value, equal to a low value). In some aspects, the information/values/data of such field(s), signal(s), bit(s), or portion(s) may include a second set/sequence/structure of value/bits/data if/when the value/magnitude of such one or more such factors is relatively higher/high (e.g., greater than a/the threshold value, equal to a high value).

In some aspects, the first set/sequence/structure of values/bits/data may have a relationship with the second set/sequence/structure of values/bits/data. In some aspects, the first set/sequence/structure of values/bits/data may be or include a complement of the second set/sequence/structure of values/bits/data. In some aspects, the second set/sequence/structure of values/bits/data may be or include a complement of the first set/sequence/structure of values/bits/data. In some aspects, at least a portion of the first set/sequence/structure of values/bits/data may be a complement of at least a portion of the second set/sequence/structure of values/bits/data, or vice versa. In some aspects, a 'complement' of something may refer to an inverse of that something, an opposite of that something, a complementing value of that something, otherwise different from or not included in the set of that something, or any other aspect associated with a complement as understood by one of ordinary skill in the art. In some aspects, the complement of A may be $\overline{A}$, A', or $A^C$, and the complement of $\overline{A}$, A', or $A^C$ may be A. In some aspects, the complement of 0 may be 1, and the complement of 1 may be 0.

In some aspects, the duration of such field(s), signal(s), bit(s), or portion(s) may be directly proportional/related to the value/magnitude of such one or more such factors. For example, the duration of such field(s), signal(s), bit(s), or portion(s) may be long/longer/high/great/greater when/if the value/magnitude of such one or more such factors is relatively higher/high (e.g., above/greater than a threshold value, or equal to a high value), and/or the duration of such field(s), signal(s), bit(s), or portion(s) may be short/shorter/lesser/less/low when/if the value/magnitude of such one or more such factors is relatively lower/low (e.g., lesser than a/the threshold value, equal to a low value).

In some aspects, the duration of such field(s), signal(s), bit(s), or portion(s) may be inversely/oppositely proportional/related to the value/magnitude of such one or more such factors. For example, the duration of such field(s), signal(s), bit(s), or portion(s) may be long/longer/greater/great/high/higher when/if the value/magnitude of such one or more such factors is relatively lower/low (e.g., lesser than a threshold value, equal to a low value). In some aspects, the duration of such field(s), signal(s), bit(s), or portion(s) may be short/shorter/low/lesser when the value/magnitude of such one or more such factors is relatively great/higher/high (e.g., greater than a/the threshold value, equal to a high value).

In some aspects, such an apparatus (e.g., AP 110, STA(s) 120, 150) may determine the duration of such field(s), signal(s), bit(s), or portion(s) of the communication/transmission based on a value/magnitude of such one or more factors. In some aspects, such an apparatus (e.g., AP 110, STA(s) 120, 150) may determine a value/magnitude of such one or more factors based on the duration of such field(s), signal(s), bit(s), or portion(s) of the communication/transmission. In some aspects, such an apparatus (e.g., AP 110, STA(s) 120, 150) may determine the duration of such field(s), signal(s), bit(s), or portion(s) of the communication/transmission by comparing a value/magnitude of such one or more factors with a value/magnitude of one or more threshold or predetermined/preconfigured valued/magnitudes (e.g., possibly stored in the apparatus). In some aspects, the duration or quantity (e.g., of field(s), signal(s), or bit(s)) of the first set/sequence/structure of values/bits/data may be equal to, a fraction (e.g., a proper fraction, or an improper fraction) of, or a multiple of the duration or quantity (e.g., of field(s), signal(s), or bit(s)) of the second set/sequence/structure of values/bits/data. In some aspects, the duration or quantity (e.g., of field(s), signal(s), or bit(s)) of the second set/sequence/structure of values/bits/data may be equal to, a fraction (e.g., a proper fraction, or an improper fraction) of, or a multiple of the duration or quantity (e.g., of field(s), signal(s), or bit(s)) of the first set/sequence/structure of values/bits/data. In some aspects, the first set/sequence/ structure of values/bits/data and/or the second set/sequence/ structure of values/bits/data may be repeated at least once (e.g., in a sequential/contiguous/continuous or near-sequential/near-contiguous/near-continuous pattern/manner).

In some aspects, the communication/transmission received by the apparatus (e.g., AP 110, STA(s) 120, 150) may not include a specific field/parameter/portion that explicitly indicates such one or more factors (e.g., channel information, channel quality information, a rate (e.g., transmission/reception/data rate) of the transmission/communication, a frequency or frequency range/band of the transmission/communication, and/or various other suitable aspects of the transmission/communication) associated with the communication/transmission. In some aspects, such an apparatus (e.g., AP 110, STA(s) 120, 150) may determine/ infer a value/magnitude (e.g., a relative value/magnitude, relative to a threshold value) of such one or more factors based on (e.g., a value of such) information/values/data of the aforementioned field(s), signal(s), bit(s), or portion(s), which may include the aforementioned first set/sequence/ structure of values/bits/data and/or second set/sequence/ structure of values/bits/data. For example, such an apparatus (e.g., AP 110, STA(s) 120, 150) may determine/infer/differentiate a high or relatively higher value/magnitude of such one or more factors when/if the information/values/data of such field(s), signal(s), bit(s), or portion(s) includes the first set/sequence/structure of values/bits/data, and/or such an apparatus (e.g., AP 110, STA(s) 120, 150) may determine/ infer/differentiate a low or relatively lower value/magnitude of such one or more factors when/if the information/values/ data of such field(s), signal(s), bit(s), or portion(s) include the second set/sequence/structure of values/bits/data.

In some aspects, in such a plurality of bits (of the such field(s), signal(s), bit(s), or portion(s)), such field(s), signal(s), bit(s), or portion(s) may include a plurality of bits (e.g., a series of binary bits) where each bit may each have various values without deviating from the scope of the present disclosure. In some aspects, in such a plurality of bits (of the such field(s), signal(s), bit(s), or portion(s)), the number of bits having a first value may be equal to or approximately equal to the number of bits having a second value, wherein the second value is different from (e.g., a complement of) the first value, and/or wherein the first value is different from (e.g., a complement of) the second value. In some aspects, in such a plurality of bits (of the such field(s), signal(s), bit(s), or portion(s)), two or more bits of such plurality of bits may have the same value (e.g., the same first value or the same second value). In some aspects, in such a plurality of bits (of the such field(s), signal(s), bit(s), or portion(s)), no more than three consecutive/contiguous bits comprise the same value (e.g., the first value and/or the second value).

In some aspects, in such a plurality of bits (of the such field(s), signal(s), bit(s), or portion(s)), at least one and/or fewer than two/three set(s) of three/four (or fewer) consecutive/contiguous bits comprise a first value and/or at least one and/or fewer than two/three set(s) of three/four (or fewer) consecutive/contiguous bits comprise a second value, wherein the second value is different from (e.g., a complement of) the first value, and/or vice versa. In some aspects, in such a plurality of bits (of the such field(s), signal(s), bit(s), or portion(s)), a duration (e.g., a maximum duration) of time associated with at least one and/or fewer than two/three set(s) of three/four (or fewer) consecutive/contiguous bits comprising a first value is equal to or substantially equal to a duration (e.g., a maximum duration) of time associated with at least one and/or fewer than two/three set(s) of three/four (or fewer) consecutive/contiguous bits comprising a second value, wherein the second value is different from (e.g., a complement of) the first value, and/or vice versa.

In some aspects, a duration (e.g., a maximum duration) of time associated with consecutive/contiguous bits having a particular (e.g., the same) value/attribute in the aforementioned field(s), signal(s), bit(s), or portion(s) of the communication/transmission is less than or equal to twice the duration (e.g., a maximum duration) of time associated with consecutive/contiguous bits having a particular (e.g., the same) value/attribute in at least one other portion of such communication/transmission (and such other portion of such communication/transmission may include a payload/data portion of such communication/transmission). In some aspects, a duration (e.g., a maximum duration) of time associated with a particular value/attribute (e.g., power level, communication signal, off-/on-period, off-/on-signal, low-/high-power signal, etc.) in the aforementioned field(s), signal(s), bit(s), or portion(s) of the communication/transmission is less than or equal to twice a duration (e.g., a maximum duration) of time with which a similar/same value/attribute in at least one other portion of such communication/transmission (and such other portion of such communication/transmission may include a payload/data portion of such communication/transmission).

In some aspects, the aforementioned first value may correspond to, be associated with, or cause the apparatus (e.g., AP 110, STA(s) 120, 150) to communicate/operate according to a first signal value/amplitude value, a first signal energy level, 'on' duration/period/value, or other attribute/characteristic suitable for communication. In some aspects, the aforementioned second value may correspond to, be associated with, or cause the apparatus (e.g., AP 110, STA(s) 120, 150) to communicate/operate according to a second signal value/amplitude value, a second signal energy level, an 'off' duration/period/value, or other attribute/characteristic suitable for communication, which may be different from the aforementioned first signal value/amplitude value, first signal energy level, 'on' duration/period/value, or other attribute/characteristic suitable for communication, respectively. In some aspects, the aforementioned first value may correspond to, be associated with, or cause the apparatus (e.g., AP 110, STA(s) 120, 150) to communicate/ operate according to a first signal value/amplitude value, a first signal energy level, an 'off' duration/period/value, or other attribute/characteristic suitable for communication. In some aspects, the aforementioned second value may correspond to, be associated with, or cause the apparatus (e.g., AP 110, STA(s) 120, 150) to communicate/operate according to a second signal value/amplitude value, a second signal energy level, an 'on' duration/period/value, or other attribute/characteristic suitable for communication, which may be different from the aforementioned first signal value/ amplitude value, first signal energy level, 'off' duration/ period/value, or other attribute/characteristic suitable for communication, respectively.

In some aspects, an apparatus (e.g., AP 110 and/or STA(s) 120, 150) may receive a communication/transmission (e.g., a packet, data packet, a frame, a data frame, an awaken packet, an awaken request packet, a request packet, and/or any other suitable encapsulation of information), and such communication/transmission may include field(s), signal(s), bit(s), or portion(s) that includes any one or more of the various signals, parameters, values, or other indicia described in greater detail herein. In some aspects, such field(s), signal(s), bit(s), or portion(s) may include or be a preamble, a header, a timing management signal, a synchronization value/counter/signal, and/or various other suitable types of information/data, as described in greater detail herein. In some aspects, the timing management signal and/or the synchronization value/counter/signal (e.g., as described herein) may be included in the preamble or header of a packet (e.g., an awaken packet, a request packet, and/or awaken request packet (as described herein). In some aspects, the duration and/or information/values/data of such field(s), signal(s), bit(s), or portion(s) may be variable and/or may vary according to or depend on one or more factors. In some aspects, such one or more factors may include channel information, channel quality information, a rate (e.g., transmission/reception/data rate) of the transmission/communication, a frequency or frequency range/band of the transmission/communication, and/or various other suitable aspects related to the transmission/communication.

In some aspects, the duration of such field(s), signal(s), bit(s), or portion(s) may be greater when the value/magnitude of such one or more such factors is relatively lower/low (e.g., lesser than a threshold value, equal to a low value). In some aspects, the duration of such field(s), signal(s), bit(s), or portion(s) may be lesser when the value/magnitude of such one or more such factors is relatively higher/high (e.g., greater than a/the threshold value, equal to a high value). In some aspects, such an apparatus may determine the duration of such field(s), signal(s), bit(s), or portion(s) of the communication/transmission based on a value/magnitude of such one or more factors. In some aspects, such an apparatus may determine the duration of such field(s), signal(s), bit(s), or portion(s) of the communication/transmission by comparing a value/magnitude of such one or more factors with a value/magnitude of one or more threshold or predetermined/preconfigured valued/magnitudes (e.g., possibly stored in the apparatus, such as AP 110 and/or STA(s) 120, 150).

In some aspects, the information/values/data of such field(s), signal(s), bit(s), or portion(s) may include a first set/sequence/structure of values/bits/data when the value/magnitude of such one or more such factors is relatively lower/low (e.g., lesser than a threshold value, equal to a low value). In some aspects, the duration of such field(s), signal(s), bit(s), or portion(s) may include a second set/sequence/structure of value/bits/data when the value/magnitude of such one or more such factors is relatively higher/high (e.g., greater than a/the threshold value, equal to a high value). In some aspects, the first set/sequence/structure of values/bits/data may have a relationship with the second set/sequence/structure of values/bits/data. In some aspects, the first set/sequence/structure of values/bits/data may be a compliment of the second set/sequence/structure of values/bits/data, or vice versa. In some aspects, such an apparatus may determine/infer a value/magnitude (e.g., a relative value/magnitude) of such one or more factors based on (e.g., a value of such) information/values/data of such field(s), signal(s), bit(s), or portion(s). For example, such an apparatus may determine/infer/differentiate a high or relatively higher value/magnitude of such one or more factors when the information/values/data of such field(s), signal(s), bit(s), or portion(s) includes the first set/sequence/structure of values/bits/data, and/or such an apparatus may determine/infer/differentiate a low or relatively lower value/magnitude of such one or more factors when the information/values/data of such field(s), signal(s), bit(s), or portion(s) include the second set/sequence/structure of values/bits/data.

As stated above, in some aspects, an apparatus (e.g., AP 110 and/or STA(s) 120, 150) may receive a communication/transmission (e.g., a packet, data packet, a frame, a data frame, an awaken packet, an awaken request packet, a request packet, and/or any other suitable encapsulation of information), and such communication/transmission may include field(s), signal(s), bit(s), or portion(s) that includes any one or more of the various signals, parameters, values, or other indicia described in greater detail herein. As also stated above, in some aspects, such field(s), signal(s), bit(s), or portion(s) may include or be a preamble, a header, a timing management signal, a synchronization value/counter/signal, and/or various other suitable types of information/data, as described in greater detail herein. In some aspects, such field(s), signal(s), bit(s), or portion(s) may include information useful, configured for, or enabling a/an identification, determination, inference, or differentiation of a rate of transmission of information in such communication/transmission. In some aspects, such field(s), signal(s), bit(s), or portion(s) may include information useful, configured for, or enabling a identification, determination, inference, or differentiation of a boundary of at least a portion of transmission of information in such communication/transmission, such as a boundary between (1) the preamble, header, timing management signal, and/or synchronization signal and (2) at least one other portion of such communication/transmission. In some aspects, such field(s), signal(s), bit(s), or portion(s) may include information useful, configured for, or enabling a identification, determination, inference, or differentiation of a type, classification, category, or other suitable attribute of such communication/transmission.

In some aspects, such communication/transmission (e.g., a packet, data packet, a frame, a data frame, an awaken packet, an awaken request packet, a request packet, and/or any other suitable encapsulation of information) may include a data portion, a payload portion, or some other similar type of information. Such data/payload portion may be subsequent to (without necessarily being contiguous in relation to) or follow (e.g., in time) the aforementioned field(s), signal(s), bit(s), or portion(s) of such communication/transmission. Such data/payload portion of such communication/transmission may include: control information; information (e.g., identification information) associated with an apparatus (e.g., AP 110, STA(s) 120, 150) that transmitted such communication/transmission; information associated with a BSS with which (1) such communication/transmission is associated, (2) the apparatus (e.g., AP 110, STA(s) 120, 150) that transmitted such communication/transmission is associated, or (3) a singular/plurality of apparatus (e.g., AP 110, STA(s) 120, 150) to/for which such communication/transmission is intended/destined is associated; and/or information associated with a group identifier with which one or more apparatuses (e.g., AP 110, STA(s) 120, 150) to/for which such communication/transmission is intended is or will be associated.

As stated above, in some aspects, an apparatus (e.g., AP 110 and/or STA(s) 120, 150) may receive a communication/transmission (e.g., a packet, data packet, a frame, a data frame, an awaken packet, an awaken request packet, a request packet, and/or any other suitable encapsulation of information), and such communication/transmission may include field(s), signal(s), bit(s), or portion(s) that includes any one or more of the various signals, parameters, values, or other indicia described in greater detail herein. As also stated above, in some aspects, such field(s), signal(s), bit(s), or portion(s) may include or be a preamble, a header, a timing management signal, a synchronization value/counter/signal, and/or various other suitable types of information/data, as described in greater detail herein. In some aspects, such transmission/communication may lack, not include, or be without a/another header (e.g., a physical (PHY) and/or medium access control (MAC) header(s), etc.) between (1) the aforementioned field(s), signal(s), bit(s), or portion(s) (which may include or be a preamble, a header, a timing management signal, a synchronization value/counter/signal) and (2) the aforementioned data/payload portion(s).

In some aspects, a (receiving) apparatus (e.g., STA(s) 120, 150 or AP 110) may transition/change to the third mode/state/configuration described above (in which its primary/main radio/receiver may be/operate in an off/low-/lower-/inactive/doze power mode/state/configuration and its secondary radio/receiver (e.g., SR(s) 224, 234) may be/operate in an (e.g., always/continuously) on/high-/higher-/active power mode/state/configuration) or the fourth mode/state/configuration described above (in which its primary/main radio/receiver (e.g., PR(s) 222, 232) may be/operate in an off/low-/lower-/inactive/doze power mode/state/configuration and its secondary radio/receiver (e.g., SR(s) 224, 234) may cycle/alternate between a period of being/operating in an on/high-/higher-/active power mode/state/configuration followed by a period of being/operating in an off/low-/lower-/inactive/doze power mode/state/configuration (or vice versa), e.g., according to a duty cycle, schedule, frequency, or periodicity), e.g., from the first mode/state/configuration described above (in which its primary/main radio/receiver (e.g., PR(s) 222, 232) may be/operate in an on/high-/higher-/active power mode/state/configuration and its secondary radio/receiver (e.g., SR(s) 224, 234) may be/operate in an off/low-/lower-/inactive/doze power mode/state/configuration) or from the second mode/state/configuration described above (in which its primary/main radio/receiver (e.g., PR(s) 222, 232) may cycle/alternate/vary between a period/duration of being/operating in an on/high-/higher-/active power mode/state/configuration and/followed by a period/duration of being/operating in an off/low-/lower-/inactive/doze power mode/state/configuration (or vice versa), e.g., according to a duty cycle, schedule, frequency, or periodicity and its secondary radio/receiver (e.g., SR(s) 224, 234) may be/operate in an off/low-/lower-/inactive/doze power mode/state/configuration), if/when or only if/when that (receiving) apparatus (e.g., STA/AP) is unable/unsuccessful in transmitting a/any/all packet(s) (e.g., awaken response packet(s)) to another apparatus (e.g., AP 110 or STA(s) 120, 150) and receiving a response (e.g., ACK, NACK, response packet, etc.) (after, in response to, and/or in association with transmitting that packet) within a period/duration of time, e.g., after/relative to a time that the (receiving) apparatus (e.g., STA(s) 120, 150) completed an awaken procedure and/or began operating in the first mode/state/configuration described above (in which its primary/main radio/receiver (e.g., PR(s) 222, 232) may be/operate in an on/high-/higher-/active power mode/state/configuration and its secondary radio/receiver (e.g., SR(s) 224, 234) may be/operate in an off/low-/lower-/inactive/doze power mode/state/configuration) and/or the second mode/state/configuration described above (in which its primary/main radio/receiver (e.g., PR(s) 222, 232) may cycle/alternate/vary between a period/duration of being/operating in an on/high-/higher-/active power mode/state/configuration and/followed by a period/duration of being/operating in an off/low-/lower-/inactive/doze power mode/state/configuration (or vice versa), e.g., according to a duty cycle, schedule, frequency, or periodicity and its secondary radio/receiver may be/operate in an off/low-/lower-/inactive/doze power mode/state/configuration).

In some aspects, in the SS, a number of bits having a first value is equal to a number of bits having a second value. In some aspects, the first value is different from (or a complement of) the second value. In some aspects, in the SS, no more than three consecutive/contiguous bits comprise the same value. In some aspects, in the SS, at least one/two set of three consecutive/contiguous bits comprise a first value and at least one/two set of three consecutive/contiguous bits comprise a second value, and the first value may be different from (or a complement of) the second value. In some aspects, at a particular data rate, in the SS, fewer than three sets of three consecutive/contiguous bits comprise a first value and fewer than three sets of three consecutive/contiguous bits comprise a second value, wherein the first value is different from (or a complement of) the second value.

In some aspects, the first value may correspond to communication according to a first signal energy level and the second value may correspond to communication according to a second signal energy level, which may be different from the first signal energy level. In some aspects, the first value may correspond to communication according to a first signal amplitude value or first signal energy level and the second value may correspond to communication according to a second signal amplitude value or second signal energy level, whereby the first signal amplitude level may be different from the second signal amplitude level, and the first signal energy level may be different from the second signal energy level.

As described herein, in some aspects, the packet 320 may include the SS. In some aspects, a duration of the SS varies according to one or more factors, wherein such one or more factors may include a data rate of the communication that included the packet 320. In some aspects, the SS has a first duration when a magnitude of the one or more factors is less than a threshold value or equal to a low value, and/or the SS has a second duration when a magnitude of the one or more factors is more than a threshold value or equal to a high value. In such aspects, the first duration is greater than the second duration, or the second duration is less than the first duration. In some aspects, the SS comprises a first set/structure of data when the magnitude of the one or more factors is lesser than a threshold value or equal to a low value, and a second set/structure of data when the magnitude of the one or more factors is more than a threshold value or equal to a high value, whereby the first set/structure of data may be different from the second set/structure of data.

In some aspects, the first set/structure of data has a relationship to the second set/structure of data, or the second set/structure of data has a relationship to the first set/structure of data. In some aspects, a quantity of bits of the first set/structure of data of the SS is a multiple of a quantity of bits of the second set/structure of data of the SS. In some aspects, the first set/structure of data of the SS and/or the second set/structure of data of the SS is repeated at least once in the packet 320. In some aspects, the first set/structure of data is or includes a complement of the second set/structure of data. In some aspects, at least a portion of the first set/structure of data of the SS may be a complement of at least a portion of the second set/structure of data of the SS. In some aspects, at least a portion of the second set/structure of data of the SS may be a complement of at least a portion of the first set/structure of data of the SS. In some aspects, a complement of a first value refers to an inverse of the first value. In some aspects, a complement of a first value refers to a second value that is different from the first value. In some aspects, a complement of A comprises A. In some aspects, a complement of 0 comprises 1, and a complement of 1 comprises 0.

As mentioned herein, in some aspects, the packet 320 (or at least some parts thereof) may be modulated using on off keying. In some aspects, the on off keying is configured differently based on a rate of data transmission of the packet 320 (or at least some parts thereof). In some aspects, at a first data rate, a first set including one on-duration and one off-duration corresponds to a first value, and/or, at a second data rate, a first set including two on-durations and two off-duration corresponds to the first value. In some aspects, at a first data rate, a second set including one on-duration and one off-duration correspond to a second value, and/or, at a second data rate, a second set including two on-durations and two off-duration correspond to the second value. The first data rate may be different from the second data rate. In some aspects, the first set may include one on-duration and one off-duration is different from the second set that includes one on-duration and one off-duration. In some aspects, the first set that includes two on-durations and two off-duration may be different from the second set that includes two on-durations and two off-duration, and the first value may be different from the second value. In some aspects, at the first data rate, each on- and off-duration has a duration of X microseconds, and/or, at the second data rate, each on- and off-duration includes a duration of A microseconds, which may be different from the duration of X microseconds.

In some aspects, as described above, a received packet (e.g., an awaken packet, an awaken request packet, etc.) (e.g., packet 320) may be modulated in various ways without deviating from the scope of the present disclosure. In some aspects, as described above, the packet (e.g., an awaken packet, an awaken request packet, etc.) (e.g., packet 320) may be modulated using various keying/modulation techniques, such as frequency shift keying, amplitude shift keying, phase shift keying, on off keying, quadrature amplitude modulation, and/or various other types of modulation or keying/modulation techniques. In some aspects, the on off keying may be configured in various ways without deviating from the scope of the present disclosure. In some aspects, the on off keying may be configured differently based on the rate of data transmission of the packet (e.g., an awaken packet, an awaken request packet, etc.) (e.g., packet 320).

In some aspects, when communication of the packet (e.g., an awaken packet, an awaken request packet, etc.) (e.g., packet 320) is according to a first data rate, an off/off-duration signal(s)/symbol(s) of/for a first duration (e.g., X microseconds) followed by an on/on-duration signal(s)/symbol(s) for a second duration, which may be the same (e.g., X microseconds) as the first duration (e.g., X microseconds) or different from (e.g., Y microseconds) the first duration (e.g., X microseconds), may carry or correspond to a first value, and an on/on-duration signal(s)/symbol(s) of/for a first duration (e.g., X microseconds) followed by an off/off-duration signal(s)/symbol(s) for a second duration, which may be the same (e.g., X microseconds) as the first duration (e.g., X microseconds) or different (e.g., Y microseconds) from the first duration (e.g., X microseconds), may carry or correspond to a second value, which may be different from the first value. In some aspects, such on/on-duration signal(s)/symbol(s) may include a null portion and a payload/signal portion. In some aspects, such a null portion may be for a duration that is shorter than the payload/signal portions. For example, the null portion may have a duration that is one third (e.g., X/3 microseconds) of the on/on-duration signal(s)/symbol(s) (X microseconds), and the payload/signal portion may have a duration that is two thirds (e.g., 2X/3 microseconds) of the on/on-duration signal(s)/symbol(s) (e.g., X microseconds).

In some aspects, when communication of the packet (e.g., an awaken packet, an awaken request packet, etc.) (e.g., packet 320) is according to a second data rate, two (or more) on/on-duration signal(s)/symbol(s) each or collectively having a first duration (e.g., A microseconds) followed by two (or more) off/off-duration signal(s)/symbol(s) each or collectively having of/for a second duration (e.g., B microseconds), which may be the same (e.g., A microseconds) as the first duration (e.g., A microseconds) or different (e.g., B microseconds) from the first duration (e.g., A microseconds), may carry or correspond to a first value, and two (or more) off/off-duration signal(s)/symbol(s) each or collectively having a first duration (e.g., A microseconds) followed by two (or more) off/off-duration signal(s)/symbol(s) each or collectively having of/for a second duration (e.g., B microseconds), which may be the same (e.g., A microseconds) as the first duration (e.g., A microseconds) or different (e.g., B microseconds) from the first duration (e.g., A microseconds), may carry or correspond to a second value. In some aspects, such on/on-duration signal(s)/symbol(s) may include a null portion and a payload/signal portion. In some aspects, such a null portion may be for a duration that is shorter than the payload/signal portions. For example, the null portion may have a duration that is one fourth (e.g., A/4 microseconds) of the on/on-duration signal(s)/symbol(s) (A microseconds), and the payload/signal portion may have a duration that is three quarters (e.g., 3A/4 microseconds) of the on/on-duration signal(s)/symbol(s) (e.g., A microseconds).

In some aspects, the first data rate may be less than the second data rate, or the second data rate may be greater than the first data rate. In some aspects, the second data rate may be lower than the first data rate, or the first data rate may be greater than the second date rate. Although various data rates (e.g., first and second data rates) are described herein, in some aspects, a single data rate (e.g., only a first data rate or only a second data rate) may be sufficient and additional data rates are not necessarily a requirement of the present disclosure, while, in some other aspects, more than a single data rate (e.g., a first data rate and a second data rate) may be required and a single data rate may not necessarily be sufficient. Therefore, various implementations may utilize a single data rate or more than a single data rate without deviating from the scope of the present disclosure.

In some aspects, a communication/transmission (e.g., packet 320) transmitted by AP 110 and received by STA(s) 120, 150 may not include a field that explicitly indicates a data rate of the transmission/communication (e.g., packet 320). In some aspects, the SS includes information useful for an inference (e.g., by STA(s) 120, 150) of a rate of transmission of information in the communication/transmission (e.g. packet 320). In some aspects, STA(s) 120, 150 may infer a first magnitude of the one or more factors when the SS includes the first set/structure of data, and infer a second magnitude of the one or more factors when the SS includes the second set/structure of data. In such aspects, the first set/structure of data is different from the second set/structure of data. In such aspects, the first magnitude of the one or more factors is higher than the second magnitude of the one or more factors, or the second magnitude of the one or more factors is less than the first magnitude of the one or more factors. In such aspects, the first set/structure of data of the SS has a relationship to the second set/structure of data of the SS, or the second set/structure of data of the SS has a relationship to the first set/structure of data of the SS. The second set/structure of data of the SS may be or include a complement of the first set/structure of data of the SS.

In some aspects, a quantity of bits of the first set/structure of data of the SS is a fraction of a quantity of bits of the second set/structure of data of the SS. In some aspects, the number of bits/symbols and/or the duration of the first set/structure of data of the SS is greater than the number of bits/symbols and/or the duration of the second set/structure of data of the SS, or the number of bits/symbols and/or the duration of the second set/structure of data of the SS is less than the number of bits/symbols and/or the duration of the first set/structure of data of the SS. In some other aspects, the number of bits/symbols and/or the duration of the second set/structure of data of the SS is greater than the number of bits/symbols and/or the duration of the first set/structure of data of the SS, or the number of bits/symbols and/or the duration of the first set/structure of data of the SS is less than the number of bits/symbols and/or the duration of the second set/structure of data of the SS.

As mentioned herein, in some aspects, the second data rate may be lower than the first data rate, or the first data rate may be greater than the second date rate. In some aspects, e.g., when communication of the packet 320 is according to a particular data rate (e.g., a low data rate, or a single, predetermined data rate), an on (or on-duration) signal may be characterized by having an energy level above a threshold (e.g., threshold energy level), and an off (or off-duration) signal may be characterized by having an energy level below the threshold (e.g., threshold energy level). In such aspects, if, during the period of time, STA(s) 120, 150 receives a group that includes at least three signals where an initial signal is the same as the penultimate signal and the final signal of the group comprises an off signal, STA(s) 120, 150 may determine that the group of signals received during the period of time corresponds to a first value. In such aspects, if, during the period of time, STA(s) 120, 150 receives a group that includes at least three signals where an initial signal is the same as the penultimate signal and the final signal includes an on signal, STA(s) 120, 150 may determine that the group of signals received during the period of time corresponds to a second value, which may be different from the first value.

In some aspects, as described above, a received packet (e.g., an awaken packet, an awaken request packet, etc.) (e.g., packet 320) may be modulated in various ways without deviating from the scope of the present disclosure. In some aspects, as described above, the packet (e.g., an awaken packet, an awaken request packet, etc.) (e.g., packet 320) may be modulated using various keying/modulation techniques, such as frequency shift keying, amplitude shift keying, phase shift keying, on off keying, quadrature amplitude modulation, and/or various other types of modulation or keying/modulation techniques. In some aspects, the on off keying may be configured in various ways without deviating from the scope of the present disclosure. In some aspects, the on off keying may be configured differently based on the rate of data transmission of the packet (e.g., an awaken packet, an awaken request packet, etc.).

In some aspects, when communication of the packet (e.g., an awaken packet, an awaken request packet, etc.) (e.g., packet 320) is according to a second data rate, which may be the same as or different from (e.g., lesser/lower than or greater/higher than) the aforementioned first data rate (described above), an apparatus (e.g., STA(s) 120, 150 or AP 110) may determine information, a value, or an information/informational value associated with symbols/signals received during a certain period of time. In some aspects, such an apparatus (e.g., STA(s) 120, 150 AP 110), when communicating according to such second data rate, may determine that the symbols/signals received during such a period of time contains or corresponds to a first value/information/informational-value when/if, during such a period of time: (1) such apparatus (e.g., STA(s) 120, 150 or AP 110) receives/received a group of at least three signals/symbols comprising no more than two or two or more on/on-duration signal(s)/symbol(s) (e.g., wherein an on/on-duration signal/symbol may be characterized by having a detectable energy level above a certain threshold) separated by no more than one or more than one off/off-duration signal(s)/symbol(s) (e.g., wherein an off/off-duration signal/symbol may be characterized by having a detectable energy level below a certain threshold), and wherein a final/last symbol/signal of such grouping is/includes/comprises an off/off-duration signal/symbol; (2) such apparatus (e.g., STA(s) 120, 150 or AP 110) receives/received a group of at least three signals/symbols comprising no more than two or two or more off/off-duration signal(s)/symbol(s) separated by no more than one or more than one on/on-duration signal(s)/symbol(s) and wherein a first/initial symbol/signal of such grouping is/includes/comprises an on/on-duration signal/symbol; and/or (3) such apparatus (e.g., STA(s) 120, 150 or AP 110) receives/received a group of at least three signals/symbols wherein an initial symbol/signal is similar or the same as the penultimate signal/symbol (e.g., both on/on-durations signals/symbols or both off/off-duration symbols/signals) and (i) the last/final symbol is an off/off-duration symbol/signal and/or (ii) the first/initial symbol/signal is an on/on-duration signal/symbol. In some aspects, the duration of time associated with each signal/symbol described above is the same (e.g., each comprises A microseconds). In some aspects, a duration of time associated with each signal/symbol described above is different from one another (e.g., one signal/symbol may have a duration of A microseconds while one (or more) signal(s)/symbol(s) may have a duration of B microseconds).

In some aspects, such an apparatus (e.g., STA(s) 120, 150 or AP 110), when communicating according to such second data rate, may determine that the symbols/signals received during such a period of time contains or corresponds to a second value/information/informational-value, which may be the same as or different from the aforementioned first value/information/informational-value (described above), when/if, during such a period of time: (1) such apparatus (e.g., STA(s) 120, 150 or AP 110) receives/received a group of at least three signals/symbols comprising no more than two or two or more on/on-duration signal(s)/symbol(s) (e.g., wherein an on/on-duration signal/symbol may be characterized by having a detectable energy level above a certain threshold) separated by no more than one or more than one off/off-duration signal(s)/symbol(s) (e.g., wherein an off/off-duration signal/symbol may be characterized by having a detectable energy level below a certain threshold), and wherein a final/last symbol/signal of such grouping is/includes/comprises an on/on-duration signal/symbol; (2) such apparatus (e.g., STA(s) 120, 150 or AP 110) receives/received a group of at least three signals/symbols comprising no more than two or two or more off/off-duration signal(s)/symbol(s) separated by no more than one or more than one on/on-duration signal(s)/symbol(s) and wherein a first/initial symbol/signal of such grouping is/includes/comprises an off/off-duration signal/symbol; and/or (3) such apparatus (e.g., STA(s) 120, 150 or AP 110) receives/ received a group of at least three signals/symbols wherein an initial symbol/signal is similar or the same as the penultimate signal/symbol (e.g., both on/on-durations signals/symbols or both off/off-duration symbols/signals) and (i) the last/final symbol is an on/on-duration symbol/signal and/or (ii) the first/initial symbol/signal is an off/off-duration signal/symbol. In some aspects, a duration of time associated with each signal/symbol described above is different from one another (e.g., one signal/symbol may have a duration of A microseconds while one (or more) signal(s)/symbol(s) may have a duration of B microseconds). In some aspects, a duration of time associated with each signal/symbol described above is similar to or the same as one another (e.g., one signal/symbol may have a duration of A microseconds while one (or more) signal(s)/symbol(s) may have a duration of exactly or approximately A microseconds).

In some aspects, the packet 320 may include a preamble. In some aspects, the preamble is communicated using a first bandwidth or a first frequency range, and the SS is communicated using a second bandwidth or second frequency range. In some aspects, the first bandwidth or first frequency range comprises a value or range of values that is greater than or a multiple of the second bandwidth or second frequency range. In some aspects, such multiple comprises a value of X, which may be an integer greater than one. In some aspects, the first bandwidth or frequency range comprises a same center frequency as the second bandwidth or second frequency range.

As described in greater detail herein, in some aspects, an apparatus (e.g., AP 110 and/or STA(s) 120, 150) may receive/transmit a communication/transmission (e.g., a packet, data packet, a frame, a data frame, an awaken packet, an awaken request packet, a request packet, a response packet, an awaken response packet, a beacon, and/or any various other suitable encapsulation of information), and such communication/transmission may include field(s), signal(s), bit(s), or portion(s) that includes any one or more of the various signals, parameters, values, or other indicia described in greater detail herein. In some aspects, such field(s), signal(s), bit(s), or portion(s) may include or be a preamble, a header, a timing management signal, a synchronization value/counter/signal, and/or various other suitable types of information/data, as described in greater detail herein. In some aspects, the preamble and/or header of such field(s), signal(s), bit(s), or portion(s) may be communicated using/in, be included in, or span a first bandwidth or first frequency range, and the timing management signal, synchronization value/counter/signal, and/or one or more other portions of such field(s), signal(s), bit(s), or portion(s) may be communicated using/in, be included in, or span a second bandwidth or second frequency range. In some aspects, the first bandwidth or first frequency range comprises a value or a range of values that is greater than, or a multiple of (e.g., 2X/2-times, 3X/3-times, 4X/4-times, 5X/5-times, 6X/6-times etc.), the second bandwidth or second frequency range. In some aspects, the first bandwidth or first frequency range comprises a same center frequency as the second bandwidth or second frequency range.

In some aspects, the second bandwidth or second frequency range comprises a value or a range of values that is less than, a subset of, or a fraction of (e.g., one-half, one-third, one-fourth, one-fifth, one-sixth, etc.) the second bandwidth or second frequency range. In some aspects, no more than a single timing management signal and/or synchronization signal (of such field(s), signal(s), bit(s), or portion(s)) spanning, communicated in/using, or included in the second frequency range or second bandwidth is communicated with the header and/or preamble (of such field(s), signal(s), bit(s), or portion(s)) spanning, communicated in/using, or included in the first frequency range or first bandwidth. In some aspects, at least a portion or some of the first bandwidth or first frequency range is included in the second bandwidth or second frequency range, and at least a portion or some of the first bandwidth or first frequency range is not included in the second bandwidth or second frequency range. In some aspects, all of the second bandwidth or second frequency range is included in or is the same as the first bandwidth or first frequency range, and not all of the first bandwidth or first frequency range is included in or the same as the second bandwidth or second frequency range.

In some aspects, in response to receiving the packet 320, STA(s) 120, 150 may initiate a transition of PR(s) 222, 232 from a low power state/mode, turned off state or powered down state to a high power, turned on state, or powered up state. In some aspects, STA(s) 120, 150 may transmit and AP 110 may receive a response 330 to the packet 320. STA(s) 120, 150 may transmit the response 330 utilizing PR(s) 222, 232, as illustrated in FIG. 3, or SR(s) 224, 234, even though not illustrated in FIG. 3. In some aspects, after transmitting the response 330 to the packet 320, AP 110 may transmit and STA(s) 120, 150 may receive a message 332, which may be communicated in association with the aforementioned response 330. STA(s) 120, 150 may receive the message 332 utilizing PR(s) 222, 232, as illustrated in FIG. 3, or SR(s) 224, 234, even though not illustrated in FIG. 3. In some aspects, in response to receiving the message 332, AP 110 may initiate a transition from operating according to a mode/state wherein SR(s) 224, 234 is in a high power state/mode, turned on, or powered up to operating according to a mode/state wherein SR(s) 224, 234 is in a low power state/mode, turned off, or powered down. In some aspects, if/after STA(s) 120, 150 transmits the response 330 (e.g., using PR(s) 222, 232 and/or SR(s) 224, 234) to the packet 320 to AP 110 and if/after STA(s) 120, 150 receives a packet (e.g., message 332) associated with the transmitted response 330, STA(s) 120, 150 may initiate a transition of SR(s) 224, 234 from a high power state/mode, a turned on state, or a powered up state to a low power state/mode, a turned off state, or a powered down state.

In some aspects, an apparatus (e.g., STA(s) 120, 150) having a primary/main radio/receiver (e.g., PR(s) 222, 232) and/or secondary receiver (e.g., SR(s) 224, 234) may be configured to, maintain in a same/similar power/operation mode/state, turn-on/power-up, and/or turn-off/power-down one or more such radio/receivers based on various conditions, parameters, factors, thresholds, and other suitable aspects. In some aspects, such an apparatus (e.g., STA(s) 120, 150) may be configured to operate in or according to the first mode/state/configuration described above (in which its primary/main radio/receiver (e.g., PR(s) 222, 232) may be/operate in an on/high-/higher-/active power mode/state/configuration and its secondary radio/receiver (e.g., SR(s) 224, 234) may be/operate in an off/low-/lower-/inactive/doze power mode/state/configuration). In some aspects, such an apparatus (e.g., STA(s) 120, 150) may be configured to operate in or according to the third mode/state/configuration described above (in which its primary/main radio/receiver (e.g., PR(s) 222, 232) may be/operate in an off/low-/lower-/inactive/doze power mode/state/configuration and its secondary radio/receiver (e.g., SR(s) 224, 234) may be/operate in an (e.g., always/continuously) on/high-/higher-/active power mode/state/configuration). In some aspects, such an apparatus (e.g., STA(s) 120, 150) may be configured to operate in or according to a fifth mode/state/ configuration in which its primary/main receiver/radio (e.g., PR(s) 222, 232) is/operates in an on/high-/higher-/active power mode/state/configuration while its secondary radio/ receiver (e.g., SR(s) 224, 234) is/operates in an on/high-/ higher-/active power mode/state/configuration. In some aspects, such an apparatus (e.g., STA(s) 120, 150) may be configured to operate in or according to a sixth mode/state/ configuration in which its primary/main receiver/radio (e.g., PR(s) 222, 232) is switching, or at least transitioning, from being/operating in an off/low-/lower-/inactive/doze power mode/state/configuration to being/operating in an on/high-/ higher-/active power mode/state/configuration while its secondary radio/receiver (e.g., SR(s) 224, 234) is/operates in an on/high-/higher-/active power mode/state/configuration.

In some aspects, such an apparatus (e.g., STA(s) 120, 150) may be configured to communicate/receive a packet/frame (e.g., an awaken packet, a request packet, or awaken request packet, as described in greater detail herein) while such an apparatus (e.g., STA(s) 120, 150) is operating in or according to the third mode/state/configuration described above (in which its primary/main radio/receiver (e.g., PR(s) 222, 232) may be/operate in an off/low-/lower-/inactive/doze power mode/state/configuration and its secondary radio/receiver (e.g., SR(s) 224, 234) may be/operate in an (e.g., always/ continuously) on/high-/higher-/active power mode/state/ configuration). In some aspects, after, in response to, and/or in association with receiving such a packet (e.g., an awaken packet, a request packet, or awaken request packet, as described in greater detail herein), such an apparatus (e.g., STA(s) 120, 150) may be configured to switch, or at least initiate a transition, from (1) operating in or according to the third mode/state/configuration described above (in which its primary/main radio/receiver (e.g., PR(s) 222, 232) may be/operate in an off/low-/lower-/inactive/doze power mode/ state/configuration and its secondary radio/receiver (e.g., SR(s) 224, 234) may be/operate in an (e.g., always/continuously) on/high-/higher-/active power mode/state/configuration) to (2) operating in or according to the fifth mode/state/ configuration described above (in which its primary/main receiver/radio (e.g., PR(s) 222, 232) is/operates in an on/high-/higher-/active power mode/state/configuration while its secondary radio/receiver (e.g., SR(s) 224, 234) is/operates in an on/high-/higher-/active power mode/state/ configuration) and/or the sixth mode/state/configuration described above (in which its primary/main receiver/radio (e.g., PR(s) 222, 232) is switching, or at least transitioning, from being/operating in an off/low-/lower-/inactive/doze power mode/state/configuration to being/operating in an on/high-/higher-/active power mode/state/configuration while its secondary radio/receiver (e.g., SR(s) 224, 234) is/operates in an on/high-/higher-/active power mode/state/ configuration). In some aspects, such an apparatus (e.g., STA(s) 120, 150) may be configured to, after, in response to, and/or in association with receiving such a packet (e.g., an awaken packet, a request packet, or awaken request packet, as described in greater detail herein), maintain its secondary receiver/radio (e.g., SR(s) 224, 234) in a same/similar power/operation mode/state/configuration (e.g., in the on/high-/higher-/active power mode/state/configuration). In some aspects, such an apparatus (e.g., STA(s) 120, 150) may be configured to, after, in response to, and/or in association with receiving such a packet (e.g., an awaken packet, a request packet, or awaken request packet, as described in greater detail herein), switch, or at least initiate a transition, its primary/main radio from an off/low-/lower-/inactive/ doze power mode/state/configuration to an on/high-/higher-/ active power mode/state/configuration.

In some aspects, such an apparatus (e.g., STA(s) 120, 150) may be configured to communicate/transmit a response to such packet/frame (e.g., such response to such packet/frame being a response packet or awaken response packet, as described in greater detail herein) while operating in or according to the fifth mode/state/configuration described above (in which its primary/main receiver/radio (e.g., PR(s) 222, 232) is/operates in an on/high-/higher-/active power mode/state/configuration while its secondary radio/receiver (e.g., SR(s) 224, 234) is/operates in an on/high-/higher-/ active power mode/state/configuration) and/or the sixth mode/state/configuration described above (in which its primary/main receiver/radio (e.g., PR(s) 222, 232) is switching, or at least transitioning, from being/operating in an off/low-/ lower-/inactive/doze power mode/state/configuration to being/operating in an on/high-/higher-/active power mode/ state/configuration while its secondary radio/receiver (e.g., SR(s) 224, 234) is/operates in an on/high-/higher-/active power mode/state/configuration). In some aspects, such an apparatus (e.g., STA(s) 120, 150) may be configured to (e.g., after/subsequent-to, in response to, and/or in association with communicating/transmitting a response to such packet/ frame (e.g., such response to such packet/frame being a response packet or awaken response packet, as described in greater detail herein)) communicate/receive a response acknowledgement message (e.g., an acknowledgement message transmitted from another apparatus indicating whether the aforementioned response to the aforementioned frame/ packet (e.g., such response to such packet/frame being a response packet or awaken response packet, as described in greater detail herein)) while operating in or according to the fifth mode/state/configuration described above (in which its primary/main receiver/radio (e.g., PR(s) 222, 232) is/operates in an on/high-/higher-/active power mode/state/configuration while its secondary radio/receiver (e.g., SR(s) 224, 234) is/operates in an on/high-/higher-/active power mode/ state/configuration) and/or the sixth mode/state/configuration described above (in which its primary/main receiver/ radio (e.g., PR(s) 222, 232) is switching, or at least transitioning, from being/operating in an off/low-/lower-/ inactive/doze power mode/state/configuration to being/operating in an on/high-/higher-/active power mode/state/configuration while its secondary radio/receiver (e.g., SR(s) 224, 234) is/operates in an on/high-/higher-/active power mode/state/configuration).

In some aspects, such apparatus (e.g., STA(s) 120, 150) may be configured to, after, in response to, and/or in association with communicating/receiving a response acknowledgement message (e.g., an acknowledgement message transmitted from another apparatus indicating whether the aforementioned response to the aforementioned frame/ packet (e.g., such response to such packet/frame being a response packet or awaken response packet, as described in greater detail herein)), switch, or at least initiate a transition, from (1) operating in or according to the fifth mode/state/ configuration described above (in which its primary/main receiver/radio (e.g., PR(s) 222, 232) is/operates in an on/high-/higher-/active power mode/state/configuration while its secondary radio/receiver (e.g., SR(s) 224, 234) is/operates in an on/high-/higher-/active power mode/state/ configuration) and/or the sixth mode/state/configuration described above (in which its primary/main receiver/radio (e.g., PR(s) 222, 232) is switching, or at least transitioning, from being/operating in an off/low-/lower-/inactive/doze power mode/state/configuration to being/operating in an on/high-/higher-/active power mode/state/configuration while its secondary radio/receiver (e.g., SR(s) 224, 234) is/operates in an on/high-/higher-/active power mode/state/configuration) to (2) operating in or according to the first mode/state/configuration described above (in which its primary/main radio/receiver (e.g., PR(s) 222, 232) may be/operate in an on/high-/higher-/active power mode/state/configuration and its secondary radio/receiver (e.g., SR(s) 224, 234) may be/operate in an off/low-/lower-/inactive/doze power mode/state/configuration). In some aspects, such apparatus (e.g., STA(s) 120, 150) may be configured to, after, in response to, and/or in association with communicating/receiving a response acknowledgement message (e.g., an acknowledgement message transmitted from another apparatus indicating whether the aforementioned response to the aforementioned frame/packet (e.g., such response to such packet/frame being a response packet or awaken response packet, as described in greater detail herein)), maintain its primary/main receiver/radio (e.g., PR(s) 222, 232) in a same/similar power/operation mode/state/configuration (e.g., is/ in an on/high-/higher-/active power mode/state/configuration). In some aspects, such apparatus (e.g., STA(s) 120, 150) may be configured to, after in response to, and/or in association with communicating/receiving a response acknowledgement message (e.g., an acknowledgement message transmitted from another apparatus indicating whether the aforementioned response to the aforementioned frame/packet (e.g., such response to such packet/frame being a response packet or awaken response packet, as described in greater detail herein)), switch, or at least initiate a transition, from being or operating according to an on/high-/higher-/active power mode/state/configuration to being/operating in an off/low-/lower-/inactive/doze power mode/state/configuration.

In some aspects, such an apparatus (e.g., STA(s) 120, 150) may be configured to (e.g., after receiving the aforementioned packet/frame (e.g., an awaken packet, a request packet, or awaken request packet, as described in greater detail herein) (e.g., packet 320) (e.g., by its secondary radio/receiver and/or while its secondary radio/receiver (e.g., SR(s) 224, 234) is in an on/high-/higher-/active power mode/state/configuration) switch, or at least initiate a transition, its secondary radio/receiver (e.g., SR(s) 224, 234) from an on/high-/higher-/active power mode/state/configuration to an off/low-/lower-/inactive/doze power mode/state/configuration if/only-if/when/only-when/after/only-after-if/only-after (1) at least one frame/packet (e.g., the aforementioned response to the aforementioned frame/packet (e.g., such response to such packet/frame being a response packet or awaken response packet, as described in greater detail herein) is communicated/transmitted to another apparatus and (2) at least one frame/packet associated with that communicated/transmitted packet/frame (e.g., such at least one frame/packet associated with that communicated/transmitted packet/frame being a response acknowledgement message (e.g., an acknowledgement message transmitted from another apparatus indicating whether the aforementioned response to the aforementioned frame/packet)) is communicated/received.

In some aspects, after AP 110 transmits the packet 320, AP 110 may determine whether the transmission was successful based on whether AP 110 receives a response 330 to the transmitted packet 320 during a predetermined period of time after the transmission (e.g., during a time period between time $T_6$ and time $T_9$). In some aspects, AP 110 may determine that the transmission was unsuccessful if no response to the packet 320 is received (e.g., by time $T_9$), and/or may determine that the transmission was successful if a response to the packet 320 was received (e.g., by time $T_9$).

In some aspects, an apparatus/transmitter (e.g., AP 110) that transmits an awaken request packet may determine whether such transmission was successful based on whether it receives any (e.g., at least one) packets (e.g., awaken response packets, such as packet(s) 320) after, in response to, and/or in association with the transmitted awaken request packet (e.g., packet 320) during a period/duration (e.g., preset, predetermined, variable) of time after transmitting the awaken request packet (e.g., packet 320). In some aspects, if the apparatus/transmitter (e.g., AP 110) receives any (e.g., at least one) packets (e.g., awaken response packet(s), such as packet(s) 320) after, in response to, and/or in association with transmission of the awaken request packet (e.g., packet 320), then the apparatus/transmitter (e.g., AP 110) may determine that the transmission of the awaken request packet (e.g., packet 320) was successful. In some aspects, if the apparatus/transmitter (e.g., AP) receives no packets (e.g., awaken response packets) After, in response to, and/or in association with transmission of the awaken request packet, then the apparatus/transmitter (e.g., AP) may determine that the transmission of the awaken request packet was unsuccessful.

In some aspects, an apparatus/receiver (e.g., STA(s) 120, 150) may alter, adjust, or otherwise change its state, mode, or other configuration based on its success in receiving a packet (e.g., awaken request packet), and/or based on its success in transmitting a packet (e.g., awaken response packet) after, in response to, and/or in association with receiving another packet (e.g., awaken request packet), during a duration/period (e.g., preset, predetermined, variable, etc.) of time after receiving the packet (e.g., awaken request packet), and/or within a period of time after initiating/completing an awaken procedure (as described herein). A state, mode, or other configuration may refer to or include the radio/antenna utilized by the apparatus/receiver (e.g., STA(s) 120, 150), the power state or relative power utilization by the apparatus/receiver (e.g., STA(s) 120, 150) or any of its antenna(s)/receiver(s), and/or any other suitable aspects of the apparatus/receiver (e.g., STA(s) 120, 150), or as otherwise described herein.

In some aspects, a mode/state/configuration may be a relatively high-/higher-power mode/state/configuration of operation, and another mode/state/configuration may be a relatively lower-power mode/state/configuration of operation. In some aspects, the apparatus/receiver (e.g., STA(s) 120, 150) may alter, adjust, or otherwise change its state, mode, or other configuration, if/when the apparatus/receiver (e.g., STA(s) 120, 150) is unsuccessful in receiving any/all packets (e.g., awaken request packets) (e.g., packet(s) 320), and/or is unsuccessful in transmitting any/all packets (e.g., awaken response packets) (e.g., packet(s) 320) after, in response to, and/or in association with receiving another/other packet(s) (e.g., other awaken request packet(s)), e.g., during a period/duration (e.g., preset, predetermined, variable, etc.) of time after receiving such packet (e.g., awaken request packet) (e.g., packet(s) 320), and/or within a period of time after initiating/completing an awaken procedure (as described herein).

In some aspects, as described in greater detail herein, AP 110 may transmit and STA(s) 120, 150 may (e.g., using SR(s) 224, 234) receive the packet 320 while PR(s) 222, 232 is in a low power state/mode, a turned off state, or in a low power state/mode. In some aspects, the received packet 320 includes a field that indicates a version value. In some aspects, STA(s) 120, 150 may do one or more of the following: (A) use the version value to determine whether settings or parameters associated with a BSS are up-to-date or current; (B) use the version value to determine whether to update settings or parameters associated with the BSS; and/or (C) compare the version value (included in the received packet 320) with a previously received version value and, based on the comparison, to determine whether to perform an operation to update the settings or parameters associated with the BSS.

In some aspects, the settings or parameters associated with the BSS may affect communications using at least one of PR(s) 222, 232 or SR(s) 224, 234. In some aspects, in response to receiving the version value, and/or based on any one or more of the aforementioned (A), (B), and/or (C), STA(s) 120, 150 may determine to perform an operation to update such parameters or settings associated with the BSS. In some aspects, the operation to update the settings or parameters of the BSS includes STA(s) 120, 150 awakening PR(s) 222, 232. In some aspect, the operation to update the settings or parameters of the BSS includes STA(s) 120, 150 communicating a request to AP 110 and subsequently receiving a response from AP 110.

In some aspects, an apparatus (e.g. AP 110) may transmit and another apparatus (e.g., STA(s) 120, 150) may receive a packet, frame, beacon, or other information comprising various field. In some aspects, non-limiting examples of such packet, frame, beacon, or other information may include an awaken packet, an awaken request packet, an awaken beacon, or various other suitable forms of data/information. In some aspects, such received packet, frame, beacon, or other information may be received by the primary/main radio/receiver (e.g., PR(s) 222, 232) of the other apparatus (e.g., STA(s) 120, 150) (e.g., while the secondary/awaken radio/receiver (e.g., SR(s) 224, 234) of the other apparatus (e.g., STA(s) 120, 150) is turned off or in a low power state). In some aspects, such received packet, frame, beacon, or other information may be received by the secondary/awaken radio/receiver (e.g., SR(s) 224, 234) of the other apparatus (e.g., STA(s) 120, 150) (e.g., while the main/primary radio/receiver (e.g., PR(s) 222, 232) of the other apparatus (STA(s) 120, 150) is turned off or in low power state). In some aspects, such received packet, frame, beacon, or other information may include a field, value, counter, indicator, or number of bits that indicates a version/modification/alteration/synchronization/counter/change number/indicia/value. In some aspects, the other apparatus (e.g., STA(s) 120, 150) may utilize such version/modification/alteration/synchronization/counter/change number/indicia/value to determine whether information/settings/parameters associated with the BSS set (e.g., with which the apparatus(es) (e.g., AP and/or STA) is/are associated) (e.g., as stored in/by the other apparatus (e.g., STA(s) 120, 150)) are updated/up-to-date/current and/or whether to update such information/settings/parameters associated with the BSS (e.g., with which the apparatus(es) (e.g., AP 110 and/or STA(s) 120, 150) is/are associated) (e.g., as stored in/by the other apparatus (e.g., STA(s) 120, 150)). In some aspects, the other apparatus (e.g., STA(s) 120, 150) may compare such received version/modification/alteration/synchronization/counter/change number/indicia/value with a stored or another previously received version/modification/alteration/synchronization/counter/change number/indicia/value and, based on such comparison, determine whether to perform an operation to update such information/settings/parameters associated with the BSS (e.g., with which the apparatus(es) (e.g., AP 110 and/or STA(s) 120, 150) is/are associated) (e.g., as stored in/by the other apparatus (e.g., STA(s) 120, 150)). In some aspects, such information/settings/parameters associated with the BSS may impact/affect communications by/using the primary/main receiver/radio (e.g., PR(s) 222, 232) of the apparatus (e.g., STA(s) 120, 150)). In some aspects, such information/settings/parameters associated with the BSS may impact/affect communications by/using the secondary/awaken receiver/radio (e.g., SR(s) 224, 234) of the apparatus (e.g., STA(s) 120, 150).

After, in response to, and/or in association with receiving the aforementioned information (version/modification/alteration/synchronization/counter/changenumber/indicia/value), or in association with or based upon the aforementioned comparison (comparison of such received version/modification/alteration/synchronization/counter/changenumber/indicia/value with a stored or another previously received version/modification/alteration/synchronization/counter/change number/indicia/value) (e.g., as stored in/by the other apparatus (e.g., STA(s) 120, 150)) or any of the aforementioned determinations (e.g., (i) determining whether information/settings/parameters associated with the BSS (e.g., with which the apparatus(es) (e.g., AP 110 and/or STA(s) 120, 150) is/are associated) (e.g., as stored in/by the other apparatus (e.g., STA(s) 120, 150)) are updated/up-to-date/current), (ii) determining whether to update such information/settings/parameters associated with the BSS (e.g., with which the apparatus(es) (e.g., AP 110 and/or STA(s) 120, 150) is/are associated) (e.g., as stored in/by the other apparatus (e.g., STA(s) 120, 150)), (iii) or determine whether to perform an operation to update such information/settings/parameters associated with the BSS (e.g., with which the apparatus(es) (e.g., AP 110 and/or STA(s) 120, 150) is/are associated), the apparatus (e.g., STA(s) 120, 150) may make a determination.

In some aspects, such a determination is that no further action is required in relation to the information/settings/parameters associated with the BSS (e.g., when the information/settings/parameters associated with the BSS is up-to-date). In some actions, such a determination is to perform an operation to update such information/settings/parameters associated with the BSS (e.g., when the information/settings/parameters associated with the BSS is not up-to-date). In some aspects, such an operation to update such information/settings/parameters associated with the BSS may be for the apparatus (e.g., STA(s) 120, 150) to awaken or enter into a high (er) power state (e.g., with respect to its primary/main radio (e.g., PR(s) 222, 232)). In some aspects, such an operation to update such information/settings/parameters associated with the BSS may be for the apparatus (e.g., STA(s) 120, 150) to update/change its stored version/modification/alteration/synchronization/counter/change number/indicia/value based on the received version/modification/alteration/synchronization/counter/change number/indicia/value. In some aspects, such an operation to update such information/settings/parameters associated with the BSS may be for the apparatus (e.g., STA(s) 120, 150) to communicate a request (e.g., probe request) to another apparatus (e.g., AP 110) and/or subsequently receive a response (e.g., probe response) after, in response to, and/or in association with its request (e.g., probe request). In some aspects, the response to its request may include updated information/settings/parameters associated with the BSS. In some aspects, such an operation to update such information/settings/parameters associated with the BSS may be for the apparatus (e.g., STA(s) 120, 150) to awaken the primary/main receiver/radio (e.g., PR(s) 222, 232) to decode/process/ obtain information contained in at least a portion of the aforementioned received packet, frame, beacon, or other information.

In some aspects, the packet 320 includes a counter or counter value. In some aspects, the counter or counter value is regarding an availability of an updated value for one or more parameters of a BSS (e.g., with/to which the apparatus is associated). In some aspects, the counter or counter value is regarding whether an updated value for one or more parameters of a BSS (with/to which the apparatus is associated) is available for STA(s) 120, 150. In some aspects, STA(s) 120, 150 is configured to utilize the counter or counter value to determine whether an updated value for one or more parameters of a BSS (with/to which the apparatus is associated) is available.

In accordance with many aspects described herein, STA(s) 120, 150 may be configured to operate according to any one or more of the following configurations: (1) a first configuration in which PR(s) 222, 232 operates in a high/active power state/mode (e.g., a continuous high/active power state/mode) while its SR(s) 224, 234 operates in a low/doze power state/mode; (2) a second configuration in which PR(s) 222, 232 alternates between a period of operating in a high/active power state/mode and a period of operating in a low/doze power state/mode according to a duty cycle or periodicity while its SR(s) 224, 234 operates in a low/doze power state/mode; (3) a third configuration in which PR(s) 222, 232 operates in a low/doze power state/mode and SR(s) 224, 234 operates in a high/active power (e.g., a continuous high/active power state/mode); and/or (4) a fourth configuration in which PR(s) 222, 232 operates in a low/doze power mode and SR(s) 224, 234 alternates between a period of operating in a high/active power mode followed by a period of operating in a low/doze power mode according to a duty cycle or periodicity.

In some aspects, STA(s) 120, 150 may use PR(s) 222, 232 and/or SR(s) 224, 234 to receive a signal from AP 110 and transition between any two (or more) of the four aforementioned configurations (listed above as (1) through (4)) after or based on a signal received from AP 110. In some aspects, as described in greater detail herein, STA(s) 120, 150 may use SR(s) 224, 234 to receive the packet 320 and, in response to receiving the packet 320, alter a mode of PR(s) 222, 232 from a low/doze power mode to a high/active power mode. In some aspects, STA(s) 120, 150 may transition from the first configuration (see (1) above) or the second configuration (see (2) above) to the third configuration (see (3) above) or the fourth configuration (see (4) above), if/when the apparatus determines that a buffer of a transmitting device (e.g., AP 110) with which STA(s) 120, 150 intends to communicate does not have a frame or packet addressed to it.

In some aspects, an apparatus (e.g., STA(s) 120, 150) may operate in various modes/states/configurations without deviating from the scope of the present disclosure. In some aspects, the apparatus (e.g., STA(s) 120, 150) may be/operate in a first mode/state/configuration in which its primary/main radio/receiver (e.g., PR(s) 222, 232) may be/operate in an on/high-/higher-/active power mode/state/configuration and its secondary radio/receiver (e.g., SR(s) 224, 234) may be/operate in an off/low-/lower-/inactive/doze power mode/state/configuration. In some aspects, the apparatus (e.g., STA(s) 120, 150) may be/operate in a second mode/state/configuration in which its primary/main radio/receiver (e.g., PR(s) 222, 232) may cycle/alternate/vary between a period/duration of being/operating in an on/high-/higher-/active power mode/state/configuration and/followed by a period/duration of being/operating in an off/low-/lower-/inactive/doze power mode/state/configuration (or vice versa), e.g., according to a duty cycle, schedule, frequency, or periodicity and its secondary radio/receiver (e.g., SR(s) 224, 234) may be/operate in an off/low-/lower-/inactive/doze power mode/state/configuration.

In some aspects, the apparatus (e.g., STA(s) 120, 150) may be/operate in a third mode/state/configuration in which its primary/main radio/receiver (e.g., PR(s) 222, 232) may be/operate in an off/low-/lower-/inactive/doze power mode/state/configuration and its secondary radio/receiver (e.g., SR(s) 224, 234) may be/operate in an always/continuously on/high-/higher-/active power mode/state/configuration. In some aspects, the apparatus may be/operate in a fourth mode/state/configuration in which its primary/main radio/receiver (e.g., PR(s) 222, 232) may be/operate in an off/low-/lower-/inactive/doze power mode/state/configuration and its secondary radio/receiver (e.g., SR(s) 224, 234) may cycle/alternate between a period of being/operating in an on/high-/higher-/active power mode/state/configuration followed by a period of being/operating in an off/low-/lower-/inactive/doze power mode/state/configuration (or vice versa), e.g., according to a duty cycle, schedule, frequency, or periodicity.

The apparatus (e.g., STA(s) 120, 150) may transition between any two or more of the modes/states/configurations described herein, e.g., upon/after/based on a signal or power-related indicator/indicia/information/parameter/field received from another apparatus (e.g., AP 110), possibly using the primary/main receiver/radio and/or using the secondary receiver/radio from another apparatus (e.g., AP 110). In some aspects, the apparatus (e.g., STA(s) 120, 150) may use the main/primary receiver/radio (e.g., PR(s) 222, 232) to receive the awaken request packet (described herein; e.g., packet 320) and/or transmit the awaken response packet (described herein; e.g., response 330). In some aspects, the apparatus (e.g., STA(s) 120, 150) uses the secondary receiver/radio (e.g., SR(s) 224, 234) to receive the awaken request packet (described herein; e.g., packet 320) and/or transmit the awaken response packet (described herein; e.g., response 330). In some aspects, after, in response to, and/or in association with receiving the awaken request packet (e.g., packet 320), the apparatus (e.g., STA(s) 120, 150) may turn-on/activate/enable/power-increase or otherwise alter a mode/state/configuration of the main/primary receiver/radio (e.g., PR(s) 222, 232) from a low-/lower-/inactive/off/doze power state/mode/configuration/configuration to a high-/higher-/active/on power state/mode/configuration/configuration. In some aspects, after, in response to, and/or in association with receiving the awaken request packet (e.g., packet 320), the apparatus (e.g., STA(s) 120, 150) may turn-on/activate/enable/power-increase or otherwise alter a mode/state/configuration of the secondary receiver/radio (e.g., SR(s) 224, 234) from a low-/lower-/inactive/off/doze power state/mode/configuration to a high-/higher-/active/on power state/mode/configuration.

In some aspects, a (receiving) apparatus (e.g., STA(s) 120, 150) may transition/change to the third mode/state/configuration (as described herein) or the fourth mode/state/configuration described above (in which its primary/main radio/receiver (e.g., PR(s) 222, 232) may be/operate in an off/low-/lower-/inactive/doze power mode/state/configuration and its secondary radio/receiver (e.g., SR(s) 224, 234) may cycle/alternate between a period of being/operating in an on/high-/higher-/active power mode/state/configuration followed by a period of being/operating in an off/low-/lower-/inactive/doze power mode/state/configuration (or vice versa) (e.g., according to a duty cycle, schedule, frequency, or periodicity)) from the first mode/state/configuration described above (in which its primary/main radio/receiver (e.g., PR(s) 222, 232) may be/operate in an on/high-/higher-/active power mode/state/configuration and its secondary radio/receiver (e.g., SR(s) 224, 234) may be/operate in an off/low-/lower-/inactive/doze power mode/state/configuration) or from the second mode/state/configuration described above (in which its primary/main radio/receiver (e.g., PR(s) 222, 232) may cycle/alternate/vary between a period/duration of being/operating in an on/high-/higher-/active power mode/state/configuration and/followed by a period/duration of being/operating in an off/low-/lower-/inactive/doze power mode/state/configuration (or vice versa) (e.g., according to a duty cycle, schedule, frequency, or periodicity and its secondary radio/receiver (e.g., SR(s) 224, 234) may be/operate in an off/low-/lower-/inactive/doze power mode/state/configuration), when/if or only if/when (i) that (receiving) apparatus (e.g., STA(s) 120, 150) determines that a buffer of another (transmitting) apparatus (e.g., AP 110) with which it is/intends/destined to communicate is empty or does not have a packet/frame addressed to that (receiving) apparatus (e.g., STA(s) 120, 150) and/or (ii) the (receiving) apparatus (e.g., STA(s) 120, 150) determines that a (transmission) buffer of that (receiving) apparatus (e.g., STA(s) 120, 150) is empty or does not have a packet/frame addressed to that other (transmitting) apparatus (e.g., AP 110).

In some aspects, STA(s) 120, 150 may be configured to forgo listening for one or more beacons when either (i) PR(s) 222, 232 is alternating between a period of operating in a high/higher/active power state/mode followed by a period of operating in an off/low/lower/doze power state/mode, or (ii) PR(s) 222, 232 is operating (e.g., at least partially) according to the second configuration (see (2) above). In some aspects, if (i) SR(s) 224, 234 is operating in (e.g., a continuous) high/higher/active power mode/state, or (ii) SR(s) 224, 234 is operating (e.g., at least partially) according to the third configuration (see (3) above), then STA(s) 120, 150 may forgo listening for one or more beacons when PR(s) 222, 232 is either (i) alternating between a period of operating in an on/high/higher/active power mode/state followed by a period of operating in an off/low/lower/doze power state/mode, or (ii) operating (e.g., at least partially) according to the second configuration (see (2) above).

In some aspects, if (i) SR(s) 224, 234 is alternating between a period of operating in an on/high/higher/active power mode/state followed by a period of operating in an off/low/lower/doze power state/mode, or (ii) SR(s) 224, 234 is operating (e.g., at least partially) according to the fourth configuration (see (4) above), then STA(s) 120, 150 may forgo listening for one or more beacons when PR(s) 222, 232 is either (i) alternating between a period of operating in an on/high/higher/active power mode/state followed by a period of operating in an off/low/lower/doze power state/mode, or (ii) operating (e.g., at least partially) according to the second configuration (see (2) above). In some aspects, if (i) the STA(s) 120, 150 is operating according to a state/mode in which PR(s) 222, 232 operates in a low/lower/doze power state/mode and SR 124 operates in a high/higher/active power state/mode or (ii) the STA(s) 120, 150 is operating according to the third configuration (see (3) above), STA(s) 120, 150 may be configured to hold or suspend one or more service periods previously negotiated between the apparatus and AP 110. In some aspects, wherein STA(s) 120, 150 may be configured to operate according to a fifth mode, wherein one or more negotiated parameters/settings for communication using SR(s) 224, 234 is/are suspending while SR(s) 224, 234 is enabled to power down, turn off, or otherwise enter into a low/doze power state/mode.

In some aspects, if/when/while its main/primary antenna/receiver (e.g., PR(s) 222, 232) and/or its secondary antenna/receiver (e.g., SR(s) 224, 234) is operating in or according to (i) the third mode/state/configuration described above (in which its primary/main radio/receiver (e.g., PR(s) 222, 232) may be/operate in an off/low-/lower-/inactive/doze power mode/state/configuration and its secondary radio/receiver (e.g., SR(s) 224, 234) may be/operate in an (e.g., always/continuously) on/high-/higher-/active power mode/state/configuration) and/or (ii) the (above-described) fourth mode/state/configuration (in which its primary/main radio/receiver (e.g., PR(s) 222, 232) may be/operate in an off/low-/lower-/inactive/doze power mode/state/configuration and/or its secondary radio/receiver (e.g., SR(s) 224, 234) may cycle/alternate between a period of being/operating in an on/high-/higher-/active power mode/state/configuration followed by a period of being/operating in an off/low-/lower-/inactive/doze power mode/state/configuration (or vice versa), e.g., according to a duty cycle, schedule, frequency, or periodicity), the apparatus (e.g., STA(s) 120, 150) may use/operate/configure its secondary radio/receiver (e.g., SR(s) 224, 234) according to a duty cycle, schedule, frequency, or periodicity, e.g., which may have been previously negotiated between the apparatus (e.g., STA(s) 120, 150) and another apparatus (e.g., AP 110), e.g., if/when/provided the apparatus (e.g., STA(s) 120, 150) or its primary/main antenna/receiver (e.g., PR(s) 222, 232) is operating in or according to an off/low-/lower-/inactive/doze power mode/state/configuration.

In some aspects, if/when/while operating its primary/main radio/receiver (e.g., PR(s) 222, 232) and/or its secondary antenna/receiver (e.g., SR(s) 224, 234) in or according to (i) the third mode/state/configuration described above (in which its primary/main radio/receiver (e.g., PR(s) 222, 232) may be/operate in an off/low-/lower-/inactive/doze power mode/state/configuration and its secondary radio/receiver (e.g., SR(s) 224, 234) may be/operate in an (e.g., always/continuously) on/high-/higher-/active power mode/state/configuration) and/or (ii) the (above-described) fourth mode/state/configuration (in which its primary/main radio/receiver (e.g., PR(s) 222, 232) may be/operate in an off/low-/lower-/inactive/doze power mode/state/configuration and/or its secondary radio/receiver (e.g., SR(s) 224, 234) may cycle/alternate between a period of being/operating in an on/high-/higher-/active power mode/state/configuration followed by a period of being/operating in an off/low-/lower-/inactive/doze power mode/state/configuration (or vice versa), e.g., according to a duty cycle, schedule, frequency, or periodicity), the apparatus (e.g., STA(s) 120, 150) may refrain/avoid/elect-to-not/forego/not utilize its primary/main antenna/receiver and/or its secondary antenna/receiver (e.g., SR(s) 224, 234) to receive/listen-for one or more packets, frames, and/or beacons, e.g., if/when the apparatus (e.g., STA(s) 120, 150) or its primary/main antenna/receiver (e.g., PR(s) 222, 232) is/are operating in or according to the second mode/state/configuration described above (in which its primary/main radio/receiver (e.g., PR(s) 222, 232) may cycle/alternate/vary between a period/duration of being/operating in an on/high-/higher-/active power mode/state/configuration and/followed by a period/duration of being/operating in an off/low-/lower-/inactive/doze power mode/state/configuration (or vice versa), e.g., according to a duty cycle, schedule, frequency, or periodicity and its secondary radio/receiver may be/operate in an off/low-/lower-/inactive/doze power mode/state/configuration) or the third mode/state/configuration described above (in which its primary/main radio/receiver, e.g., PR(s) 222, 232) may be/operate in an off/low-/lower-/inactive/doze power mode/state/configuration and its secondary radio/receiver (e.g., SR(s) 224, 234) may be/operate in an (e.g., always/continuously) on/high-/higher-/active power mode/state/configuration).

As described in greater detail herein, in some aspects, an apparatus (e.g., STA(s) 120, 150) may operate in various modes/states/configurations without deviating from the scope of the present disclosure. In some aspects, if/when an apparatus (e.g., STA(s) 120, 150) operates according to the aforementioned third mode/state/configuration (in which its primary/main radio/receiver (e.g., PR(s) 222, 232) may be/operate in an off/low-/lower-/inactive/doze power mode/state/configuration and its secondary radio/receiver (e.g., SR(s) 224, 234) may be/operate in an on/high-/higher-/active power mode/state/configuration), the secondary radio/receiver (e.g., SR(s) 224, 234) of the apparatus (e.g., STA(s) 120, 150) may operate according to a first state/mode/configuration (in which the secondary radio/receiver (e.g., SR(s) 224, 234) is powered on/up (e.g., operating/operated according to a high/higher power state) and/or enabled to receive and/or transmit frames/packets (e.g., awaken request packets, awaken packets, awaken request response packets, and any other packets or encapsulations of data/information)) and/or in a second state/mode configuration (in which the secondary radio/receiver (e.g., SR(s) 224, 234) is powered off/down (e.g., operating/operated according to a low/lower power state) and/or unable to receive and/or transmit frames/packets (e.g., awaken request packets, awaken packets, awaken request response packets, and any other packets or encapsulations of data/information)).

In some aspects, if/when an apparatus (e.g., STA(s) 120, 150) operates according to the aforementioned third mode/state/configuration (in which its primary/main radio/receiver (e.g., PR(s) 222, 232) may be/operate in an off/low-/lower-/inactive/doze power mode/state/configuration and its secondary radio/receiver (e.g., SR(s) 224, 234) may be/operate in an on/high-/higher-/active power mode/state/configuration), the apparatus (e.g., STA(s) 120, 150) may be configured to inactivate, hold, stop, suspend, or otherwise not maintain/implement one or more communication aspects/windows (e.g., one or more service periods previously negotiated between the apparatus (e.g., STA 120) and another apparatus (e.g., AP 110 or another-STA 150)).

In some aspects, the apparatus (e.g., STA(s) 120, 150) may be configured to operate according to a seventh mode/state/configuration, in which the secondary radio/receiver (e.g., SR(s) 224, 234) operates according to the aforementioned second state/mode/configuration (in which the secondary radio/receiver (e.g., SR(s) 224, 234) is powered off/down (e.g., operating/operated according to a low/lower power state) and/or unable to receive and/or transmit frames/packets (e.g., awaken request packets, awaken packets, awaken request response packets, and any other packets or encapsulations of data/information)) and/or the apparatus (e.g., STA(s) 120, 150) may be configured to activate, not hold, not stop, not suspend, or otherwise maintain/implement one or more communication aspects/windows (e.g., one or more service periods previously negotiated between the apparatus (e.g., STA 120) and another apparatus (e.g., AP 110 or another-STA 150)).

In some aspects, an apparatus (e.g., STA(s) 120, 150) may at some times operate in accordance with a mode different from the aforementioned mode(s)/state(s). In some aspects, operation in accordance with such a mode by such an apparatus may include maintaining/holding/suspending/storing/retaining one or more negotiated parameters/settings/configurations for communication using at least one of the radios/receivers (e.g., the primary/main radio/receiver (e.g., PR(s) 222, 232) and/or secondary radio/receiver (e.g., SR(s) 224, 234)) of such an apparatus (e.g., STA(s) 120, 150) while/and permitting/enabling at least one of the radios/receivers (e.g., that same radio/receiver, the primary/main radio/receiver, and/or secondary radio/receiver) to turn-off, power-down, or otherwise operate in accordance with another state/mode (e.g., a relatively lower state/mode). In some aspects, operation in accordance with such a mode by such an apparatus (e.g., STA(s) 120, 150) may additionally or alternatively include maintaining/not-suspending communication using at least one of the radios/receivers (e.g., the primary/main radio/receiver and/or secondary radio/receiver) of such an apparatus (e.g., STA(s) 120, 150) without a change in the mode/state in relation to communication by that radio(s)/receiver(s) (e.g., PR(s) 222, 232 and/or SR(s) 224, 234).

In some aspects, an apparatus (e.g., AP 110) may determine a communication channel associated with operation by another apparatus (e.g., STA(s) 120, 150) (1) in a mode (e.g., awaken mode) that utilizes a secondary/awaken radio/receiver (e.g., SR(s) 224, 234), which may be different from its main/primary radio/receiver (e.g., PR(s) 222, 232), to communicate certain information, or (2) for communication (e.g., of data/information) using its secondary/awaken radio/receiver (e.g., SR(s) 224, 234), which may be different from its main/primary radio/receiver (e.g., PR(s) 222, 232). In some aspects, one apparatus (e.g., AP 110) may transmit and another apparatus (e.g., STA(s) 120, 150) may receive a beacon, packet, frame or other information indicating a communication channel for use/operation by the other apparatus (e.g., STA(s) 120, 150), and the other apparatus (e.g., STA(s) 120, 150) may modify, maintain, switch, or select a communication channel for use/operation by the secondary/awaken radio (e.g., SR(s) 224, 234) of the other apparatus (e.g., STA(s) 120, 150) based on such received beacon, packet, frame or other information. In some aspects, one apparatus (e.g., AP 110) may determine which/a communication channel the other apparatus (e.g., STA(s) 120, 150) is to select for operation/use by its secondary/awaken radio/receiver (e.g., SR(s) 224, 234) based on a/the communication channel that the other apparatus (e.g., STA(s) 120, 150) does/will use/operate for communication(s) by its primary/main radio/receiver (e.g., PR(s) 222, 232). In some aspects, one apparatus (e.g., AP 110) may select a/the communication channel for the other apparatus' (e.g., STA's) secondary/awaken radio/receiver (e.g., SR(s) 224, 234) such that it differs from a/the communication channel for the other apparatus' (e.g., STA's) main/primary radio/receiver (e.g., PR(s) 222, 232), e.g., when/if the frequency/band/parameters utilized by the other apparatus (e.g., STA(s) 120, 150) correspond to or may be utilized in accordance with dynamic frequency selection.

As described in greater detail herein, in some aspects, a communication/transmission (e.g., a packet, data packet, a frame, a data frame, an awaken packet, an awaken request packet, a request packet, a response packet, an awaken response packet, a beacon, and/or any various other suitable encapsulation of information) and/or any one or more of its field(s), signal(s), bit(s), or portion(s)) may be configured to include various fields or information. In some aspects, such fields/information may include information indicating a time by which one or more receivers of the (respective) a communication/transmission (e.g., a packet, data packet, a frame, a data frame, an awaken packet, an awaken request packet, a request packet, a response packet, an awaken response packet, a beacon, and/or any various other suitable encapsulation of information) shall finish an awaken procedure that transitions that/those receiver(s), or any one or more of its receiver(s)/radio(s), from a low-power state to a high power state. In some aspects, an apparatus (e.g., receiver/recipient) (e.g., STA(s) 120, 150) of the communication/transmission (e.g., a packet, data packet, a frame, a data frame, an awaken packet, an awaken request packet, a request packet, a response packet, an awaken response packet, a beacon, and/or any various other suitable encapsulation of information) may determine when (e.g., a specific time, perhaps in relation to the time of receiving the communication/transmission (e.g., a packet, data packet, a frame, a data frame, an awaken packet, an awaken request packet, a request packet, a response packet, an awaken response packet, a beacon, and/or any various other suitable encapsulation of information)) (i) to perform an awaken procedure, (ii) to complete an awaken procedure, or (iii) to turn on or power up one or more of its receivers/radios.

As also described in greater detail herein, in some aspects, an apparatus (e.g., AP 110 and/or STA(s) 120, 150) may transmit, receive, and/or negotiate a field, parameter, data, information, information element, or indication indicating a period of time corresponding to/associated with transitioning from a one state (e.g., awake, doze, power save, or active state) to another state (e.g., awake, doze, power save, or active state) in response to transmitting, receiving, and/or negotiating a particular packet, data packet, transmission, or other information, such as an awaken packet, request packet, or awaken request packet. In some aspects, an apparatus (e.g., AP 110 and/or STA(s) 120, 150) may perform an operation (e.g., transition from one state/mode to another state/mode) in accordance with such field, parameter, data, information, information element, or indication.

In some aspects, such an operation may be or include transmitting, scheduling a transmission, receiving, or scheduling reception of any communication/transmission (e.g., a packet, data packet, a frame, a data frame, an awaken packet, an awaken request packet, a request packet, a response packet, an awaken response packet, a beacon, and/or any various other suitable encapsulation of information) described herein. As an example, an AP 110 may transmit or schedule to transmit a communication/transmission (e.g., a packet, data packet, a frame, a data frame, an awaken packet, an awaken request packet, a request packet, a response packet, an awaken response packet, a beacon, and/or any various other suitable encapsulation of information) in accordance with (1) such indication indicating a period of time corresponding to/associated with transitioning from one state (e.g., awake, doze, power save, or active state) to another state (e.g., awake, doze, power save, or active state) and (2) such information indicating a time by which one or more receivers of the (respective) awaken request packet(s) shall finish an awaken procedure that transitions that/those receiver(s), or any one or more of its receiver(s)/radio(s), from a low-power state to a high power state. In some aspects, such communication/transmission may be in accordance with such an indication when that communication/transmission occurs (1) after/upon expiration/termination of such period of time corresponding to/associated with transitioning from one state (e.g., awake, doze, power save, or active state) to another state (e.g., awake, doze, power save, or active state) and/or (2) the receiving apparatus (e.g., STA(s) 120, 150) and/or any of its radios/transceivers (e.g., PR(s) 222, 232 and/or SR(s) 224, 234) are currently/already operating in the other state (e.g., awake, doze, power save, or active state).

As another example, a STA (e.g., STA(s) 120, 150) may receive or schedule (e.g., receipt of) a communication/transmission (e.g., a packet, data packet, a frame, a data frame, an awaken packet, an awaken request packet, a request packet, a response packet, an awaken response packet, a beacon, and/or any various other suitable encapsulation of information) in accordance with (1) such indication indicating a period of time corresponding to/associated with transitioning from one state (e.g., awake, doze, power save, or active state) to another state (e.g., awake, doze, power save, or active state), and/or (2) such information indicating a time by which one or more receivers of the (respective) awaken request packet(s) shall finish an awaken procedure that transitions that/those receiver(s) (e.g., STA(s) 120, 150), or any one or more of its receiver(s)/radio(s) (e.g., PR(s) 222, 232 and/or SR(s) 224, 234), from a low-power state to a high power state. In some aspects, such communication/transmission may be in accordance with such an indication when that communication/transmission occurs (1) after/upon expiration/termination of such period of time corresponding to/associated with transitioning from one state (e.g., awake, doze, power save, or active state) to another state (e.g., awake, doze, power save, or active state), and/or (2) the receiving apparatus (e.g., STA(s) 120, 150) and/or any of its radios/transceivers are currently/already operating in the other state (e.g., awake, doze, power save, or active state).

As mentioned above, at block 416, an apparatus (e.g., AP 110 and/or STA 120, or its PR(s) 222, 232 and/or SR(s) 224, 234) may perform various operations (e.g., possibly related to receive of the packet 320 and/or the negotiated parameters), as described in greater detail herein. Various aspects described below (and elsewhere) will provide non-limiting examples of some aspects pertaining to block 416 (even if block 416 may not be explicitly referenced in every instance), and one of ordinary skill in the art will appreciate that such aspects may additionally or alternatively pertain to other blocks illustrated in FIG. 4 without deviating from the scope of the present disclosure. For example, AP 110 and STA(s) 120, 150 (or its PR(s) 222, 232 and/or SR(s) 224, 234) may perform UL and/or DL communication(s). For example, STA(s) 120, 150 may utilize PR(s) 222, 232 for UL/DL communication(s) (e.g., any one or more of 350-357, 362-363) at any one or more of time(s) $T_{11-17}$. In some aspects, possibly in relation to block 406, AP 110 and/or STA(s) 120, 150 (e.g., using PR(s) 222, 232) may transmit one or more communications that result in termination or teardown of one or more of the negotiated parameters, settings, and/or configurations relating to operation(s) of AP 110, STA(s) 120, 150, PR(s) 222, 232, and/or SR(s) 224, 234, as described in greater detail herein.

One of ordinary skill in the art will understand that certain terms described herein may be interchangeable without necessarily deviating from their respective meaning. In some aspects, the following terms may be interchangeable without necessarily deviating from the scope of the present disclosure: packet, frame, beacon, signal, transmission, communication, and/or various other suitable terms. In some aspects, the following terms may be interchangeable without necessarily deviating from the scope of the present disclosure: packet, request packet, awaken request packet, and/or various other suitable terms. In some aspects, the following terms may be interchangeable without necessarily deviating from the scope of the present disclosure: response, response packet, awaken response packet, and/or various other suitable terms. In some aspects, the following terms may be interchangeable without necessarily deviating from the scope of the present disclosure: data packet, data portion, data, payload, and/or various other suitable terms.

Various non-limiting examples of particular communications between an AP (e.g., AP 110) and various STAs (e.g., STA(s) 120, 150) (e.g., using its PR(s) 222, 232 and/or SR(s) 224, 234) are described herein in accordance with some aspects of the present disclosure. In some aspects, at time $T_{11}$, AP 110 may transmit one or more DL communication(s) 350, 351 to STA(s) 120, 150 (e.g., using its PR(s) 222, 232 and/or SR(s) 224, 234). Such DL communication(s) 350, 351 may be configured to cause STA(s) 120, 150 (e.g., using its PR(s) 222, 232 and/or SR(s) 224, 234) to transmit one or more UL transmissions (e.g., UL communication(s) 352, 353) (e.g., at time $T_{12}$) (e.g., using its PR(s) 222, 232 and/or SR(s) 224, 234) that may be configured to protect one or more DL multiuser transmissions (e.g., DL multiuser communication(s) 354, 355) (e.g., at time $T_{13}$) (e.g., using its PR(s) 222, 232 and/or SR(s) 224, 234). In some aspects, at time $T_{12}$, STA(s) 120, 150 may communicate UL communication(s) 352, 353 (e.g., using its PR(s) 222, 232 and/or SR(s) 224, 234) to AP 110. Such UL communication(s) 352, 353 (e.g., using its PR(s) 222, 232 and/or SR(s) 224, 234) may be configured to protect one or more DL multiuser transmissions (e.g., DL multiuser communication(s) (s) 354, 355) (e.g., using its PR(s) 222, 232 and/or SR(s) 224, 234). Various aspects pertaining to such DL communication(s) 350, 351 and/or UL communication(s) 352, 353 are provided in greater detail herein.

In some aspects, at time $T_{13}$, AP 110 may transmit one or more DL multiuser communication(s) 354, 355 to STA(s) 120, 150 (or its PR(s) 222, 232 and/or SR(s) 224, 234). The DL multiuser communication(s) 354, 355 may include data and/or information destined/intended for a plurality STAs (e.g., STA(s) 120, 150). In some aspects, the term 'multiuser' may be described herein with reference to a transmission (or other similar terms, such as communication, signal, packet, and/or data unit). A DL multiuser transmission may refer to a transmission that originates at a single transmitter (e.g., apparatus, AP, BSS, node, network, etc.) (or its PR(s) 222, 232 and/or SR(s) 224, 234) and includes data and/or information destined/intended for a plurality of receivers (e.g., apparatuses, STAs, users, receivers, destinations, etc.) (or its PR(s) 222, 232 and/or SR(s) 224, 234). Various aspects pertaining to such DL multiuser communication(s) 354, 355 are provided in greater detail herein.

In some aspects, at time $T_{14}$, $AP_1$ may transmit DL communication(s) 356, 357 to STA(s) 120, 150 (or its PR(s) 222, 232 and/or SR(s) 224, 234). In some aspects, the DL communication(s) 356, 357 may be or include the same transmission (e.g., one set of DL communication(s) 356, 357 destined/intended for the same set of one or more STA(s) 120, 150). In some aspects, the DL communication(s) 356, 357 may be or include different transmissions (e.g., one set of DL communication(s) 356, 357 destined/intended for one set of one or more STA(s) 120, 150, and another set of DL communication(s) 356, 357 destined/intended for another set of one or more STA(s) 120, 150). In some aspects, the DL multiuser communication(s) 354, 355 to STA(s) 120, 150 (or its PR(s) 222, 232 and/or SR(s) 224, 234) may refer to a single DL transmission (e.g., a single DL transmission destined/intended for STA(s) 120, 150). In some aspects, the DL communication(s) 356, 357 to STA(s) 120, 150 (or its PR(s) 222, 232 and/or SR(s) 224, 234) may be included as a part of another DL transmission(s) (e.g., DL multiuser communication(s) 354, 355 to STA(s) 120, 150 (or its PR(s) 222, 232 and/or SR(s) 224, 234)).

In some aspect, the DL communication(s) 356, 357 may be configured to trigger (e.g., simultaneous/concurrent) UL communication(s) 362, 363 by a plurality of STAs (e.g., STA(s) 120, 150) (or its PR(s) 222, 232 and/or SR(s) 224, 234). In some aspects, such DL communication(s) 356, 357 may be or include an ULTR. As described above, in some aspects, the packet 320 may sometimes be referred to as an ULTR. In some aspects, the term 'ULTR' may refer to a signal configured to trigger an UL transmission by at least one STA. In some aspects, the ULTR may be a signal configured to trigger (e.g., simultaneous/concurrent) UL transmissions by a plurality of STAs (or its PR(s) 222, 232 and/or SR(s) 224, 234) within a period of time after receiving the signal. The ULTR may be referred to by various other terms/phrases (e.g., UL transmission trigger, UL trigger frame, and/or various other suitable terms/phrases) without deviating from the scope of the present disclosure. An ULTR may be characterized as 'cascading' when another ULTR is planned, scheduled, and/or destined to follow that ULTR. Various aspects pertaining to such DL communication(s) 356, 357 are provided in greater detail herein.

In some aspects, at time $T_{17}$, the UL communication(s) 362, 363 may include one or more UL transmissions 362, 363 from some STA(s) 120 (or its PR(s) 222 and/or SR(s) 224) to AP 110 simultaneously/concurrently with one or more UL transmissions 362, 363 from other STA(s) 150 (or its PR(s) 232 and/or SR(s) 234) to AP 110. In some aspects, the UL communication(s) 362, 364 may be referred to as UL multiuser transmission(s). UL multiuser transmission(s) may refer to one or more transmissions that originate at different transmitters (e.g., apparatuses, STAs, users, etc.) (or its PR(s) 222, 232 and/or SR(s) 224, 234) and each include data and/or information destined/intended for a common/shared receiver (e.g., apparatus, AP, node, network, etc.), and such transmissions may at least in part occur during a common, concurrent, and/or simultaneous period of time. Various aspects pertaining to such (e.g., simultaneous/concurrent) UL communication(s) 362, 363 are provided in greater detail herein.

In some aspects, prior to such (e.g., simultaneous/concurrent) UL communication(s) 362, 363 at time $T_{17}$, an STA (e.g., STA(s) 120, 150, or its PR(s) 222, 232 and/or SR(s) 224, 234), at time $T_{15}$, may enable various features, operations, functions, and/or aspects 358, 359 related to carrier sensing and/or one or more navigation allocation vectors (NAVs), as described in greater detail herein. In some aspects, prior to such (e.g., simultaneous/concurrent) UL communication(s) 362, 363 at time $T_{17}$, an STA (e.g., STA(s) 120, 150, or its PR(s) 222, 232 and/or SR(s) 224, 234), at time $T_{16}$, may enable various features, operations, functions, and/or aspects 360, 361 related to random access, as also described in greater detail herein.

Various non-limiting examples of possible relationships between a total number of space-time streams (STSs) (included in a frame, packet, and/or data unit) and various possible values in one or more fields (e.g., field values (FVs)) (that may be included in a frame, packet, and/or data unit) are described herein. In some aspects, described herein are non-limiting examples of possible relationships between the number (e.g., quantity, numerical quantification, count, amount, size, extent, etc.) of STSs destined/intended for one or more STAs assigned/allocated various possible user position (UP) values in view of various possible FVs (that may be included in a frame, packet, and/or data unit).

Various aspects of non-limiting examples of many features, operations, steps, methods, processes, and/or functions are described herein. Such features, operations, steps, methods, processes, and/or functions may be enabled, performed by, reside in, executed by, configured for, and/or otherwise associated with any apparatus described herein, such an AP (e.g., AP 110) and/or an STA (e.g., STA(s) 120, 150, or its PR(s) 222, 232 and/or SR(s) 224, 234).

At block 440, an apparatus (e.g., STA(s) 120, 150, or its PR(s) 222, 232 and/or SR(s) 224, 234) may enable aspects related to protecting DL communication(s). In some aspects, an AP (e.g., AP 110) may transmit and/or an STA (e.g., STA(s) 120, 150, or its PR(s) 222, 232 and/or SR(s) 224, 234) may receive a transmission configured to cause a plurality of STAs (e.g., STA(s) 120, 150, or its PR(s) 222, 232 and/or SR(s) 224, 234) to simultaneously transmit a signal/transmission that is configured to protect one or more DL multiuser transmission(s) (e.g., DL multiuser communication(s) 354, 355) to the plurality of STAs. For example, referring to FIG. 3, AP 110 may transmit DL communication(s) 350, 351 to STA(s) 120 and/or DL communication(s) 350, 351 to another STA(s) 150. Such DL communication(s) 350, 351 may be configured to request that STA(s) 120, 150 refrain from transmitting signals during a particular period of time (e.g., at least at time(s) $T_{13}$, $T_{14}$) using a certain channel or resource. In some aspects, in response to such a signal/transmission (e.g., DL communication(s) 350, 351) and simultaneously/concurrently with another STA 150 of the plurality of STAs 120, 150, an STA 120 may transmit and/or an AP 110 may receive a signal/transmission (e.g., UL communication(s) 352, 353) configured to protect a DL multiuser transmission (e.g., DL multiuser communication(s) 354, 355) to the plurality of STAs 120, 150. For example, referring to FIG. 3, STA 120 may transmit UL communication(s) 352, 353 (e.g., using its PR(s) 222, 232 and/or SR(s) 224, 234) at least in part simultaneously/concurrently with UL communication(s) 352, 353 by another STA(s) 150 (e.g., using its PR(s) 222, 232 and/or SR(s) 224, 234). Such UL communication(s) 352, 353 may inform AP 110 that STA(s) 120, 150 (e.g., using its PR(s) 222, 232 and/or SR(s) 224, 234) will not transmit during that particular period of time (e.g., at least at time(s) $T_{13}$, $T_{14}$) using that channel or resource, thereby protecting any DL multiuser transmission(s) (e.g., DL multiuser communication(s) 354, 355 from AP 110 to STA(s) 120, 150, or its PR(s) 222, 232 and/or SR(s) 224, 234) during that particular period of time (e.g., at least at time(s) $T_{13}$, $T_{14}$). In some aspects, a time synchronization of the simultaneous transmission by the plurality of STAs 120, 150 (or its PR(s) 222, 232 and/or SR(s) 224, 234) is based on an end time of the received signal/transmission (e.g., DL communication(s) 350, 351). For example, referring to FIG. 3, the UL communication(s) 352, 353 may begin after a particular inter-frame spacing (e.g., in FIG. 3, time $T_{12}$ minus time $T_{11}$) after the communication of the DL communication(s) 350, 351. In some aspects, a scrambling seed associated with the transmitted signal/transmission (e.g., UL communication(s) 352, 353) configured to protect the DL multiuser transmission (e.g., DL multiuser communication(s) 354, 355) is similar to or the same as a scrambling seed of the received signal/transmission (e.g., DL communication(s) 350, 351) that caused the plurality of STAs 120, 150 (or its PR(s) 222, 232 and/or SR(s) 224, 234) to simultaneously transmit the signal/transmission (e.g., UL communication(s) 352, 353) configured to protect the DL multiuser transmission (e.g., DL multiuser communication(s) 354, 355). The term 'scrambler seed' may refer to an initial value or state used for scrambling, randomization, and/or encoding an input value. For example, referring to FIG. 3, an initial scrambler state of the DL communication(s) 350, 351 may be similar to or the same as an initial scrambler state of the UL communication(s) 352, 353.

In some configurations, the AP (e.g., AP 110) may generate and/or transmit a request-to-send (RTS) message/signal (e.g., in DL communication(s) 350, 351) that solicits simultaneous clear-to-send (CTS) messages/signals (e.g., in UL communication(s) 352, 353) from a plurality of STAs (e.g., STA(s) 120, 150). In some configurations, the AP (e.g., AP 110) may generate and/or transmit a RTS message/signal simultaneously to a plurality of STAs (e.g., STA(s) 120, 150), and the RTS message(s)/signal(s) (e.g., in DL communication(s) 350, 351) may be configured to solicit, induce, trigger, and/or otherwise cause the simultaneous transmission of CTS message(s)/signal(s) (e.g., in UL communication(s) 352, 353) from that same plurality of STAs (e.g., STA(s) 120, 150). In such configurations, the STA (e.g., STA(s) 120, 150) may receive and/or decode the RTS message(s)/signal(s) (e.g., in DL communication(s) 350, 351) and transmit CTS message(s)/signal(s) (e.g., in UL communication(s) 352, 353) at a time indicated in the RTS message(s)/signal(s) (e.g., in DL communication(s) 350, 351). That indicated time may be at the same time as the time of transmission of CTS message(s)/signal(s) (e.g., in UL communication(s) 352, 353) by other STAs (e.g., STA(s) 120, 150) (that were intended recipients of the RTS message(s)/signal(s) (e.g., in DL communication(s) 350, 351) from the AP). In some configurations, the scramble seed associated with the simultaneous CTS message(s)/signal(s) (e.g., in UL communication(s) 352, 353) may be similar to (or the same as) the scramble seed associated with the RTS message(s)/signal(s) (e.g., in DL communication(s) 350, 351). In some configurations, the transmission rate associated with the simultaneously-transmitted CTS message(s)/signal(s) (e.g., in UL communication(s) 352, 353) may be similar to (or the same as) the transmission rate associated with the RTS message(s)/signal(s) (e.g., in DL communication(s) 350, 351). In some configurations, the transmission rate associated with the simultaneously-transmitted CTS message(s)/signal(s) (e.g., in UL communication(s) 352, 353) may be based on the rate or MCS of the RTS message(s)/signal(s) (e.g., in DL communication(s) 350, 351). In some configurations, the time synchronization among the STAs (e.g., STA(s) 120, 150) is based on the end time of the RTS message(s)/signal(s) (e.g., in DL communication(s) 350, 351). In some configurations, the RTS message(s)/signal(s) (e.g., in DL communication(s) 350, 351) includes an indication/signal that indicates/identifies each of the plurality of STAs (e.g., STA(s) 120, 150). In some configurations, the CTS message(s)/signal(s) (e.g., in UL communication(s) 352, 353) is the same for each of the plurality of STAs (e.g., STA(s) 120, 150). In some configurations, the CTS message(s)/signal(s) (e.g., in UL communication(s) 352, 353) is transmitted at the same start time and/or the same end time by each of the plurality of STAs (e.g., STA(s) 120, 150) as indicated in the RTS message(s)/signal(s) (e.g., in DL communication(s) 350, 351). In some configurations, the CTS message(s)/signal(s) (e.g., in UL communication(s) 352, 353) is configured to protect multiuser transmissions from/to the plurality of STAs (e.g., STA(s) 120, 150). In some configurations, the RTS message(s)/signal(s) (e.g., in DL communication(s) 350, 351) includes an indication/signal indicating that the RTS message(s)/signal(s) (e.g., in DL communication(s) 350, 351) is destined for/intended for that plurality of STAs (e.g., STA(s) 120, 150). In some configurations, the RTS message(s)/signal(s) (e.g., in DL communication(s) 350, 351) includes an implicit and/or explicit indicator/signal identifying at least one of the MCS, the scrambling seed, transmission rate, or bandwidth (BW) of the RTS message(s)/signal(s) (e.g., in DL communication(s) 350, 351). In some configurations, each of the plurality of STAs generates/transmits the CTS message(s)/signal(s) (e.g., in UL communication(s) 352, 353) based on such an indicator/signal. In some configurations, the CTS message(s)/signal(s) (e.g., in UL communication(s) 352, 353) comprises a BW corresponding to the BW of the RTS message(s)/signal(s) (e.g., in DL communication(s) 350, 351).

In some configurations, a communication may sometimes be protected using a CTS/RTS signaling scheme. In a multi-user communication environment, channel utilization may be improved by implementing various enhancements under certain circumstances. In some configurations, an apparatus (e.g., STA(s) 120, 150) may set/reset/configure its NAV settings/parameters/configurations based on information/parameter/setting included in a received RTS message(s)/signal(s) (e.g., in DL communication(s) 350, 351). In circumstances where a CTS message(s)/signal(s) (e.g., in UL communication(s) 352, 353) and/or an ULTR (e.g., in DL communication(s) 356, 357 and/or in packet 320) does not subsequently follow the RTS message(s)/signal(s) (e.g., in DL communication(s) 350, 351), even though at least one NAV settings/parameters/configurations have already been set/reset/configured, there may exist an opportunity for certain enhancement in some circumstances. In some circumstances, at least one NAV may be unnecessarily protecting the channel from communication, even though nothing is being transmitted. In some circumstances, it may be beneficial to implement a relatively early/earlier termination/end/reset/reconfiguration of at least one NAV so that the communication channel may become accessible sooner than it might be otherwise. In some circumstances, this may lead to more channel efficiency, higher channel utilization, and/or other enhancements. In some configurations, the AP 110 may transmit and/or the STA(s) 120, 150 may receive a RTS message(s)/signal(s) (e.g., in DL communication(s) 350, 351). In some configurations, the STA(s) 120, 150 may set a parameter/setting/configuration of at least one NAV based on information included in and/or associated with the received RTS message(s)/signal(s) (e.g., in DL communication(s) 350, 351). In some configurations, the STA(s) 120, 150 may set a NAV expiration timer upon receiving the RTS message(s)/signal(s) (e.g., in DL communication(s) 350, 351) and/or upon setting the parameter/setting/configuration of at least one NAV. In some configurations, at least one NAV expiration timer may have a duration that is shorter than a duration of time for which at least one NAV is set (e.g., based on the set parameter/setting/configuration of at least one NAV). In some configurations, the STA(s) 120, 150 may determine whether and/or detect whether a/any signal/message (e.g., CTS, ULTR, UL transmission/communication, etc.) from the AP and/or other STA(s) 120, 150 is/are received prior to expiration of at least one NAV expiration timer. In some configurations, the STA(s) 120, 150 may, if/when no signal (e.g., CTS, ULTR, UL transmission/communication, etc.) from the AP 110 and/or other STA(s) 120, 150 is/are received prior to expiration of at least one NAV expiration timer, terminate/end/reset at least one NAV. In some configurations, the STA(s) 120, 150 may terminate/end/reset at least one NAV at a time that is before a time at which at least one NAV is scheduled to terminate/end/reset based on the set parameter/setting/configuration of at least one NAV. In some configurations, if/when no signal (e.g., CTS, ULTR, UL transmission/communication, etc.) from the AP 110 and/or other STA(s) 120, 150 is/are received prior to expiration of at least one NAV expiration timer, the AP 110 may transmit and the STA(s) 120, 150 may receive a frame/packet/message/signal configured to/for or comprising information for/to reset at least one NAV. In some configurations, the AP 110 transmits and the STA(s) 120, 150 receives this frame/packet/message/signal (configured to/for or comprising information for/to reset at least one NAV) at a time that is before a time at which at least one NAV is scheduled to terminate/end/reset based on the (set/preset/configured) parameter/setting/configuration of at least one NAV. The ULTR (e.g., in DL communication(s) 356, 357 and/or in packet 320) and/or the data packet/communication/transmission (e.g., in UL direction) following reception of the ULTR (e.g., in DL communication(s) 356, 357 and/or in packet 320) may include various fields, parameters, formats, structures, etc. without deviating from the scope of the present disclosure. In some configurations, the ULTR (e.g., in DL communication(s) 356, 357 and/or in packet 320) includes information indicating/corresponding to/associated with a probability of transmission. In some configurations, the STA(s) 120, 150 may utilize the probability of transmission to determine whether to and, if so, how, in what format, structure, configuration, parameter, capabilities, and/or settings to perform a transmission/communication (e.g., in the UL direction) (in response to/corresponding to the ULTR (e.g., in DL communication(s) 356, 357 and/or in packet 320)). In some configurations, data packet/communication/transmission (e.g., in UL direction) may include a field indicating an identity/identifier/group-identifier associated with the STA(s) 120, 150 and/or a number of STAs, such as, for example, a number of STAs with which the AP 110 and/or the STA(s) 120, 150 is associated/grouped.

At block 442, an apparatus (e.g., STA(s) 120, 150) may enable aspects related to performing DL communication(s). In some aspects, at time $T_{13}$, an AP 110 may transmit and/or an STA(s) 120, 150 (e.g., using its PR(s) 222, 232 and/or SR(s) 224, 234) may receive DL transmission(s) (e.g., DL multiuser communication(s) 354, 355) comprising a frame, packet, and/or data unit destined/intended for a plurality of STAs 120, 150. In some aspects, the DL transmission(s) (e.g., DL multiuser communication(s) 354, 355) comprising a frame, packet, and/or data unit destined/intended for a plurality of STAs 120, 150 may include a plurality of STSs. For example, one (or more) STS(s) may be destined/intended for STA(s) 120 (or its PR(s) 222 and/or SR(s) 224) and another one (or more) STS(s) may be destined/intended for STA(s) 150 (or its PR(s) 232 and/or SR(s) 234).

The frame, packet, and/or data unit may include one or more fields. The term 'field(s)' may refer to any subset, portion, fraction, component, and/or bit of the frame, packet, and/or data unit. In some aspects, STA(s) 120, 150 may use a field included in the packet, frame, and/or data unit to determine a total number of STSs included in the packet, frame, and/or data unit. For example, STA(s) 120, 150 may determine a total number of STSs (e.g., a, b, c, . . . z, which each may represent a non-negative integer value) (included in the packet, frame, and/or data unit) based on the FV (e.g., A, B, C, . . . Z, which may each represent one or more integer values, one or more complex numbers, one or more alphanumeric values, one or more bits, a bit string, one or more binary values, one or more hexadecimal values, and/or any other suitable set of one or more values). For instance, if FV=B, then the total number of STSs included in the frame, packet, and/or data unit is equal to b.

In some aspects, STA(s) 120, 150 may use the field to select a subset of values from a set of values indicating a number of STSs destined to each of at least some of the plurality of STAs 120, 150. For example, the number of STSs associated with each UP may vary based on the FV. An STA for/to which a packet, frame, and/or data unit, or at least a portion thereof, is intended/destined may be assigned a UP. A UP may be assigned to one or more STAs 120, 150. For example, if FV=B, then the STA(s) 120, 150 may select a subset of values (e.g., $B_0, B_1, B_2, B_3, B_4, B_5, \ldots, B_N$) from a set of values (e.g., $A_0, A_1, A_2, A_3, A_4, A_5, \ldots, A_N, B_0, B_1, B_2, B_3, B_4, B_5, \ldots, B_N, C_0, C_1, C_2, C_3, C_4, C_5, \ldots, C_N, \ldots Z_0, Z_1, Z_2, Z_3, Z_4, Z_5, \ldots, Z_N$, wherein each of these value may have any non-negative integer value) indicating the number of STSs destined/intended for each of at least some of the plurality of STAs (e.g., STA(s) 120, 150 assigned $UP_0, UP_1, UP_2, UP_3, UP_4, UP_5, \ldots, UP_N$). N may correspond to a last value in a series of values. Although the example described herein mentions five or more values (e.g., N being greater than 5) in each of the set of values, this is not a limitation of the present disclosure nor any aspect of the claims, because any of the set of values may have any plurality of values (e.g., two or more values, wherein N is simply greater than 0) without deviating from the scope of the present disclosure.

In some aspects, STA(s) 120, 150 may determine a value of a UP assigned to the STA(s) 120, 150. For example, STA(s) 120, 150 may determine that it is assigned/allocated a particular UP value, such as $UP_3$ (e.g., $UP_j$, where j=3). Because the frame, packet, and/or data unit may contain a plurality of STSs, not all of which may be destined/intended for a single STA 120/150, each of the STAs 120, 150 for which that frame, packet, and/or data unit is destined/intended may wish to determine which of the plurality of STSs in the frame, packet, and/or data unit are destined/intended for that particular STA 120/150. In some aspects, an STA 120/150 may select which of the plurality of STSs in the frame, packet, and/or data unit are destined to the STA 120/150 by considering a number of STSs allocated to one or more other STAs 120, 150 each assigned a UP value that is different from the UP value assigned to the STA 120/150. If assigned/allocated $UP_3$, STA(s) 120, 150 may determine that the number of STSs destined/intended for that particular STA is $B_3$ (e.g., $B_3$-number of STSs are destined/intended for STA(s) 120, 150). However, because the frame, packet, and/or data unit may have more than $B_3$-number of STSs, STA(s) 120, 150 may wish to determine exactly which of those more-than-$B_3$-number of STSs is/are the specific $B_3$-number of STSs destined/intended for STA(s) 120, 150.

To do so, STA(s) 120, 150 may consider the number of STSs assigned/allocated to one or more other STAs assigned a UP value different from (e.g., higher/greater than and/or lower/lesser than) $UP_3$ (e.g., STA(s) assigned/allocated any one or more of $UP_0, UP_1, UP_2, UP_4, UP_5, \ldots$, and/or $UP_N$). For example, by considering (i) that $B_0$-number of STSs are assigned/allocated to STA(s) assigned/allocated $UP_0$, (ii) that $B_1$-number of STSs are assigned/allocated to STA(s) assigned/allocated $UP_1$, and/or (iii) that $B_2$-number of STSs are assigned/allocated to STA(s) assigned/allocated $UP_2$, STA(s) 120, 150 (if assigned/allocated $UP_3$) may determine that the starting stream index of the STS(s) destined/intended for it begin(s) after the sum of $B_0$-, $B_1$-, and $B_2$-number of STSs (which are destined/intended for other STA(s) assigned/allocated to UP values different from the UP value assigned/allocated to STA(s) 120, 150).

One of ordinary skill in the art will understand that any one or more of $A_0$-$A_N$ through $Z_0$-$Z_N$ may have various values, characteristics, relationships, features, requirements, conditions, and/or other suitable attributes without necessarily deviating from the scope of the present disclosure. In some aspects, the number of STSs intended for every STA assigned a higher UP value may never exceed the number of STSs intended for the STA (e.g., STA(s) 120, 150). For example, if STA(s) 120, 150 is assigned/allocated $UP_3$, none of the individual values of $B_4, B_5, \ldots$, nor $B_N$ may exceed the value of $B_3$. In some aspects, a number of STSs intended for the STA may be greater than or equal to a number of STSs intended for every STA assigned a higher UP value than the UP assigned to the STA. For example, if STA(s) 120, 150 is assigned/allocated $UP_3$, the value of $B_3$ is greater than or equal to the individual values of $B_4, B_5, \ldots,$ and $B_N$.

In some aspects, at least one of $A_0$-$A_N$ through $Z_0$-$Z_N$ (shown in FIG. 3) may be variable (e.g., varying, adjustable, non-fixed, comprising a range of two or more possible values, etc.). In some aspects, at least one of the values in the selected subset is variable, and a determination of an exact value for the variable includes considering the determined total number of STSs included in the data frame, packet, and/or data unit. In some aspects, at least one of the values in the selected subset is variable, and a determination of an exact value for the variable includes subtracting at least some of the other values in the selected subset of values from the determined total number of STSs included in the data frame, packet, and/or data unit. For example, if FV=B, the selected subset includes $B_0, B_1, B_2, B_3, B_4, B_5, \ldots, B_N$, and at least one of these values is variable. For the purpose of illustration but not limitation, it can be assumed that $B_3$ is variable. As described above, if FV=B, the number of STSs included in the frame, packet, and/or data unit is equal to b (e.g., a non-negative integer value). To determine the exact value for $B_3$ (e.g., a variable, in this example), the value of b is subtracted by the value of $B_0, B_1, B_2, B_4$, and $B_5 \ldots B_N$. For instance, if b=5, $B_0$=3, $B_1$=1, $B_2$=0, $B_4$=0, and $B_5 \ldots B_N$=0, then $B_3$=5−3−1=1. In some aspects, at least one of the values in the selected subset is variable, and a determination of an exact value for the variable comprises eliminating a possible value if addition of that possible value to the other subset of values generates a sum that exceeds the total number of STSs included in the data frame, packet, and/or data unit. For example, if FV=B, $B_0$=3, $B_1$=1, $B_2$=0, $B_4$=0, and $B_5 \ldots B_N$=0, and $B_3$ is variable, then the exact value of $B_3$ may be determined by eliminating possible values that cause the sum of the subset of values (e.g., sum of $B_0$-$B_N$) to exceed b=5. For instance, the value of $B_3$=2 can be eliminated because $B_3$=2 would result in the sum of the subset of values (e.g., sum of $B_0$-$B_N$) to equal to 6, which exceeds b=5.

In some configurations, the AP (e.g., AP 110) may determine to operate on, search for, and/or probe exclusively a limited number or subset of possible channels. For instance, the AP (e.g., AP 110) may determine to operate on, search for, and/or probe (e.g., a primary channel) exclusively on non-overlapping channels. Non-limiting examples of non-overlapping channels may include channels 1, 6, 11, and/or 14. In some configurations, the AP (e.g., AP 110) may do so when operating in a particular band (e.g., 2.4 GHz). Non-limiting examples of (potentially) overlapping channels include one or more of the remaining channels. When at least a portion of its frequency spectrum/range, bandwidth, and/or spectral mask of a first channel overlaps (or has the potential to overlap) with at least a portion of the frequency spectrum/range, bandwidth, and/or spectral mask of at least a second channel, then the first channel may be characterized as an overlapping channel. In some configurations, the AP (e.g., AP 110) may determine to operate on, search for, and/or probe non-overlapping channels prior to operating on, searching for, and/or probing on overlapping channels. In some configurations, the AP (e.g., AP 110) may select which channel to operate on, search for, and/or probe based on a likelihood and/or probability of the channel being a non-overlapping channel. In some configurations, the AP (e.g., AP 110) may determine whether to operate on, search for, and/or probe a particular channel based on the likelihood and/or probability of the channel being a non-overlapping channel.

In some configurations, a data packet (e.g., any one or more of DL communication(s) 350, 351, 354, 355, 356, 357) may include various portions having relatively different characteristics. For instance, a first portion of the data packet (e.g., any one or more of DL communication(s) 350, 351, 354, 355, 356, 357) may include a field that is common, shared, and/or otherwise available/provided to every user, receiver, intended/destined recipient, and/or destination of the data packet (e.g., any one or more of DL communication(s) 350, 351, 354, 355, 356, 357). In some configurations, the field that is common, shared, and/or otherwise available/provided to every user, receiver, intended/destined recipient, and/or destination of the data packet (e.g., any one or more of DL communication(s) 350, 351, 354, 355, 356, 357) may contain an allocation of resources (e.g., resource units) for each of the user, receiver, intended/destined recipient, and/or destination of the data packet (e.g., any one or more of DL communication(s) 350, 351, 354, 355, 356, 357). A second portion of the data packet (e.g., any one or more of DL communication(s) 350, 351, 354, 355, 356, 357) may include a plurality of user-specific information that do not belong to the field that is common, shared, and/or otherwise available/provided to every user, receiver, intended/destined recipient, and/or destination of the data packet (e.g., any one or more of DL communication(s) 350, 351, 354, 355, 356, 357). There may exist a bit-level separation between the first portion and the second portion. In some configurations, the first and second portions may be located in a single one of the fields described above (e.g., fields). In some configurations, the first and second portions may be located in a plurality of the fields described above (e.g., fields). In some configurations, the AP (e.g., AP 110) may generate and/or transmit a data packet (e.g., any one or more of DL communication(s) 350, 351, 354, 355, 356, 357) including a header or preamble including a field common to a plurality of users and also including a plurality of fields each containing user-, receiver-, recipient-, and/or destination-specific information. In such configurations, the STA (e.g., STA(s) 120, 150) (or its PR(s) 222, 232 and/or SR(s) 224, 234) may receive and/or decode a data packet (e.g., any one or more of DL communication(s) 350, 351, 354, 355, 356, 357) including a header or preamble including a field common to a plurality of users and also including a plurality of fields each containing user-, receiver-, recipient-, and/or destination-specific information. In some configurations, the STA (e.g., STA(s) 120, 150) may utilize the field common to all users, receivers, recipients, and/or destinations to determine which of the resources (e.g., resource units) are allocated to it. In some configurations, the STA (e.g., STA(s) 120, 150) may utilize the user-, receiver-, recipient-, and/or destination-specific information to determine at least one of user-, receiver-, recipient-, and/or destination-specific identifier, modulation and coding scheme (MCS), number of space-time streams corresponding to that specific user, receiver, recipient, and/or destination. In some configurations, the resource unit and/or resource allocation may include a portion or subset of the full bandwidth that is allocated to that specific user, receiver, recipient, and/or destination.

In some configurations, the STA(s) (e.g., STA(s) 120, 150) may need to determine whether the data packet (e.g., any one or more of DL communication(s) 350, 351, 354, 355, 356, 357) is one of various possible types of data packets. For example, the data packet (e.g., any one or more of DL communication(s) 350, 351, 354, 355, 356, 357) may be a non-legacy data packet. If the data packet is not a non-legacy data packet, the data packet (e.g., any one or more of DL communication(s) 350, 351, 354, 355, 356, 357) may be a legacy data packet. In some configurations, an auto-detection algorithm for determining whether a received data packet (e.g., any one or more of DL communication(s) 350, 351, 354, 355, 356, 357) is a legacy or non-legacy data packet may provide certain enhancements to the overall system. An auto-detection algorithm for determining whether a received data packet is a legacy or non-legacy data packet may involve performing a comparison or evaluation between/among various portions, bits, segments, or other subparts of the overall data packet. For instance, the STA (e.g., STA(s) 120, 150) (or its PR(s) 222, 232 and/or SR(s) 224, 234) may receive a data packet (e.g., any one or more of DL communication(s) 350, 351, 354, 355, 356, 357) that includes a header/preamble, determine whether any portion of the header/preamble of the data packet (e.g., any one or more of DL communication(s) 350, 351, 354, 355, 356, 357) is repeated at least once, and determine whether the data packet is a legacy or non-legacy data packet based on the determination that that particular portion of the header/preamble portion of the data packet (e.g., any one or more of DL communication(s) 350, 351, 354, 355, 356, 357) is repeated at least once. For example, if that particular portion is not repeated at least once, then the STA (e.g., STA(s) 120, 150) may determine that the data packet (e.g., any one or more of DL communication(s) 350, 351, 354, 355, 356, 357) is a legacy data packet. As another example, if that particular portion is repeated at least once, then the STA (e.g., STA(s) 120, 150) may determine that the data packet (e.g., any one or more of DL communication(s) 350, 351, 354, 355, 356, 357) is not a legacy data packet. This particular portion may be any portion or an entirety of any one or more of the fields described in greater detail above without deviating from the scope of the present disclosure.

In some configurations, the repetition of a particular portion of the data packet (e.g., any one or more of DL communication(s) 350, 351, 354, 355, 356, 357) may trigger the STA (e.g., STA(s) 120, 150) to change its mode of operation from one mode to another mode. For example, the STA (e.g., STA(s) 120, 150) may be in an outdoor area and thus may benefit from changing its settings in order to operate in an outdoor or extended mode of operation. Accordingly, the AP (e.g., AP 110) may generate and/or transmit the data packet (e.g., any one or more of DL communication(s) 350, 351, 354, 355, 356, 357) such that a particular portion is repeated at least once. The STA (e.g., STA(s) 120, 150) (or its PR(s) 222, 232 and/or SR(s) 224, 234) may receive and/or decode the data packet (including that particular portion) (e.g., any one or more of DL communication(s) 350, 351, 354, 355, 356, 357) and, in response to detecting the (at least once) repetition of that particular portion, determine to change its mode of operation from its current mode of operation to another mode of operation. A non-limiting example involves changing the mode of operations to an outdoor or extended mode of operation, but the mode of operation can be changed to any other mode of operation (other than the current mode of operation) without deviating from the scope of the present disclosure. This particular portion may be any portion or an entirety of any one or more of the fields described in greater detail above without deviating from the scope of the present disclosure.

In some circumstances, one of the apparatuses (e.g., STA(s) 120, 150) (e.g., using its PR(s) 222, 232 and/or SR(s) 224, 234) may transmit a message to another apparatus (e.g., AP 110) to indicate whether a particular signal previously transmitted by that apparatus (e.g., AP 110) was successfully received and/or decoded (e.g., at the STA(s) 120, 150). As an example, when that particular signal was successfully received and/or decoded, the STA(s) 120, 150 (e.g., using its PR(s) 222, 232 and/or SR(s) 224, 234) may transmit an acknowledgement message (ACK). As another example, when that particular signal was not successfully received and/or decoded, the STA(s) 120, 150 may (e.g., using its PR(s) 222, 232 and/or SR(s) 224, 234) transmit a negative acknowledgement message (NACK). A message may refer to a frame, packet, data packet, any sequence of bits/bytes/octets, and/or other suitable terms. In some configurations, such a message may be a block acknowledgement message (BA). While an ACK/NACK may indicate whether a single frame/packet was successfully received and/or decoded, a BA may be a message that indicates whether a plurality of frames/packets (e.g., MPDUs) were successfully received and/or decoded. In systems, such a message (e.g., ACK/NACK/BA) may be transmitted by one apparatus (e.g., STA(s) 120, 150) at a time. In other words, STA 120 may transmit such a message (e.g., ACK/NACK/BA) at Time$_1$, and STA 150 may transmit another such message (e.g., ACK/NACK/BA) at Time$_2$.

However, when a relatively high number of such apparatuses (e.g., STAs 120, 150) exist in a BSS or communication range associated with or corresponding to the other apparatus (e.g., AP 110) to which that message (e.g., ACK/NACK/BA) is being sent, the amount of time consumed/utilized for communicating such messages (e.g., ACK/NACK/BA) by all of those apparatuses (e.g., STAs 120, 150) may be considerable. In some configurations, multiple apparatuses (e.g., STAs 120, 150) may transmit such a message (e.g., ACK/NACK/BA) at the same (or similar or substantially similar/same) time. For example, in some configurations, STA 120 may transmit (e.g., using its PR(s) 222 and/or SR(s) 224) such a message (e.g., ACK/NACK/BA) at Time$_1$, and STA 150 may transmit (e.g., using its PR(s) 232 and/or SR(s) 234) such a message also at (or approximately at) Time$_1$. Such aspects may sometimes be referred to as a multi-user (MU) transmission. Such aspects may sometimes be referred to an UL MU transmission. In some configurations, such messages may be multiplexed. Multiplexing may refer to a method, process, and/or algorithm of combining multiple (e.g., a plurality of) signals/messages/packets/frames (e.g., ACK/NACK/BA) into a single signal/message/packet/frame. Multiplexing may refer to or include space-division multiplexing, frequency-division multiplexing, time-division multiplexing, polarization-division multiplexing, code-division multiplexing, orbital angular momentum multiplexing, and/or various other suitable types/forms of multiplexing.

As an example, the message (e.g., ACK/NACK/BA) from STA 120 (or its PR(s) 222 and/or SR(s) 224) may be multiplexed with the message (e.g., ACK/NACK/BA) from STA 150 (or its PR(s) 232 and/or SR(s) 234). In other words, the ACK/NACK/BA can be a multiplexed UL MU transmission. Prior to such multiplexing, in some configurations, one apparatus (e.g., AP 110) may transmit to one or more other apparatuses (e.g., STA(s) 120, 150, or its PR(s) 222, 232 and/or SR(s) 224, 234) a request message to solicit an acknowledgement message (e.g., ACK/NACK/BA) from multiple (e.g., a plurality of) other apparatuses (e.g., other STA(s) 120, 150, or its PR(s) 222, 232 and/or SR(s) 224, 234). Such a request message may sometimes be referred to as an ACK request, a NACK request, a BA request, and/or any other suitable term. Such a request message may also be referred to as a multi-user message (e.g., a multi-user ACK request, a multi-user NACK request, a multi-user BA request). Such a request message may be sent to multiple (e.g., a plurality of) such apparatuses (e.g., STA(s) 120, 150, or its PR(s) 222, 232 and/or SR(s) 224, 234). In some circumstances, such a request message may be sent to multiple (e.g., a plurality of) such apparatuses (e.g., STA(s) 120, 150, or its PR(s) 222, 232 and/or SR(s) 224, 234) at the same (or substantially similar) time. As an example, an apparatus (e.g., AP 110) may transmit a request message (e.g., a MU ACK request, a MU NACK request, a MU BA request) to solicit a request message (e.g., ACK/NACK/BA) from multiple (e.g., a plurality of) other apparatuses (e.g., STA(s) 120, 150, or its PR(s) 222, 232 and/or SR(s) 224, 234) in an UL MU transmission.

In some configurations, an apparatus (e.g., AP 110) may transmit a multi-user BA request configured to solicit an ACK/NACK/BA to be transmitted from a plurality of receivers (e.g., STA(s) 120, 150, or its PR(s) 222, 232 and/or SR(s) 224, 234) of the multi-user BA request at the same time. In some configurations, an apparatus (e.g., STA(s) 120, 150, or its PR(s) 222, 232 and/or SR(s) 224, 234) may receive a multi-user BA request configured to request an ACK/NACK/BA (e.g., from a plurality of recipients). In some configurations, the multi-user BA request may be included in an ULTR (e.g., in DL communication(s) 356, 357 and/or in packet 320). In some configurations, the multi-user BA request may be included in the data packet (PPDU) (e.g., DL multiuser communication(s) 354, 355). The multi-user BA request may be configured to solicit an ACK/NACK/BA to be transmitted by a plurality of receivers of the multi-user BA request at the same time. In some configurations, the BA request may include certain data/information (e.g., a receiver identifier, a station identifier, an associated identifier, a station/receiver associated identifier, BA request control, BA request information) associated with and/or corresponding to each apparatus (e.g., STA(s) 120, 150, or its PR(s) 222, 232 and/or SR(s) 224, 234). The apparatus (e.g., STA(s) 120, 150, or its PR(s) 222, 232 and/or SR(s) 224, 234) may also transmit an ACK/NACK/BA when certain data/information (e.g., a receiver identifier, a station identifier, an associated identifier, a station/receiver associated identifier, BA request control, BA request information) included in the multi-user BA request corresponds to data assigned/associated/stored in the apparatus (e.g. STA(s) 120, 150, or its PR(s) 222, 232 and/or SR(s) 224, 234).

Information included in frames/packets communicated from one apparatus (e.g. STA(s) 120, 150, or its PR(s) 222, 232 and/or SR(s) 224, 234) to another apparatus (e.g. STA(s) 120, 150, or its PR(s) 222, 232 and/or SR(s) 224, 234) may be associated with one or more access categories, stream identifiers (IDs), traffic categories, and/or traffic IDs. Some systems may only be able to communicate packets/frames associated with a single access category, stream ID, traffic category, and/or traffic ID at a single point in time. In other words, such systems may transmit a first frame/packet associated with a first access category, first stream ID, first traffic category, and/or first traffic ID at Time$_1$, and may have to wait until a next transmission time (e.g., TXOP) to transmit second frame/packet associated with a second access category, second stream ID, second traffic category, and/or second traffic ID (which is different from the first stream ID, the first traffic category, and/or the first traffic ID, respectively, as transmitted at Time$_1$).

However, enabling transmission of data associated with multiple (e.g., a plurality of different) access categories, stream IDs, traffic categories, and/or traffic IDs in a single transmission/frame/packet may contribute to increased efficiency and/or throughput. In some configurations, a frame/packet may be a MAC service data unit (MSDU), a physical layer service data unit (PSDU), PPDU, and/or various other types of frames/packets. In some configurations, data/frames/packets associated with and/or corresponding to multiple (e.g., two or more different) (e.g., a plurality of) access categories, stream IDs, traffic categories, and/or traffic IDs may be included in a single MSDU/PSDU/PPDU and/or a single ACK/NACK/BA communicated between AP 110 and one or more STA(s) 120, 150, or its PR(s) 222, 232 and/or SR(s) 224, 234, during DL and/or UL communication. The frame/packet may be an aggregated frame/packet. For instance, the frame/packet may be an aggregated MSDU, an aggregated PSDU, an aggregated PPDU, and/or an aggregated other type of frame/packet.

As an example, AP 110 may transmit a frame/packet comprising a first (data) portion associated with and/or corresponding to a first access category, first stream ID, first traffic category, and/or first traffic ID and further comprising a second (data) portion associated with and/or corresponding to a second access category, second stream ID, second traffic category, and/or second traffic ID (which is different from the first stream ID, the first traffic category, and/or the first traffic ID, respectively). In other words, the AP 110 may transmit a first frame/packet associated with a first access category, first stream ID, first traffic category, and/or first traffic ID at Time$_1$ and (concurrently, in the same transmission, in the same transmission time interval, in the same TXOP, and/or in the same frame/packet) also transmit a second frame/packet associated with a second access category, second stream ID, second traffic category, and/or second traffic ID (which is different from the first stream ID, the first traffic category, and/or the first traffic ID).

As mentioned above, a frame/packet may sometimes be referred to as a PPDU. Each PPDU may include an allocation and/or a portion for a payload of the frame/packet/PPDU. Such an allocation and/or portion (e.g., payload) may include data sometimes referred to as the MSDU/MPDU. However, the size/duration of the MSDU/MPDU can vary based on many factors (e.g., MCS, bandwidth, etc.). In some circumstances, the MSDU/MPDU may be too large/long/big to even fit in and/or be accommodated by the aforementioned allocation/portion/payload of the PPDU. In some circumstances, the allocation/portion/payload may accommodate at least one MSDU/MPDU, but the allocation/portion/payload may not accommodate a non-integer number of MSDUs/MPDUs. In such circumstances, padding may be added/included to fill the unused portion of the allocation/portion/payload of the PPDU. However, in the aforementioned circumstances, a fragment of the MSDU/MPDU may fit and/or be accommodated in the allocation/portion/payload of the PPDU, thereby possibly improving the efficiency and throughput of the overall system.

In some configurations, the network/system/device/apparatus/apparatuses may enable/allow/support/provide/accommodate fragments/fragmentation of an MSDU/MPDU. For example, an apparatus (e.g., AP) may determine a length/duration/size of a single MSDU/MPDU for transmission in a PPDU. Based on the determined length/duration/size of the single MSDU/MPDU, the apparatus (e.g., AP 110) may determine how many MSDUs/MPDUs can be included in the PPDU. The apparatus (e.g., AP 110) may determine to include a fragment of an MSDU/MPDU when a number of MSDUs/MPDUs that can be included in the PPDU is a non-integer number. In some configurations, the apparatus (e.g., AP 110) may determine that a length/duration/size of a single MSDU/MPDU for transmission in a PPDU is greater than an allocated portion/duration/size in the PPDU when the length/duration/size of the single MSDU/MPDU for transmission in a PPDU is greater than an allocated portion/duration/size in the PPDU. In some configurations, the apparatus (e.g., AP 110) may determine a length/duration/size of a portion of a PPDU allocated for an MSDU/MPDU, and the apparatus (e.g., AP 110) may determine to include a fragment of the MSDU/MPDU in the PPDU for transmission when the determined length/duration/size of the portion of the PPDU allocated for the MSDU/MPDU is less a length/duration/size of at least one entire MSDU/MPDU. In one or more of the aforementioned configurations, the apparatus (e.g., AP 110) may transmit the PPDU including the fragment of the MSDU/MPDU.

In some configurations, an apparatus (e.g., STA(s) 120, 150, or its PR(s) 222, 232 and/or SR(s) 224, 234) may receive a PPDU that includes a fragment of an MSDU/MPDU, and the fragment of the MSDU/MPDU includes less than an entirety of a complete MSDU/MPDU. In some configurations, the determining the length/duration/size of the single MSDU/MPDU for transmission in the PPDU is based on at least one of a bandwidth, MCS, and/or various other factors. The MSDU/MPDU can be fragmented dynamically based on various factors, such as a remaining portion of the PPDU allocated for one or more MSDUs/MPDUs, a size/length/duration of padding for the remaining portion of the PPDU allocated for one or more MSDUs/MPDUs, and/or various other suitable factors.

Sounding protocols may sometimes involve an STA transmitting feedback frames (e.g., a beamforming frame) one STA at a time. However, in an environment with many STAs, this may cause relatively lengthy delays for the AP to receive all of the feedback frames (e.g., beamforming frames) it needs/wants prior to performing a DL transmission to those STAs.

In some configurations, an apparatus (e.g., AP 110) may transmit an ULTR (e.g., in DL communication(s) 356, 357 and/or in packet 320) and, in response to transmitting the ULTR (e.g., in DL communication(s) 356, 357 and/or in packet 320), receive a feedback frame (e.g., a feedback report, a beamforming frame, etc.) from a plurality of other apparatuses (e.g., STA(s) 120, 150, or its PR(s) 222, 232 and/or SR(s) 224, 234) at a same time. In some configurations, an apparatus (e.g., STA(s) 120, 150, or its PR(s) 222, 232 and/or SR(s) 224, 234) may receive an ULTR (e.g., in DL communication(s) 356, 357 and/or in packet 320) and, in response to receiving the ULTR (e.g., in DL communication(s) 356, 357 and/or in packet 320), transmit a feedback frame (e.g., a feedback report, a beamforming frame, etc.) at a same time as a transmission of a feedback frame (e.g., a feedback report, a beamforming frame, etc.) by another apparatus (e.g., STA(s) 120, 150, or its PR(s) 222, 232 and/or SR(s) 224, 234). In some configurations, an apparatus (e.g., AP 110) may, prior to transmitting an ULTR (e.g., in DL communication(s) 356, 357 and/or in packet 320), transmit a null data packet announcement frame and transmit a null data packet after transmitting the null data packet announcement frame. In some configurations, an apparatus (e.g., STA(s) 120, 150, or its PR(s) 222, 232 and/or SR(s) 224, 234) may, prior to receiving an ULTR (e.g., in DL communication(s) 356, 357 and/or in packet 320), receive a null data packet announcement frame and receive a null data packet after receiving the null data packet announcement frame.

In some configurations, an apparatus (e.g., STA(s) 120, 150, or its PR(s) 222, 232 and/or SR(s) 224, 234) may determine/read/ascertain a total number of space-time streams (STSs) included in the data packet/frame/etc. using/based on a value/field/information included in a portion (header) of the data packet/frame/etc. In some configurations, the apparatus (e.g., STA(s) 120, 150, or its PR(s) 222, 232 and/or SR(s) 224, 234) may determine/read/ascertain a total number of a plurality of users/destinations/STAs to which a data packet/frame/etc. is destined/intended using/based on information included in the data packet/frame/etc. In some configurations, the apparatus (e.g., STA(s) 120, 150, or its PR(s) 222, 232 and/or SR(s) 224, 234) may utilize an identifier/value/field/information included in the frame/data packet/etc. to select a subset of values from a set of values that indicate/identify a number of space-time streams destined to at least one of the plurality of users/destinations/STAs (e.g., STA(s) 120, 150, or its PR(s) 222, 232 and/or SR(s) 224, 234) to which the data packet/frame/etc. is destined/intended. In some configurations, at least one of the values in the selected subset of values (indicating the number of space-time streams destined to at least one of the users/destinations/STAs) varies/ranges/depends upon various factors. In some configurations, the apparatus (e.g., STA(s) 120, 150, or its PR(s) 222, 232 and/or SR(s) 224, 234) may determine/calculate/compute an (exact) value for the at least one of the values in the selected subset of values that varies/ranges by considering a total number of STSs included in the data packet/frame/etc. In some configurations, the apparatus (e.g., STA(s) 120, 150, or its PR(s) 222, 232 and/or SR(s) 224, 234) may determine/calculate/compute an (exact) value for the at least one of the values in the selected subset of values that varies/ranges by deducting/subtracting some or all other values in the selected subset of values from the total number of STSs included in the data packet/frame/etc.

In some configurations, the apparatus (e.g., STA(s) 120, 150, or its PR(s) 222, 232 and/or SR(s) 224, 234) may determine/calculate/compute an (exact) value for the at least one of the values in the selected subset of values that varies/ranges by eliminating one or more possible values if an addition of those one or more possible values to the other subset of values generates a sums that exceeds the total number of STSs included in the data packet/frame/etc. In some configurations, the apparatus (e.g., STA(s) 120, 150, or its PR(s) 222, 232 and/or SR(s) 224, 234) may determine a value of a user position assigned/allocated to the STA. In some configurations, the apparatus (e.g., STA(s) 120, 150, or its PR(s) 222, 232 and/or SR(s) 224, 234) may select which of (e.g., which may be different from just how many) of the streams of the plurality of STSs included in the data packet/frame/etc. is/are destined to/intended for the apparatus (e.g., STA(s) 120, 150, or its PR(s) 222, 232 and/or SR(s) 224, 234) by considering a number of STSs allocated/assigned to other apparatuses (e.g., STA(s) 120, 150, or its PR(s) 222, 232 and/or SR(s) 224, 234) that are assigned/allocated user position values different from (e.g., lower in value than) the value of the user position assigned/allocated to the apparatus (e.g., STA(s) 120, 150, or its PR(s) 222, 232 and/or SR(s) 224, 234). In some configurations, a number of STSs intended/destined for/to a first user/destination/STA (e.g., STA(s) 120, 150, or its PR(s) 222, 232 and/or SR(s) 224, 234) may be greater than or equal to (e.g., never exceed) a number of STSs intended/destined for/to a second user/destination/STA (e.g., STA(s) 120, 150, or its PR(s) 222, 232 and/or SR(s) 224, 234). Any number of spatially-multiplexed users in a DL or UL MU-MIMO transmission may be implemented. Any number of STS values for each user in a MU-MIMO RU may be implemented. In many other configurations, another apparatus (e.g., AP, another STA) (e.g., STA(s) 120, 150, or its PR(s) 222, 232 and/or SR(s) 224, 234) may perform transmitter-side processes that relate to/pertain to the receiver-side processes described above with reference to an apparatus or STA (e.g., STA(s) 120, 150, or its PR(s) 222, 232 and/or SR(s) 224, 234). In some configurations, an apparatus (e.g., STA(s) 120, 150, or its PR(s) 222, 232 and/or SR(s) 224, 234) having/with a pending UL data, after receiving a MU DL transmission, may set a bit in its UL MU response frame (e.g., an acknowledgement of some sort). That bit may be configured to inform the receiving apparatus (e.g., AP 110, another STA(s) 150) that the transmitting apparatus (e.g., STA 120) has a pending UL data ready for near future transmission.

In some configurations, an AP 110 (e.g., physical AP, such as AP 110) may function, operate, be, and/or be associated with one or more virtual APs (VAPs). In some configurations, a virtual AP is a logical entity that may reside within a physical AP. In some configurations, to a STA (e.g., STA(s) 120, 150), the VAP appears as an independent AP with its own unique BSSID. In some configurations, each VAP may advertise a unique BSSID. In some configurations, a physical AP may advertise a separate beacon for each VAP that it supports. In some configurations, each BSSID corresponds to a particular VAP of the physical AP. In some configurations, from a STA's perspective, these VAPs appear as separate APs. In some circumstances, without some information about other VAPs associated with that physical AP, there is a likelihood of collision among communications between the VAPs and their respective STAs. In some circumstances, if one VAP or its client has some information about the other VAP or its client, the likelihood of collisions may be less than it might be otherwise. In some configurations, an AP may establish two or more VAPs for a single physical AP. In some configurations, each VAP is associated with a different BSSID (e.g., VAP1 is associated with BSSID1 and VAP2 is associated with BSSID2). In some configurations, the BSSIDs may have at least one common (e.g., shared, same, etc.) element (e.g., information element, e.g., BSS group designation, BSS color designation, etc.). In some configurations, the AP (e.g., physical AP, such as AP 110) may advertise/transmit/communicate (and one or more STA(s) 120, 150 may therefore receive) a separate beacon for each of the VAPs (e.g., a first beacon for VAP1 and, subsequently, a separate second beacon for VAP2). In some configurations, each beacon may include a BSSID associated with its VAPs (e.g., to the STA(s) 120, 150 within the coverage area of the physical AP (e.g., AP 110)). In some configurations, two or more beacons may have at least one common (e.g., shared, same, etc.) element (e.g., information element, e.g., BSS group designation, BSS color designation, etc.). In some configurations, the AP 110 may use a first BSSID and/or first beacon to establish/initiate/configure/identify communication (of a first virtual AP) with a first STA 120. In some configurations, the AP 110 may use a second BSSID (different from the first BSSID) and/or second beacon (different from the first beacon) to establish/initiate/configure/identify communication (of a second VAP) with a second STA 150. In some configurations, an element of information (e.g., identifying information, e.g., BSS group designation, BSS color designation, etc.) of the communication (of the first virtual VAP) with the first STA 120 is common relative to (e.g., shared with, same as, etc.) an element of information (e.g., identifying information, e.g., BSS group designation, BSS color designation, etc.) of the communication (of the second VAP) with the second STA 150. In some configurations, an apparatus (e.g., AP 110) may receive/transmit/communicate packets/frames with one or more other apparatuses (e.g., STA(s) 120, 150) (e.g., each associated with a different VAP) (e.g., STA-1 associated with VAP-1, and STA-2 associated with VAP-2) in a single/common/same/shared multi-user transmission. In some configurations, a particular field (e.g., one or more signal (SIG) fields), or some information contained therein, for those communications may be the same/shared/common/etc.

In some configurations, an apparatus (e.g., STA(s) 120, 150, or its PR(s) 222, 232 and/or SR(s) 224, 234) may transmit and another apparatus (e.g., AP 110) may receive a data packet that may include a plurality of components, portions, parts, fragments, partitions, etc. Such a data packet may sometimes be referred to as an aggregated data packet. By including such a plurality of components, portions, parts, fragments, partitions, etc., there is a likelihood that fewer data packets may need to be communicated (e.g., transmitted) separately, thereby potentially increasing communication efficiency and overall throughput. In some configuration, when a data packet with a plurality of such components, portions, parts, fragments, partitions, etc. is received, the apparatus (e.g., AP 110) may wish to communicate acknowledgement information to the apparatus (e.g., STA(s) 120, 150, or its PR(s) 222, 232 and/or SR(s) 224, 234) that transmitted that aggregated data packet. In some configurations, the apparatus (e.g., STA(s) 120, 150, or its PR(s) 222, 232 and/or SR(s) 224, 234) may transmit and another apparatus (e.g., AP 110) may receive an aggregated data packet (e.g., aggregated protocol data unit (PDU)) comprising at least one data packet (e.g., service data unit (SDU)) that includes a plurality of (e.g., multiple) fragments (e.g., incomplete data packets) (e.g., fragments of one or more SDUs). In some configurations, each data packet included in the aggregated data packet is associated with a series/chronology/order/arrangement/sequence/array/success number. In some configurations, that apparatus (e.g., AP 110) may transmit a block acknowledgement corresponding to or in response to receiving the aggregated data packet transmitted by the other apparatus (e.g., STA(s) 120, 150, or its PR(s) 222, 232 and/or SR(s) 224, 234). In some configurations, the block acknowledgement comprises an indication of a number (e.g., a singular number, a plural number, a minimum number, an average number, a maximum number, a counting number, a whole number, a positive integer, etc.) of fragments included in the data packet. In some configurations, the block acknowledgement comprises an indication of a beginning one of the series/chronology/order/arrangement/sequence/array/success number. In some configurations, the block acknowledgement comprises a bitmap that includes acknowledgement information. In some configurations, the block acknowledgement comprises acknowledgement information for each packet. In some configurations, the acknowledgement information for each packet is included in a number of bits that correspond to the indicated number of fragments. In some configurations, acknowledgment information for a sequentially first packet (e.g., a packet including a plural number (e.g., three) of fragments) in the aggregated data packet is included in a first set or plural number of (e.g., three) bits of the bitmap. In some configurations, acknowledgement for a sequentially second packet (e.g., another packet including a plural number (e.g., three) of fragments) in the aggregated data packet is included in a second set or plural number (e.g., three) bits of the bitmap. In some configurations, the indicated number of fragments corresponds to a grouping of acknowledgement information included in the bitmap. In some configurations, the apparatus (e.g., STA(s) 120, 150, or its PR(s) 222, 232 and/or SR(s) 224, 234) uses the indicated number of fragments to determine how acknowledgement information is assigned/allocated/grouped in the bitmap. In some configurations, the apparatus (e.g., STA(s) 120, 150, or its PR(s) 222, 232 and/or SR(s) 224, 234) uses the indicated number of fragments to determine which of the bits in the bitmap correspond to each of the data packets and/or fragments thereof. In some configurations, each bit in the bitmap includes acknowledgement information corresponding to at least one of the plurality of (e.g., multiple) fragments of a data packet included in each data packet. In some configurations, a first set of bits in the bitmap correspond to the indicated beginning one of the series/chronology/order/arrangement/sequence/array/success number. In some configurations, each bit in the bitmap indicates acknowledgement information for at least one fragment.

At block 460, an apparatus may enable aspects related to performing communications regarding UL communication(s). In some aspects, at time $T_{14}$, an AP 110 may transmit and/or STA(s) 120, 150 (or its PR(s) 222, 232 and/or SR(s) 224, 234) may receive a signal/transmission (e.g., DL communication(s) 356, 357) configured to trigger (e.g., simultaneous/concurrent) UL transmission(s) (e.g., UL communication(s) 362, 363) by a plurality of STAs 120, 150 within a period of time after receiving that signal/transmission (e.g., DL communication(s) 356, 357). As indicated above, such a signal/transmission (e.g., DL communication(s) 356, 357) is sometimes referred to as an ULTR and/or various other suitable terms (as described in greater detail herein) without deviating from the scope of the present disclosure. In some aspects, the time duration between time $T_{14}$ and time $T_{17}$ may represent a period of time between reception, by the STA(s) 120, 150 (or its PR(s) 222, 232 and/or SR(s) 224, 234), of the aforementioned DL communication(s) 356, 357 (e.g., ULTR(s)) and transmission, by the STA(s) 120, 150 (or its PR(s) 222, 232 and/or SR(s) 224, 234), of the (e.g., simultaneous/concurrent) UL communication(s) 362, 363. In some aspects, the ULTR (e.g., in DL communication(s) 356, 357 and/or in packet 320) may be destined/intended for a plurality of STAs 120, 150. In some aspects, the ULTR (e.g., in DL communication(s) 356, 357 and/or in packet 320) may include information for identifying the plurality of STAs 120, 150 for the (e.g., simultaneous/concurrent) UL transmissions (e.g., UL communication(s) 362, 363). For example, the ULTR (e.g., in DL communication(s) 356, 357 and/or in packet 320) may identify which of the STAs within the coverage area of the AP 110 is/are intended to receive the ULTR (e.g., in DL communication(s) 356, 357 and/or in packet 320) and/or intended to perform the (e.g., simultaneous/concurrent) UL communication(s) 362, 363. In some aspects, the ULTR (e.g., in DL communication(s) 356, 357 and/or in packet 320) may include an indication indicating whether to perform carrier sensing prior to initiating an UL transmission (e.g., UL communication(s) 362, 363).

In some aspects, the ULTR (e.g., in DL communication(s) 356, 357 and/or in packet 320) includes a first portion including a field common to the plurality of STAs and indicating a duration of at least a portion of the (e.g., simultaneous/concurrent) UL transmission(s) (e.g., UL communication(s) 362, 363). In some aspects, the ULTR (e.g., in DL communication(s) 356, 357 and/or in packet 320) includes a second portion including a plurality of user-specific fields indicating a description of resource allocation for the (e.g., simultaneous/concurrent) UL transmission(s) (e.g., UL communication(s) 362, 363) by the plurality of STAs 120, 150 (or its PR(s) 222, 232 and/or SR(s) 224, 234). For example, the ULTR (e.g., in DL communication(s) 356, 357 and/or in packet 320) may identify, allocate, assign, and/or otherwise specific resource units (RUs) to be used by each the plurality of STAs 120, 150 that will be performing the (e.g., simultaneous/concurrent) UL transmission(s) (e.g., UL communication(s) 362, 363). In some aspects, the ULTR (e.g., in DL communication(s) 356, 357 and/or in packet 320) further comprises an indication indicating whether a subsequent ULTR is a cascading ULTR. For example, the ULTR (e.g., in DL communication(s) 356, 357 and/or in packet 320) may include a field, parameter, value, bit, portion and/or other suitable aspect indicating whether the ULTR will be followed by another, possibly unscheduled, ULTR.

In some aspects, the ULTR (e.g., in DL communication(s) 356, 357 and/or in packet 320) may include information corresponding to a target received signal strength, which may refer to the desired/targeted power of the signal(s) to be received by one or more of the antennas of the AP(s) (e.g., the desired/targeted power of the UL communication(s) 362, 363). In some aspects, the ULTR (e.g., in DL communication(s) 356, 357 and/or in packet 320) may include information corresponding to a power measurement of the transmitted ULTR (e.g., in DL communication(s) 356, 357 and/or in packet 320), wherein the power measurement of the transmitted ULTR (e.g., in DL communication(s) 356, 357 and/or in packet 320) may refer to the power utilized to transmit the ULTR (e.g., in DL communication(s) 356, 357 and/or in packet 320) using one or more antennas of the AP(s) 110. In some aspects, based on the information corresponding to the power measurement of the transmitted ULTR (as included in the ULTR), an STA (e.g., STA(s) 120, 150) may determine an amount of power loss during the DL transmission of the ULTR (e.g., in DL communication(s) 356, 357 and/or in packet 320) from an apparatus (e.g., AP 110) to the STA (e.g., STA(s) 120, 150). For example, the STA (e.g., STA(s) 120, 150) may consider the received information corresponding to the power measurement of the transmitted ULTR (e.g., in DL communication(s) 356, 357 and/or in packet 320) in relation to the measured signal strength of the received ULTR (e.g., in DL communication(s) 356, 357 and/or in packet 320) in order to determine the amount of power loss during the DL transmission of the ULTR (e.g., in DL communication(s) 356, 357 and/or in packet 320).

In some aspects, prior to receiving the ULTR (e.g., in DL communication(s) 356, 357 and/or in packet 320), an AP 110 may transmit and an STA 120, 150 (or its PR(s) 222, 232 and/or SR(s) 224, 234) may receive a signal/transmission indicating a start time associated with communication of an ULTR (e.g., in DL communication(s) 356, 357 and/or in packet 320) from the AP 110. Subsequently, the STA 120, 150 (or its PR(s) 222, 232 and/or SR(s) 224, 234) may enter a low-power mode until a time corresponding to the start time indicated in the received signal/transmission (e.g., DL communication(s) 356, 357). By entering into the low-power mode, the STA 120, 150 (or its PR(s) 222, 232 and/or SR(s) 224, 234) can conserve power that might otherwise be expended prior to the approximate start time of the ULTR communication (e.g., DL communication(s) 356, 357). In some aspects, the ULTR (e.g., in DL communication(s) 356, 357 and/or in packet 320) is further configured to assign at least one RU for random access. For example, DL communication(s) 356, 357 may be configured to assign at least one RU for random access for UL multiuser transmission(s) (e.g., UL communication(s) 362, 363).

In some configurations, the transmission of a data packet may be from an AP 110 to a plurality of STA(s) 120, 150. Such a transmission may sometimes be referred to as a DL transmission. In some configurations, the transmission of a data packet may be from a plurality of STA(s) 120, 150 to the AP 110. Such a transmission may be referred to as an UL transmission (or, alternatively, a multi-user UL transmission). In some configurations, the AP may coordinate the timing of the UL transmission from the plurality of STAs to the AP. Such a coordination procedure may at least in part include transmission of an ULTR from the AP 110 to one or more of the plurality of STA(s) 120, 150, or its PR(s) 222, 232 and/or SR(s) 224, 234. The ULTR (e.g., in DL communication(s) 356, 357 and/or in packet 320) may be referred to by any other suitable name (e.g., UL request, UL response, trigger/triggering data/portion/packet/frame, etc.) without deviating from the scope of the present disclosure. In some configurations, the ULTR (e.g., in DL communication(s) 356, 357 and/or in packet 320) may be a control frame (or part of a control frame). In some configurations, the ULTR (e.g., in DL communication(s) 356, 357 and/or in packet 320) may be a management frame (or part of a control frame). In some configurations, the ULTR (e.g., in DL communication(s) 356, 357 and/or in packet 320) may be a data frame (or part of a data frame). In some configurations, the ULTR (e.g., in DL communication(s) 356, 357 and/or in packet 320) may be a unicast frame. In some configurations, the ULTR (e.g., in DL communication(s) 356, 357 and/or in packet 320) is a multicast frame. In some configurations, the ULTR (e.g., in DL communication(s) 356, 357 and/or in packet 320) is transmitted at random times. In some configurations, the ULTR (e.g., in DL communication(s) 356, 357 and/or in packet 320) is transmitted at a target transmission time. The target transmission time may be determined based on various factors without deviating from the scope of the present disclosure. For instance, in some configurations, the target transmission time for transmitting the ULTR (e.g., in DL communication(s) 356, 357 and/or in packet 320) may be associated with and/or corresponding to a target wake time. Generally, the target wake time is a function that permits the AP 110 to define a specific time or set of times for individual STA(s) 120, 150, or its PR(s) 222, 232 and/or SR(s) 224, 234, to access a transmission medium. The STA(s) 120, 150 and the AP 110 may exchange information that includes an expected activity duration to allow the AP 110 to control the amount of contention and overlap among other/competing STA(s) 120, 150, or its PR(s) 222, 232 and/or SR(s) 224, 234. The AP 110 may protect the expected duration of activity with various protection mechanisms. The target wake time may be determined implicitly and/or explicitly without deviating from the scope of the present disclosure. For example, the target wake time may be broadcasted in a beacon signal. As another example, the target wake time may be negotiated. Even the use of the target wake time may sometimes be negotiated between the AP 110 and one or more STA(s) 120, 150, or its PR(s) 222, 232 and/or SR(s) 224, 234. In some configurations, the ULTR (e.g., in DL communication(s) 356, 357 and/or in packet 320) is part of a data packet (e.g., data packet), such as a PPDU. In some configurations, the ULTR (e.g., in DL communication(s) 356, 357 and/or in packet 320) is separate from the data packet (e.g., data packet), such as a PPDU; rather, the ULTR (e.g., in DL communication(s) 356, 357 and/or in packet 320) is either a standalone frame or data packet, or included with another data packet. In some configurations, the ULTR (e.g., in DL communication(s) 356, 357 and/or in packet 320) is a control format that carries information sufficient to identify the STA(s) 120, 150, or its PR(s) 222, 232 and/or SR(s) 224, 234, transmitting the UL data packet (e.g., a multi-user UL PPDU) (e.g., UL communication(s) 362, 363) and/or allocating resources for the UL data packet (e.g., a multi-user UL PPDU) (e.g., UL communication(s) 362, 363). In some configurations, the ULTR (e.g., in DL communication(s) 356, 357 and/or in packet 320) is configured to trigger at least one UL transmission (e.g., UL communication(s) 362, 363) by each of the STAs, receivers, users, destinations, and/or intended recipients (e.g., STA(s) 120, 150, or its PR(s) 222, 232 and/or SR(s) 224, 234) that receive the ULTR (e.g., in DL communication(s) 356, 357 and/or in packet 320) and/or the data packet (which may sometimes include the ULTR) within a certain period of time (e.g., inter-frame spacing (IFS)). In some configurations, the UL transmission (e.g., UL communication(s) 362, 363) that follows the ULTR (e.g., in DL communication(s) 356, 357 and/or in packet 320) may begin at a time that is indicated in the ULTR (e.g., in DL communication(s) 356, 357 and/or in packet 320). In some configurations, the UL transmission (e.g., UL communication(s) 362, 363) that follows the ULTR may end/terminate at a time that is indicated in the ULTR. In some configurations, the ULTR (e.g., in DL communication(s) 356, 357 and/or in packet 320) may indicate the duration of the UL transmission(s) (e.g., UL communication(s) 362, 363) that follows the ULTR (e.g., in DL communication(s) 356, 357 and/or in packet 320). In some configurations, the ULTR (e.g., in DL communication(s) 356, 357 and/or in packet 320) may include various fields configured to include various types of information, data, and content without deviating from the scope of the present disclosure. For instance, the ULTR (e.g., in DL communication(s) 356, 357 and/or in packet 320) may include a first portion including a field common to, shared with, and/or otherwise available/provided to a plurality of STA(s) 120, 150, or its PR(s) 222, 232 and/or SR(s) 224, 234. The field common to, shared with, and/or otherwise available/provided to the plurality of STA(s) 120, 150, or its PR(s) 222, 232 and/or SR(s) 224, 234, may include various subfields characterizing or defining the format of the information included in the ULTR (e.g., in DL communication(s) 356, 357 and/or in packet 320). The field common to, shared with, and/or otherwise available/provided to the plurality of STA(s) 120, 150, or its PR(s) 222, 232 and/or SR(s) 224, 234, may additionally or alternatively include the duration of the UL data packet (e.g., a multi-user UL data packet, such as UL communication(s) 362, 363). The field common to, shared with, and/or otherwise available/provided to the plurality of STA(s) 120, 150, or its PR(s) 222, 232 and/or SR(s) 224, 234, may additionally or alternatively include the goal/objective/reason/purpose/intent of the UL data packet (e.g., a multi-user UL data packet, such as UL communication(s) 362, 363). The ULTR (e.g., in DL communication(s) 356, 357 and/or in packet 320) may also include a second portion including a plurality of user-specific fields containing information that do not belong to the field that is common, shared, and/or otherwise available/provided to all of the plurality of STA(s) 120, 150, or its PR(s) 222, 232 and/or SR(s) 224, 234. In some configurations, the plurality of user-specific fields may include an identifier or identification of the STA(s) 120, 150, or its PR(s) 222, 232 and/or SR(s) 224, 234. In some configurations, the plurality of user-specific fields may include a description of the resource allocation (e.g., resource units) for the UL data packet and/or its corresponding UL transmission (e.g., UL communication(s) 362, 363). In some configurations, the plurality of user-specific fields may include information associated with the power level for the UL transmission of the UL data packet (e.g., UL communication(s) 362, 363), or any other suitable/revenant aspect.

As described above, the ULTR (e.g., in DL communication(s) 356, 357 and/or in packet 320) may be included as a part of any data packet. In some configurations, the ULTR (e.g., in DL communication(s) 356, 357 and/or in packet 320) may be included as a part of the DL data packet (e.g., a multi-user DL data packet, such as DL multiuser communication(s) 354, 355). In some configurations, the ULTR (e.g., in DL communication(s) 356, 357 and/or in packet 320) may be appended to an end portion of one or more data portions (e.g., Aggregated MAC Protocol Data Unit(s) [A-MPDU(s)]) of one or more portions (e.g., space-time stream(s)) of the DL data packet (e.g., DL multiuser communication(s) 354, 355). In some configurations, the ULTR (e.g., in DL communication(s) 356, 357 and/or in packet 320) may be multiplexed across/over/throughout/onto one or more data portions (e.g., A-MPDU(s)) of the DL data packet (e.g., multi-user DL data packet, such as DL multiuser communication(s) 354, 355). Such multiplexing may occur in the frequency domain and/or the spatial domain. By including the ULTR (e.g., in DL communication(s) 356, 357 and/or in packet 320) as a part of the DL data packet (e.g., DL multiuser communication(s) 354, 355), the ULTR (e.g., in DL communication(s) 356, 357 and/or in packet 320) may not need to be transmitted as a separate frame/packet, thereby possibly reducing the need for certain IFS prior to and/or following the ULTR (e.g., in DL communication(s) 356, 357 and/or in packet 320). Also, the ULTR (e.g., in DL communication(s) 356, 357 and/or in packet 320) may be able to piggy-back onto the DL data packet (e.g., multi-user DL data packet, such as DL multiuser communication(s) 354, 355), thereby possibly reducing the need for some overhead (e.g., headers, preambles, etc.) that might otherwise be needed for a separately-transmitted ULTR (e.g., in DL communication(s) 356, 357 and/or in packet 320). Accordingly, the AP 110 may generate and/or transmit a DL data packet (e.g., a multi-user DL data packet, such as DL multiuser communication(s) 354, 355) including a data portion (e.g., A-MPDU) and also including at least one ULTR (e.g., in DL communication(s) 356, 357 and/or in packet 320), and the STA(s) 120, 150 may receive and/or decode the DL data packet (e.g., a multi-user DL data packet, such as DL multiuser communication(s) 354, 355) including the data portion (e.g., A-MPDU) and also including the at least one ULTR (e.g., in DL communication(s) 356, 357 and/or in packet 320). Subsequently, without transmitting another (or a separate) ULTR, the STA(s) 120, 150 may generate and/or transmit the UL data packet (e.g., a multi-user UL data packet, such as UL communication(s) 362, 363), and the AP 110 may receive and/or decode the UL data packet (e.g., a multi-user UL data packet, such as UL communication(s) 362, 363). In some configurations, the DL data transmission (e.g., DL multiuser communication(s) 354, 355 and/or DL communication(s) 356, 357) and the UL data transmission (UL communication(s) 362, 363) may occur during a single transmission opportunity (TXOP). In other words, the DL data packet (e.g., DL multiuser communication(s) 354, 355 and/or DL communication(s) 356, 357) is generated and/or transmitted during a TXOP that is the same as the TXOP during which the UL data packet (UL communication(s) 362, 363) is generated and/or transmitted. In other words, the AP 110 may generate/transmit a data packet (e.g., PPDU) including one or more data portions (e.g., A-MPDUs) to a plurality of STA(s) 120, 150, or its PR(s) 222, 232 and/or SR(s) 224, 234. In some configurations, such data packet includes the ULTR (e.g., in DL communication(s) 356, 357 and/or in packet 320). In some configurations, the ULTR (e.g., in DL communication(s) 356, 357 and/or in packet 320) may be configured to trigger a simultaneous UL transmission by the plurality of STAs 120, 150 within a period of time (e.g., IFS) after receiving the data packet and/or the ULTR (e.g., in DL communication(s) 356, 357 and/or in packet 320) in the data packet. As described above, the ULTR (e.g., in DL communication(s) 356, 357 and/or in packet 320) may sometimes be a unicast frame. In some configurations, the ULTR (e.g., in DL communication(s) 356, 357 and/or in packet 320) may be included for each of the one or more data portions (e.g., A-MPDUs). In some configurations, each of the one or more data portions (e.g., A-MPDUs) is destined to different STAs (and thus may have a different ULTR). As described above, in some aspects, the ULTR(s) (e.g., DL communication(s) 356, 357) may precede simultaneous, multi-user UL transmission by the plurality of STA(s) 120, 150, or its PR(s) 222, 232 and/or SR(s) 224, 234.

In some configurations, an apparatus (e.g., AP 110) may transmit information/data/bit(s) indicating whether the receive signal (e.g., beacon) is associated with two or more ULTRs (e.g., DL communication(s) 356, 357). In some configurations, an apparatus (e.g., AP 110) may transmit information/data/bit(s) indicating that the two or more ULTRs (e.g., DL communication(s) 356, 357) are cascaded (e.g., transmitted in a cascaded sequence/number). In some configurations, an apparatus (e.g., STA(s) 120, 150) may disregard/refrain from processing/considering any/every ULTR (e.g., in DL communication(s) 356, 357 and/or in packet 320) received during a time period beginning from receipt of the message/signal (e.g., beacon) and ending at the time corresponding to the scheduling information, the start time, and/or the time interval included in the received signal/message (e.g., beacon).

In some configurations, the ULTR (e.g., in DL communication(s) 356, 357 and/or in packet 320) may include information that may be used by the STA(s) 120, 150, or its PR(s) 222, 232 and/or SR(s) 224, 234, to determine how to subsequently communicate with the AP 110. For example, the ULTR (e.g., in DL communication(s) 356, 357 and/or in packet 320) may include information that the STA(s) 120, 150, or its PR(s) 222, 232 and/or SR(s) 224, 234, may utilize to determine a setting/parameter/configuration of an UL transmission/communication (e.g., UL communication(s) 362, 363) that follows receipt of the ULTR (e.g., in DL communication(s) 356, 357 and/or in packet 320). The ULTR (e.g., in DL communication(s) 356, 357 and/or in packet 320) may include various types and configurations of such information. In some configurations, the ULTR (e.g., in DL communication(s) 356, 357 and/or in packet 320) includes an indication of a duration/size/length/modulation/coding/scheduling/encryption of the UL communication (e.g., UL communication(s) 362, 363). In some configuration, the ULTR (e.g., in DL communication(s) 356, 357 and/or in packet 320) may include an indication of the packet/frame structure/type/format. In some configurations, the ULTR (e.g., in DL communication(s) 356, 357 and/or in packet 320) may include an indication of the category/type/capabilities of the STA(s) 120, 150, or its PR(s) 222, 232 and/or SR(s) 224, 234. In some configurations, the STA(s) 120, 150, or its PR(s) 222, 232 and/or SR(s) 224, 234, may generate one or more frames/packets for an UL transmission/communication (e.g., UL communication(s) 362, 363) (that corresponds to/in response to the ULTR). In some configurations, the generated one or more frames/packets includes at least one frame/packet that is based on/is according to/is associated with/matches/is the same as/the indication (described above). In some configurations, the STA(s) 120, 150, or its PR(s) 222, 232 and/or SR(s) 224, 234, may have a default setting/parameter of communicating/transmitting a specific/predetermined/preset configuration/type/format of frame/packet (e.g., a null/empty signal/packet/frame/message) if/when the generated one or more packets are not based on/is according to/is associated with/matches/is the same as the indication (described above).

In some configurations, an acknowledgement message/signal may take the form of a block acknowledgement message/signal, a multi-user block acknowledgement, and/or various other suitable types of messages/signals. In some configurations, the AP 110 may determine whether/that a DL acknowledgement message is expected to be/scheduled to be transmitted by the AP 110 (e.g., immediately) preceding a DL transmission of the ULTR (e.g., in DL communication(s) 356, 357 and/or in packet 320). In some configurations, the AP 110 may determine whether/that the ULTR (e.g., in DL communication(s) 356, 357 and/or in packet 320) is expected to be/scheduled to be transmitted by the AP 110 (e.g., immediately) preceding a transmission of an acknowledgement message. In some configurations, the AP 110 may combine/join/aggregate/include the acknowledgement message and the ULTR (e.g., in DL communication(s) 356, 357 and/or in packet 320) into a single/unitary/contiguous/continuous/unbroken/uninterrupted DL transmission. In some configurations, the STA(s) 120, 150, or its PR(s) 222, 232 and/or SR(s) 224, 234, may receive a single/unitary/contiguous/continuous/unbroken/uninterrupted DL transmission that has included/combined/joined/aggregated an acknowledgement message and the ULTR (e.g., in DL communication(s) 356, 357 and/or in packet 320). In some configurations, the single/unitary/contiguous/continuous/unbroken/uninterrupted DL transmission may be without some attribute/feature/aspect that would otherwise be included. For example, the single/unitary/contiguous/continuous/unbroken/uninterrupted DL transmission may be without an inter-frame spacing that might otherwise exist between the acknowledgement message and the ULTR (e.g., in DL communication(s) 356, 357 and/or in packet 320). As another example, the single/unitary/contiguous/continuous/unbroken/uninterrupted DL transmission may be without a data frame/portion/packet that might otherwise exist.

As used herein, the term resources may refer to and/or be interchangeable with other terms, such as communication resources/elements/units, resource elements/units, time-frequency resources/elements/units, OFDMA resources/elements/units, MU-MIMO resources/elements/units, and/or any other suitable resources/elements/units utilized in various wireless communication technologies. In some configurations, the STA(s) 120, 150, or its PR(s) 222, 232 and/or SR(s) 224, 234, may receive an ULTR (e.g., in DL communication(s) 356, 357 and/or in packet 320) that has many fields (e.g., STA-specific information field, user-specific information field, etc.), and one of the fields may include a plurality of bits. Based on a first subset of the plurality of bits included in the ULTR (e.g., in DL communication(s) 356, 357 and/or in packet 320), in some configurations, the STA(s) 120, 150, or its PR(s) 222, 232 and/or SR(s) 224, 234, may determine whether one or more resources is allocated to the STA(s) 120, 150, or its PR(s) 222, 232 and/or SR(s) 224, 234. Based on a first subset of the plurality of bits included in the ULTR (e.g., in DL communication(s) 356, 357 and/or in packet 320), in some configurations, the STA(s) 120, 150, or its PR(s) 222, 232 and/or SR(s) 224, 234, may determine whether one or more resources allocated to the STA(s) 120, 150, or its PR(s) 222, 232 and/or SR(s) 224, 234, is included in a preferred/preselected/preconfigured/preset/primary communication channel (or a non-preferred/preselected/preconfigured/preset/primary communication channel, next-preferred/preselected/preconfigured/preset communication channel, etc.). Based on a second subset of the plurality of bits included in the ULTR (e.g., in DL communication(s) 356, 357 and/or in packet 320), in some configurations, the STA(s) 120, 150, or its PR(s) 222, 232 and/or SR(s) 224, 234, may determine how many/which/a number of/a quantity of/a number of units of resource(s) allocated to the STA(s) 120, 150, or its PR(s) 222, 232 and/or SR(s) 224, 234, and/or other STA(s) 120, 150, or its PR(s) 222, 232 and/or SR(s) 224, 234,s.

In some configurations, the STA(s) 120, 150, or its PR(s) 222, 232 and/or SR(s) 224, 234, may determine an index/indices of the resource(s) based on a second subset of the plurality of bits included in the ULTR (e.g., in DL communication(s) 356, 357 and/or in packet 320). In some configurations, the index/indices indicates which of the available resources (e.g., in a/the communication channel) is allocated to the STA(s) 120, 150, or its PR(s) 222, 232 and/or SR(s) 224, 234, and/or other STA(s) 120, 150, or its PR(s) 222, 232 and/or SR(s) 224, 234,s. In some configurations, the index/indices may correspond to/be associated with a chronological/sequential/ordering of the available resources. Based on a second subset of the plurality of bits included in the ULTR (e.g., in DL communication(s) 356, 357 and/or in packet 320), in some configurations, the STA(s) 120, 150, or its PR(s) 222, 232 and/or SR(s) 224, 234, may determine which of the available resources are the one or more resource units allocated to the STA(s) 120, 150, or its PR(s) 222, 232 and/or SR(s) 224, 234, and/or other STA(s) 120, 150, or its PR(s) 222, 232 and/or SR(s) 224, 234. In some configurations, a second subset of the plurality of bits may correspond to/be associated with a bandwidth of the resources allocated to the STA(s) 120, 150, or its PR(s) 222, 232 and/or SR(s) 224, 234, and/or other STA(s) 120, 150, or its PR(s) 222, 232 and/or SR(s) 224, 234. In some configurations, the available resource(s) may refer to/correspond to the bandwidth available for communication. In some configurations, the resource(s) may refer to/correspond to a subset of the available bandwidth. In some configurations, the subset of the available bandwidth may correspond to the bandwidth allocated/reserved/scheduled for that/a particular STA(s) 120, 150, or its PR(s) 222, 232 and/or SR(s) 224, 234. In some configurations, a first range of values for the second subset of bits of the plurality of bits may correspond to/be associated with a resource size/number of resources/channel size/bandwidth that is different from (e.g., larger, smaller, etc.) relative to another resource size/number of resources/channel size/bandwidth corresponding to/associated with a second range of values for the second subset of bits of the plurality of bits. In some configurations, the first range may be different from the second range.

In some configurations, the ULTR (e.g., in DL communication(s) 356, 357 and/or in packet 320) may include information indicating/associated with/corresponding to a threshold/target/ideal/selected/preselected/optimized received signal strength for the one or more STA(s) 120, 150, or its PR(s) 222, 232 and/or SR(s) 224, 234. In some configurations, the threshold/target/ideal/selected/preselected/optimized received signal strength for one STA 120, or its PR(s) 222 and/or SR(s) 224, to which the ULTR (e.g., in DL communication(s) 356, 357 and/or in packet 320) is addressed or destined is different from the threshold/target/ideal/selected/preselected/optimized received signal strength for another STA 150, or its PR(s) 232 and/or SR(s) 234, to which the ULTR (e.g., in DL communication(s) 356, 357 and/or in packet 320) is addressed or destined. In some configurations, the ULTR (e.g., in DL communication(s) 356, 357 and/or in packet 320) may include information indicating/associated with/corresponding to an encryption, modulation, encoding, and/or encoding for the one or more STA(s) 120, 150, or its PR(s) 222, 232 and/or SR(s) 224, 234, to which the ULTR is destined or addressed. In some configurations, the encryption, modulation, encoding, and/or encoding for one STA 120, or its PR(s) 222 and/or SR(s) 224, to which the ULTR (e.g., in DL communication(s) 356, 357 and/or in packet 320) is addressed or destined is different from the encryption, modulation, encoding, and/or encoding for another STA 150, or its PR(s) 232 and/or SR(s) 234, to which the ULTR (e.g., in DL communication(s) 356, 357 and/or in packet 320) is addressed or destined. In some configurations, the ULTR (e.g., in DL communication(s) 356, 357 and/or in packet 320) may comprise information indicating/associated with/corresponding to an amount/duration/profile/measurement of power of the transmitted ULTR (e.g., in DL communication(s) 356, 357 and/or in packet 320). In some configurations, the information indicating/associated with/corresponding to the amount/duration/profile/measurement of power of the transmitted ULTR (e.g., in DL communication(s) 356, 357 and/or in packet 320) is communicated to all STA(s) 120, 150, or its PR(s) 222, 232 and/or SR(s) 224, 234, (e.g., a plurality of STAs) to which the ULTR (e.g., in DL communication(s) 356, 357 and/or in packet 320) is destined or addressed.

At block 450, an apparatus may enable aspects related to performing operations related carrier sensing and/or one or more NAVs. In some aspects, in response to receiving the ULTR (e.g., in DL communication(s) 356, 357 and/or in packet 320), STA(s) 120, 150, or its PR(s) 222, 232 and/or SR(s) 224, 234, may consider a NAV unless at least one NAV was set by a frame originating from the apparatus from which the ULTR (e.g., in DL communication(s) 356, 357 and/or in packet 320) was transmitted. In some aspects, in response to receiving the ULTR (e.g., in DL communication(s) 356, 357 and/or in packet 320), if/when at least one NAV was (previously) set by a frame originating from an AP (e.g., AP 110) from which the ULTR (e.g., in DL communication(s) 356, 357 and/or in packet 320) is transmitted, an STA (e.g., STA(s) 120, 150) may transmit a frame, packet, and/or data unit (e.g., UL communication(s) 362, 363) without considering at least one NAV. In some aspects, an STA (e.g., STA(s) 120, 150) may refrain from considering a NAV when at least one NAV was most recently set by an apparatus (e.g., AP 110) that transmitted the ULTR (e.g., in DL communication(s) 356, 357 and/or in packet 320). For example, referring to FIG. 3, in response to receiving an ULTR (e.g., in DL communication(s) 356, 357 and/or in packet 320) from AP 110, STA(s) 120, 150 may consider a NAV unless at least one NAV was most recently set by a frame originating from AP 110. In some aspects, an STA (e.g., STA(s) 120150) may refrain from considering a NAV when an identifier of the apparatus that most recently set at least one NAV 150 is the same as an identifier of the apparatus (e.g., AP 110, STA(s) 150) that transmitted the ULTR (e.g., in DL communication(s) 356, 357 and/or in packet 320). If such an apparatus (e.g., AP 110, STA(s) 150) had most recently set at least one NAV of STA(s) 120150, then 150 may already be configured with parameters and settings that are relatively less likely to result in interfering communications. Accordingly, refraining from considering the NAV in such circumstances can conserve time, power, and computational resources.

In some aspects, STA(s) 120, or its PR(s) 222 and/or SR(s) 224, 150 may receive a frame (e.g., included in a transmission 130) from another STA(s) 150, or its PR(s) 232 and/or SR(s) 234, 150 and use that frame to set a NAV of the STA(s) 120, or its PR(s) 222 and/or SR(s) 224. In some aspects, STA(s) 120, or its PR(s) 222 and/or SR(s) 224, 150 may refrain from considering a NAV 150 in response to receiving the ULTR (e.g., DL communication(s) 356, 357 from AP 110) when an identifier (e.g., a BSS identifier (BSSID), a MAC address, etc.) of the BSS with which the STA(s) 120, or its PR(s) 222 and/or SR(s) 224, 150 is associated corresponds to the BSSID of the BSS with which the other STA(s) 150, or its PR(s) 232 and/or SR(s) 234, 150 is associated. In some aspects, the STA(s) 120, or its PR(s) 222 and/or SR(s) 224,150 may refrain from considering a NAV 150 in response to receiving the ULTR (e.g., DL communication(s) 356, 357 from AP 110) when the STA(s) 120, or its PR(s) 222 and/or SR(s) 224,150 is in the same BSS as the other STA(s) 150, or its PR(s) 232 and/or SR(s) 234150. When the BSSIDs of the STA(s) 120, 150, or its PR(s) 222, 232 and/or SR(s) 224, 234 are associated with each other and/or when the STA(s) 120, 150, or its PR(s) 222, 232 and/or SR(s) 224, 234 are in the same BSS, the communications of the STA(s) 120, 150, or its PR(s) 222, 232 and/or SR(s) 224, 234 150 may be centrally managed and/or the likelihood of interference may be relatively low. Accordingly, refraining from considering a NAV in such circumstances can conserve time, power, and computational resources.

In some aspects, in response to receiving the ULTR (e.g., in DL communication(s) 356, 357 and/or in packet 320), if/when the UL response (e.g., UL communication(s) 362, 363) to the ULTR (e.g., in DL communication(s) 356, 357 and/or in packet 320) comprises an acknowledgement message having less than a threshold duration, STA(s) 120, 150, or its PR(s) 222, 232 and/or SR(s) 224, 234 150150 may transmit a frame (e.g., UL communication(s) 362, 363) without considering a NAV. For example, referring to FIG. 3, in response to receiving DL communication(s) 356, 357 (e.g., ULTR) at time $T_{14}$, the STA(s) 120, 150, or its PR(s) 222, 232 and/or SR(s) 224, 234150, at time $T_{15}$, may refrain from considering a NAV when the UL communication(s) 362, 363, at time $T_{17}$, includes an acknowledgement message having a duration less than a threshold value. For relatively short transmissions that communicate acknowledgement information, the time, power, and computational resources utilized for considering the NAV (e.g., of STA(s) 120, 150) may not be warranted.

In some aspects, STA(s) 120, 150 may determine whether to update a NAV by using varying detection thresholds based on whether a received ULTR (e.g., in DL communication(s) 356, 357 and/or in packet 320), signal, frame and/or data unit is communicated from a same BSS. In some aspects, STA(s) 120, 150 may refrain from updating one or more parameters of the NAV if (i) a received ULTR (e.g., in DL communication(s) 356, 357 and/or in packet 320), signal, frame, and/or data unit is transmitted from an apparatus (e.g., $AP_2$ 142, $STA_3$ 144, $STA_5$ 146) associated with a BSS different from a BSS with which the STA(s) 120, 150 is associated and/or (ii) a strength of the received ULTR (e.g., in DL communication(s) 356, 357 and/or in packet 320), signal, frame, and/or data unit is less than a first detection threshold value. The first detection threshold value may be greater than a second detection threshold value used if the received ULTR (e.g., in DL communication(s) 356, 357 and/or in packet 320), signal, frame, and/or data unit is not transmitted by the apparatus (e.g., $AP_2$ 142, $STA_3$ 144, $STA_5$ 146) associated with the BSS that is different from the BSS with which the STA(s) 120, 150 is associated (e.g., if the received ULTR, signal, frame, and/or data unit is transmitted by an apparatus (e.g., AP 110, STA(s) 150, $STA_4$ 118) associated with the same BSS as the STA (e.g., STA(s) 120, 150)). In such aspects, a relatively higher detection threshold is used when the received ULTR (e.g., in DL communication(s) 356, 357 and/or in packet 320), signal, frame, and/or data unit is transmitted from an apparatus in a different BSS, and a relatively lower detection threshold is used when the received ULTR (e.g., in DL communication(s) 356, 357 and/or in packet 320), signal, frame, and/or data unit is transmitted from an apparatus (e.g., STA or AP) in the same BSS. By doing so, communications between apparatuses in the same BSS have a relatively higher likelihood of updating a NAV, and communications between apparatuses in different BSSs have a relatively lower likelihood of updating a NAV.

In some aspects, an STA (e.g., STA(s) 120, 150) may receive a frame from an apparatus (e.g., another STA or an AP), and the frame may include information indicating a duration of time used for updating a NAV of that STA (e.g., STA(s) 120, 150). Depending on a difference between the received information indicating the duration of time used for updating the NAV and an existing duration of time of the NAV, the STA (e.g., STA(s) 120, 150) may override the existing duration of time of the NAV with the received information indicating the duration of time used for updating the NAV. The aforementioned difference may be (i) a positive value when the duration indicated in the received frame is greater than an existing duration, or (ii) a negative value when the duration indicated in the received frame is lesser than the existing duration. When the difference is a positive value, the STA (e.g., STA(s) 120, 150) may override the existing duration with the duration indicated in the received frame.

In some aspects, an STA (e.g., STA(s) 120, 150) may have more than just one NAV. In some aspects, an STA (e.g., STA(s) 120, 150) may maintain a plurality of NAVs, each configured for a particular purpose. In some aspects, an STA (STA(s) 120, 150) may maintain a plurality of NAVs configured to regulate whether the STA accesses a wireless medium during a period of time. The plurality of NAVs may include a first NAV adapted for frames originating from an apparatus (e.g., AP 110, STA(s) 150, $STA_4$ 118) in a BSS with which the STA (e.g., STA(s) 120, 150) is associated, and a second NAV adapted for frames originating from an apparatus (e.g., $AP_2$ 142, $STA_5$ 146, $STA_3$ 144) in a BSS with which the STA (e.g., STA(s) 120, 150) is not associated. By using a plurality of NAVs, the STA (e.g., STA(s) 120, 150) can track the time durations and resources being utilized by not only apparatuses in its current BSS but also time durations and resources being utilized by other apparatuses in one or more overlapping BSSs, thereby enabling the STA (e.g., STA(s) 120, 150) to better manage potential interference, contention, and/or channel access.

In some aspects, an STA (e.g., STA(s) 120, 150) may update each of at least two of the plurality of NAVs based on various criteria without necessarily deviating from the scope of the present disclosure. In some aspects, an STA (e.g., STA(s) 120, 150) may receive a frame from an apparatus (e.g., another STA or an AP), and the frame may be configured to update one of a plurality of NAVs of the STA (e.g., STA(s) 120, 150). If a BSSID of the BSS with which the STA (e.g., STA(s) 120, 150) is associated corresponds to a BSSID of a BSS with which the apparatus (e.g., STA(s) 150, AP 110, $STA_4$ 118) is associated, then an STA (e.g., STA(s) 120, 150) may update a first NAV (of a plurality of NAVs), wherein the first NAV is configured for frames communicated within a BSS with which the STA (e.g., STA(s) 120, 150) is associated. If the BSSID of the BSS with which the STA (e.g., STA(s) 120, 150) is associated does not corresponds to a BSSID of the BSS with which the apparatus (e.g., $AP_2$ 142, $STA_3$ 144, $STA_5$ 146) is associated, then an STA (e.g., STA(s) 120, 150) may update a second NAV (of a plurality of NAVs), wherein the second NAV is configured for frames communicated outside of the BSS with which the STA (e.g., STA(s) 120, 150) is associated.

In some aspects, an STA (e.g., STA(s) 120, 150) may determine whether to perform carrier sensing prior to initiating an UL transmission (e.g., UL communication(s) 362, 363) in response to receiving the ULTR (e.g., in DL communication(s) 356, 357 and/or in packet 320). Carrier sensing may include signal detection and/or NAV(s) evaluation. Carrier sensing may occur during a time period that begins at/after receiving the ULTR (e.g., at/after time $T_{14}$) and ends at/before transmission of the UL transmission(s) (e.g., UL communication(s) 362, 363) (e.g., at/before time $T_{17}$). In some aspects, determining whether to perform carrier sensing depends on whether the ULTR (e.g., in DL communication(s) 356, 357 and/or in packet 320) includes information indicating whether to perform the carrier sensing prior to the initiating the UL transmission(s) (e.g., UL communication(s) 362, 363) in response to receiving the ULTR (e.g., in DL communication(s) 356, 357 and/or in packet 320).

As described above, in some aspects, the ULTR (e.g., in DL communication(s) 356, 357 and/or in packet 320) may include an indication indicating whether an STA (e.g., STA(s) 120, 150) is to perform carrier sensing prior to initiating UL transmission(s) (e.g., UL communication(s) 362, 363). When/If the indication in the ULTR (e.g., in DL communication(s) 356, 357 and/or in packet 320) indicates no requirement to perform carrier sensing prior to the UL transmission(s) (e.g., UL communication(s) 362, 363) in response to the ULTR (e.g., in DL communication(s) 356, 357 and/or in packet 320), then the STA(s) 120, 150 may refrain from performing carrier sensing (for at least a subchannel allocated to the UL communication(s) 362, 363). When/If the indication in the ULTR (e.g., in DL communication(s) 356, 357 and/or in packet 320) indicates a requirement to perform carrier sensing prior to the UL communication(s) 362, 363 in response to the ULTR (e.g., in DL communication(s) 356, 357 and/or in packet 320), then the STA(s) 120, 150 may perform carrier sensing (for at least the subchannel allocated to the UL communication(s) 362, 363).

In some systems, the UL transmission(s) from the STA(s) 120, 150, or its PR(s) 222, 232 and/or SR(s) 224, 234, is initiated by the AP 110 (e.g., rather than STA(s) 120, 150). As a result, when the AP 110 sends the ULTR (e.g., in DL communication(s) 356, 357 and/or in packet 320), the STA(s) 120, 150 may intend/wish to immediately begin transmission of the UL communication(s) 362, 363. That is, in some systems, the STA(s) 120, 150 may not always necessarily consider the duration of other transmissions on a particular channel (e.g., as indicated by the NAV) before that/those immediate UL transmission(s) and, thus, may initiate UL transmission(s) without considering other protected transmissions on that particular channel, thereby likely disrupting those other transmissions and/or possibly colliding with and thus failing with its own UL transmission(s). In some configurations, an ULTR (e.g., in DL communication(s) 356, 357 and/or in packet 320) may poll the STA(s) 120, 150 for UL multi-user transmissions. STA(s) 120, 150 that is polled from an ULTR (e.g., in DL communication(s) 356, 357 and/or in packet 320) for UL multi-user transmissions (e.g., (e.g., UL communication(s) 362, 363) considers at least one NAV to determine whether to respond to the ULTR (e.g., in DL communication(s) 356, 357 and/or in packet 320). In some configurations, the STA(s) 120, 150 may refrain from responding to the poll if the NAV was set by a frame/packet originating from the AP 110 that sent/transmitted the ULTR (e.g., in DL communication(s) 356, 357 and/or in packet 320). In some configurations, the STA(s) 120, 150 may refrain from responding to the poll if the response to the ULTR (e.g., in DL communication(s) 356, 357 and/or in packet 320) includes an ACK/NACK/BA and the duration of the UL multi-user transmission (e.g., UL communication(s) 362, 363) is less than a threshold duration.

In some configurations, an apparatus (e.g., STA(s) 120, 150) may, in response to receiving an ULTR (e.g., in DL communication(s) 356, 357 and/or in packet 320), consider the NAV and/or a duration (of other transmissions) indicated in the NAV to determine when/whether to respond to the ULTR (e.g., in DL communication(s) 356, 357 and/or in packet 320). In some configurations, such an apparatus (e.g., STA(s) 120, 150) may refrain from responding to an ULTR (e.g., in DL communication(s) 356, 357 and/or in packet 320) until after considering the NAV and/or a duration (of other transmissions) indicated in the NAV. In some configurations, such an apparatus (e.g., STA(s) 120, 150) may, in response to receiving an ULTR (e.g., in DL communication(s) 356, 357 and/or in packet 320), transmit a frame/packet without considering the NAV and/or a duration (of other transmissions) indicated in the NAV when the NAV and/or the duration (of other transmissions) indicated in the NAV was/is set by a frame/packet/data originating from an apparatus (e.g., AP 110) from which the ULTR (e.g., in DL communication(s) 356, 357 and/or in packet 320) was sent/transmitted. In some configurations, such an apparatus (e.g., STA(s) 120, 150) may, in response to receiving an ULTR (e.g., in DL communication(s) 356, 357 and/or in packet 320), transmit a frame without considering the NAV and/or a duration (of other transmissions) indicated in the NAV when response(s) (e.g., UL communication(s) 362, 363) to the ULTR (e.g., in DL communication(s) 356, 357 and/or in packet 320) comprises an ACK/NACK/BA and/or a duration of the UL multi-user transmission(s) (e.g., UL communication(s) 362, 363) is below a threshold value/duration/time/amount.

In some systems, an apparatus (e.g., AP 110) may send a message configured to and/or comprising information for early termination of a transmission interval and/or TXOP. This message may sometimes be referred to as a contention free end message/signal and/or any other suitable message/signal. In some circumstances, an apparatus (e.g., STA(s) 120, 150, or its PR(s) 222, 232 and/or SR(s) 224, 234) may be within the communication range of two (or more) other apparatuses (e.g., APs). Either (or both) of those apparatuses (e.g., APs) may send a ULTR (e.g., in DL communication(s) 356, 357 and/or in packet 320). In some configurations, the ULTR (e.g., in DL communication(s) 356, 357 and/or in packet 320) may include information for setting a duration of time to protect a communication channel by preventing/inhibiting other communications for that duration of time on that communication channel. For example, the ULTR (e.g., in DL communication(s) 356, 357 and/or in packet 320) may include information for and/or may be configured to set one or more parameters/settings of a NAV. Also, either (or both) of those apparatuses (e.g., APs) may send the aforementioned message (e.g., the contention free message/signal) for early termination of the transmission interval and/or TXOP. For instance, if STA(s) 120, 150, or its PR(s) 222, 232 and/or SR(s) 224, 234, receives such a message from AP 110 before the end of the transmission interval and/or TXOP that is protected by the NAV as set by another AP, then STA(s) 120, 150, or its PR(s) 222, 232 and/or SR(s) 224, 234, would be free to perform transmissions earlier than it should (based on the settings/parameters set for the NAV), thereby increasing the likelihood of collisions with transmissions with other STAs and/or other APs.

In some configurations, when an apparatus (e.g., STA(s) 120, 150, or its PR(s) 222, 232 and/or SR(s) 224, 234) receives a particular message/signal (e.g., contention free end message/signal) an overlapping BSS apparatus (e.g., AP 110), that apparatus (e.g., STA(s) 120, 150, or its PR(s) 222, 232 and/or SR(s) 224, 234) will not adjust, change, reset, modify, and/or adjust one or more parameters/settings corresponding to a preceding/most-recent/last NAV update, which may have been caused by an apparatus (e.g., AP 110) with which it was assigned/associated (e.g., an inter-BSS AP/apparatus). In some configurations, an apparatus (e.g., STA(s) 120, 150, or its PR(s) 222, 232 and/or SR(s) 224, 234) may receive an ULTR (e.g., in DL communication(s) 356, 357 and/or in packet 320) from a first other apparatus (e.g., first AP), wherein the ULTR (e.g., in DL communication(s) 356, 357 and/or in packet 320) may be configured to set and/or comprises information for setting one or more parameters/settings of the NAV. In some configurations, an apparatus (e.g., STA(s) 120, 150, or its PR(s) 222, 232 and/or SR(s) 224, 234) may receive a message (e.g., contention free end message/signal) configured to and/or comprising information for ending a transmission interval and/or TXOP. In some configurations, an apparatus (e.g., STA(s) 120, 150, or its PR(s) 222, 232 and/or SR(s) 224, 234) may determine whether the message is received from a second other apparatus (e.g., second AP) is different from the first other apparatus (e.g., first AP). In some configurations, an apparatus (e.g., STA(s) 120, 150, or its PR(s) 222, 232 and/or SR(s) 224, 234) may, if/when the second other apparatus (e.g., other AP) is the same as the first other apparatus (e.g., first AP), modify/adjust/change/update/reset the one or more parameters or settings of the NAV (e.g., based on a time at which the aforementioned message is received) (e.g., based on information included in the message). In some configurations, an apparatus (e.g., STA(s) 120, 150, or its PR(s) 222, 232 and/or SR(s) 224, 234) may, if/when the second other apparatus (e.g., second AP) is different from the first other apparatus (e.g., first AP), modify/adjust/change/update/reset the one or more parameters or settings of the NAV (e.g., based on a time at which the message is received) (e.g., based on information included in the message).

In some circumstances, when an apparatus (e.g., STA(s) 120, 150, or its PR(s) 222, 232 and/or SR(s) 224, 234) receives a particular PPDU with/at a power, signal strength, and/or received signal strength indicator (RSSI) below an a particular threshold level, that apparatus (e.g., STA(s) 120, 150, or its PR(s) 222, 232 and/or SR(s) 224, 234) may not update its NAV. In some configurations, an apparatus (e.g., STA(s) 120, 150, or its PR(s) 222, 232 and/or SR(s) 224, 234) may determine the BSS to which that apparatus (e.g., STA(s) 120, 150, or its PR(s) 222, 232 and/or SR(s) 224, 234) is assigned/associated. In some configurations, the apparatus (e.g., STA(s) 120, 150, or its PR(s) 222, 232 and/or SR(s) 224, 234) may determine whether a received signal (e.g., PPDU) originates from and/or is transmitted by an apparatus (e.g., AP 110) assigned/associated with another BSS (e.g., an overlapping BSS) (e.g., a BSS that is different from the BSS to which the apparatus (e.g., STA) is assigned/associated. In some configurations, the apparatus (e.g., STA(s) 120, 150, or its PR(s) 222, 232 and/or SR(s) 224, 234) may determine a signal strength (e.g., RSSI) of the received signal. In some configurations, the apparatus (e.g., STA(s) 120, 150, or its PR(s) 222, 232 and/or SR(s) 224, 234) may, if the received signal originates from/is transmitted by an apparatus (e.g., AP 110) assigned/associated with another BSS (e.g., overlapping basis service set) and the signal strength is less than a first threshold value/amount (e.g., a first predetermined/dynamically-adjusted/fixed/stored threshold value/amount) (e.g., a first preamble detect threshold level/amount) associated with signals originating from and/or transmitted by apparatuses (e.g., APs) assigned/associated with the another BSS, disregard/ignore/refrain from processing the received signal and/or refrain from updating/resetting/adjusting/modifying/changing one or more parameters/settings of the NAV. In some configurations, the apparatus (e.g., STA(s) 120, 150, or its PR(s) 222, 232 and/or SR(s) 224, 234) may, if the received signal originates from and/or is not transmitted by the apparatus (e.g., AP 110) assigned/associated with another BSS (e.g., an overlapping BSS) and the signal strength is equal to and/or greater than a second threshold value/amount (e.g., a second predetermined/dynamically-adjusted/fixed/stored threshold value/amount) (e.g., a second preamble detect threshold level/amount), then consider/process the received signal and/or update/reset/adjust/modify/change one or more parameters and/or settings of the NAV, wherein the second threshold has a value lower than the first threshold.

In some configurations, an apparatus (e.g., STA(s) 120, 150, or its PR(s) 222, 232 and/or SR(s) 224, 234) may receive a signal (e.g., PPDU) originating from and/or transmitted by an apparatus (e.g., AP 110) assigned/associated with a BSS different from the BSS to which the that apparatus (e.g., STA(s) 120, 150, or its PR(s) 222, 232 and/or SR(s) 224, 234) is assigned/associated. In some configurations, the apparatus (e.g., STA(s) 120, 150, or its PR(s) 222, 232 and/or SR(s) 224, 234) may determine whether to consider/process the received signal and/or update/reset/adjust/modify/change one or more parameters/settings of the NAV based on a signal strength (e.g., RSSI) of the received signal. In some configurations, the apparatus (e.g., STA(s) 120, 150, or its PR(s) 222, 232 and/or SR(s) 224, 234) may receive a signal (e.g., PPDU) originating from and/or transmitted by an apparatus (e.g., AP 110) assigned/associated with a BSS different from the BSS to which the STA(s) 120, 150, or its PR(s) 222, 232 and/or SR(s) 224, 234 is assigned/associated. In some configurations, the apparatus (e.g., STA(s) 120, 150, or its PR(s) 222, 232 and/or SR(s) 224, 234) may refrain from considering/ processing the received signal and/or updating/resetting/ adjusting/modifying/changing one or more parameters/settings of the NAV when a signal strength (e.g., RSSI) of the received signal is less than a first threshold value/amount (e.g., a first predetermined/dynamically-adjusted/fixed/ stored threshold value/amount) (e.g., a preamble detect threshold level/amount) that is greater than a second threshold value/amount (e.g., a second predetermined/dynamically-adjusted/fixed/stored threshold value/amount) (e.g., a second preamble detect threshold level/amount) associated with and/or corresponding to signals received from an apparatus (e.g., AP 110) assigned/associated with the BSS to which the apparatus (e.g., STA(s) 120, 150, or its PR(s) 222, 232 and/or SR(s) 224, 234) is associated/assigned. In some configurations, the apparatus (e.g., STA(s) 120, 150, or its PR(s) 222, 232 and/or SR(s) 224, 234) may refrain from using the medium for communication for a period of time that is at least as long as a duration or length corresponding to the received signal (e.g., PPDU).

In some configurations, an apparatus (e.g., STA) may consider at least one NAV prior to initiating/performing any transmission. If at least one NAV has been set such that no transmission is allowed at a particular time, then that (e.g., STA(s) 120, 150, or its PR(s) 222, 232 and/or SR(s) 224, 234) may refrain from transmitting any signals at that time. For example, when an apparatus (e.g., STA(s) 120, 150, or its PR(s) 222, 232 and/or SR(s) 224, 234) receives an ULTR (e.g., in DL communication(s) 356, 357 and/or in packet 320), the apparatus (e.g., STA(s) 120, 150, or its PR(s) 222, 232 and/or SR(s) 224, 234) may consider at least one NAV to determine whether to transmit an UL signal/transmission. However, in some circumstances, the apparatus (e.g., STA(s) 120, 150, or its PR(s) 222, 232 and/or SR(s) 224, 234) may not need to always consider at least one NAV. Considering at least one NAV settings may cause unnecessary processing time, power consumption, and/or complexity. In some configurations, an apparatus (e.g., STA(s) 120, 150, or its PR(s) 222, 232 and/or SR(s) 224, 234) that is polled from an ULTR (e.g., in DL communication(s) 356, 357 and/or in packet 320) for UL MU transmission may consider at least one NAV in determining whether to respond unless one or more conditions exists and/or are met. An example of such a condition may be that at least one NAV was set by a frame originating from the AP sending the ULTR (e.g., in DL communication(s) 356, 357 and/or in packet 320). Another example of such a condition may be that the response (e.g., to the ULTR) contains an ACK and/or BA and the duration of the UL MU transmission may be below a predetermined threshold. Yet another example of such a condition is that at least one NAV was set by a frame originating from an intra-BSS STAs.

In some configurations, the apparatus (e.g., STA(s) 120, 150, or its PR(s) 222, 232 and/or SR(s) 224, 234) may receive a ULTR (e.g., in DL communication(s) 356, 357 and/or in packet 320) from another apparatus (e.g., AP 110, another STA). In some configurations, the apparatus (e.g., STA(s) 120, 150, or its PR(s) 222, 232 and/or SR(s) 224, 234) may determine whether the ULTR (e.g., in DL communication(s) 356, 357 and/or in packet 320) is destined to/intended for the apparatus (e.g., STA(s) 120, 150, or its PR(s) 222, 232 and/or SR(s) 224, 234). In some configurations, the apparatus (e.g., STA(s) 120, 150, or its PR(s) 222, 232 and/or SR(s) 224, 234) may determine an identity/identifier/type of apparatus that transmitted the ULTR (e.g., in DL communication(s) 356, 357 and/or in packet 320). In some configurations, the apparatus (e.g., STA(s) 120, 150, or its PR(s) 222, 232 and/or SR(s) 224, 234) may determine the identify/identifier/type of the apparatus (e.g., AP 110, another STA) that (most recently) set at least one NAV of the apparatus (e.g., STA(s) 120, 150, or its PR(s) 222, 232 and/or SR(s) 224, 234). In some configurations, the apparatus (e.g., STA(s) 120, 150, or its PR(s) 222, 232 and/or SR(s) 224, 234) may compare the identity/identifier/type of the apparatus (e.g., AP 110, another STA) that transmitted the ULTR (e.g., in DL communication(s) 356, 357 and/or in packet 320) with identity/identifier/type of the apparatus (e.g., AP 110, another STA) that (most recently) set at least one NAV of the apparatus (e.g., STA(s) 120, 150, or its PR(s) 222, 232 and/or SR(s) 224, 234). In some configurations, the apparatus (e.g., STA(s) 120, 150, or its PR(s) 222, 232 and/or SR(s) 224, 234) may determine whether to respond to the ULTR (e.g., UL communication(s) 362, 363 by considering whether at least one NAV of the apparatus (e.g., STA) was (most recently) set/adjusted/updated by the apparatus (e.g., AP, another STA) that transmitted the ULTR (e.g., UL communication(s) 362, 363. In some configurations, the apparatus (e.g., STA(s) 120, 150, or its PR(s) 222, 232 and/or SR(s) 224, 234) may determine whether to consider at least one NAV. In some configurations, the apparatus (e.g., STA(s) 120, 150, or its PR(s) 222, 232 and/or SR(s) 224, 234) may determine whether to consider at least one NAV based on the aforementioned comparison. In some configurations, the apparatus (e.g., STA(s) 120, 150, or its PR(s) 222, 232 and/or SR(s) 224, 234) may refrain from considering at least one NAV (in determining whether to respond to the ULTR (e.g., UL communication(s) 362, 363) when the identity/identifier of the apparatus (e.g., AP 110, another STA) that (most recently) set/adjusted/updated at least one NAV is the same as the identity/identifier of the apparatus (e.g., AP 110, another STA) that transmitted the ULTR (e.g., UL communication(s) 362, 363. In some configurations, the apparatus (e.g., STA(s) 120, 150, or its PR(s) 222, 232 and/or SR(s) 224, 234) may consider at least one NAV (in determining whether to respond to the ULTR (e.g., UL communication(s) 362, 363) when the identity/identifier of the apparatus (e.g., AP 110, another STA) that (most recently) set/adjusted/updated at least one NAV is different from the identity/identifier of the apparatus (e.g., AP 110, another STA) that transmitted the ULTR (e.g., UL communication(s) 362, 363. In some configurations, the apparatus (e.g., STA(s) 120, 150, or its PR(s) 222, 232 and/or SR(s) 224, 234) may refrain from considering at least one NAV (in determining whether to respond to the ULTR (e.g., UL communication(s) 362, 363) when at least one NAV (e.g., of the STA) was (most recently) set/adjusted/updated by the apparatus (e.g., AP 110, another STA) that transmitted the ULTR (e.g., UL communication(s) 362, 363. In some configurations, the apparatus (e.g., STA(s) 120, 150, or its PR(s) 222, 232 and/or SR(s) 224, 234) may consider at least one NAV (in determining whether to respond to the ULTR (e.g., UL communication(s) 362, 363) when at least one NAV (e.g., of the STA) was (most recently) not set/adjusted/ updated by the apparatus (e.g., AP 110, another STA) that transmitted the ULTR (e.g., UL communication(s) 362, 363. The determining whether to consider at least one NAV may be performed while/prior to/after determining whether to respond to the ULTR (e.g., in DL communication(s) 356, 357 and/or in packet 320).

In some configurations, a first STA (e.g., STA(s) 120, or its PR(s) 222 and/or SR(s) 224) may receive a frame from a second STA (e.g., STA(s) 150, or its PR(s) 232 and/or SR(s) 234). In some configurations, the frame is an UL transmission. In some configurations, the frame is intended/ destined for/to an apparatus (e.g., AP 110, another STA)

other than the first STA (e.g., STA(s) 120, or its PR(s) 222 and/or SR(s) 224). In some configurations, the frame is configured to set/update/adjust settings of at least one NAV of the first STA (e.g., STA(s) 120, or its PR(s) 222 and/or SR(s) 224). In some configurations, the frame includes information that indicates a duration of a transmission or a TXOP of the (current) frame. In some configurations, the first STA (e.g., STA(s) 120, or its PR(s) 222 and/or SR(s) 224) may use the frame and/or information included in the frame to set/adjust/update at least one NAV of the first STA (e.g., STA(s) 120, or its PR(s) 222 and/or SR(s) 224). In some configurations, the first STA (e.g., STA(s) 120, or its PR(s) 222 and/or SR(s) 224) may determine whether the second STA (e.g., STA(s) 150, or its PR(s) 232 and/or SR(s) 234) is in a same BSS as the first STA (e.g., STA(s) 120, or its PR(s) 222 and/or SR(s) 224). In some configurations, the first STA (e.g., STA(s) 120, or its PR(s) 222 and/or SR(s) 224) may determine whether the BSSID of the BSS with which the first STA (e.g., STA(s) 120, or its PR(s) 222 and/or SR(s) 224) is associated is the same as/matches/corresponds to the BSSID of the BSS with which the second STA (e.g., STA(s) 150, or its PR(s) 232 and/or SR(s) 234) is associated. In some configurations, the first STA (e.g., STA(s) 120, or its PR(s) 222 and/or SR(s) 224) may compare the BSSID of the BSS with which the first STA (e.g., STA(s) 120, or its PR(s) 222 and/or SR(s) 224) is associated with the BSSID with which the second STA (e.g., STA(s) 150, or its PR(s) 232 and/or SR(s) 234) is associated to determine whether the first STA (e.g., STA(s) 120, or its PR(s) 222 and/or SR(s) 224) is in a same BSS as the second STA (e.g., STA(s) 150, or its PR(s) 232 and/or SR(s) 234). In some configurations, the first STA (e.g., STA(s) 120, or its PR(s) 222 and/or SR(s) 224) may receive a ULTR (e.g., in DL communication(s) 356, 357 and/or in packet 320) from another apparatus (e.g., AP 110, another STA) that is different from the first and second STAs. In some configurations, the first STA (e.g., STA(s) 120, or its PR(s) 222 and/or SR(s) 224) may determine whether to respond to the ULTR (e.g., in DL communication(s) 356, 357 and/or in packet 320) received from the other apparatus (e.g., AP, another STA) by considering whether at least one NAV of the first STA was (most recently) set/adjusted/updated by the second STA (e.g., STA(s) 120, or its PR(s) 222 and/or SR(s) 224). In some configurations, the first STA (e.g., STA(s) 120, or its PR(s) 222 and/or SR(s) 224) may refrain from considering at least one NAV (in determining whether to respond to the ULTR frame) when the second STA (e.g., STA(s) 120, or its PR(s) 222 and/or SR(s) 224) is in a same BSS as the first STA (e.g., STA(s) 120, or its PR(s) 222 and/or SR(s) 224). In some configurations, the first STA (e.g., STA(s) 120, or its PR(s) 222 and/or SR(s) 224) may consider at least one NAV (in determining whether to respond to the ULTR frame) when the second STA (e.g., STA(s) 120, or its PR(s) 222 and/or SR(s) 224) is in a different BSS as the first STA (e.g., STA(s) 120, or its PR(s) 222 and/or SR(s) 224). In some configurations, the first STA (e.g., STA(s) 120, or its PR(s) 222 and/or SR(s) 224) may refrain from considering at least one NAV (in determining whether to respond to the ULTR frame) when the BSSID of the BSS with which the first STA (e.g., STA(s) 120, or its PR(s) 222 and/or SR(s) 224) is associated is the same as/matches/corresponds to the BSSID of the BSS with which the second STA (e.g., STA(s) 120, or its PR(s) 222 and/or SR(s) 224) is associated. In some configurations, the first STA (e.g., STA(s) 120, or its PR(s) 222 and/or SR(s) 224) may consider at least one NAV (in determining whether to respond to the ULTR frame) when the BSSID of the BSS with which the first STA (e.g., STA(s) 120, or its PR(s) 222 and/or SR(s) 224) is associated is different from/unmatched with/uncorrelated with/does not correspond to the BSSID of the BSS with which the second STA (e.g., STA(s) 120, or its PR(s) 222 and/or SR(s) 224) is associated. In some configurations, the first STA (e.g., STA(s) 120, or its PR(s) 222 and/or SR(s) 224) may refrain from considering at least one NAV (in determining whether to transmit a signal) when the signal/frame/packet is an ACK or BA. In some configurations, the first STA (e.g., STA(s) 120, or its PR(s) 222 and/or SR(s) 224) may consider at least one NAV (in determining whether to transmit a signal/frame/packet) when the signal is not an ACK or BA.

In some configurations, an apparatus (e.g., STA) may utilize/implement a NAV to regulate whether it accesses a wireless medium during various times. In some circumstances, that apparatus (e.g., STA(s) 120, 150, or its PR(s) 222, 232 and/or SR(s) 224, 234) may receive information for setting/adjusting/resetting at least one NAV in frames originating from within its BSS (e.g., intra-BSS) (e.g., a BSS with which it is not associated) and information for setting/adjusting/resetting at least one NAV in frames originating from outside of its BSS (e.g., inter-BSS) (e.g., a BSS with which it is not associated). In some circumstances, it may not be ideal to have a single NAV because at least some of the aforementioned information may be/become ignored/disregarded/unused. In some configurations, an apparatus (e.g., STA(s) 120, 150, or its PR(s) 222, 232 and/or SR(s) 224, 234) maintains a plurality (e.g., two or more) NAVs. One NAV may be adapted for intra-BSS frames and another NAV may be adapted for inter-BSS frames. Frames that cannot be conclusively classified/characterized as intra-BSS frames nor inter-BSS frames may be paired with either of these NAVs.

In some configurations, an apparatus (e.g., STA(s) 120, 150, or its PR(s) 222, 232 and/or SR(s) 224, 234) may receive a frame (e.g., ULTR frame, MU UL frame, etc.) that is configured to set/updated/adjust at least one NAV of the apparatus (e.g., STA(s) 120, 150, or its PR(s) 222, 232 and/or SR(s) 224, 234), and/or includes information indicating a setting, duration of time or TXOP that is associated with/can be used to set/update/adjust at least one NAV of the apparatus (e.g., STA(s) 120, 150, or its PR(s) 222, 232 and/or SR(s) 224, 234). In some configurations, the apparatus (e.g., STA(s) 120, 150, or its PR(s) 222, 232 and/or SR(s) 224, 234) may determine whether the received frame originates from another apparatus (e.g., AP 110, another STA) that is associated with a BSS with which the apparatus (e.g., STA(s) 120, 150, or its PR(s) 222, 232 and/or SR(s) 224, 234) is associated. In some configurations, the apparatus (e.g., STA(s) 120, 150, or its PR(s) 222, 232 and/or SR(s) 224, 234) may determine whether that other apparatus (e.g., AP 110, another STA) is in a same BSS as the apparatus (e.g., STA(s) 120, 150, or its PR(s) 222, 232 and/or SR(s) 224, 234). In some configurations, the apparatus (e.g., STA(s) 120, 150, or its PR(s) 222, 232 and/or SR(s) 224, 234) may determine whether an identifier (e.g., BSSID, BSS type, BSS category, BSS color) of a BSS with which the apparatus (e.g., STA(s) 120, 150, or its PR(s) 222, 232 and/or SR(s) 224, 234) is associated is the same as/matches/corresponds to an identifier (e.g., BSSID, BSS type, BSS category, BSS color) of a BSS with which the other apparatus (e.g., AP 110, another STA) is associated. In some configurations, the apparatus (e.g., STA(s) 120, 150, or its PR(s) 222, 232 and/or SR(s) 224, 234) may compare an identifier (e.g., BSSID, BSS type, BSS category, BSS color) of a BSS with which the apparatus (e.g., STA(s) 120, 150, or its PR(s) 222, 232 and/or SR(s) 224, 234) is associated with an identifier (e.g., BSSID, BSS type, BSS category, BSS color) of a BSS that the other apparatus (e.g., AP 110, another STA) is associated to determine whether the apparatus (e.g., STA(s) 120, 150, or its PR(s) 222, 232 and/or SR(s) 224, 234) is in a same BSS as that of the other apparatus (e.g., AP 110, another STA). In some configurations, the apparatus (e.g., STA(s) 120, 150, or its PR(s) 222, 232 and/or SR(s) 224, 234) may, based on such a comparison and/or determination, select one of a plurality of NAVs of the apparatus (e.g., STA(s) 120, 150, or its PR(s) 222, 232 and/or SR(s) 224, 234) to set/adjust/update (e.g., according to the included information described above). In some configurations, the apparatus (e.g., STA(s) 120, 150, or its PR(s) 222, 232 and/or SR(s) 224, 234) may determine that the BSS with which the other apparatus (e.g., AP 110, another STA(s) 120, 150, or its PR(s) 222, 232 and/or SR(s) 224, 234) is associated is not the same as/does not match/does not correspond/is uncorrelated with the BSS with which the apparatus (e.g., STA(s) 120, 150, or its PR(s) 222, 232 and/or SR(s) 224, 234) is associated when the identifier (e.g., BSSID, BSS type, BSS category, BSS color) of the BSS with which the apparatus (e.g., STA(s) 120, 150, or its PR(s) 222, 232 and/or SR(s) 224, 234) is associated is not the same as/does not match/does not correspond/is uncorrelated with an identifier (e.g., BSSID, BSS type, BSS category, BSS color) of a BSS with which the that other apparatus (e.g., AP 110, another STA) is associated.

In some configurations, an apparatus (e.g., STA(s) 120, 150, or its PR(s) 222, 232 and/or SR(s) 224, 234) may determine that the BSS with which the other apparatus (e.g., AP 110, another STA) is associated is the same as/matches/does correspond/is correlated with the BSS with which the apparatus (e.g., STA(s) 120, 150, or its PR(s) 222, 232 and/or SR(s) 224, 234) is associated when the identifier (e.g., BSSID, BSS type, BSS category, BSS color) of the BSS with which the apparatus (e.g., STA(s) 120, 150, or its PR(s) 222, 232 and/or SR(s) 224, 234) is associated is the same as/does match/does correspond/is correlated with an identifier (e.g., BSSID, BSS type, BSS category, BSS color) of a BSS with which the that other apparatus (e.g., AP, another STA) is associated. In some configurations, the apparatus (e.g., STA(s) 120, 150, or its PR(s) 222, 232 and/or SR(s) 224, 234) may designate/characterize/associate the frame as an intra-BSS frame (or a non-intra-BSS frame (e.g., any frame that is not determined to be an intra-BSS frame) based on the aforementioned comparison and/or determination. In some configurations, the apparatus (e.g., STA) may set/update/adjust a first NAV allocated/dedicated for/configured for frames communicated inside/within/intra- the BSS with which the apparatus (e.g., STA(s) 120, 150, or its PR(s) 222, 232 and/or SR(s) 224, 234) is associated when the identifier (e.g., BSSID, BSS type, BSS category, BSS color) of the BSS with which the apparatus (e.g., STA(s) 120, 150, or its PR(s) 222, 232 and/or SR(s) 224, 234) is associated is the same as/does match/does correspond/is correlated with an identifier (e.g., BSSID, BSS type, BSS category, BSS color) of a BSS with which the that other apparatus (e.g., AP 110, another STA) is associated. In some configurations, the apparatus (e.g., STA(s) 120, 150, or its PR(s) 222, 232 and/or SR(s) 224, 234) may set/update/adjust a second NAV (different from the first NAV) allocated/dedicated for/configured for all other frames (e.g., frames communicated outside-of/not-within/inter- the BSS with which the apparatus (e.g., STA(s) 120, 150, or its PR(s) 222, 232 and/or SR(s) 224, 234) is associated) when the identifier (e.g., BSSID, BSS type, BSS category, BSS color) of the BSS with which the apparatus (e.g., STA(s) 120, 150, or its PR(s) 222, 232 and/or SR(s) 224, 234) is associated is not the same as/does not match/does not correspond to/is uncorrelated with an identifier (e.g., BSSID, BSS type, BSS category, BSS color) of a BSS with which the that other apparatus (e.g., AP 110, another STA) is associated.

In some configurations, an apparatus (e.g., STA(s) 120, 150, or its PR(s) 222, 232 and/or SR(s) 224, 234) may determine a difference between a setting, duration of time or TXOP set for the first NAV and determined a setting, duration of time or TXOP set for the second NAV. In some configurations, the apparatus (e.g., STA(s) 120, 150, or its PR(s) 222, 232 and/or SR(s) 224, 234) may determine a difference between a setting, duration of time or TXOP set for the first NAV and a setting, duration of time or TXOP set for the second NAV. In some configurations, the apparatus (e.g., STA(s) 120, 150, or its PR(s) 222, 232 and/or SR(s) 224, 234) may determine whether a difference exists between a setting, duration of time or TXOP set for the first NAV and a setting, duration of time or TXOP set for the second NAV. In some configurations, the apparatus (e.g., STA(s) 120, 150, or its PR(s) 222, 232 and/or SR(s) 224, 234) may adjust (e.g., increase/decrease) a setting, duration of time or TXOP of either the first NAV or the second NAV based on various factors. In some configurations, the apparatus (e.g., STA(s) 120, 150, or its PR(s) 222, 232 and/or SR(s) 224, 234) may override a setting, duration of time or TXOP set for or associated with the first NAV with a setting, duration of time or TXOP set for or associated with the second NAV. In some configurations, the apparatus (e.g., STA(s) 120, 150, or its PR(s) 222, 232 and/or SR(s) 224, 234) may adjust (e.g., increase) a setting, duration of time or TXOP associated with or set for the first NAV by/based on a difference between a setting, duration of time, or TXOP associated with or set for the first NAV and a setting, duration of time, or TXOP associated with or set for the second NAV. In some configurations, the apparatus (e.g., STA(s) 120, 150, or its PR(s) 222, 232 and/or SR(s) 224, 234) may override a setting, duration of time or TXOP set for or associated with the second NAV with a setting, duration of time or TXOP set for or associated with the first NAV. In some configurations, the apparatus (e.g., STA(s) 120, 150, or its PR(s) 222, 232 and/or SR(s) 224, 234) may adjust (e.g., increase) a setting, duration of time or TXOP associated with or set for the second NAV by/based on a difference between a setting, duration of time, or TXOP associated with or set for the first NAV and a setting, duration of time, or TXOP associated with or set for the second NAV.

In some configurations, an apparatus (e.g., STA(s) 120, 150, or its PR(s) 222, 232 and/or SR(s) 224, 234) may receive a frame (e.g., ULTR frame, MU UL frame, etc.) that is configured to set/updated/adjust a NAV of the apparatus (e.g., STA(s) 120, 150, or its PR(s) 222, 232 and/or SR(s) 224, 234) and/or includes information indicating a setting, duration of time or TXOP that is associated with or used for setting/updating at least one NAV. In some configurations, the apparatus (e.g., STA(s) 120, 150, or its PR(s) 222, 232 and/or SR(s) 224, 234) may compare a setting, duration of time, TXOP that is associated with or used for setting/updating at least one NAV of the apparatus (e.g., STA(s) 120, 150, or its PR(s) 222, 232 and/or SR(s) 224, 234) with an existing/current/stored/previously-set setting, duration of time, TXOP of at least one NAV of the apparatus (e.g., STA(s) 120, 150, or its PR(s) 222, 232 and/or SR(s) 224, 234). In some configurations, the apparatus (e.g., STA(s) 120, 150, or its PR(s) 222, 232 and/or SR(s) 224, 234) may compute/calculate a difference between a setting, duration of time, TXOP that is associated with or used for setting/updating at least one NAV and an existing/current/stored/previously-set setting, duration of time, TXOP of at least one NAV of the apparatus (e.g., STA(s) 120, 150, or its PR(s) 222, 232 and/or SR(s) 224, 234). If the computed/calculated difference is a positive value, in some configurations, the apparatus (e.g., STA(s) 120, 150, or its PR(s) 222, 232 and/or SR(s) 224, 234) may consider both the received setting, duration of time, TXOP that is associated with or used for setting/updating at least one NAV of the apparatus (e.g., STA(s) 120, 150, or its PR(s) 222, 232 and/or SR(s) 224, 234) and the existing/current/stored/previously-set setting, duration of time, TXOP of at least one NAV of the apparatus (e.g., STA(s) 120, 150, or its PR(s) 222, 232 and/or SR(s) 224, 234). In other words, if the computed/calculated difference is a positive value, in some configurations, the apparatus (e.g., STA(s) 120, 150, or its PR(s) 222, 232 and/or SR(s) 224, 234) may override the existing/current/stored/previously-set setting, duration of time, TXOP of at least one NAV of the apparatus (e.g., STA(s) 120, 150, or its PR(s) 222, 232 and/or SR(s) 224, 234) with the received setting, duration of time, TXOP that is associated with or used for setting/updating at least one NAV of the apparatus (e.g., STA(s) 120, 150, or its PR(s) 222, 232 and/or SR(s) 224, 234). On the other hand, if the computed/calculated difference is not a positive value (e.g., zero or less), in some configurations, the apparatus (e.g., STA(s) 120, 150, or its PR(s) 222, 232 and/or SR(s) 224, 234) may consider (e.g., only) the existing/current/stored/previously-set setting, duration of time, TXOP of at least one NAV of the apparatus (e.g., STA(s) 120, 150, or its PR(s) 222, 232 and/or SR(s) 224, 234). In other words, if the computed/calculated difference is not a positive value (e.g., zero or less), in some configurations, the apparatus (e.g., STA(s) 120, 150, or its PR(s) 222, 232 and/or SR(s) 224, 234) may disregard/ignore the received setting, duration of time, TXOP that is associated with or used for setting/updating at least one NAV of the apparatus (e.g., STA(s) 120, 150, or its PR(s) 222, 232 and/or SR(s) 224, 234).

In some configurations, a first apparatus (e.g., STA(s) 120, or its PR(s) 222 and/or SR(s) 224) may consider a procedure based on received signal information (e.g., received signal strength indicator(s) (RSSI(s)) of two or more frames in determining whether to avoid updating at least one NAV of the first apparatus (e.g., STA(s) 120, or its PR(s) 222 and/or SR(s) 224). In some configurations, the first apparatus (e.g., STA(s) 120, or its PR(s) 222 and/or SR(s) 224) may determine whether to reset/set/adjust/update one or more settings, times, durations of at least one NAV based on/using/by considering RSSI information received for the first signal transmitted from a second apparatus to a third apparatus and RSSI information received for a second signal transmitted from the third apparatus to the second apparatus in response to the first signal. In some configurations, the first apparatus (e.g., STA(s) 120, or its PR(s) 222 and/or SR(s) 224) may refrain from resetting/setting/updating/adjusting one or more settings of at least one NAV of/associated with the first apparatus (e.g., STA(s) 120, or its PR(s) 222 and/or SR(s) 224) when the RSSI information for the first signal is equal to or below a first threshold value and/or the RSSI information for the second signal is equal to or below a second threshold value. In some configurations, the first and second threshold values may be equal to, different from, greater than, and/or less than each other. In some configurations, the first apparatus (e.g., STA(s) 120, or its PR(s) 222 and/or SR(s) 224) may refrain from resetting/setting/updating/adjusting one or more settings of at least one NAV of/associated with the first apparatus (e.g., STA(s) 120, or its PR(s) 222 and/or SR(s) 224) when a difference between the RSSI information for/associated with the first signal is equal to, less than and/or greater than the RSSI information for the second signal by a certain threshold amount, percentage, standard deviation, etc.

In some configurations, a first apparatus (e.g., STA(s) 120, or its PR(s) 222 and/or SR(s) 224) may determine to reset/set/update/adjust one or more settings of at least one NAV of/associated with the first apparatus (e.g., STA(s) 120, or its PR(s) 222 and/or SR(s) 224) when the RSSI information for the first signal is equal to or above a first threshold value and/or the RSSI information for the second signal is equal to or above a second threshold value. The first and second threshold value may be equal to, different from, greater than, and/or less than each other. In some configurations, the first apparatus (e.g., STA(s) 120, or its PR(s) 222 and/or SR(s) 224) may reset/set/update/adjust one or more settings of at least one NAV of/associated with the first apparatus (e.g., STA(s) 120, or its PR(s) 222 and/or SR(s) 224) when a difference between the RSSI information for the first signal is less than or greater than the RSSI information for the second signal by a certain threshold amount, percentage, standard deviation, etc. In some configurations, the first signal may be an ULTR (e.g., in DL communication(s) 356, 357 and/or in packet 320), an RTS (e.g., in DL communication(s) 350, 351), and/or any other suitable (triggering) signal/message and the second signal is a MU UL frame (e.g., UL communication(s) 362, 363), a CTS (e.g., in UL communication(s) 352, 353), and/or any other suitable response signal/message (to the triggering signal/message, such as DL communication(s) 356, 357).

In some configurations, the AP 110 communicates (e.g., transmits) an ULTR (e.g., in DL communication(s) 356, 357 and/or in packet 320) to the STA 120, 150 (or its PR(s) 222, 232 and/or SR(s) 224, 234), as described in greater detail above. After the AP 110 sends the ULTR (e.g., in DL communication(s) 356, 357 and/or in packet 320) to the STA (or its PR(s) 222, 232 and/or SR(s) 224, 234), the STA (or its PR(s) 222, 232 and/or SR(s) 224, 234) may initiate a transmission (e.g., an UL transmission/communication, such as UL communication(s) 362, 363) that corresponds to and/or is in response to the ULTR (e.g., in DL communication(s) 356, 357 and/or in packet 320). In some configurations, the STA 120, 150 (or its PR(s) 222, 232 and/or SR(s) 224, 234) may check/sense/detect conditions of a particular channel (on which it intends/wishes/plans/desires to communicate) to determine whether that particular channel is available for the transmission (e.g., UL transmission/communication, such as UL communication(s) 362, 363). Such checking/sensing/detecting may consume system resources and/or time. However, in some circumstances, such checking/sensing/detecting of the communication channel may be obviated/precluded/omitted/avoided/skipped/refrained. In some configurations, the STA 120, 150 (or its PR(s) 222, 232 and/or SR(s) 224, 234) may obviate/preclude/omit/avoid/skip/refrain such checking/sensing/detecting prior to initiating an UL transmission (e.g., UL communication(s) 362, 363) (corresponding to/in response to that ULTR, such as DL communication(s) 356, 357). In some configurations, obviating the carrier sensing step may reduce the amount of time consumed between receiving the ULTR (e.g., in DL communication(s) 356, 357 and/or in packet 320) and communicating the UL transmission (e.g., UL communication(s) 362, 363), thereby increasing efficiency and/or throughput. In some configurations, the STA 120, 150 (or its PR(s) 222, 232 and/or SR(s) 224, 234) may receive the ULTR (e.g., in DL communication(s) 356, 357 and/or in packet 320), and the STA 120, 150 (or its PR(s) 222, 232 and/or SR(s) 224, 234) may determine whether to perform carrier sensing prior to initiating an UL transmission/communication (e.g., UL communication(s) 362, 363) (corresponding to/associated with/in response to the ULTR, such as DL communication(s) 356, 357). In some configurations, the determination is based on/associated with/dependent upon/corresponding to/comprising determining/a determination of whether the ULTR (e.g., in DL communication(s) 356, 357 and/or in packet 320) includes information (e.g., parameter/setting/indicator/indication/configuration) indicating whether to perform carrier sensing prior to the UL transmission/communication (e.g., UL communication(s) 362, 363) (corresponding to/in response to the ULTR, such as DL communication(s) 356, 357). For example, in some configurations, the STA 120, 150 (or its PR(s) 222, 232 and/or SR(s) 224, 234) determines to refrain from performing carrier sensing when the information (e.g., parameter/setting/indicator/indication/configuration) indicates an absence of a necessity/need/requirement (e.g., no necessity/need/requirement) (e.g., an off/false/negative/null value) to perform carrier sensing prior to the UL transmission/communication (e.g., UL communication(s) 362, 363) (corresponding to/in response to the ULTR, such as DL communication(s) 356, 357). In some configurations, the STA 120, 150 (or its PR(s) 222, 232 and/or SR(s) 224, 234) determines to perform carrier sensing when the information (e.g., parameter/setting/indicator/indication/configuration) indicates an affirmative need (e.g., requirement, necessity, need) (e.g., an on/true/positive value) to perform carrier sensing prior to the UL transmission/communication (e.g., UL communication(s) 362, 363) (corresponding to/in response to the ULTR, such as DL communication(s) 356, 357). In some configurations, after/upon determining to perform carrier sensing, the STA 120, 150 (or its PR(s) 222, 232 and/or SR(s) 224, 234) performs carrier sensing prior to the UL transmission/communication (e.g., UL communication(s) 362, 363) (corresponding to/in response to the ULTR, such as DL communication(s) 356, 357). As used herein, the term 'carrier sensing' may be interchangeable with similar terms, such as communication/physical/virtual/NAV tone/signal/subchannel/channel/carrier detection/sensing/measurement/evaluation/determination. In some configurations, the default setting/parameter may be for the STA 120, 150 (or its PR(s) 222, 232 and/or SR(s) 224, 234) to (always) perform carrier sensing unless the above-described information (e.g., parameter/setting/indicator/indication/configuration) indicates otherwise. In some configurations, the default setting/parameter may be for the STA 120, 150 (or its PR(s) 222, 232 and/or SR(s) 224, 234) to not/never perform carrier sensing unless the above-described information (e.g., parameter/setting/indicator/indication/configuration) indicates otherwise. In some configurations, the STA 120, 150 (or its PR(s) 222, 232 and/or SR(s) 224, 234) determines whether to perform carrier sensing prior to initiating an UL transmission/communication (e.g., UL communication(s) 362, 363) (corresponding to/associated with/in response to the ULTR, such as DL communication(s) 356, 357) based on/associated with/dependent upon/corresponding to a content/size/length/duration of the UL transmission/communication (e.g., UL communication(s) 362, 363). In some configurations, the STA 120, 150 (or its PR(s) 222, 232 and/or SR(s) 224, 234) determines to refrain from performing carrier sensing when the content/size/length/duration of the UL transmission/communication (e.g., UL communication(s) 362, 363) is less than a threshold value. In some configurations, the STA 120, 150 (or its PR(s) 222, 232 and/or SR(s) 224, 234) determines to perform carrier sensing when a content/size/length/duration of the UL transmission/communication (e.g., UL communication(s) 362, 363) is greater than a threshold value. In some configurations, the STA 120, 150 (or its PR(s) 222, 232 and/or SR(s) 224, 234) determines whether to perform carrier sensing prior to initiating an UL transmission/communication (e.g., UL communication(s) 362, 363) (corresponding to/associated with/in response to the ULTR, such as DL communication(s) 356, 357) based on/associated with/dependent upon/corresponding to/comprises determining whether the UL transmission/communication (e.g., UL communication(s) 362, 363) is protected by a NAV/CTS-RTS. In some configurations, the STA 120, 150 (or its PR(s) 222, 232 and/or SR(s) 224, 234) determines to refrain from performing carrier sensing when a CTS (e.g., in UL communication(s) 352, 353) and a corresponding RTS (e.g., in DL communication(s) 350, 351) for the UL transmission/communication (e.g., UL communication(s) 362, 363) is previously communicated. In some configurations, the STA 120, 150 (or its PR(s) 222, 232 and/or SR(s) 224, 234) determines to perform carrier sensing when a CTS (e.g., in UL communication(s) 352, 353) and a corresponding RTS (e.g., in DL communication(s) 350, 351) is previously communicated. In some configurations, the STA 120, 150 (or its PR(s) 222, 232 and/or SR(s) 224, 234) determining whether to perform carrier sensing prior to initiating an UL transmission/communication (e.g., UL communication(s) 362, 363) (corresponding to/associated with/in response to the ULTR, such as DL communication(s) 356, 357) based on/associated with/dependent upon/corresponding to/comprises determining whether carrier sensing is previously performed in a common/shared/same TXOP and/or within a predetermined/variable/threshold/preselected period of time prior to receipt of the ULTR (e.g., such as DL communication(s) 356, 357) and/or transmission of the UL transmission/communication (e.g., UL communication(s) 362, 363). In some configurations, the STA 120, 150 (or its PR(s) 222, 232 and/or SR(s) 224, 234) determines to refrain from performing carrier sensing when carrier sensing is performed in a TXOP that is same as/common/shared with a TXOP of the ULTR (e.g., such as DL communication(s) 356, 357) and/or the UL transmission/communication (e.g., UL communication(s) 362, 363). In some configurations, the STA 120, 150 (or its PR(s) 222, 232 and/or SR(s) 224, 234) determines to refrain from performing carrier sensing when carrier sensing is performed within a predetermined/variable/threshold/preselected period of time prior to receipt of the ULTR (e.g., such as DL communication(s) 356, 357) and/or transmission of the UL transmission/communication (e.g., UL communication(s) 362, 363). In some configurations, the STA 120, 150 (or its PR(s) 222, 232 and/or SR(s) 224, 234) determines to perform carrier sensing when carrier sensing is not performed in a TXOP that is same as/common/shared with a TXOP of the ULTR (e.g., such as DL communication(s) 356, 357) and/or the UL transmission/communication (e.g., UL communication(s) 362, 363). In some configurations, the STA 120, 150 (or its PR(s) 222, 232 and/or SR(s) 224, 234) determines to perform carrier sensing when carrier sensing is not performed within a predetermined/variable/threshold/preselected period of time prior to receipt of the ULTR (e.g., such as DL communication(s) 356, 357) and/or transmission of the UL transmission/communication (e.g., UL communication(s) 362, 363). In some configurations, the inter-frame spacing between the ULTR (e.g., such as DL communication(s) 356, 357) and the UL transmission/communication (e.g., UL communication(s) 362, 363) (corresponding to/in response to the ULTR, such as DL communication(s) 356, 357) varies based on the determination and/or above-described information (e.g., parameter/setting/indicator/indication/configuration). In some configurations, the STA use a first inter-frame spacing/duration/length/size when carrier sensing is performed, and the STA 120, 150 (or its PR(s) 222, 232 and/or SR(s) 224, 234) uses a second inter-frame spacing duration/length/size (less than the first inter-frame spacing duration/length/size) when carrier sensing is not performed (e.g., upon determining to refrain from performing carrier sensing). In some configurations, the inter-frame spacing varies/depends upon/corresponds to/is associated with/depends upon/is correlated to the determining/determination of whether to perform carrier sensing and/or carrier sensing (generally) after receiving the ULTR (e.g., such as DL communication(s) 356, 357) and prior to the UL transmission/communication (e.g., UL communication(s) 362, 363) that is corresponding to/in response to the ULTR (e.g., such as DL communication(s) 356, 357).

In some configurations, the apparatus (e.g., STA(s) 120, 150, or its PR(s) 222, 232 and/or SR(s) 224, 234) may detect/sense (current) use/utilization of (e.g., presence of a signal on) one or more channels (or subchannels). In some configurations, the apparatus (e.g., STA(s) 120, 150, or its PR(s) 222, 232 and/or SR(s) 224, 234) performs channel/subchannel/carrier/subcarrier/RU detection/sensing at various times and for various durations. In some configurations, the apparatus (e.g., STA(s) 120, 150, or its PR(s) 222, 232 and/or SR(s) 224, 234) performs channel/subchannel/carrier/subcarrier/RU detection/sensing prior to receiving the ULTR (e.g., in DL communication(s) 356, 357 and/or in packet 320). In some configurations, the apparatus (e.g., STA(s) 120, 150, or its PR(s) 222, 232 and/or SR(s) 224, 234) performs channel/subchannel/carrier/subcarrier/RU detection/sensing upon receiving the ULTR (e.g., in DL communication(s) 356, 357 and/or in packet 320). In some configurations, the apparatus (e.g., STA(s) 120, 150, or its PR(s) 222, 232 and/or SR(s) 224, 234) performs channel/subchannel/carrier/subcarrier/RU detection/sensing immediately after reception of the ULTR (e.g., in DL communication(s) 356, 357 and/or in packet 320) is complete. In some configurations, the apparatus (e.g., STA(s) 120, 150, or its PR(s) 222, 232 and/or SR(s) 224, 234) performs channel/subchannel/carrier/subcarrier/RU detection/sensing anytime after the initial reception of the ULTR (e.g., in DL communication(s) 356, 357 and/or in packet 320). In some configurations, the apparatus (e.g., STA(s) 120, 150, or its PR(s) 222, 232 and/or SR(s) 224, 234) performs channel/subchannel/carrier/subcarrier/RU detection/sensing at a time that corresponds to reception of the indication (described above) (e.g., upon/after reception of that indication). In some configurations, the STA performs channel/subchannel/carrier/subcarrier/RU detection/sensing during the time period that begins immediately after receiving the ULTR (e.g., in DL communication(s) 356, 357 and/or in packet 320) and ends immediately before transmission of the UL transmission/communication (e.g., UL communication (s) 362, 363). In some configurations, the apparatus (e.g., STA(s) 120, 150, or its PR(s) 222, 232 and/or SR(s) 224, 234) performs channel/subchannel/carrier/subcarrier/RU detection/sensing during the inter-frame spacing between the ULTR (e.g., in DL communication(s) 356, 357 and/or in packet 320) and the UL transmission/communication (e.g., UL communication (s) 362, 363). In some configurations, the apparatus (e.g., STA(s) 120, 150, or its PR(s) 222, 232 and/or SR(s) 224, 234) performs channel/subchannel/carrier/subcarrier/RU detection/sensing with respect to/for/of one or more channel/subchannel/carrier/subcarrier/RU among a plurality of channel/subchannel/carrier/subcarrier/RU available to the apparatus (e.g., STA(s) 120, 150, or its PR(s) 222, 232 and/or SR(s) 224, 234). In some circumstances, the apparatus (e.g., STA(s) 120, 150, or its PR(s) 222, 232 and/or SR(s) 224, 234) may detect that the one or more channel/subchannel/carrier/subcarrier/RU is being used/occupied/utilized. On the one hand, in some configurations, the apparatus (e.g., STA(s) 120, 150, or its PR(s) 222, 232 and/or SR(s) 224, 234) may initiate a transmission/communication to the AP using/utilizing at least one other channel (or subchannel) of the plurality of channels (or subchannels) for which use (e.g., a signal) was not detected/sensed. On the other hand, in some configurations, the apparatus (e.g., STA(s) 120, 150, or its PR(s) 222, 232 and/or SR(s) 224, 234) may refrain from transmitting to/communicating with the AP using/utilizing any of the other channel/subchannel/carrier/subcarrier/RU of the plurality of channel/subchannel/carrier/subcarrier/RU even if/though use (e.g., a signal) was not detected/sensed (on those other channel/subchannel/carrier/subcarrier/RU). In some configurations, the apparatus (e.g., STA(s) 120, 150, or its PR(s) 222, 232 and/or SR(s) 224, 234) may perform carrier sensing/detecting for/with respect to/at least (or only of) a channel/subchannel/carrier/subcarrier/RU for/allocated to the UL transmission/communication (e.g., UL communication (s) 362, 363) for that apparatus (e.g., STA(s) 120, 150, or its PR(s) 222, 232 and/or SR(s) 224, 234). In some configurations, the apparatus (e.g., STA(s) 120, 150, or its PR(s) 222, 232 and/or SR(s) 224, 234) may perform carrier sensing/detecting without necessarily sensing the primary channel allocated for the UL transmission/communication (e.g., UL communication (s) 362, 363) when that apparatus (e.g., STA(s) 120, 150, or its PR(s) 222, 232 and/or SR(s) 224, 234) is not allocated/designated to it. In some configurations, the apparatus (e.g., STA(s) 120, 150, or its PR(s) 222, 232 and/or SR(s) 224, 234) may perform carrier sensing/detecting without sensing the primary channel when the primary channel is not allocated/designated to that apparatus (e.g., STA(s) 120, 150, or its PR(s) 222, 232 and/or SR(s) 224, 234).

At block 470, an apparatus may enable aspects related to random access. As described in greater detail above, the ULTR (e.g., in DL communication(s) 356, 357 and/or in packet 320) may be configured to assign/allocate RUs for random access (e.g., for simultaneous/concurrent UL communication(s) 362, 363) by a plurality of apparatus (e.g., STA(s) 120, 150, or its PR(s) 222, 232 and/or SR(s) 224, 234). In some aspects, after receiving an ULTR (e.g., in DL communication(s) 356, 357 and/or in packet 320), an apparatus (e.g., STA(s) 120, 150, or its PR(s) 222, 232 and/or SR(s) 224, 234) may determine the number (e.g., quantity, amount, extent, size, and/or any other suitable measurement) of the RUs assigned by the ULTR (e.g., in DL communication(s) 356, 357 and/or in packet 320) for random access. For example, the apparatus (e.g., STA(s) 120, 150, or its PR(s) 222, 232 and/or SR(s) 224, 234) may determine the number of RUs assigned to it by utilizing the above-described portion of the ULTR (e.g., in DL communication(s) 356, 357 and/or in packet 320) that includes a plurality of user-specific fields indicating a description of resource allocation for (e.g., simultaneous/concurrent) UL transmission(s) (e.g., UL communication (s) 362, 363) by the plurality of apparatus (e.g., STA(s) 120, 150, or its PR(s) 222, 232 and/or SR(s) 224, 234). The apparatus (e.g., STA(s) 120, 150, or its PR(s) 222, 232 and/or SR(s) 224, 234) may reduce a back-off counter based on the number of RUs assigned by the ULTR (e.g., in DL communication(s) 356, 357 and/or in packet 320) for random access. In some aspects, reducing the back-off counter based on the number of RUs assigned for random access by the ULTR (e.g., in DL communication(s) 356, 357 and/or in packet 320) includes reducing a value of the back-off counter by a predetermined amount for each of at least one resource for random access assigned by the ULTR (e.g., in DL communication(s) 356, 357 and/or in packet 320) and associated with a particular identifier. For example, if an apparatus (e.g., STA(s) 120, 150, or its PR(s) 222, 232 and/or SR(s) 224, 234) is assigned three RUs and its back-off counter was initially set to a value of five, then the apparatus (e.g., STA(s) 120, 150, or its PR(s) 222, 232 and/or SR(s) 224, 234) may decrement its back-off counter by three units, resulting in its reduced back-off counter having a value of two.

Depending on a value of the reduced back-off counter, the apparatus (e.g., STA(s) 120, 150, or its PR(s) 222, 232 and/or SR(s) 224, 234) may randomly select one or more of the RUs assigned for random access by the ULTR (e.g., in DL communication(s) 356, 357 and/or in packet 320). When the value of the reduced back-off counter reaches or crosses a threshold value, then that apparatus (e.g., STA(s) 120, 150, or its PR(s) 222, 232 and/or SR(s) 224, 234) may randomly select RUs assigned for random access. For example, if such a threshold value is two (or greater), then the apparatus (e.g., STA(s) 120, 150, or its PR(s) 222, 232 and/or SR(s) 224, 234) may randomly select RUs assigned for random access; otherwise, the apparatus (e.g., STA(s) 120, 150, or its PR(s) 222, 232 and/or SR(s) 224, 234) may refrain from randomly selecting RUs for random access. Depending on a value of the reduced back-off counter (e.g., if/when the value of the reduced back-off counter reaches or crosses a threshold value), the apparatus (e.g., STA(s) 120, 150, or its PR(s) 222, 232 and/or SR(s) 224, 234) may transmit a frame, packet, and/or data unit (e.g., UL communication(s) 362, 363) using the randomly selected one or more RUs assigned by the ULTR (e.g., in DL communication(s) 356, 357 and/or in packet 320) for random access.

As described above, an ULTR (e.g., in DL communication(s) 356, 357 and/or in packet 320) may sometimes indicate various resources and/or resource units (e.g., RUs) that are allocated for random access. In other words, the ULTR (e.g., in DL communication(s) 356, 357 and/or in packet 320) may allocate various resources (e.g., RUs) for random access. Some systems may rely on random selection procedures to fairly allocate such resources to a plurality of apparatus (e.g., STA(s) 120, 150, or its PR(s) 222, 232 and/or SR(s) 224, 234) seeking/needing such resources. However, this may lead to unnecessary contention, possible collisions, and overall inefficiencies in certain circumstances.

In some configurations, an apparatus (e.g., AP 110) may transmit an ULTR (e.g., in DL communication(s) 356, 357 and/or in packet 320), wherein the ULTR (e.g., in DL communication(s) 356, 357 and/or in packet 320) is configured to assign/allocate at least one resource (e.g., RU) for random access. In some configurations, an apparatus (e.g., STA(s) 120, 150, or its PR(s) 222, 232 and/or SR(s) 224, 234) may receive an ULTR (e.g., in DL communication(s) 356, 357 and/or in packet 320), wherein the ULTR (e.g., in DL communication(s) 356, 357 and/or in packet 320) is configured to assign/allocate at least one resource (e.g., RU) for random access. In such configurations, the apparatus (e.g., STA(s) 120, 150, or its PR(s) 222, 232 and/or SR(s) 224, 234) may determine a number/amount/duration/size of the at least one resource (e.g., RU) for random access. In such configurations, the apparatus (e.g., STA(s) 120, 150, or its PR(s) 222, 232 and/or SR(s) 224, 234) may reduce/adjust/decrement a back-off counter/back-off timer based on the determined number/amount/duration/size of the at least one resource (e.g., RU) for random access. In such configurations, the apparatus (e.g., STA(s) 120, 150, or its PR(s) 222, 232 and/or SR(s) 224, 234) may, if the reduced/adjusted/decremented back-off counter/back-off timer has a value equal to or less than zero, refrain from (randomly) selecting one or more of the at least one resource for random access. In such configurations, the apparatus (e.g., STA(s) 120, 150, or its PR(s) 222, 232 and/or SR(s) 224, 234) may, if the reduced/adjusted/decremented back-off counter/back-off timer has a value greater than zero, (randomly) select one or more of the at least one resource for random access and transmit a frame/packet/data/information using/utilizing the selected one or more of the at least one resource for random access.

In some configurations, reducing/adjusting/decrementing a back-off counter/back-off timer based on the determined number/amount/duration/size of the at least one resource (e.g., RU) for random access may include reducing/adjusting/decrementing the back-off counter/back-off timer by an amount of time/quantity/duration/count-value equal/correspond/associated to/with the determined number/amount/duration/size of the at least one resource for random access (as assigned/allocated by the ULTR, such as in DL communication(s) 356, 357). In some configurations, reducing/adjusting/decrementing a back-off counter/back-off timer based on the determined number/amount/duration/size of the at least one resource (e.g., RU) for random access may include reducing/adjusting/decrementing a value of the back-off counter/back-off timer by a value of fixed/predetermined/variable value/amount for each of the determined number/amount/duration/size of the at least one resource for random access (as assigned/allocated by the ULTR, such as in DL communication(s) 356, 357). In some configurations, at least one of (or each of) the at least one resource assigned/allocated by the ULTR (e.g., in DL communication(s) 356, 357 and/or in packet 320) for random access is assigned/allocated/having a particular identifier, wherein the apparatus (e.g., STA(s) 120, 150, or its PR(s) 222, 232 and/or SR(s) 224, 234) uses/utilizes that particular identifier to determine which of the resources assigned/allocated by the ULTR (e.g., in DL communication(s) 356, 357 and/or in packet 320) is the at least one resource for random access. In some configurations, at least one resource (e.g., RU) for random access includes/means at least one resource (e.g., RU) that is not assigned/allocated to a specific receiver/STA/destination (by the ULTR, such as in DL communication(s) 356, 357). In some configurations, at least one resource (e.g., RU) for random access includes/means at least one resource (e.g., RU) that is assigned/associated with a specific/particular/predetermined identifier (e.g., AID).

In some circumstances, an apparatus may benefit from remaining in a power-save/low-power mode for a particular period of time. For example, an STA may benefit from remaining in a power-save/low-power mode until an ULTR (e.g., in DL communication(s) 356, 357 and/or in packet 320) is received. As described above, the ULTR (e.g., in DL communication(s) 356, 357 and/or in packet 320) may allocate/assign at least one resource (e.g., RU) for random access. In some circumstances, a system may benefit by reducing and/or minimizing overhead in/during wireless communication. For example, scheduling every single ULTR (e.g., in DL communication(s) 356, 357 and/or in packet 320) may add substantial overhead to the system, thereby possibly reducing the system efficiency and overall system throughput.

In some configurations, rather than scheduling each and every ULTR (e.g., in DL communication(s) 356, 357 and/or in packet 320), at least some ULTR (e.g., in DL communication(s) 356, 357 and/or in packet 320) may be communicated in a cascaded sequence of ULTR (e.g., in DL communication(s) 356, 357 and/or in packet 320) for random access. For example, a first set of one or more ULTRs may be scheduled and a second set of one or more ULTR (e.g., in DL communication(s) 356, 357 and/or in packet 320) may be cascaded after the first set of the one or more scheduled ULTRs, such as in DL communication(s) 356, 357. In some configurations, a signal communicated prior to the communication of the first set of the one or more scheduled ULTRs, such as in DL communication(s) 356, 357, may indicate that a subsequent/next ULTR is a scheduled ULTR, such as in DL communication(s) 356, 357. Such a signal may be included in a beacon, a beacon frame, a header of another frame/packet, or in any other suitable signal. Such a signal may also indicate a beginning of a transmission time, a start of a transmission time interval, a commencement of a TXOP, a target transmission time, and/or a desired transmission period/duration for at least one of the first set of the one or more scheduled ULTRs, such as in DL communication(s) 356, 357. In some configurations, a scheduled ULTR (e.g., in DL communication(s) 356, 357 and/or in packet 320) may indicate that a subsequent ULTR (e.g., in DL communication(s) 356, 357 and/or in packet 320) is a non-scheduled and/or cascaded/cascading ULTR (e.g., in DL communication(s) 356, 357 and/or in packet 320). Such an indication may be a bit, sequence of bits, header field, and/or any other indicator included in the scheduled ULTR (e.g., in DL communication(s) 356, 357 and/or in packet 320).

In some configurations, an apparatus (e.g., AP 110) may transmit a first signal/message (e.g., beacon) comprising scheduling information, a start time, and/or a time interval associated with at least a first ULTR (e.g., in DL communication(s) 356, 357 and/or in packet 320) configured to assign/allocate at least one resource for random access. In some configurations, an apparatus (e.g., AP 110) may also transmit the first ULTR (e.g., in DL communication(s) 356, 357 and/or in packet 320) according to the scheduling information, start time, and/or time interval, wherein the first ULTR (e.g., in DL communication(s) 356, 357 and/or in packet 320) includes an indication of a cascaded sequence (of one or more other ULTRs, such as in DL communication(s) 356, 357) when one or more other ULTRs, such as in DL communication(s) 356, 357, are set/scheduled for (subsequent) transmission. In some configurations, an apparatus (e.g., AP 110) may also transmit an ACK/NACK/BA after receiving data on the at least one resource for random access. In some configurations, an apparatus (e.g., AP 110) may also transmit one or more other ULTRs, such as in DL communication(s) 356, 357, after transmitting the ACK/NACK/BA when the first ULTR (e.g., in DL communication(s) 356, 357 and/or in packet 320) includes the indication of the cascaded sequence (of one or more other ULTRs).

In some configurations, an apparatus (e.g., STA(s) 120, 150, or its PR(s) 222, 232 and/or SR(s) 224, 234) may receive a signal/message (e.g., beacon) comprising scheduling information, a start time, a time interval associated with at least a first ULTR (e.g., in DL communication(s) 356, 357 and/or in packet 320) configured to assign/allocate at least one resource for random access. In some configurations, an apparatus (e.g., STA(s) 120, 150, or its PR(s) 222, 232 and/or SR(s) 224, 234) may also enter a low-power mode, a power-save mode, an ultra-low-power mode, a doze mode, and/or a doze-off mode until a time corresponding to the scheduling information, the start time, and/or the time interval included in the received signal/message. In some configurations, an apparatus (e.g., STA(s) 120, 150, or its PR(s) 222, 232 and/or SR(s) 224, 234) may detect and/or attempt to (randomly) select at least one resource for random access allocated/assigned by the first ULTR (e.g., in DL communication(s) 356, 357 and/or in packet 320). In some configurations, an apparatus (e.g., STA(s) 120, 150, or its PR(s) 222, 232 and/or SR(s) 224, 234) may, if/when the attempt to (randomly) select at least one resource for random access is unsuccessful, determine/detect whether the first ULTR (e.g., in DL communication(s) 356, 357 and/or in packet 320) includes an indication of a cascaded sequence (of one or more other ULTRs, such as in DL communication(s) 356, 357). In some configurations, an apparatus (e.g., STA(s) 120, 150, or its PR(s) 222, 232 and/or SR(s) 224, 234) may receive a second ULTR (e.g., in DL communication(s) 356, 357 and/or in packet 320) and/or attempt to (randomly) select at least one resource for random access when the first ULTR (e.g., in DL communication(s) 356, 357 and/or in packet 320) includes the indication of a cascaded sequence (of one or more other ULTRs, such as in DL communication(s) 356, 357). In some configurations, an apparatus (e.g., STA(s) 120, 150, or its PR(s) 222, 232 and/or SR(s) 224, 234) may detect and/or attempt to (randomly) select at least one resource for random access allocated/assigned by the second ULTR (e.g., in DL communication(s) 356, 357 and/or in packet 320) if/when the attempt to (randomly) select the at least one resource for random access assigned/allocated in/by the first ULTR (e.g., in DL communication(s) 356, 357 and/or in packet 320) is unsuccessful.

At block 462, an apparatus (e.g., STA(s) 120, 150, or its PR(s) 222, 232 and/or SR(s) 224, 234) may enable aspects related to performing UL communication(s) (e.g., UL communication (s) 362, 363). In some aspects, in response to receiving the ULTR (e.g., in DL communication(s) 356, 357 and/or in packet 320), an STA 120, 150 (or its PR(s) 222, 232 and/or SR(s) 224, 234) may transmit an UL transmission (e.g., UL communication(s) 362, 364) (at least partially) simultaneously/concurrently with (UL transmission(s) of) one or more STAs 120, 150 (or its PR(s) 222, 232 and/or SR(s) 224, 234) of the plurality of STAs 120, 150 (or its PR(s) 222, 232 and/or SR(s) 224, 234). That is, in response to transmitting the ULTR (e.g., in DL communication(s) 356, 357 and/or in packet 320), an AP (e.g., AP 110) may receive UL transmission(s) (e.g., UL communication (s) 362, 363) simultaneously/concurrently from a plurality of STAs (e.g., STAs 120, 150, or its PR(s) 222, 232 and/or SR(s) 224, 234). For example, referring to FIG. 3, at time $T_{17}$, in response to receiving an ULTR (e.g., DL communication(s) 356, 357), STA(s) 120, 150 (or its PR(s) 222, 232 and/or SR(s) 224, 234) may simultaneously/concurrently transmit their respective UL transmission (e.g., UL communication(s) 362, 363). In some aspects, receiving the DL multiuser transmission (e.g., DL multiuser transmission(s) 354, 355 at time $T_{13}$) and transmitting the (e.g., simultaneous/concurrent) UL transmission(s) (e.g., UL communication (s) 362, 363) (e.g., UL communication(s) at time $T_{17}$) by the plurality of STAs (e.g., STAs 120, 150, or its PR(s) 222, 232 and/or SR(s) 224, 234) occur in the same TXOP.

In some aspects, as described above, an STA (e.g., STA(s) 120, 150, or its PR(s) 222, 232 and/or SR(s) 224, 234) may determine the amount of power loss during the DL transmission of the ULTR (e.g., in DL communication(s) 356, 357 and/or in packet 320) from an AP (e.g., AP 110) to the STA (e.g., STA(s) 120, 150, or its PR(s) 222, 232 and/or SR(s) 224, 234). As also described above, in some aspects, the ULTR (e.g., in DL communication(s) 356, 357 and/or in packet 320) may include information corresponding to the power measurement of the transmitted ULTR (e.g., in DL communication(s) 356, 357 and/or in packet 320). In some aspects, based on the determined amount of power loss during the DL transmission of the ULTR (e.g., in DL communication(s) 356, 357 and/or in packet 320) from the AP (e.g., AP 110) to the STA (e.g., STA(s) 120, 150, or its PR(s) 222, 232 and/or SR(s) 224, 234) and/or based on the target received signal strength (as included in the ULTR, such as in DL communication(s) 356, 357), the STA (e.g., STA(s) 120, 150, or its PR(s) 222, 232 and/or SR(s) 224, 234) may determine an amount of power (to be utilized by one or more antennas) for the UL transmission (e.g., UL communication(s) 362, 363) by the STA to the AP (e.g., AP 110). In accordance with the determined amount of power for the UL transmission, the STA(s) (e.g., STA(s) 120, 150, or its PR(s) 222, 232 and/or SR(s) 224, 234) may transmit the UL transmission(s) (e.g., UL communication(s) 362, 363) to the AP (e.g., AP 110). In some aspects, the UL transmission(s) may include information corresponding to how much transmission power the STA(s) (e.g., STA(s) 120, 150, or its PR(s) 222, 232 and/or SR(s) 224, 234) remains capable of using relative to a transmission power currently utilized. For example, UL transmission(s) (e.g., UL communication (s) 362, 363) may include information indicating how much more power the STA(s) 120, 150 (or its PR(s) 222, 232 and/or SR(s) 224, 234) is able of using relative to how much power the STA(s) 120, 150 (or its PR(s) 222, 232 and/or SR(s) 224, 234) is currently using for such UL transmission(s) (e.g., UL communication (s) 362, 363). In some aspects, how much transmission power the STA remains capable of using relative to the transmission power currently utilized refers to a difference between a maximum transmission power (of the STA(s) 120, 150, or its PR(s) 222, 232 and/or SR(s) 224, 234) and a currently utilized amount of power (by the STA(s) 120, 150, or its PR(s) 222, 232 and/or SR(s) 224, 234) for the UL transmission(s) (UL communication(s) 362, 363).

In some aspects, an AP (e.g., AP 110) may transmit and/or an STA(s) 120, 150 (or its PR(s) 222, 232 and/or SR(s) 224, 234) may receive a request for simultaneous transmission of an acknowledgement message by the plurality of STAs 120, 150 (or its PR(s) 222, 232 and/or SR(s) 224, 234). For example, referring to FIG. 3, in the DL multiuser communication(s) 354, 355 at time $T_{13}$, or in the DL communication(s) 356, 357 at time $T_{14}$, AP 110 may transmit and/or STA(s) 120, 150 (or its PR(s) 222, 232 and/or SR(s) 224, 234) may receive a request for simultaneous transmission of an acknowledgement message by the plurality of STAs (e.g., STAs 120, 150, or its PR(s) 222, 232 and/or SR(s) 224, 234). In response to the received request, an AP (e.g., AP 110) may receive and/or an STA (e.g., STA(s) 120, 150 (or its PR(s) 222, 232 and/or SR(s) 224, 234) may transmit an UL acknowledgement message simultaneously/concurrently with another STA of the plurality of STAs (e.g., STAs 120, 150, or its PR(s) 222, 232 and/or SR(s) 224, 234). For example, referring to FIG. 3, in the UL communication(s) 362, 363 at time $T_{17}$, the plurality of STAs (e.g., STAs 120, 150, or its PR(s) 222, 232 and/or SR(s) 224, 234) may simultaneously/concurrently transmit an UL acknowledgement message to AP 110 (e.g., in UL communication(s) 362, 363). In some aspects, in response to receiving the ULTR (e.g., in DL communication(s) 356, 357 and/or in packet 320), an STA (e.g., STAs 120, 150, or its PR(s) 222, 232 and/or SR(s) 224, 234) may transmit and/or an AP (e.g., AP 110) may receive a feedback frame at a same time as a transmission of a feedback frame by another STA (e.g., STAs 120, 150, or its PR(s) 222, 232 and/or SR(s) 224, 234). For example, referring to FIG. 3, at time $T_{17}$, in response to receiving a DL communication(s) 356 (e.g., ULTR, such as in DL communication(s) 356, 357) at time $T_{14}$, STAs 120, 150, or its PR(s) 222, 232 and/or SR(s) 224, 234, may transmit an UL transmission (e.g., UL communication (s) 362, 363). The UL transmission (e.g., UL communication (s) 362, 363) may include a feedback frame and may be transmitted simultaneously/concurrently with a transmission of a feedback frame in another UL transmission (e.g., UL communication (s) 362, 363) by other STA(s) to AP 110.

In some configurations, the STA (e.g., STA(s) 120, 150, or its PR(s) 222, 232 and/or SR(s) 224, 234) may receive and/or begin/initiate/detect/determine receiving at least a first portion of a ULTR (e.g., in DL communication(s) 356, 357 and/or in packet 320). In some configurations, the STA (e.g., STA(s) 120, 150, or its PR(s) 222, 232 and/or SR(s) 224, 234) may the STA (e.g., STA(s) 120, 150 (or its PR(s) 222, 232 and/or SR(s) 224, 234) may begin/initiate preparation of an UL transmission (e.g., an UL PPDU, such as UL communication (s) 362, 363) corresponding to/associated with/in response to/based on information included in the at least first portion of the ULTR (e.g., in DL communication(s) 356, 357 and/or in packet 320). In some configurations, the STA (e.g., STA(s) 120, 150, or its PR(s) 222, 232 and/or SR(s) 224, 234) may begin/initiate preparation of the UL transmission (e.g., UL communication (s) 362, 363) prior to and/or before completely/entirely/fully processing/demodulating/decoding/decrypting/receiving the entire/entirety of the ULTR (e.g., in DL communication(s) 356, 357 and/or in packet 320). In some configurations, the STA (e.g., STA(s) 120, 150, it its PR(s) 222, 232 and/or SR(s) 224, 234) may begin/initiate preparation of the UL transmission (e.g., UL communication (s) 362, 363) after receiving less than an entirety of the ULTR (e.g., in DL communication(s) 356, 357 and/or in packet 320). In some configurations, preparation of the UL transmission (e.g., UL communication (s) 362, 363) may begin/initiate when/upon processing/demodulating/decoding/decrypting/receiving a common portion of the ULTR (e.g., in DL communication(s) 356, 357 and/or in packet 320) (e.g., a portion processed/demodulated/received/processed by all intended/destined STAs 120, 150). In some configurations, preparation of the UL transmission (e.g., UL communication (s) 362, 363) may begin/initiate when/upon processing/demodulating/decoding/decrypting/receiving a STA-specific portion (e.g., STA-specific information, per-user information, user-specific information, etc.) of/included in the ULTR (e.g., in DL communication(s) 356, 357 and/or in packet 320) (e.g., a STA-specific portion of the ULTR (e.g., in DL communication(s) 356, 357 and/or in packet 320) that corresponds to a specific STA). In some configurations, preparation of the UL transmission (e.g., UL communication (s) 362, 363) may occur prior to reception of an end portion of the ULTR (e.g., in DL communication(s) 356, 357 and/or in packet 320). In some configurations, the end portion of the ULTR (e.g., in DL communication(s) 356, 357 and/or in packet 320) may include padding, tail bits, etc. In some configurations, the AP (e.g., AP 110) may determine/obtain/receive information associated with an amount of time/duration of time that one or more STAs (e.g., STAs 120, 150) utilize for preparation of an UL transmission (e.g., PPDU, such as UL communication (s) 362, 363). In some configurations, the AP (e.g., AP 110) may set/determine/configure/adjust an amount/size/duration/length of padding included in an ULTR (e.g., in DL communication(s) 356, 357 and/or in packet 320) based on/in response to/in association with/corresponding to that information. In some configurations, the amount/size/duration/length of padding included in the ULTR (e.g., in DL communication(s) 356, 357 and/or in packet 320) may be increased when that information indicates a relatively longer amount/duration of time for one or more STAs (e.g., STAs 120, 150) to prepare an UL transmission (e.g., UL communication (s) 362, 363). In some configurations, the amount/size/duration/length of padding included in the ULTR (e.g., in DL communication(s) 356, 357 and/or in packet 320) may be decreased when that information indicates a relatively longer amount/duration of time for one or more STAs (e.g., STAs 120, 150) to prepare an UL transmission (e.g., UL communication (s) 362, 363).

In some configurations, the STA (e.g., STA(s) 120, 150, or its PR(s) 222, 232 and/or SR(s) 224, 234) may determine/estimate/obtain/ascertain/calculate/compute/approximate an amount/duration/profile/measurement of loss/attenuation/dissipation of power (e.g., during the DL transmission from the AP 110 to the STA(s) 120, 150) in response to/in accordance with/based on (one or more) information received from the AP (e.g., AP 110). In some configurations, the STA (e.g., STA(s) 120, 150, or its PR(s) 222, 232 and/or SR(s) 224, 234) may determine/estimate/obtain/ascertain/calculate/compute/approximate an amount/duration/profile/measurement for a transmission by the STA to the AP (e.g., AP 110). In some configurations, the STA (e.g., STA(s) 120, 150, or its PR(s) 222, 232 and/or SR(s) 224, 234) may determine/adjust/set/calibrate/estimate/obtain/ascertain/calculate/compute/approximate an amount/duration/profile/measurement for an UL transmission (e.g., UL communication (s) 362, 363) by the STA (e.g., STA(s) 120, 150, or its PR(s) 222, 232 and/or SR(s) 224, 234) to the AP (e.g., AP 110) based on one or more factors. In some configurations, a factor may include the determined/estimated/obtained/ascertained/calculated/computed/approximated amount/duration/profile/measurement of loss/attenuation/dissipation of power (e.g., during the DL transmission from the AP 110 to the STA(s) 120, 150, or its PR(s) 222, 232 and/or SR(s) 224, 234). In some configurations, a factor may include the threshold/target/ideal/selected/preselected/optimized received signal strength for the one or more STAs (e.g., STA(s) 120, 150, or its PR(s) 222, 232 and/or SR(s) 224, 234) as received in/included in the ULTR (e.g., in DL communication(s) 356, 357 and/or in packet 320) from the AP (e.g., AP 110).

In some configurations, the STA (e.g., STA(s) 120, 150, or its PR(s) 222, 232 and/or SR(s) 224, 234) may transmit an UL transmission (e.g., UL communication (s) 362, 363) in response to/utilizing/observing/considering/according to/based on/in accordance with the determined/adjusted/set/calibratee/estimated/obtained/ascertained/calculated/computed/approximated amount/duration/profile/measurement for the UL transmission (e.g., UL communication (s) 362, 363) by the STA (e.g., STA(s) 120, 150, or its PR(s) 222, 232 and/or SR(s) 224, 234) to the AP (e.g., AP 110) (e.g., based on the one or more factors). In some configurations, the AP (e.g., AP 110) may receive an UL transmission (e.g., UL communication (s) 362, 363) in response to/utilizing/observing/considering/according to/based on/in accordance with the determined/adjusted/set/calibrated/estimated/obtained/ascertained/calculated/computed/approximated amount/duration/profile/measurement for the UL transmission (e.g., UL communication (s) 362, 363) by the STA (e.g., STA(s) 120, 150, or its PR(s) 222, 232 and/or SR(s) 224, 234) to the AP (e.g., AP 110) (e.g., based on the one or more factors). In some configurations, the UL transmission (e.g., UL communication (s) 362, 363) may include an indication/indicia/information/field/parameter associated with/corresponding to/affiliated with how much transmission power remains/is left/it remains capable of using relative to a transmission power currently or otherwise utilized (e.g., a difference between a maximum transmission power and a current or otherwise utilized transmission power). In some configuration, the AP (e.g., AP 110) may utilize the indication/indicia/information/field/parameter associated with/corresponding to/affiliated with how much transmission power remains/is left/it remains capable of using relative to a transmission power currently or otherwise utilized by the STA (e.g., STA(s) 120, 150, or its PR(s) 222, 232 and/or SR(s) 224, 234) for one or more subsequent/future/following transmissions. For example, a subsequent/future/following ULTR (e.g., in DL communication(s) 356, 357 and/or in packet 320) from the AP (e.g., AP 110) to the STA (e.g., STA(s) 120, 150, or its PR(s) 222, 232 and/or SR(s) 224, 234) may include information associated with/based on/corresponding to the indication/indicia/information/field/parameter associated with/corresponding to/affiliated with how much transmission power remains/is left/it remains capable of using relative to a transmission power currently or otherwise utilized by the STA (e.g., STA(s) 120, 150, or its PR(s) 222, 232 and/or SR(s) 224, 234).

In some circumstances, a transmitter apparatus (e.g., AP 110) may transmit and/or a receiver apparatus (e.g., STA(s) 120, 150, or its PR(s) 222, 232 and/or SR(s) 224, 234) may receive a packet, which may be or may be included in any one or more of the DL and/or UL communications 310, 312, 320, 330, 332, 350-357, 362-364 described in greater detail herein. In some circumstances, a type, category, classification, identification, or other suitable aspect of the packet may be determined (e.g., by the STA(s) 120, 150, or its PR(s) 222, 232 and/or SR(s) 224, 234). If such type, category, classification, identification, or other suitable aspect of the packet is not determined (e.g., by the STA(s) 120, 150, or its PR(s) 222, 232 and/or SR(s) 224, 234), the packet may not be processed, demodulated, or decoded properly. Accordingly, in some circumstances, wireless communication can benefit from aspects that provide for protocols that enable such determination(s). In some circumstances, such determination while processing a portion of the packet (e.g., the preamble) can assist a receiver apparatus (e.g., STA(s) 120, 150, or its PR(s) 222, 232 and/or SR(s) 224, 234) decide whether to continue to process a remaining portion(s) of the packet (e.g., if the receiver apparatus (e.g., STA(s) 120, 150, or its PR(s) 222, 232 and/or SR(s) 224, 234) determines that such type, category, classification, identification, or other suitable aspect of the packet does not satisfy one or more criteria, requirement, threshold, or other suitable information), thereby potentially enabling conservation of power consumption, computational resources, and other suitable processes that may otherwise have been performed (e.g., by the receiver apparatus (e.g., STA(s) 120, 150, or its PR(s) 222, 232 and/or SR(s) 224, 234)).

In some aspects, a packet may include a preamble, and such packet (and any corresponding preamble(s), portion(s), etc., to the extent applicable) may be or may be included in any one or more of the DL and/or UL communications 310, 312, 320, 330, 332, 350-357, 362-364 described in greater detail herein. In some aspects, the packet, the preamble of the packet, and/or portion of the preamble of the packet may include any sort, type, or variety of information, bits, symbols, and/or data, and/or other information carrier. In some aspects, the packet, the preamble of the packet, and/or portion of the preamble of the packet may include a plurality of sub-components (e.g., sub-packets, sub-preambles of the preamble, and/or sub-portions of the portion of the preamble of the packet, respectively).

In some aspects, the packet and/or the preamble of the packet may include at least a first portion and a second portion. In some aspects, the first portion may include data, symbols, bits, or information that is different from, varies from, or substantially deviates from data, symbols, bits, or information included in the second portion. In some aspects, the first portion may include data, symbols, bits, or information that is the same as, substantially the same as, or equivalent to data, symbols, bits, or information included in the second portion. In some aspects, the second portion (or the data, symbols, bits, or information thereof) may comprise a replication or repetition (e.g., at least once) of the first portion (or the data, symbols, bits, or information thereof). In some aspects, the first portion precedes the second portion. In some aspects, the second portion is subsequent to the first portion. In some aspects, the first portion is subsequent to the second portion. As mentioned above, in some aspects, such packet (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, the first portion and the second portion are provided, included, or arranged (in the packet) continuously, contiguously, and/or without other information, bits, symbols, and/or data there-between. For example, in such aspects, the end/last portion of the first portion is substantially/immediately followed by, or contiguous in relation to, the beginning/starting portion of the second portion. In some aspects, the first portion and the second portion are provided, included, or arranged (in the packet) non-continuously, non-contiguously, and/or with other information, bits, symbols, and/or data there-between. For example, in such aspects, the end/last portion of the first portion is substantially/immediately followed by the beginning/starting portion of the second portion. As mentioned above, in some aspects, such packet (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, the first portion is modulated using, by, or according to a first modulation scheme, type, or technique, and the second portion is modulated using, by, or according to a second modulation scheme, type, or technique. In some aspects, such first modulation scheme, type, or technique is the same as, similar to, or equivalent to the second modulation scheme, type, or technique. In some aspects, either one or more of such first and/or second modulation scheme(s), type(s), or technique(s) may include but is/are not limited to orthogonal quadrature amplitude modulation, frequency division multiplexing, orthogonal code division multiplexing, complementary code keying, cyclic-code shift keying, pulse-position modulation, binary phase-shift keying, quadrature phase-shift keying, quadrature phase shift keying, quadrature binary phase-shift keying (e.g., ninety degrees phase-shifted relative to binary phase shift-keying), dual-binary phase-shift keying, QBPSK, frequency-shift keying, amplitude-shift keying, on-off keying, and/or various other suitable forms of modulation schemes, types, or techniques. As mentioned above, in some aspects, such packet (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, the packet and/or the preamble of the packet may include at least a third portion. In some aspects, the third portion may include one or more fields, portions, information, bits, symbols, and/or data. In some aspects, the third portion may include an indication associated with a type, color, or identifier of a BSS. For example, such an indication may include a BSS identifier, a BSS color, and/or various other suitable indications. In some aspects, the third portion may include an indication associated with a TXOP. For example, such an indication may include information related to the TXOP (e.g., a start time, a duration/period of transmission, an end time, etc.) of one or more wireless communications of an apparatus (e.g., AP 110) and/or another apparatus (e.g., STA(s) 120, 150, or its PR(s) 222, 232 and/or SR(s) 224, 234). In some aspects, the third portion may include information associated with a format, type, or other suitable aspect of the packet, the preamble of the packet, and/or the modality of wireless communication of the packet and/or the preamble of the packet. In some aspects, the third portion may include or indicate a length or duration of the packet, the preamble of the packet, and/or any other portion of the preamble of the packet. For example, the third portion may include or indicate a length or duration of the third portion. In some aspects, the third portion may include or indicate information associated with a direction of communication of the packet (or at least some portions thereof), an intended recipient of the packet (or at least some portions thereof), a link type/characteristic of the communication of the packet (or at least some portions thereof). As an example, such information may include or indicate whether/that the packet (or at least some portions thereof) is intended for, directed to, or destined to an apparatus (e.g., AP 110) and/or whether/that the packet (or at least some portions thereof) is intended for, directed to, or destined to an apparatus (e.g., STA(s) 120, 150, or its PR(s) 222, 232 and/or SR(s) 224, 234). As another example, such information may include or indicate whether the packet (or at least some portions thereof) is an uplink packet/communication and/or a downlink packet/communication. As mentioned above, in some aspects, such packet (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, an apparatus (e.g., AP 110) may generate a packet, a preamble of a packet, and/or any portions respectively thereof in a manner that enables an apparatus (e.g., STA(s) 120, 150, or its PR(s) 222, 232 and/or SR(s) 224, 234) to determine, using information, data, bits, symbols, and/or other suitable encapsulations of information included in such packet, preamble, and/or portions respectively thereof, a type, format, version, configuration, structure, and/or any suitable characteristic of such packet, preamble, and/or other portions respectively thereof. In some aspects, an apparatus (e.g., STA(s) 120, 150, or its PR(s) 222, 232 and/or SR(s) 224, 234) may determine a type, format, version, configuration, structure, and/or any suitable characteristic of such packet, preamble, and/or other portions respectively thereof based at least in part on one or more aspects described herein in relation to any one or more portions (e.g., the first portion, the second portion, and/or the third portion, and/or any respective portions/sub-portions respectively thereof) of the packet and/or the preamble of the packet.

In some aspects, an apparatus (e.g., STA(s) 120, 150, or its PR(s) 222, 232 and/or SR(s) 224, 234) may determine/distinguish whether/that the packet and/or preamble is of a first type, first format, first version, first configuration, first structure, and/or a first characteristic (e.g., instead of any other/different type, format, version, configuration, structure, and/or a characteristic, as described herein) if, when, based at least in part on, or by considering (a) the/that/whether the packet and/or preamble of the packet includes the second portion (as described herein) of the preamble and/or the packet, and/or (b) the/that/whether the packet and/or preamble of the packet includes the first portion (as described herein) of the preamble and/or the packet but does not include the second portion (as described herein) of the preamble and/or the packet. As mentioned above, in some aspects, such packet (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, an apparatus (e.g., STA(s) 120, 150, or its PR(s) 222, 232 and/or SR(s) 224, 234) may determine/distinguish whether/that the packet and/or preamble of the packet is of a first type, first format, first version, first configuration, first structure, and/or a first characteristic (e.g., instead of any other/different type, format, version, configuration, structure, and/or a characteristic, as described herein) if, when, based at least in part on, or by considering (a) the/that/whether the first portion (as described herein) of the packet and/or preamble of the packet comprises a length that is not the same as (or not substantially/substantively equivalent/similar/same in relation to) a length of the second portion (as described herein) of the packet and/or the preamble of the packet, and/or (b) the/that/whether the second portion (as described herein) of the packet and/or the preamble of the packet comprises a length that is not the same as (or not substantially/substantively equivalent/similar/same in relation to) a length of the first portion (as described herein) of the packet and/or the preamble of the packet. As used herein, in some aspects, a first length is not substantially/substantively equivalent/similar/same in relation to a second length if/when the second length is not an integer multiple of the first length or the first length is not a multiple (e.g., not an integer multiple) of the second length, such that, for example, dividing one length (e.g., the first length or the second length) by the other length (e.g., the second length or the first length, respectively) produces in a remainder having value that is not zero. As mentioned above, in some aspects, such packet (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, an apparatus (e.g., STA(s) 120, 150, or its PR(s) 222, 232 and/or SR(s) 224, 234) may determine/distinguish whether/that the packet and/or preamble of the packet is of a second type, second format, second version, second configuration, second structure, and/or a second characteristic (e.g., instead of any other/different type, format, version, configuration, structure, and/or a characteristic, as described herein) if, when, based at least in part on, or by considering (a) the/that/whether the first portion (as described herein) of the packet and/or preamble of the packet comprises a length that is the same as (or substantially/substantively equivalent/similar/same in relation to) a length of the second portion (as described herein) of the packet and/or preamble of the packet, and/or (b) the/that/whether the second portion (as described herein) of the packet and/or preamble of the packet comprises a length that is the same as (or substantially/substantively equivalent/similar/same in relation to) a length of the first portion (as described herein) of the packet and/or preamble of the packet. As used herein, in some aspects, a first length is substantially/substantively equivalent/similar/same in relation to a second length if/when the second length is a multiple (e.g., an integer multiple) of the first length or the first length is a multiple (e.g., an integer multiple) of the second length, such that, for example, dividing one length (e.g., the first length or the second length) by the other length (e.g., the second length or the first length, respectively) produces a remainder having value of zero. As mentioned above, in some aspects, such packet (and, to the extent applicable, any corresponding preamble(s), portion(s), etc.) may be or may be included in any one or more of the DL and/or UL communications 310, 312, 320, 330, 332, 350-357, 362-364 described in greater detail herein.

Furthermore, in some aspects, an apparatus (e.g., STA(s) 120, 150, or its PR(s) 222, 232 and/or SR(s) 224, 234) may determine/distinguish whether/that the packet and/or preamble of the packet is of a second type, second format, second version, second configuration, second structure, and/or a second characteristic (e.g., instead of any other/different type, format, version, configuration, structure, and/or a characteristic, as described herein) if, when, based at least in part on, or by considering (a) the/that/whether the first portion (as described herein) of the packet and/or preamble of the packet comprises a length that is not the same as (or not substantially/substantively equivalent/similar/same in relation to) a length of the second portion (as described herein) of the packet and/or the preamble of the packet, and/or (b) the/that/whether the second portion (as described herein) of the packet and/or the preamble of the packet comprises a length that is not the same as (or not substantially/substantively equivalent/similar/same in relation to) a length of the first portion (as described herein) of the packet and/or the preamble of the packet. As used herein, in some aspects, a first length is not substantially/substantively equivalent/similar/same in relation to a second length if/when the second length is not an integer multiple of the first length or the first length is not a multiple (e.g., not an integer multiple) of the second length, such that, for example, dividing one length (e.g., the first length or the second length) by the other length (e.g., the second length or the first length, respectively) produces in a remainder having value that is not zero. As mentioned above, in some aspects, such packet (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, an apparatus (e.g., STA(s) 120, 150, or its PR(s) 222, 232 and/or SR(s) 224, 234) may determine/distinguish whether/that the packet and/or preamble of the packet is of a second type, second format, second version, second configuration, second structure, and/or a second characteristic (e.g., instead of any other/different type, format, version, configuration, structure, and/or a characteristic, as described herein) if, when, based at least in part on, or by considering (a) the/that/whether the first portion (as described herein) of the packet and/or preamble of the packet comprises data, symbols, bits, or information that is different from, varies from, or substantially deviates from data, symbols, bits, or information included in the second portion (as described herein) of the packet and/or preamble of the packet, and/or (b) the/that/whether the second portion (as described herein) of the packet and/or preamble of the packet comprises data, symbols, bits, or information that is different from, varies from, or substantially deviates from data, symbols, bits, or information included in the first portion (as described herein) of the packet and/or preamble of the packet. As mentioned above, in some aspects, such packet (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, an apparatus (e.g., STA(s) 120, 150, or its PR(s) 222, 232 and/or SR(s) 224, 234) may determine/distinguish whether/that the packet and/or preamble of the packet is of a second type, second format, second version, second configuration, second structure, and/or a second characteristic (e.g., instead of any other/different type, format, version, configuration, structure, and/or a characteristic, as described herein) if, when, based at least in part on, or by considering (a) the/that/whether the first portion (as described herein) of the packet and/or preamble of the packet comprises data, symbols, bits, or information that is the same as (or substantially/substantively equivalent/similar/same in relation to) data, symbols, bits, or information included in the second portion (as described herein) of the packet and/or preamble of the packet, and/or (b) the/that/whether the second portion (as described herein) of the packet and/or preamble of the packet comprises data, symbols, bits, or information that is the same as (or substantially/substantively equivalent/similar/same in relation to) data, symbols, bits, or information included in the first portion (as described herein) of the packet and/or preamble of the packet. As mentioned above, in some aspects, such packet (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, an apparatus (e.g., STA(s) 120, 150, or its PR(s) 222, 232 and/or SR(s) 224, 234) may determine/distinguish whether/that the packet and/or preamble of the packet is of a second type, second format, second version, second configuration, second structure, and/or a second characteristic (e.g., instead of any other/different type, format, version, configuration, structure, and/or a characteristic, as described herein) if, when, based at least in part on, or by considering (a) the/that/whether the first portion (as described herein) of the packet and/or preamble of the packet comprises data, symbols, bits, or information that is modulated according to a modulation scheme, type, or technique that is different from, varies from, or substantially deviates from a modulation scheme, type, or technique of the data, symbols, bits, or information included in the second portion (as described herein) of the packet and/or preamble of the packet, and/or (b) the/that/whether the second portion (as described herein) of the packet and/or preamble of the packet comprises data, symbols, bits, or information that is modulated according to a modulation scheme, type, or technique different from, varies from, or substantially deviates from a modulation scheme, type, or technique of the data, symbols, bits, or information included in the first portion (as described herein) of the packet and/or preamble of the packet. As mentioned above, in some aspects, such packet (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, an apparatus (e.g., STA(s) 120, 150, or its PR(s) 222, 232 and/or SR(s) 224, 234) may determine/distinguish whether/that the packet and/or preamble of the packet is of a second type, second format, second version, second configuration, second structure, and/or a second characteristic (e.g., instead of any other/different type, format, version, configuration, structure, and/or a characteristic, as described herein) if, when, based at least in part on, or by considering (a) the/that/whether the first portion (as described herein) of the packet and/or preamble of the packet comprises data, symbols, bits, or information that is modulated according to a modulation scheme, type, or technique that is the same as (or substantially/substantively equivalent/similar/same in relation to) a modulation scheme, type, or technique of the data, symbols, bits, or information included in the second portion (as described herein) of the packet and/or preamble of the packet, and/or (b) the/that/whether the second portion (as described herein) of the packet and/or preamble of the packet comprises data, symbols, bits, or information that is modulated according to a modulation scheme, type, or technique that is the same as (or substantially/substantively equivalent/similar/same in relation to) a modulation scheme, type, or technique of the data, symbols, bits, or information included in the first portion (as described herein) of the packet and/or preamble of the packet. As mentioned above, in some aspects, such packet (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, an apparatus (e.g., STA(s) 120, 150, or its PR(s) 222, 232 and/or SR(s) 224, 234) may determine/distinguish whether/that the packet and/or preamble is of a third type, third format, third version, third configuration, third structure, and/or a third characteristic (e.g., instead of any other/different type, format, version, configuration, structure, and/or a characteristic, as described herein) if, when, based at least in part on, or by considering (a) the/that/whether the packet and/or preamble of the packet includes the second portion (as described herein) of the preamble and/or the packet and/or (b) the/that/whether the packet and/or preamble of the packet includes the first portion (as described herein) of the preamble and/or the packet but does not include the second portion (as described herein) of the preamble and/or the packet. As mentioned above, in some aspects, such packet (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, an apparatus (e.g., STA(s) 120, 150, or its PR(s) 222, 232 and/or SR(s) 224, 234) may determine/distinguish whether/that the packet and/or preamble of the packet is of a third type, third format, third version, third configuration, third structure, and/or a third characteristic (e.g., instead of any other/different type, format, version, configuration, structure, and/or a characteristic, as described herein) if, when, based at least in part on, or by considering (a) the/that/whether the first portion (as described herein) of the packet and/or preamble of the packet comprises a length that is the same as (or substantially/substantively equivalent/similar/same in relation to) a length of the second portion (as described herein) of the packet and/or preamble of the packet, and/or (b) the/that/whether the second portion (as described herein) of the packet and/or preamble of the packet comprises a length that is the same as (or substantially/substantively equivalent/similar/same in relation to) a length of the first portion (as described herein) of the packet and/or preamble of the packet. As used herein, in some aspects, a first length is substantially/substantively equivalent/similar/same in relation to a second length if/when the second length is a multiple (e.g., an integer multiple) of the first length or the first length is a multiple (e.g., an integer multiple) of the second length, such that, for example, dividing one length (e.g., the first length or the second length) by the other length (e.g., the second length or the first length, respectively) produces a remainder having value of zero. As mentioned above, in some aspects, such packet (and, to the extent applicable, any corresponding preamble(s), portion(s), etc.) may be or may be included in any one or more of the DL and/or UL communications 310, 312, 320, 330, 332, 350-357, 362-364 described in greater detail herein.

Furthermore, in some aspects, an apparatus (e.g., STA(s) 120, 150, or its PR(s) 222, 232 and/or SR(s) 224, 234) may determine/distinguish whether/that the packet and/or preamble of the packet is of a third type, third format, third version, third configuration, third structure, and/or a third characteristic (e.g., instead of any other/different type, format, version, configuration, structure, and/or a characteristic, as described herein) if, when, based at least in part on, or by considering (a) the/that/whether the first portion (as described herein) of the packet and/or preamble of the packet comprises a length that is not the same as (or not substantially/substantively equivalent/similar/same in relation to) a length of the second portion (as described herein) of the packet and/or the preamble of the packet, and/or (b) the/that/whether the second portion (as described herein) of the packet and/or the preamble of the packet comprises a length that is not the same as (or not substantially/substantively equivalent/similar/same in relation to) a length of the first portion (as described herein) of the packet and/or the preamble of the packet. As used herein, in some aspects, a first length is not substantially/substantively equivalent/similar/same in relation to a second length if/when the second length is not an integer multiple of the first length or the first length is not a multiple (e.g., not an integer multiple) of the second length, such that, for example, dividing one length (e.g., the first length or the second length) by the other length (e.g., the second length or the first length, respectively) produces in a remainder having value that is not zero. As mentioned above, in some aspects, such packet (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, an apparatus (e.g., STA(s) 120, 150, or its PR(s) 222, 232 and/or SR(s) 224, 234) may determine/distinguish whether/that the packet and/or preamble of the packet is of a third type, third format, third version, third configuration, third structure, and/or a third characteristic (e.g., instead of any other/different type, format, version, configuration, structure, and/or a characteristic, as described herein) if, when, based at least in part on, or by considering (a) the/that/whether the first portion (as described herein) of the packet and/or preamble of the packet comprises data, symbols, bits, or information that is different from, varies from, or substantially deviates from data, symbols, bits, or information included in the second portion (as described herein) of the packet and/or preamble of the packet, and/or (b) the/that/whether the second portion (as described herein) of the packet and/or preamble of the packet comprises data, symbols, bits, or information that is different from, varies from, or substantially deviates from data, symbols, bits, or information included in the first portion (as described herein) of the packet and/or preamble of the packet. As mentioned above, such packet which may be or may be included in any one or more of the DL and/or UL communications 310, 312, 320, 330, 332, 350-357, 362-364 described in greater detail herein.

In some aspects, an apparatus (e.g., STA(s) 120, 150, or its PR(s) 222, 232 and/or SR(s) 224, 234) may determine/distinguish whether/that the packet and/or preamble of the packet is of a third type, third format, third version, third configuration, third structure, and/or a third characteristic (e.g., instead of any other/different type, format, version, configuration, structure, and/or a characteristic, as described herein) if, when, based at least in part on, or by considering (a) the/that/whether the first portion (as described herein) of the packet and/or preamble of the packet comprises data, symbols, bits, or information that is the same as (or substantially/substantively equivalent/similar/same in relation to) data, symbols, bits, or information included in the second portion (as described herein) of the packet and/or preamble of the packet, and/or (b) the/that/whether the second portion (as described herein) of the packet and/or preamble of the packet comprises data, symbols, bits, or information that is the same as (or substantially/substantively equivalent/similar/same in relation to) data, symbols, bits, or information included in the first portion (as described herein) of the packet and/or preamble of the packet. As mentioned above, in some aspects, such packet (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, an apparatus (e.g., STA(s) 120, 150, or its PR(s) 222, 232 and/or SR(s) 224, 234) may determine/distinguish whether/that the packet and/or preamble of the packet is of a third type, third format, third version, third configuration, third structure, and/or a third characteristic (e.g., instead of any other/different type, format, version, configuration, structure, and/or a characteristic, as described herein) if, when, based at least in part on, or by considering (a) the/that/whether the first portion (as described herein) of the packet and/or preamble of the packet comprises data, symbols, bits, or information that is modulated according to a modulation scheme, type, or technique that is different from, varies from, or substantially deviates from a modulation scheme, type, or technique of the data, symbols, bits, or information included in the second portion (as described herein) of the packet and/or preamble of the packet, and/or (b) the/that/whether the second portion (as described herein) of the packet and/or preamble of the packet comprises data, symbols, bits, or information that is modulated according to a modulation scheme, type, or technique different from, varies from, or substantially deviates from a modulation scheme, type, or technique of the data, symbols, bits, or information included in the first portion (as described herein) of the packet and/or preamble of the packet. As mentioned above, in some aspects, such packet (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, an apparatus (e.g., STA(s) 120, 150, or its PR(s) 222, 232 and/or SR(s) 224, 234) may determine/distinguish whether/that the packet and/or preamble of the packet is of a third type, third format, third version, third configuration, third structure, and/or a third characteristic (e.g., instead of any other/different type, format, version, configuration, structure, and/or a characteristic, as described herein) if, when, based at least in part on, or by considering (a) the/that/whether the first portion (as described herein) of the packet and/or preamble of the packet comprises data, symbols, bits, or information that is modulated according to a modulation scheme, type, or technique that is the same as (or substantially/substantively equivalent/similar/same in relation to) a modulation scheme, type, or technique of the data, symbols, bits, or information included in the second portion (as described herein) of the packet and/or preamble of the packet, and/or (b) the/that/whether the second portion (as described herein) of the packet and/or preamble of the packet comprises data, symbols, bits, or information that is modulated according to a modulation scheme, type, or technique that is the same as (or substantially/substantively equivalent/similar/same in relation to) a modulation scheme, type, or technique of the data, symbols, bits, or information included in the first portion (as described herein) of the packet and/or preamble of the packet. As mentioned above, in some aspects, such packet (and, to the extent applicable, any corresponding preamble(s), portion(s), etc.) may be or may be included in any one or more of the DL and/or UL communications 310, 312, 320, 330, 332, 350-357, 362-364 described in greater detail herein. In some aspects, an apparatus (e.g., STA(s) 120, 150, or its PR(s) 222, 232 and/or SR(s) 224, 234) may determine/distinguish whether/that the packet and/or preamble is of a third type, third format, third version, third configuration, third structure, and/or a third characteristic (e.g., instead of any other/different type, format, version, configuration, structure, and/or a characteristic, as described herein) if, when, based at least in part on, or by considering (a) the/that/whether the packet and/or preamble of the packet includes the third portion (as described herein) of the preamble and/or the packet and/or (b) the/that/whether the packet and/or preamble of the packet includes the first portion (as described herein) and/or the second portion (as described herein) of the preamble and/or the packet but does not include the third portion (as described herein) of the preamble and/or the packet. As mentioned above, in some aspects, such packet (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, an apparatus (e.g., STA(s) 120, 150, or its PR(s) 222, 232 and/or SR(s) 224, 234) may determine/distinguish whether/that the packet and/or preamble of the packet is of a third type, third format, third version, third configuration, third structure, and/or a third characteristic (e.g., instead of any other/different type, format, version, configuration, structure, and/or a characteristic, as described herein) if, when, based at least in part on, or by considering (a) the/that/whether the third portion (as described herein) of the packet and/or preamble of the packet comprises data, symbols, bits, or information that is modulated according to a modulation scheme, type, or technique that is different from, varies from, or substantially deviates from a modulation scheme, type, or technique of the data, symbols, bits, or information included in the first portion (as described herein) and/or the second portion (as described herein) of the packet and/or preamble of the packet, and/or (b) the/that/whether the first portion (as described herein) and/or the second portion (as described herein) of the packet and/or preamble of the packet comprises data, symbols, bits, or information that is modulated according to a modulation scheme, type, or technique different from, varies from, or substantially deviates from a modulation scheme, type, or technique of the data, symbols, bits, or information included in the third portion (as described herein) of the packet and/or preamble of the packet. As mentioned above, in some aspects, such packet (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, an apparatus (e.g., STA(s) 120, 150, or its PR(s) 222, 232 and/or SR(s) 224, 234) may determine/distinguish whether/that the packet and/or preamble of the packet is of a third type, third format, third version, third configuration, third structure, and/or a third characteristic (e.g., instead of any other/different type, format, version, configuration, structure, and/or a characteristic, as described herein) if, when, based at least in part on, or by considering (a) the/that/whether the third portion (as described herein) of the packet and/or preamble of the packet comprises data, symbols, bits, or information that is modulated according to a modulation scheme, type, or technique that is the same as (or substantially/substantively equivalent/similar/same in relation to) a modulation scheme, type, or technique of the data, symbols, bits, or information included in the first portion (as described herein) and/or the second portion (as described herein) of the packet and/or preamble of the packet, and/or (b) the/that/whether the first portion (as described herein) and/or the second portion (as described herein) of the packet and/or preamble of the packet comprises data, symbols, bits, or information that is modulated according to a modulation scheme, type, or technique that is the same as (or substantially/substantively equivalent/similar/same in relation to) a modulation scheme, type, or technique of the data, symbols, bits, or information included in the third portion (as described herein) of the packet and/or preamble of the packet. As mentioned above, in some aspects, such packet (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, an apparatus (e.g., STA(s) 120, 150, or its PR(s) 222, 232 and/or SR(s) 224, 234) may determine/distinguish whether/that the packet and/or preamble of the packet is of a third type, third format, third version, third configuration, third structure, and/or a third characteristic (e.g., instead of any other/different type, format, version, configuration, structure, and/or a characteristic, as described herein) if, when, based at least in part on, or by considering (a) the/that/whether the third portion (as described herein) of the packet and/or preamble of the packet comprises data, symbols, bits, or information that is different from, varies from, or substantially deviates from data, symbols, bits, or information included in the first portion (as described herein) and/or the second portion (as described herein) of the packet and/or preamble of the packet, and/or (b) the/that/whether the first portion (as described herein) and/or the second portion (as described herein) of the packet and/or preamble of the packet comprises data, symbols, bits, or information that is different from, varies from, or substantially deviates from data, symbols, bits, or information included in the third portion (as described herein) of the packet and/or preamble of the packet. As mentioned above, in some aspects, such packet (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, an apparatus (e.g., STA(s) 120, 150, or its PR(s) 222, 232 and/or SR(s) 224, 234) may determine/distinguish whether/that the packet and/or preamble of the packet is of a third type, third format, third version, third configuration, third structure, and/or a third characteristic (e.g., instead of any other/different type, format, version, configuration, structure, and/or a characteristic, as described herein) if, when, based at least in part on, or by considering (a) the/that/whether the third portion (as described herein) of the packet and/or preamble of the packet comprises a length that is not the same as (or not substantially/substantively equivalent/similar/same in relation to) a length of the first portion (as described herein) and/or the second portion (as described herein) of the packet and/or the preamble of the packet, and/or (b) the/that/whether the first portion (as described herein) and/or the second portion (as described herein) of the packet and/or the preamble of the packet comprises a length that is not the same as (or not substantially/substantively equivalent/similar/same in relation to) a length of the third portion (as described herein) of the packet and/or the preamble of the packet. As used herein, in some aspects, a first length is not substantially/substantively equivalent/similar/same in relation to a second length if/when the second length is not an integer multiple of the first length or the first length is not a multiple (e.g., not an integer multiple) of the second length, such that, for example, dividing one length (e.g., the first length or the second length) by the other length (e.g., the second length or the first length, respectively) produces in a remainder having value that is not zero. As mentioned above, in some aspects, such packet (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, an apparatus (e.g., STA(s) 120, 150, or its PR(s) 222, 232 and/or SR(s) 224, 234) may determine/distinguish whether/that the packet and/or preamble of the packet is of a third type, third format, third version, third configuration, third structure, and/or a third characteristic (e.g., instead of any other/different type, format, version, configuration, structure, and/or a characteristic, as described herein) if, when, based at least in part on, or by considering (a) the/that/whether the first portion (as described herein) of the packet and/or preamble of the packet comprises a first value or first range of values (e.g., XXX or YYY), and/or (b) the/that/whether the second portion (as described herein) of the packet and/or preamble of the packet comprises a second value or a second range of values (e.g., YYY or XXX). As mentioned above, in some aspects, such packet (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, the first portion may include data, symbols, bits, or information that is the same as, substantially the same as, or equivalent to data, symbols, bits, or information included in the second portion. In some aspects, the first portion precedes the second portion. In some aspects, the first portion is subsequent to the second portion. In some aspects, an apparatus (e.g., STA(s) 120, 150, or its PR(s) 222, 232 and/or SR(s) 224, 234) may determine/distinguish whether/that the packet and/or preamble of the packet is of a second type, second format, second version, second configuration, second structure, and/or a second characteristic (e.g., instead of any other/different type, format, version, configuration, structure, and/or a characteristic, as described herein) if, when, based at least in part on, or by considering (a) the/that/whether the first portion (as described herein) of the packet and/or preamble of the packet comprises a first value or first range of values (e.g., XXX or YYY), and/or (b) the/that/whether the second portion (as described herein) of the packet and/or preamble of the packet comprises a second value or a second range of values (e.g., YYY or XXX). As mentioned above, in some aspects, such packet (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, a network of devices/apparatuses may include a plurality of apparatuses (e.g., APs, or their respective PR(s) and/or SR(s)) and/or a plurality of other apparatuses (e.g., STAs 120, 150, or its PR(s) 222, 232 and/or SR(s) 224, 234). In some aspects, at least a first apparatus, or its PR(s) and/or SR(s), (e.g., sometimes interchangeably referred to herein as the "primary apparatus" or "primary AP") (of the plurality of apparatuses (e.g., APs, or its PR(s) and/or SR(s))) may be superior to (e.g., be an administrator, commander, controller, manager, or director relative to) at least a second apparatus, or its PR(s) and/or SR(s), (e.g., sometimes interchangeably referred to herein as a "secondary apparatus" or "secondary AP") (of the plurality of apparatuses (e.g., APs, or its PR(s) and/or SR(s))). In some aspects, at least a first apparatus (e.g., sometimes interchangeably referred to herein as the "secondary apparatus" or "secondary AP") (of the plurality of apparatuses (e.g., APs)) may be subordinate to (e.g., be a servant, attendant, dependent, or inferior relative to) at least a second apparatus (e.g., sometimes interchangeably referred to herein as the "primary apparatus" or "primary AP") (of the plurality of apparatuses (e.g., APs, or its PR(s) and/or SR(s))).

In some aspects, one or more apparatus of a plurality of apparatuses (e.g., including the first apparatus (e.g., primary AP, or its PR(s) and/or SR(s)) and/or the second apparatus (e.g., secondary AP, or its PR(s) and/or SR(s))) may perform, initiate, cooperate, collaborate, combine, and/or coordinate their respective transmission(s) (e.g., DL transmission(s)) to one or more apparatuses (e.g., one or more STAs), and such performed/initiated/cooperative/collaborative/combined/coordinated communication may sometimes be referred to herein as "concerted communication(s)."

In some aspects, concerted communication(s) (as described herein) may include: two or more of the plurality of apparatuses (e.g., APs, or its PR(s) and/or SR(s)) transmitting the same or similar information, data, bits, packets, or frames. In some aspects, concerted communication(s) (as described herein) may include: two or more of the plurality of apparatuses (e.g., APs, or its PR(s) and/or SR(s)) transmitting the same or similar information, data, bits, packets, or frames at the same time or time period. In some aspects, concerted communication(s) (as described herein) may include: a DLDLTR communicated by the primary apparatus (e.g., primary AP, or its PR(s) and/or SR(s)) to at least one other apparatus (e.g., one or more secondary apparatus, one or more secondary APs (or its PR(s) and/or SR(s)), or one or more STA (or its PR(s) and/or SR(s))).

In some aspects, the DLTR may be configured to or comprising information useful to enable/cause such at least one other apparatus (e.g., one or more secondary apparatus, one or more secondary APs (or its PR(s) and/or SR(s)), or one or more STA (or its PR(s) and/or SR(s))) to be informed, prepared, or notified about a pending, expected, or anticipated DL communication to it from the primary apparatus(es) (e.g., primary AP(s), or its PR(s) and/or SR(s)).

In some aspects, the DLTR may include an announcement frame, packet, or information. For example, in some aspects, the DLTR may include a trigger frame, packet, or information. In some aspects, the DLTR may be configured to cause, trigger, or otherwise induce such at least one other apparatus (e.g., one or more secondary apparatus, one or more secondary APs (or its PR(s) and/or SR(s)), or one or more STA (or its PR(s) and/or SR(s))) to at least: (a) receive a DL communication from the primary apparatus (e.g., primary AP, or its PR(s) and/or SR(s)), and/or (b) relay, communicate, or otherwise transmit that same DL communication (received from the primary apparatus (e.g., primary AP, or its PR(s) and/or SR(s)) to at least one other downstream apparatus (e.g., a/another STA (or its PR(s) and/or SR(s)), a/another secondary transmitter, or a/another secondary AP (or its PR(s) and/or SR(s))).

In some aspects, the DLTR may include at least some (or may include all) of the information, bits, or data that the primary apparatus (e.g., primary AP, or its PR(s) and/or SR(s)) intends for the secondary apparatus (e.g., secondary AP, or its PR(s) and/or SR(s)) to communicate to at least one downstream apparatus (e.g., STA, or its PR(s) and/or SR(s)). In some aspects, a communication by the secondary apparatus (e.g., secondary AP, or its PR(s) and/or SR(s)) to at least one downstream apparatus (e.g., STA, or its PR(s) and/or SR(s)) may occur at the same/similar time or time period as, and/or may include at least some (or all) of the same/similar information as, a communication by the primary apparatus(es) (e.g., primary AP(s), or its PR(s) and/or SR(s)) to the same at least one downstream apparatus (e.g., STA, or its PR(s) and/or SR(s)), and/or at least another downstream apparatus (e.g., another STA, or its PR(s) and/or SR(s)).

In some aspects, concerted communication(s) (as described herein) may include: two or more of the plurality of apparatuses (e.g., APs, or their PR(s) and/or SR(s)) transmitting the same/similar or different/varying information, data, bits, packets, or frames at different time or varying time periods (e.g., sequentially). For example, in some aspects, a first set of information, data, bits, packets, or frames may be transmitted by the primary apparatus(es) (e.g., primary AP(s), or its PR(s) and/or SR(s)) to a first apparatus (e.g., a STA1 (or its PR(s) and/or SR(s)), a secondary apparatus, or a secondary AP (or its PR(s) and/or SR(s))) at time A or time period A, and a second set of information, data, bits, packets, or frames may be transmitted by the primary apparatus(es) (e.g., primary AP(s), or its PR(s) and/or SR(s)) to a second apparatus (e.g., a $STA_2$ (or its PR(s) and/or SR(s)), a secondary apparatus, or a secondary AP (or its PR(s) and/or SR(s))) at time B or time period B, wherein A and B may be the same, may at least partially overlap, or may not overlap.

In some aspects, concerted communication(s) (as described herein) may include: use/enabling/configuration of a first set of one or more antenna of the primary apparatus(es) (e.g., primary AP(s), or its PR(s) and/or SR(s)) for a communication (from the primary apparatus(es) (e.g., primary AP(s), or its PR(s) and/or SR(s))) to one or more secondary apparatus (e.g., secondary AP(s), or its PR(s) and/or SR(s)), and use/enabling/configuration of a second set of one or more antenna of the primary apparatus(es) (e.g., primary AP(s), or its PR(s) and/or SR(s)) for communication (from the primary apparatus(es) (e.g., primary AP(s), or its PR(s) and/or SR(s))) to one or more apparatuses (e.g., one or more STAs, or its PR(s) and/or SR(s)). In some aspects, the first set of antenna may have the same antenna relative to, or may have at least one of the same antenna relative to, the second set of antenna. In some aspects, the first set of antenna may have at least one different antenna relative to, or may have all different antennas relative to, the second set of antenna. In some aspects, the first set of antennas may be used at a first time or first period of time, and the second set of antenna may be used at a second time or second period of time. In some aspects, the first time or time period may be the same as, at least partially overlap with, or be different from the second time or second time period.

In some aspects, concerted communication(s) (as described herein) may be followed by one or more UL acknowledgements communicated/transmitted by one or more downstream apparatuses (e.g., one or more STAs (or their PR(s) and/or SR(s)), one or more secondary apparatuses, or one or more secondary APs (or their PR(s) and/or SR(s))) to one or more upstream apparatuses (e.g., one or more (upstream) STAs, one or more (upstream) secondary apparatuses, one or more (upstream) secondary APs (or their PR(s) and/or SR(s)), one or more primary apparatuses, or one or more primary APs). Such acknowledgements may occur at the same time or at varying times without deviating from the scope of the present disclosure.

In some aspects, the primary apparatus (e.g., primary AP, or its PR(s) and/or SR(s)) may transmit a frame, packet, or information (e.g., sometimes interchangeably referred to herein as "selection information" or "selection frame") to a secondary apparatus (e.g., secondary AP, or its PR(s) and/or SR(s)). In some aspects, such selection information may be configured to or comprise information useful to enable/cause the secondary apparatus (e.g., secondary AP, or its PR(s) and/or SR(s)) to determine whether the secondary apparatus (e.g., secondary AP, or its PR(s) and/or SR(s)) is available, capable, selectable, qualified, and/or enabled to participate in concerted communication, as described herein.

For example, an apparatus (e.g., apparatus, STA (or its PR(s) and/or SR(s)), secondary apparatus, or secondary AP (or its PR(s) and/or SR(s))) may receive such frame, packet, or information and, e.g., at least in part based on it, determine whether it has at least one channel, resource, communication antenna, and/or other aspect available or for use in such concerted communication(s) (as described herein) (e.g., at/by the time that such concerted communication(s) is desired/intended/expected/planned to occur). In some aspects, in response to or after receiving such selection information, the apparatus (e.g., apparatus, STA (or its PR(s) and/or SR(s)), secondary apparatus, or secondary AP (or its PR(s) and/or SR(s))) may generate and/or transmit a response packet, frame, or information to the primary apparatus (e.g., primary AP, or its PR(s) and/or SR(s)) and such response packet, frame, or information may include information related to the received selection information and/or configured to or comprising information useful to enable/cause the primary apparatus (e.g., primary AP) to understand whether that apparatus (e.g., apparatus, STA (or its PR(s) and/or SR(s)), secondary apparatus, or secondary AP (or its PR(s) and/or SR(s))) is available, capable, selectable, qualified, and/or enabled to participate in concerted communication, as described herein. In some aspects, at least in part based on such response packet, frame, or information, the primary apparatus (e.g., primary AP, or its PR(s) and/or SR(s)) may determine to (or determine not to) utilize the secondary apparatus (e.g., secondary AP, or its PR(s) and/or SR(s)) for concerted communication, as described herein.

In some aspects, an apparatus (e.g., AP (or its PR(s) and/or SR(s)) and/or STA (or its PR(s) and/or SR(s))) may comprise a plurality of antennas. In some aspects, each of the plurality of antennas may be configured to communicate (e.g., transmit and/or receive information) using different frequencies (e.g., antenna 1 may utilize frequency value/range X, an antenna 2 may utilize frequency value/range Y, wherein X is different from, or the same as, Y). In some aspects, the plurality of antennas may be configured to or enabled for communication in accordance with one or more aspects of concerted communication, as described herein. In some aspects, the apparatus (e.g., AP (or its PR(s) and/or SR(s)) and/or STA (or its PR(s) and/or SR(s))) may be associated with a single BSS or BSSID.

In some aspects, concerted communication(s) (as described herein) may include: concurrent/synchronous communication (e.g., concurrent/synchronous transmission, concurrent/synchronous reception, or concurrent/synchronous transmission/reception with concurrent/synchronous reception/transmission) of the same/similar data, packet, frame, or information utilizing such plurality of antennas. For example, antennas 1 and 2 may be utilized for communication of information W at the same time. In some aspects, concerted communication(s) (as described herein) may include: concurrent/synchronous communication (e.g., concurrent/synchronous transmission, concurrent/synchronous reception, or concurrent/synchronous transmission/reception with concurrent/synchronous reception/transmission) of the different data, packet, frame, or information utilizing such plurality of antennas. For example, antenna 1 may be utilized for communication of information Y at time 1 or time period 1, and antenna 2 may be utilized for communication of information Z at time 1 or time period 1.

In some aspects, concerted communication(s) (as described herein) may include: sequential/time-multiplexed/time-separated communication (e.g., concurrent/synchronous transmission, concurrent/synchronous reception, or concurrent/synchronous transmission/reception with concurrent/synchronous reception/transmission) of the same/similar data, packet, frame, or information utilizing such plurality of antennas. For example, antenna 1 may be utilized for communication of information W at time 1 or time period 1, and antenna 2 may be utilized for communication of information W at time 2 or time period 2. In some aspects, concerted communication(s) (as described herein) may include: sequential/time-multiplexed/time-separated communication (e.g., concurrent/synchronous transmission, concurrent/synchronous reception, or concurrent/synchronous transmission/reception with concurrent/synchronous reception/transmission) of the different data, packet, frame, or information utilizing such plurality of antennas. For example, antenna 1 may be utilized for communication of information W at time 1 or time period 1, and antenna 2 may be utilized for communication of information Y at time 2 or time period 2.

In some aspects, concerted communication(s) (as described herein) may include: independent/asynchronous communication (e.g., transmission and/or reception by at least one antenna/radio/chain of an apparatus independent/asynchronous in relation to any other transmission and/or reception by at least one other antenna/radio/chain of that same apparatus). In some aspects, independent/asynchronous communication(s) may involve the same/similar data, packet, frame, or information utilizing such plurality of antennas. In some aspects, independent/asynchronous communication(s) may involve different/varying data, packet, frame, or information utilizing such plurality of antennas. For example, the apparatus may enable communication of packet 1 at a time or time period that is independent/asynchronous of (e.g., unsynchronized; not dependent on) a time or time period at which packet 2 is communicated using the apparatus.

In some configurations, concerted communication(s) (as described herein) may include: a setup protocol/period/stage. In some aspects, the setup protocol/period/stage may include using at least one antenna/radio of an apparatus (e.g., AP (or its PR(s) and/or SR(s)) and/or STA (or its PR(s) and/or SR(s))) to form an association with at least one other apparatus (e.g., AP (or its PR(s) and/or SR(s)) and/or STA (or its PR(s) and/or SR(s))).

In some aspects, the setup protocol/period/stage may include an apparatus (e.g., AP (or its PR(s) and/or SR(s)) and/or STA (or its PR(s) and/or SR(s))) using at least one antenna/radio to communicate, determine, negotiation, advertise, inform, agree-upon, or select one or more capabilities of at least that apparatus or another apparatus (e.g., AP (or its PR(s) and/or SR(s)) and/or STA (or its PR(s) and/or SR(s))), and such capabilities may include any one or more of the aspects of concerted communication, as described herein.

In some aspects, the setup protocol/period/stage may include using at least one communication, packet/frame, protocol, determination, or negotiation related to determining/configuring/enabling/comprising at least (a) how many (e.g., a number/quantity) of links or channels to be enabled by the apparatus (e.g., AP (or its PR(s) and/or SR(s)) and/or STA (or its PR(s) and/or SR(s)), (b) which antenna(s)/radio(s) of an apparatus (e.g., AP (or its PR(s) and/or SR(s)) and/or STA (or its PR(s) and/or SR(s))) will be used for that determine many/number/quantity of links or channels, (c) which types of information/data/bits will be communicated/included in each of those links or channels and/or antenna(s)/radio(s) of the apparatus, (d) timing information and/or frequency information for such communications (e.g., when such communications will begin/end, and/or at what frequency such communications will occur), (e) information regarding whether such links or channels will be used concurrently, sequentially, independently, asynchronously, simultaneously, jointly/dis-jointly, synchronously/de-synchronously, etc., and/or (f) any one or more aspects of concerted communication, as described herein.

In some aspects, the setup protocol/period/stage may be performed via a single link/channel/antenna/radio. In some aspects, the setup protocol/period/stage may be performed via a plurality of link/channel/antenna/radio.

In some aspects, an apparatus (e.g., AP (or its PR(s) and/or SR(s)) and/or STA (or its PR(s) and/or SR(s))) may include/implement/utilize a first number (e.g., N) of upper MAC layer(s) and a second number (e.g., M) of lower MAC layer(s). In some aspects, each of the second number (e.g., M) of lower MAC layer(s) is associated/linked with its own (e.g., separate/different) physical (PHY) layer. In some aspects, each of those PHY layer(s) is associated/linked to its own (e.g., separate/different) antenna/radio/transceiver, as described herein. In some aspects, the first number (e.g., M) is lower than the second number (e.g., N). In some aspects, the first number (e.g., M) is equal to one, and the second number (e.g., N) is two or greater.

In some aspects, an apparatus (e.g., AP (or its PR(s) and/or SR(s)) and/or STA (or its PR(s) and/or SR(s))) may include/implement/utilize a first number (e.g., A) of MAC layer(s) and a second number (e.g., B) of physical (PHY) layer(s). In some aspects, each of the second number (e.g., B) of PHY layer(s) is associated/linked with its own (e.g., separate/different) antenna/radio/transceiver, as described herein. In some aspects, the first number (e.g., A) is lower than the second number (e.g., B). In some aspects, the first number (e.g., A) is equal to one, and the second number (e.g., B) is two or greater.

In some aspects, the setup protocol/period/stage may involve/include the communication of various types of information/data/bit(s)/field(s)/portion(s), which, in some aspects, may (or may not) include one or more of the following:

(A) an identifier of the packet/frame, an identifier of an apparatus (e.g., AP, or its PR(s) and/or SR(s)), and/or an identifier of another apparatus (e.g., STA, or its PR(s) and/or SR(s));

(B) a BSSID pertaining to the channel(s)/link(s), pertaining to a communication/packet(s)/frame(s), pertaining to an apparatus (e.g., AP, or its PR(s) and/or SR(s)), and/or pertaining to another apparatus (e.g., STA, or its PR(s) and/or SR(s));

(C) an operating class pertaining to a channel(s)/link(s), pertaining to a communication/packet(s)/frame(s), pertaining to an apparatus (e.g., AP, or its PR(s) and/or SR(s)), and/or pertaining to another apparatus (e.g., STA, or its PR(s) and/or SR(s));

(D) channel/link information (e.g., channel/link number (e.g., quantity), channel/link assignment in relation to an antenna/radio to be utilized for related communication(s), channel/link frequency information, channel/link bandwidth, channel/link channel width, channel/link conditions, channel/link identifier/information, etc.);

(E) an indication indicating that, and/or which of, a plurality of channels/links is a primary channel(s)/link(s) and, in some aspects, that, and/or which of, such plurality of channels/links is a secondary channel(s)/link(s);

(F) an indication indicating that, and/or which/whether, two or more of a plurality of channels/links includes, or is intended/desired to include, information/data for aggregation at one or more apparatuses (e.g., STA (or its PR(s) and/or SR(s)) and/or AP (or its PR(s) and/or SR(s)));

(G) channel/link status (e.g., whether and/or which of the one or more channel(s)/link(s) is currently, or subsequently can/may be, enabled, disabled, disabled but able to be enabled, and/or enabled but able to be disabled);

(H) a number (e.g., quantity) of channel(s)/link(s) currently, or subsequently can/may be, enabled/used and, in some aspects, frequency information and/or various operational parameter(s)/setting(s)/capability(s) pertaining thereto, as described herein;

(I) operational parameters/settings/capabilities pertaining to any one or more of the channel(s)/link(s), pertaining to the communication/packet(s)/frame(s), pertaining to the apparatus (e.g., AP, or its PR(s) and/or SR(s)), and/or pertaining to another apparatus (e.g., STA, or its PR(s) and/or SR(s));

(J) information pertaining/related to how one channel/link/antenna (e.g., of an apparatus (e.g., AP (or its PR(s) and/or SR(s)) and/or STA (or its PR(s) and/or SR(s))) can/does/will operate/communicates/functions in relation/relationship to another channel/link/antenna (e.g., of an apparatus (e.g., AP (or its PR(s) and/or SR(s)) and/or STA (or its PR(s) and/or SR(s)))), wherein such relation/relationship may (or may not) include one or more of the following:

(J)(1) a relationship wherein there exists concurrent/synchronous communication (e.g., transmission and/or reception) by one channel/link/antenna in relation to the other channel/link/antenna, (J)(2) a relationship wherein there exists independent/asynchronous communication (e.g., transmission and/or reception) by one channel/link/antenna in relation to the other channel/link/antenna, time-/frequency-multiplexed or time-/frequency-separated communication (e.g., transmission and/or reception) by one channel/link/antenna in relation to the other channel/link/antenna, and/or (J)(3) a relationship wherein there exists joint communication (e.g., transmission and/or reception) by one channel/link/antenna in relation to another channel/link/antenna, using the same/similar time, time period, frequency, and/or other resources by such channels/links/antennas); and/or (K) any one or more other information/data/bit(s)/field(s)/portion(s) pertaining to, associated with, or bearing a relationship to any one or more aspect(s) of concerted communication(s), as described herein.

In some aspects, information communicated from one or more apparatuses (e.g., AP and/or STA) to another one or more apparatuses (e.g., AP (or its PR(s) and/or SR(s)) and/or STA (or its PR(s) and/or SR(s))) may include one or more bits. In some aspects, such one or more bits may be an indication of a quality of service (QoS), an identifier related to the content of that communication (e.g., a packet identifier, a traffic identifier (TID), etc.), and/or various other suitable aspects. As used herein, such one or more bits may sometimes be referred to as "one or more identifier bits," "identifier bit(s)," or a similar term/phrase.

In some aspects, one or more identifier bits (as described herein) may correspond to, or include an indication of, a type, category, classification, service, priority, preference, or attribute of at least some (or all) of the information being communicated.

In some aspects, a plurality of portions of information having the same/similar identifier bit(s) (as described herein) may originate from, or be generated by, a first apparatus (e.g., AP (or its PR(s) and/or SR(s)) and/or STA (or its PR(s) and/or SR(s))) and eventually be communicated to, arrive at, or be received by a second apparatus (e.g., AP (or its PR(s) and/or SR(s)) and/or STA (or its PR(s) and/or SR(s))).

In some aspects, a first apparatus (e.g., AP (or its PR(s) and/or SR(s)) and/or STA (or its PR(s) and/or SR(s))) may transmit/communicate a first portion of such plurality of portions of information using a first antenna, using a first link/communication/channel, and/or using a first frequency/communication/link/channel attribute at a first time or first time period to a second apparatus (e.g., AP and/or STA).

In some aspects, a first apparatus (e.g., AP (or its PR(s) and/or SR(s)) and/or STA (or its PR(s) and/or SR(s))) may transmit/communicate a second portion (e.g., different or same as the first portion) of such plurality of portions of information using a second antenna (e.g., different or same as the first antenna) using a second link/communication/ channel (e.g., relative to the first link/communication/channel, the second link/communication/channel may be entirely different, entirely same/similar, at least partially different, or at least partially same/similar), and/or using a second frequency/communication/link/channel attribute (e.g., relative to the first frequency/communication/link/channel attribute, the second frequency/communication/link/channel attribute may be entirely different, entirely same/similar, at least partially different, or at least partially same/similar) at a second time (e.g., relative to the first time, the second time may be entirely different, entirely same/similar, at least partially different, or at least partially same/similar) or second time period (e.g., relative to the first time period, the second time period may be entirely different, entirely same/similar, at least partially different, or at least partially same/similar) to the second apparatus (e.g., AP (or its PR(s) and/or SR(s)) and/or STA (or its PR(s) and/or SR(s))). As mentioned, in some aspects, such first and second portions may include, or be associated with, the same/similar identifier bit(s) (as described herein).

In some aspect, an apparatus (e.g., AP (or its PR(s) and/or SR(s)) and/or STA (or its PR(s) and/or SR(s))) may generate the one or more portions of information of the plurality of portions of information according to disjoining process, a mapping process, apportionment process, de-aggregation process, all of which may interchangeably/alternatively be referred to herein as a "disjoining process." In some aspects, the disjoining process may include disjoining an aggregation of information into a plurality of information portions, and, in some aspects, arranging for transmission, scheduling for transmission, preparing for transmission, and/or actually transmitting the plurality of information portions such that one or more information portions having a first identifier bit(s) (as described herein) (e.g., associated with, or corresponding to, higher-priority traffic/information) are transmitted prior to transmission of one or more information portions having a second identifier bit(s) (as described herein) (e.g., associated with, or corresponding to, lower-priority traffic/information).

In some aspect, an apparatus (e.g., AP (or its PR(s) and/or SR(s)) and/or STA (or its PR(s) and/or SR(s))) may receive the one or more portions of information of the plurality of portions of information using a plurality of antennas/channels/chains/transceivers and/or process such information according to a conjoining process, a re-mapping process, re-apportionment process, a re-aggregation process, all of which may interchangeably/alternatively be referred to herein as a "conjoining process." In some aspects, data portions having the same identifier bit(s) (as described herein) may be conjoined together for further processing.

As described herein, concerted communication(s) (as described herein) may include any or more of the following communication(s) (e.g., among possibly one or more other forms of communication): (a) concurrent/synchronous communication, as described herein; (b) sequential/time-multiplexed/time-separated communication, as described herein; and/or (c) independent/asynchronous communication.

In some aspects, an apparatus (e.g., AP (or its PR(s) and/or SR(s)) and/or STA (or its PR(s) and/or SR(s))) may perform communication, determine to perform communication, select a mode of communication, indicate/communicate a capability to communicate, or begin/enable communication according to any one or more of such concerted communication(s) (as described herein) (e.g., (a), (b), and/or (c), as described herein) (e.g., instead of any other concerted communication (e.g., (a), (b), and/or (c), as described herein)) based at least in part on, according to, or in association with a link/channel/communication property/parameter/attribute/threshold/value/limit/characteristic (e.g., center frequency, frequency width, channel frequency, channel mask, frequency spectrum, frequency separation to another channel/link/communication, interference (e.g., from/to another channel/link/communication), link/channel/communication direction (e.g., uplink vs. downlink), virtual carrier sensing (e.g., NAV, physical/energy sensing/detection (e.g., a channel assessment), a communication mode setting, a duration/size/length of a packet/frame/signal/data-unit currently being or expected to be communicated, physical location of and/or separation of two or more antennas/transceivers/chains, a distance between a transmitting device (e.g., AP (or its PR(s) and/or SR(s)) and/or STA (or its PR(s) and/or SR(s))) and a receiving device (e.g., STA (or its PR(s) and/or SR(s)) and/o AP (or its PR(s) and/or SR(s))), and/or number (e.g., quantity) of active/enabled/disabled/disable-able/enable-able links/channels/communications) of that link/channel/communication and/or one or more other link(s)/channel(s)/communication(s).

For example, if a link/channel/communication property/parameter/attribute of a first link/channel/communication is too similar (or too dissimilar) with respect to a second link/channel/communication, then an apparatus (e.g., AP (or its PR(s) and/or SR(s)) and/or STA (or its PR(s) and/or SR(s))) may perform communication, determine to perform communication, select a mode of communication, indicate/communicate a capability to communicate, or begin/enable communication according to a first one of the aforementioned concerted communication(s) (as described herein) (e.g., (a), (b), and/or (c)) instead of a second one of the aforementioned concerted communication(s) (as described herein) (e.g., (a), (b), and/or (c)).

In some aspects, information may be transmitted in various forms, formats, types, and configurations without deviating from the scope of the present disclosure. In some aspects, the following terms maybe interchangeable without deviating from the scope of the present disclosure: bit(s), symbol(s), tone(s), packet(s), frame(s), data, message(s), portion(s), beacon(s), data packet(s), awaken packet(s), request packet(s), response packet(s), request(s), response(s), data frame(s), channel(s), communication channel(s), signal(s), signaling(s), broadcast, broadcast message(s), unicast, unicast message(s), multicast, multicast message(s), communication(s), transmission(s), reception(s), indication(s), information, any encapsulation of information that includes any one or more of the foregoing, any combination/permutation/variation of any one or more of the foregoing terms, and/or various other similar/suitable terms. As described herein, the following terms may be interchangeable in certain aspects/embodiments without deviating from the scope of the present disclosure: radio(s), antenna(s), chain(s), transceiver(s), transmitter(s), receiver(s), and/or various other similar/suitable terms. As described herein, the following terms can be interchangeable in certain aspects/embodiments without deviating from the scope of the present disclosure: communication, link, transmission, reception, signal, channel, communication channel, beacon, and/or various other suitable terms.

In some aspects, to determine whether it can, is allowed/permitted to, is capable of, is available to, or is restricted/prohibited from participation in one or more of the concerted communication(s) described herein (e.g., one or more concerted communication(s) involving one or more other AP(s) (or its PR(s) and/or SR(s)) (e.g., one or more secondary APs (or its PR(s) and/or SR(s)), as described herein)), an AP (or its PR(s) and/or SR(s)) (e.g., a primary AP (or its PR(s)

and/or SR(s)), as described herein) may initiate, engage in, and/or respond to a communication, a communication protocol, or a signal from one or more other apparatuses, as described herein (e.g., one or more other APs (or its PR(s) and/or SR(s)), one or more primary APs (or its PR(s) and/or SR(s)), one or more secondary APs (or its PR(s) and/or SR(s)), one or more STA (or its PR(s) and/or SR(s)), and/or various other apparatuses).

In some aspects, a first apparatus (e.g., an AP (or its PR(s) and/or SR(s)), a primary AP (or its PR(s) and/or SR(s)), and/or a secondary AP (or its PR(s) and/or SR(s)), as described herein) may communicate (e.g., transmit), and a second apparatus (e.g., a/another AP, a/another primary AP, a/another secondary AP (or its PR(s) and/or SR(s)), or one or more STAs (or their PR(s) and/or SR(s)), as described herein) may receive, a frame/packet/signal/information configured to announce the first apparatus' capability, interest, support, availability, or unavailability to engage/participate in one or more concerted communication(s) (as described herein). In some aspects, after, in response to, based on, or at least in association with that frame/packet/signal/information (configured to announce the first apparatus' capability, interest, support, availability, or unavailability to engage/participate in one or more concerted communication(s) (as described herein)), that second apparatus may transmit an acknowledgement message to confirm receipt of that frame/packet/signal/information.

In some aspects, a first apparatus (e.g., a STA (or its PR(s) and/or SR(s)), secondary AP (or its PR(s) and/or SR(s)), or primary AP (or its PR(s) and/or SR(s)), as described herein) may notify/inform (e.g., communicate a signal/frame configured to notify/inform) a second apparatus (e.g., a/another secondary AP (or its PR(s) and/or SR(s)), a/another primary AP (or its PR(s) and/or SR(s)), or a/another STA (or its PR(s) and/or SR(s)), as described herein) whether the first apparatus consents to, has a capability, interest, support, availability, desire, or unavailability to engage/participate in one or more concerted communication(s) (as described herein) with that second apparatus.

In some aspects, a first apparatus (e.g., a secondary AP (or its PR(s) and/or SR(s)), a primary AP (or its PR(s) and/or SR(s)), or a STA (or its PR(s) and/or SR(s)), as described herein) may notify/inform (e.g., communicate a signal/frame configured to notify/inform) a second apparatus (e.g., a/another secondary AP (or its PR(s) and/or SR(s)), a/another AP (or its PR(s) and/or SR(s)), a/another STA (or its PR(s) and/or SR(s))) whether the first apparatus consents to, has a capability, interest, support, availability, desire, or unavailability to have one or more concerted communication(s) (as described herein) be scheduled, coordinated, or controlled by that second apparatus.

In some aspects, a first apparatus may be, or may be determined to be, the primary AP (or its PR(s) and/or SR(s)) (as described herein) (e.g., as opposed to the secondary AP (or its PR(s) and/or SR(s)), as described herein) when, if, upon, because, or at least in part due to that apparatus acquiring, obtaining, or securing an access medium (e.g., wireless access medium), channel (e.g., wireless communication channel), or frequency (or a range of frequency values) (e.g., for wireless communication) prior to or instead of a second apparatus (e.g., another AP, or its PR(s) and/or SR(s)) that may have or have been trying or tried to acquire, obtain, or secure the same (access medium, channel, or frequency, as mentioned above). In the foregoing aspects, a second apparatus (e.g., another AP, or its PR(s) and/or SR(s)) that may have or have been trying or tried to acquire, obtain, or secure the same (access medium, channel, or frequency, as mentioned above) (e.g., but may have been unable/unsuccessful in doing so before the first apparatus (e.g., primary AP, or its PR(s) and/or SR(s)) doing so) may be, or may be determined to be, the secondary AP (or its PR(s) and/or SR(s)) (as described herein) (e.g., as opposed to the primary AP (or its PR(s) and/or SR(s)), as described herein).

In some aspects, the one or more second apparatus (e.g., one or more secondary AP(s) (or its PR(s) and/or SR(s)), as described herein) communicates or is configured to communicate (e.g., directly) a signal/frame/packet with both the first apparatus (e.g., primary AP (or its PR(s) and/or SR(s)), as described herein) and the one or more third apparatus (e.g., one or more STA(s) (or its PR(s) and/or SR(s)), as described herein). In some aspects, the first apparatus (e.g., primary AP (or its PR(s) and/or SR(s)), as described herein) communicates or is configured to (1) communicate a signal/frame/packet with the one or more second apparatus (e.g., one or more secondary AP(s), or its PR(s) and/or SR(s)) (e.g., directly, not indirectly) (e.g., by directly transmitting the signal/frame/packet from a transceiver of the first apparatus (e.g., primary AP, or its PR(s) and/or SR(s)) to a transceiver of the one or more second apparatus (e.g., one or more secondary AP(s), or its PR(s) and/or SR(s)), and/or (2) communicate a signal/frame/packet (e.g., same signal/frame/packet) to the one or more third apparatus (e.g., one or more STA(s), or its PR(s) and/or SR(s)) (e.g., indirectly, not directly) by utilizing the one or more secondary apparatus (e.g., one or more secondary AP(s), or its PR(s) and/or SR(s)) (e.g., without directly transmitting that signal/frame/packet from a transceiver of the first apparatus (e.g., primary AP, or its PR(s) and/or SR(s)) to a transceiver of the one or more third apparatus (e.g., one or more STA(s), or its PR(s) and/or SR(s)).

In some aspects, a first apparatus may be, or may be determined to be, the primary AP (or its PR(s) and/or SR(s)) (as described herein) (e.g., as opposed to the secondary AP (or its PR(s) and/or SR(s)), as described herein) when, if, upon, because, or at least in part due to that first apparatus initiating/starting/transmitting one or more signals/frames/packets/communications of concerted communication (as described herein) with a second apparatus (e.g., another AP, or its PR(s) and/or SR(s)). In the foregoing aspects, that second apparatus may be, or may be determined to be, the secondary AP (or its PR(s) and/or SR(s)) (as described herein) (e.g., as opposed to the primary AP (or its PR(s) and/or SR(s)), as described herein).

In some aspects, a first apparatus (e.g., configured to communicate in one or more concerted communication(s), as described herein) (e.g., the primary AP (or its PR(s) and/or SR(s)), as described herein) may communicate a signal (e.g., downlink signal) (e.g., simultaneously/concurrently) to one or more second apparatus (e.g., configured to communicate in one or more concerted communication(s), as described herein) (e.g., one or more secondary AP(s) (or its PR(s) and/or SR(s)), as described herein) to obtain/solicit/receive/trigger (e.g., simultaneously/concurrently) (e.g., (1) from the one or more secondary AP(s) (or its PR(s) and/or SR(s)), as described herein, and/or (s) from the one or more STA(s) (or its PR(s) and/or SR(s)) that (e.g., simultaneously/concurrently) transmit to the one or more secondary AP(s) (or its PR(s) and/or SR(s)) and/or primary AP(s) (or its PR(s) and/or SR(s))) an identifier, address, listing, capability (e.g., capability to engage/participate in one or more concerted communication (as described herein)), priority information (e.g., capability to engage/participate in one or more concerted communication (as described herein)), or other communication parameter/attribute of one or more third apparatus (e.g., configured to communicate in one or more concerted communication(s), as described herein) (e.g., one or more STA(s), as described herein).

In some aspects, that first apparatus (e.g., primary AP (or its PR(s) and/or SR(s)), as described herein) may utilize that obtained/solicited/received identifier, address, capability, or other communication parameter of that/those third apparatus to determine/select/coordinate/route to which of the one or more secondary AP(s) (or its PR(s) and/or SR(s)) to utilize for a communication (e.g., one or more concerted communication(s), as described herein) (e.g., as opposed to one or more other secondary AP(s) (or its PR(s) and/or SR(s)), as described herein). In some aspects, such communication may include (e.g., a downlink) data/information/signal/packet destined/intended for a particular STA (or its PR(s) and/or SR(s)) (e.g., of the one or more STA(s), or its PR(s) and/or SR(s)) (e.g., with which the secondary AP(s) (or its PR(s) and/or SR(s)) communicates for transmission of that communication, and with which the primary AP (or its PR(s) and/or SR(s)) does not communicate for transmission of that communication).

In some aspects, one or more second apparatus (e.g., secondary AP(s) or its PR(s) and/or SR(s), as described herein) may transmit a signal (e.g., an uplink signal) to one or more first apparatus (e.g., primary AP(s) or its PR(s) and/or SR(s), as described herein), and that signal may indicate one or more requirements, prerequisites, needs, constraints or criteria in relation to an attribute (e.g., a resource, a frequency, a bandwidth, a start time, an end time, a communication/transmission duration, a BSS or its identifier, a TXOP, length(s) of one or more fields, a tone, a symbol, an allocation, a resource unit, a channel, a guard interval, a number of symbols for a field) of wireless communication (e.g., concerted communication(s), as described herein) by/between the one or more first apparatus (e.g., primary AP(s) or its PR(s) and/or SR(s), as described herein) and/or one or more second apparatus (e.g., secondary AP(s) or its PR(s) and/or SR(s), as described herein).

In some aspects, at time T1, the one or more first apparatus (e.g., primary AP(s) or its PR(s) and/or SR(s), as described herein) may generate and transmit a frame/packet (e.g., announcement/schedule) indicating/allocating one or more of the following requirements, prerequisites, needs, constraints or criteria (e.g., for downlink and/or uplink communication (e.g., concerted communication(s), as described herein)) with the one or more second apparatus (e.g., secondary AP(s) or its PR(s) and/or SR(s), as described herein): a resource, a frequency, a time, a bandwidth, length(s) of one or more fields, a tone, a symbol, an allocation, a resource unit, a channel, a guard interval, or a number of symbols for a field.

In some aspects, at time T2, the one or more second apparatus (e.g., secondary AP(s) or its PR(s) and/or SR(s), as described herein) may utilized one or more of the aforementioned requirements, prerequisites, needs, constraints or criteria to generate and transmit a frame/packet (e.g., announcement/schedule) indicating/allocating one or more of the following requirements, prerequisites, needs, constraints or criteria (e.g., for downlink and/or uplink communication (e.g., concerted communication(s), as described herein)) with the one or more third apparatus (e.g., STA(s) or its PR(s) and/or SR(s), as described herein): a resource, a frequency, a time, a bandwidth, length(s) of one or more fields, a tone, a symbol, an allocation, a resource unit, a channel, guard interval, or number of symbols for a field.

In some aspects, one or more attributes (e.g., a resource, a frequency, a bandwidth, a start time, an end time, a communication/transmission duration, a BSS or its identifier, a TXOP or its duration, a communication/transmission type/category/class, length(s) of one or more fields, a tone, a symbol, an allocation, a resource unit, a channel, a guard interval, or a number of symbols for a field for/of wireless communication (e.g., concerted communication(s), as described herein)) between (to/from) the one or more second apparatus (e.g., secondary AP(s) or its PR(s) and/or SR(s), as described herein) and the one or more third apparatus (e.g., STA(s)) may be limited/bounded/constrained/restricted/determined/calculated/selected/switched/altered/maintained/adjusted based (at least in part) on, (at least in part) due to, or in correlation/association with one or more attributes (e.g., a resource, a frequency, a bandwidth, a start time, an end time, a communication/transmission duration, a BSS or its identifier, a TXOP or its duration, a communication/transmission type/category/class, length(s) of one or more fields, a tone, a symbol, an allocation, a resource unit, a channel, a guard interval, or a number of symbols for a field for/of wireless communication (e.g., concerted communication(s), as described herein)) between (to/from) the one or more first apparatus (e.g., primary AP(s) or its PR(s) and/or SR(s), as described herein) and the second apparatus (e.g., secondary AP(s), as described herein).

For example, such one or more attributes (e.g., a resource, a frequency, a bandwidth, a start time, an end time, a communication/transmission duration, a BSS or its identifier, a TXOP or its duration, a communication/transmission type/category/class, length(s) of one or more fields, a tone, a symbol, an allocation, a resource unit, a channel, a guard interval, or a number of symbols for a field for/of wireless communication (e.g., concerted communication(s), as described herein)) between one or more second apparatus (e.g., secondary AP(s) or its PR(s) and/or SR(s), as described herein) and one or more third apparatus (e.g., STA(s) or its PR(s) and/or SR(s), as described herein) may be the same as, a subset of, selected from, switched to/from, altered to/from, maintained at, adjusted to/from, or determined based (at least in part) on, (at least in part) due to, or in correlation/association with one or more attributes (e.g., a resource, a frequency, a bandwidth, a start time, an end time, a communication/transmission duration, a BSS or its identifier, a TXOP or its duration, a communication/transmission type/category/class, length(s) of one or more fields, a tone, a symbol, an allocation, a resource unit, a channel, a guard interval, or a number of symbols for a field for/of wireless communication (e.g., concerted communication(s), as described herein)) between one or more first apparatus (e.g., primary AP(s) or its PR(s) and/or SR(s), as described herein) and one or more second apparatus (e.g., secondary AP(s) or its PR(s) and/or SR(s), as described herein).

In some aspects, one or more apparatus (e.g., AP(s) or its PR(s) and/or SR(s)) may determine to utilize a plurality of resource units (as described herein) to communicate (e.g., transmit) information destined for/to, intended for/to, designated to/for, or addressed to/for one or more STAs (e.g., a single STA (or its PR(s) and/or SR(s)), or each of a plurality of STAs (or their PR(s) and/or SR(s))). In some aspects, one or more apparatus (e.g., AP(s) or its PR(s) and/or SR(s)) may generate (and subsequently transmit, e.g., concurrently/simultaneously) a signal, frame, packet, data, or other suitable encapsulation of information comprising a plurality of resource units (as described herein) destined for/to, intended for/to, designated to/for, or addressed to/for one or more STAs (e.g., a single STA (or its PR(s) and/or SR(s)), or each of a plurality of STAs (or its PR(s) and/or SR(s))). In some aspects, each of one or more STAs (or its PR(s) and/or SR(s)) may (e.g., simultaneously/concurrently) receive a signal, frame, packet, data, or other suitable encapsulation of information comprising a plurality of resource units (as described herein).

As described herein, in some aspects, a resource unit may comprise a plurality of tones, symbols, resource elements, or other suitable aspects. In some aspects, a resource unit (as described herein) may have one or more resource unit attributes. In some aspects, a resource unit attribute (as described herein) includes at least one of the following: a size; a number/size/quantity of tones, symbols, and/or resource elements; a duration; a modulation and coding scheme; a center frequency/tone/symbol/resource-element value, a lower/lowest frequency/tone/symbol/resource-element value, a higher/highest frequency/tone/symbol/resource-element value, a bandwidth, a frequency range, a center tone/symbol, a start and/or end time; and/or a guard interval size/duration/symbol/tone/resource-element value/range/quantity associated with the resource unit. In some aspects, the plurality of resource units (as described herein) received by each of the one or more STAs (e.g., a single STA (or its PR(s) and/or SR(s)), or each of a plurality of STAs (or their PR(s) and/or SR(s))) may include a first resource unit that includes at least a first resource unit attribute (as described herein) and a second resource unit that includes a second resource unit attribute (as described herein). In some aspects, the first resource unit attribute (as described herein) is different from the second unit attribute (as described herein).

In some aspects, the first resource unit attribute (as described herein) comprises a value or an attribute that comprises/bears/has a relationship (e.g., mathematical/numerical/logical relationship) relative to a value or an attribute of the second resource unit attribute (as described herein), a limitation, a requirement, a boundary, and/or a condition.

In some aspects, the aforementioned relationship (e.g., mathematical/numerical/logical relationship) may be that the value or attribute of first resource unit attribute (as described herein) is either less than or equal to half of or greater than or equal to twice the value or attribute of the second resource unit attribute (as described herein). In some aspects, the aforementioned relationship (e.g., mathematical/numerical/logical relationship) may be that the value or attribute of first resource unit attribute (as described herein) is either less than or equal to a quarter of or greater than or equal to quadruple the value or attribute of the second resource unit attribute (as described herein).

In some aspects, the aforementioned limitation, requirement, boundary, and/or condition may be that the number/quantity of (the aforementioned plurality of) resource units (as described herein) is limited or does not exceed a particular number/value (e.g., one, two, three, four, five, or any greater integer value) for/in each, or in/for a particular, bandwidth (e.g., range/span of frequency values) (e.g., 20 MHz, 40 MHz, 80 MHz, two adjacent 80 MHz (80+80 MHz), 160 MHz, 150 MHz, two adjacent 320 MHz (160+ 160 MHz), (and/or any combination/fraction/multiple thereof).

In some aspects, the aforementioned limitation, requirement, boundary, and/or condition may be that the aforementioned plurality of resource units (as described herein) are non-contiguous and/or contiguous. In some aspects, the term contiguous means that two or more things (e.g., two or more of the aforementioned plurality of resource units) are not separated by anything (e.g., in the time domain and/or in the frequency domain). In some aspects, the term contiguous means that two or more things (e.g., two or more of the aforementioned plurality of resource units) are separated by at least one thing (e.g., in the time domain (e.g., a period of time) and/or in the frequency domain (e.g., one or more punctured symbol/tone, one or more null symbol/tone, one or more guard interval symbols/tones/resource-element, and/or other similar aspects)).

As mentioned, in some aspects, the first resource unit attribute (as described herein) is different from the second unit attribute (as described herein). In some aspects, the aforementioned limitation, requirement, boundary, and/or condition may be that the difference between the value or attribute of the first resource unit (as described herein) and the value or attribute of the second resource unit (as described herein) is equal to or less than, and/or equal to or greater than, one or more threshold values. For example, in some aspects, the difference between any aforementioned first resource unit's number/size/quantity of tones/symbols/resource-elements, center frequency/tone/symbol/resource-element value, lower/lowest frequency/tone/symbol/resource-element value, higher/highest frequency/tone/symbol/resource-element value, and/or associate/corresponding/adjacent guard interval size/duration/symbol/tone/range/quantity/resource-element and any aforementioned second resource unit's number/size/quantity of tones/symbols/resource-elements, center frequency/tone/symbol/resource-element value, lower/lowest frequency/tone/symbol/resource-element value, higher/highest frequency/tone/symbol/resource-element value, and/or associate/corresponding/adjacent guard interval size/duration/symbol/tone/range/quantity/resource-element may be equal to or less than, and/or equal to or greater than, one or more threshold values. In some aspects, the one or more threshold values may be a number/size/quantity of tones/symbols/resource-elements (e.g., 1, 2, 3, 4, 5, 7, 15, 26, 52, 106, 242, 484, 996, 1001, and/or any combination/fraction/multiple thereof), a frequency value/range/span (e.g., 20 MHz, 40 MHz, 80 MHz, two adjacent 80 MHz (80+80 MHz), 160 MHz, 150 MHz, two adjacent 320 MHz (160+ 160 MHz), and/or any combination/fraction/multiple thereof), and/or a guard interval value/attribute/size/duration/symbol/tone/range/quantity (e.g., 1, 2, 3, 4, 5, 7, and/or any greater integer value less than, e.g., 2,000).

As used herein, in some aspects, but not necessarily in all aspects, the following terms may be utilized may be, or considered as being, interchangeable (if not expressly described as such herein) without deviating from the scope of the present disclosure: tone(s), symbol(s), resource(s), resource-element(s), resource unit(s), resource portion(s), carrier(s), subcarrier(s), bit(s), signal(s), and other suitable terms relating to such aspects.

In some aspects, a particular device, apparatus, or entity (e.g., communication entity) (e.g., as described herein) may be, include, or comprise an STA, an AP, and/or an entity; in some aspects, that STA, AP, and/or entity (as described herein) may itself contain, include, or comprise a plurality of STAs, a plurality of APs, a plurality of entities, a plurality of radios, a plurality of transceivers, a plurality of receivers, a plurality of transmitters, a plurality of transceiver circuits, a plurality of radio circuits, a plurality of links, a plurality of link circuits, a plurality of channels, a plurality of channel circuits, a plurality of entities, a plurality of entity circuits, and/or a plurality of communication circuits, as each of which is described in greater detail herein.

In some aspects, the particular device, apparatus, and/or entity (as described herein) may be configured to generate, transmit, receive, process, and/or communicate information including, relating to, associated with, and/or corresponding to a plurality of addresses/identifiers. In some aspects, the plurality of addresses/identifiers may include a first address/identifier (e.g., singular address/identifier) or first address/identifier field. In some aspects, the first address/identifier (e.g., singular address/identifier) or first address/identifier field may be corresponding to, associated with, configured to, and/or intended to/for identify/identifying that particular device, apparatus, and/or entity (as described herein). In some aspects, the plurality of addresses/identifiers may include a second address/identifier or second address/identifier field. In some aspects, the plurality of addresses/identifiers may include a third address/identifier or third address/identifier field. In some aspects, the plurality of addresses/identifiers may include a plurality of addresses/identifiers or plurality of addresses/identifier fields.

In some aspects, second address/identifier, second address/identifier field, third address/identifier, third address/identifier field, and/or the plurality of addresses/identifiers may be corresponding to, associated with, configured to, and/or intended to/for identify/identifying one or more of the plurality of STAs (or its PR(s) and/or SR(s)), plurality of APs (or their PR(s) and/or SR(s)), plurality of entities, plurality of radios, plurality of transceivers, plurality of receivers, plurality of transmitters, plurality of transceiver circuits, plurality of radio circuits, and/or plurality of communication circuits, as each of which is described in greater detail herein.

In some aspects, the one or more second address/identifier and/or second address/identifier field may be corresponding to, associated with, configured to, and/or intended to/for identify/identifying a first one of those aforementioned (plurality of STAs (or their PR(s) and/or SR(s)), plurality of APs (or their PR(s) and/or SR(s)), plurality of entities, plurality of radios, plurality of transceivers, plurality of receivers, plurality of transmitters, plurality of transceiver circuits, plurality of radio circuits, and/or plurality of communication circuits, as each of which is described in greater detail herein); in some aspects, the one or more third address/identifier and/or third address/identifier field may be corresponding to, associated with, configured to, and/or intended to/for identify/identifying a second one (e.g., another one, a different one, or the same one) of those aforementioned (plurality of STAs (or their PR(s) and/or SR(s)), plurality of APs (or their PR(s) and/or SR(s)), plurality of entities, plurality of radios, plurality of transceivers, plurality of receivers, plurality of transmitters, plurality of transceiver circuits, plurality of radio circuits, a plurality of links, a plurality of link circuits, a plurality of channels, a plurality of channel circuits, a plurality of entities, plurality of entity circuits, and/or plurality of communication circuits, as each of which is described in greater detail herein).

In some (but not necessarily all) aspects, each one of at least two of any of the following is configured to (e.g., at least at some time(s)) maintain or determine (e.g., at least in part independently of one or more of the others) its own power state/mode/condition/status: apparatus(es), AP(s) (or its PR(s) and/or SR(s)), STA(s) (or its PR(s) and/or SR(s)), entity/entities (e.g., communication entity/entities), radio(s), link(s), link circuit(s), transceiver(s), receiver(s), transmitter(s), transceiver circuit(s), radio circuit(s), communication circuit(s), as each is described in greater detail herein.

In some aspects, an apparatus (e.g., STA (or its PR(s) and/or SR(s)) and/or AP (or its PR(s) and/or SR(s))) may communicate a signal, frame, packet, field, or other information (e.g., to another apparatus, such as an AP/STA (or its PR(s) and/or SR(s))) configured to indicate a power state/mode/condition/status of that particular STA (or its PR(s) and/or SR(s)). After (e.g., within a period of time after), in response to, at least in part based on, or in association with communicating that signal, frame, field, or other information, that same apparatus (e.g., STA/AP, or its PR(s) and/or SR(s)) may continue to operate in, or transition to an operation that is in, a power state/mode/condition/status that is either (a) similar to, the same as, corresponding, related to, or associated with, or (b) not similar to, not the same as, the opposite of, different from, not corresponding to, or not related to that communicated signal, frame, packet, field, or other information.

In some aspects, a first apparatus (e.g., first STA/AP, or its PR(s) and/or SR(s)) may communicate one or more signals, frames, packets, fields, or other information (e.g., to another apparatus, such as an AP/STA, or its PR(s) and/or SR(s)) configured to indicate a power state/mode/condition/status of, or associated with, another apparatus (e.g., second STA/AP, or its PR(s) and/or SR(s)) (e.g., that may be contained in the same device, apparatus, or entity as the first apparatus/STA). For example, in some aspects, the aforementioned signal, frame, packet, field, or other information may be configured to indicate that the other apparatus (e.g., second STA/AP, or its PR(s) and/or SR(s)) is currently and/or was recently/previously in any one or more of the following: (i) an inactive/power-down/low-powered/doze/sleep state or mode of operation, and/or (ii) an active/powered-up/high-power/awake state or mode of operation.

In some aspects, after (e.g., within a period of time after), in response to, at least in part based on, or in association with communicating that signal, frame, field, or other information by the first apparatus (e.g., first STA/AP, or its PR(s) and/or SR(s)), the other apparatus (e.g., second STA/AP, or its PR(s) and/or SR(s)) may continue to operate in, or transition to an operation that is in, a power state/mode/condition/status that is either (a) similar to, the same as, corresponding, related to, or associated with, or (b) not similar to, not the same as, the opposite of, different from, not corresponding to, or not related to that communicated signal, frame, packet, field, or other information (which was communicated by the first apparatus/STA/AP (or its PR(s) and/or SR(s)), for example).

In some aspects, a first apparatus (e.g., AP/STA, or its PR(s) and/or SR(s)) may utilize a first link/radio/transceiver/connection with a second apparatus (e.g., STA/AP, or its PR(s) and/or SR(s)) to communicate a signal, frame, packet, field, or other information that is configured to indicate, or includes information related to an indication of, data or information ready/prepared/nearly-prepared (e.g., buffered) for transmission using at least one of (a) the first link/radio/transceiver/connection with the second apparatus (e.g., STA/AP, or its PR(s) and/or SR(s)) and/or (b) a second link/radio/transceiver/connection with the second apparatus (e.g., STA/AP, or its PR(s) and/or SR(s)) (e.g., a second actual/possible/potential link/radio/transceiver/connection with the second apparatus (e.g., STA/AP, or its PR(s) and/or SR(s))) (e.g., the second link/radio/transceiver/connection (even if actual/possible/potential) being different from the first link/radio/transceiver/connection with the second apparatus (e.g., STA/AP, or its PR(s) and/or SR(s))).

In some aspects, after (e.g., in time) and/or at least in part due to, based on, resulting from, or in association with the communication of the aforementioned signal, frame, packet, field of information communicated utilizing the first link/radio/transceiver/connection, the aforementioned second link/radio/transceiver/connection with the second apparatus (e.g., STA/AP, or its PR(s) and/or SR(s)) may transition/change to a different state/mode/status/operation (e.g., (i) transition/change from an inactive/power-down/low-powered/sleep/doze state or mode of operation to an active/powered-up/high-power/awake state or mode of operation, and/or (ii) transition/change from an active/powered-up/high-power/awake state or mode of operation to an inactive/power-down/low-powered/sleep/doze state or mode of operation).

In some aspects, a first apparatus (e.g., as each is described in greater detail herein, AP, STA, and/or entity, or their respective PR(s) and/or SR(s)) may determine to communicate (e.g., transmit, and/or generate one or more signals for transmission and transmit the generated one or more signals), or initiate a process to communicate, a plurality of data units/fields/portions/signals/segments. In some aspects, such plurality of data units/fields/portions/signals/segments originate from, be parts/portions/units/fields/segments of, belong to, and/or be associated with a single/same/unitary/aggregate(d) data packet (e.g., MAC Protocol Data Unit (MPDU), MSDU, PSDU, PPDU, etc.). In some aspects, such communication/transmission is performed in accordance with any one or more aspect of concerted communication (as described in greater detail herein).

In some aspects, each of at least two or more of the plurality of data units/fields/portions/signals/segments may be associated with, corresponding to, or linked with the same/similar/related/associated identifier/information (e.g., traffic identifier, priority information, and/or QoS information). In some aspects, each of at least two or more of the plurality of data units/fields/portions/signals/segments may be associated with, corresponding to, or linked with different identifiers/information (e.g., different traffic identifiers, different priority information, and/or different QoS information). For example, in some aspects, a first data unit/field/portion/signal/segment may be associated with, corresponding to, or linked with a first identifier/information (e.g., first traffic identifier, first priority information, and/or first QoS information), and a second data unit/field/portion/signal/segment may be associated with, corresponding to, or linked with a second identifier/information (e.g., second traffic identifier, second priority information, and/or second QoS information) that may (but may not necessarily always be) different from the first identifier/information (e.g., first traffic identifier, first priority information, and/or first QoS information).

In some aspects, each of two or more of the plurality of data units/fields/portions/signals/segments may be included in a single communication queue/buffer, e.g., of the first apparatus (e.g., AP (or its PR(s) and/or SR(s)), STA (or its PR(s) and/or SR(s)), and/or entity, as each is described in greater detail herein). In some aspects, each of two or more of the plurality of data units/fields/portions/signals/segments may be included in separate/different communication queues/buffers. For example, in some aspects, a first data unit/field/portion/signal/segment may be included in a first communication queue/buffer, and a second unit/field/portion/signal/segment is included in a second communication queue/buffer different from the first communication queue/buffer.

As mentioned, in some aspects, such communication/transmission is performed in accordance with any one or more aspect of concerted communication (as described in greater detail herein). In some aspects, for example, the first data unit/field/portion/signal/segment is communicated/transmitted utilizing a first link/radio/transceiver/etc. (as described herein) of the first apparatus (e.g., AP (or its PR(s) and/or SR(s)), STA (or its PR(s) and/or SR(s)), and/or entity, as each is described in greater detail herein) while simultaneously, concurrently, and/or sequentially the second data unit/field/portion/signal/segment is communicated/transmitted utilizing a second link/radio/transceiver/etc. (as described herein) of the first apparatus (e.g., AP (or its PR(s) and/or SR(s)), STA (or its PR(s) and/or SR(s)), and/or entity, as each is described in greater detail herein).

In some aspects, the transmitted/communicated first and second data units/fields/portions/signals/segments may be received by a second apparatus (e.g., STA (or its PR(s) and/or SR(s)), AP (or its PR(s) and/or SR(s)), and/or entity, as each is described in greater detail herein). In some aspects, such communication/reception is performed in accordance with any one or more aspect of concerted communication (as described in greater detail herein). In some aspects, for example, the first data unit/field/portion/signal/segment is communicated/received utilizing a first link/radio/transceiver/etc. (as described herein) of the second apparatus (e.g., STA (or its PR(s) and/or SR(s)), AP (or its PR(s) and/or SR(s)), and/or entity, as each is described in greater detail herein) while simultaneously, concurrently, and/or sequentially the second data unit/field/portion/signal/segment is communicated utilizing a second link/radio/transceiver/etc. (as described herein) of the second apparatus (e.g., STA (or its PR(s) and/or SR(s)), AP (or its PR(s) and/or SR(s)), and/or entity, as each is described in greater detail herein).

In some aspects, a plurality of (e.g., two or more) data packets (e.g., MPDUs, MSDUs, PSDUs, PPDU, etc.) and/or a plurality of encoders are utilized/used to communicate/transmit/receive the first data unit/field/portion/signal/segment via the first link/radio/transceiver/etc. (as described herein), and/or a plurality of data packets (e.g., MPDUs, MSDUs, PSDUs, PPDU, etc.) and/or a plurality of encoders are utilized/used to communicate/transmit/receive the second data unit/field/portion/signal/segment via the second link/radio/transceiver/etc. (as described herein). In some aspects, a single (e.g., no more than one) data packet (e.g., MPDU, MSDU, PSDU, PPDU, etc.) and/or a single (e.g., no more than one) encoder is utilized/used to communicate/transmit/receive the first data unit/field/portion/signal/segment via the first link/radio/transceiver/etc. (as described herein), and/or a single (e.g., no more than one) data packet (e.g., MPDU, MSDU, PSDU, PPDU, etc.) and/or a single (e.g., no more than one) encoder is utilized/used to communicate/transmit the second data unit/field/portion/signal/segment via the second link/radio/transceiver/etc. (as described herein).

In some aspects, after, in response to, or at least based in part on detecting such communication/reception, the second apparatus (e.g., STA (or its PR(s) and/or SR(s)), AP (or its PR(s) and/or SR(s)), and/or entity, as each is described in greater detail herein) may arrange/rearrange, order/reorder, organize/reorganize, aggregate/re-aggregate, and/or prioritize/reprioritize the received first and second data units/fields/portions/signals/segments. In some aspects, such arranging/rearranging, ordering/reordering, organizing/reorganizing, aggregation/re-aggregation, and/or prioritizing/reprioritizing may be performed (e.g., in some aspects, by a communication queue/buffer of the aforementioned second apparatus) in accordance with, at least in part based on, or in association with the aforementioned identifier/information (e.g., traffic identifier, priority information, and/or QoS information). For example, in some aspects, the second apparatus (e.g., STA (or its PR(s) and/or SR(s)), AP (or its PR(s) and/or SR(s)), and/or entity, as each is described in greater detail herein) may generate or output a single/same/unitary/aggregate data packet (e.g., MPDU, MSDU, PSDU, etc.) containing at least the first and second data units/fields/portions/signals/segments.

In some aspects, the aforementioned communication queue/buffer of the aforementioned second apparatus performs or is utilized in a process or operation that is associated with, corresponding to, or at least in part based on a space/spacing of one or more sequence numbers of, pertaining to, or associated with the first data unit/field/portion/signal/segment and/or the second data unit/field/portion/signal/segment. In some aspects, a first space/spacing of one or more sequence numbers of, pertaining to, associated with, and/or utilized by (i) the first data unit/field/portion/signal/segment communicated/transmitted by the aforementioned first apparatus, and/or (ii) the aforementioned first apparatus, may be different/disassociated from a second space/spacing of one or more sequence numbers of, pertaining to, associated with, and/or utilized by (a) the second data unit/field/portion/signal/segment communicated/received by the aforementioned second apparatus, and/or (b) the aforementioned second apparatus. In some aspects, a first space/spacing of one or more sequence numbers of, pertaining to, associated with, and/or utilized by the first data unit/field/portion/signal/segment communicated/transmitted by the aforementioned first apparatus may be similar/same/related/correlated/linked to a second space/spacing of one or more sequence numbers of, pertaining to, associated with, or utilized by (x) the second data unit/field/portion/signal/segment communicated/received by the aforementioned second apparatus, and/or (y) the aforementioned second apparatus.

In some aspects, the second apparatus (e.g., STA (or its PR(s) and/or SR(s)), AP (or its PR(s) and/or SR(s)), and/or entity, as each is described in greater detail herein) may determine to communicate (e.g., transmit, and/or generate one or more signals for transmission and transmit the generated one or more signals), or initiate a process to communicate, a message configured to acknowledge receipt of at least the first and second data units/fields/portions/signals/segments. In some aspects, the second apparatus (e.g., STA (or its PR(s) and/or SR(s)), AP (or its PR(s) and/or SR(s)), and/or entity, as each is described in greater detail herein) may perform this communication/transmission utilizing a number (e.g., quantity) of links/radios/transceivers/etc. that is fewer than (e.g., half of) the number (e.g., quantity) of links/radios/transceivers/etc. utilized to communicate/receive the at least first and second data units/fields/portions/signals/segments. For example, in some aspects, the second apparatus (e.g., STA (or its PR(s) and/or SR(s)), AP (or its PR(s) and/or SR(s)), and/or entity, as each is described in greater detail herein) may utilize two (or more) links/radios/transceivers/etc. for the communication/reception of the at least first and second data units/fields/portions/signals/segments but only utilize one (or any number fewer than the aforementioned two or more links/radios/transceivers/etc.) for communication/transmission of the message configured to acknowledge receipt of at least the first and second data units/fields/portions/signals/segments.

In some aspects, at least one identifier/information (e.g., traffic identifier, priority information, and/or QoS information) is associated with each link/radio/transceiver/connection/etc. (as described herein). In some aspects, every link/radio/transceiver/connection/etc. (as described herein) is enabled/capable/unrestricted/non-prohibited for communications/communicating (e.g., uplink and/or downlink) data/information/packets/signals/frames/etc. associated with any identifier/information (e.g., traffic identifier, priority information, and/or QoS information). In some aspects, at least some/one link/radio/transceiver/connection/etc. (as described herein) is disenabled/incapable/restricted/prohibited for communications/communicating (e.g., uplink and/or downlink) data/information/packets/signals/frames/etc. associated with one or more identifiers/information (e.g., traffic identifiers, priority information, and/or QoS information). In some aspects, at least some/one link/radio/transceiver/connection/etc. (as described herein) is committed/mandated for communications/communicating (e.g., uplink and/or downlink) data/information/packets/signals/frames/etc. associated with one or more identifiers/information (e.g., traffic identifiers, priority information, and/or QoS information). For example, in some aspects, data/information/packets/signals/frames/etc. associated with one or more identifiers/information (e.g., traffic identifiers, priority information, and/or QoS information) is routed/prioritized/mapped/adjusted for communication using/utilizing that at least some/one link/radio/transceiver/connection/etc. (as described herein).

In some aspects, an apparatus (e.g., AP (or its PR(s) and/or SR(s)), STA (or its PR(s) and/or SR(s)), and/or entity, as each is described in greater detail herein), after, in response to, based at least in part on, and/or in association with the foregoing aspects (e.g., of some/all link(s)/radio(s)/transceiver(s)/connection(s)/etc. being (i) enabled/capable/unrestricted/non-prohibited, (ii) disenabled/incapable/restricted/prohibited, (iii) committed/mandated, and/or (iv) routed/prioritized/mapped/adjusted/mapped), the apparatus may perform any one or more of the following: (1) initiate/perform any action, operation, or process that results in one or more of the plurality of links/radio/transceivers/connections/etc. (as described herein) being, becoming, and/or transitioning (e.g., from an inactive/power-down/low-powered/doze/sleep state or mode of operation) to/in an active/powered-up/high-power/awake state or mode of operation; and/or (2) initiate/perform any action, operation, or process that results in one or more of the plurality of links/radio/transceivers/connections/etc. (as described herein) being, becoming, and/or transitioning (e.g., from an active/power-up/high-powered/awake state or mode of operation) to/in an inactive/powered-down/low-power/doze/sleep state or mode of operation.

In some aspects, an apparatus (e.g., AP (or its PR(s) and/or SR(s)), STA (or its PR(s) and/or SR(s)), and/or entity, as each is described in greater detail herein), after, in response to, based at least in part on, and/or in association with (1) one or more of the plurality of links/radio/transceivers/connections/etc. (as described herein) being, becoming, and/or transitioning (e.g., from an inactive/power-down/low-powered/doze/sleep state or mode of operation) to/in an active/powered-up/high-power/awake state or mode of operation; and/or (2) one or more of the plurality of links/radio/transceivers/connections/etc. (as described herein) being, becoming, and/or transitioning (e.g., from an active/power-up/high-powered/awake state or mode of operation) to/in an inactive/powered-down/low-power/doze/sleep state or mode of operation, performing/initiating any action, operation, or process for (e.g., dynamically) adjusting/routing/re-routing/prioritizing/re-prioritizing/mapped/re-mapped, enabling/activating, disabling/restricting/prohibiting, and/or committing/mandating communication (e.g., uplink and/or downlink) of data/information/packets/signals/frames/etc. utilizing one or more (e.g., active/powered-up/high-power/awake-state) link(s)/radio(s)/transceiver(s)/connection(s)/etc. of the plurality of links/radios/transceivers/connections/etc. (as described herein) (e.g., in some aspects, in association with, at least in part based on, and/or in response to the one or more identifiers/information (e.g., traffic identifiers, priority information, and/or QoS information) of that data/information/packets/signals/frames/etc.).

As described in greater detail herein, in some aspects, the packet may include a preamble. In some aspects, such packet (and, to the extent applicable, any corresponding preamble(s), portion(s), etc.) may be or may be included in any one or more of the DL and/or UL communications 310, 312, 320, 330, 332, 350-357, 362-364 described in greater detail herein. As described in greater detail herein, some aspects, the packet, the preamble of the packet, and/or portion of the preamble of the packet may include any sort, type, or variety of information, bits, symbols, and/or data, and/or other information carrier. In some aspects the packet, the preamble of the packet, and/or portion of the preamble of the packet may include a plurality of sub-components (e.g., sub-packets, sub-preambles of the preamble, and/or sub-portions of the portion of the preamble of the packet, respectively). As described in greater detail herein, in some aspects, the packet and/or the preamble of the packet may include at least a first portion and a second portion. As described in greater detail herein, in some aspects, the packet and/or the preamble of the packet may include at least a third portion.

In some examples, one or more characteristics/attributes/aspects described herein with reference to a "first portion" (in relation to a packet and/or a preamble) may (or may not be) combined with any other one or more characteristics/attributes/aspects described herein (in relation to a packet and/or a preamble). Although, in some configurations, some characteristics/attributes/aspects of "first portion" (as described herein in some portion(s) of this disclosure in relation to a packet and/or a preamble) may be combined with some other characteristics/attributes/aspects of "first portion" (as described herein in some other portion(s) of this disclosure in relation to a packet and/or a preamble), it is not a requirement of the present disclosure that that every/all or even a particular set of characteristics/attributes/aspects of "first portion" (as described herein in some portion(s) of the this disclosure in relation to a packet and/or a preamble) be combined with certain other characteristics/attributes/aspects of "first portion" (as described in some other portion(s) of the present disclosure in relation to a packet and/or a preamble), unless such combination(s) is recited in the claims. As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some examples, one or more characteristics/attributes/aspects described herein with reference to a "second portion" (in relation to a packet and/or a preamble) may (or may not be) combined with any other one or more characteristics/attributes/aspects described herein (in relation to a packet and/or a preamble). Although, in some configurations, some characteristics/attributes/aspects of "second portion" (as described herein in some portion(s) of this disclosure in relation to a packet and/or a preamble) may be combined with some other characteristics/attributes/aspects of "second portion" (as described herein in some other portion(s) of this disclosure in relation to a packet and/or a preamble), it is not a requirement of the present disclosure that that every/all or even a particular set of characteristics/attributes/aspects of "second portion" (as described herein in some portion(s) of the this disclosure in relation to a packet and/or a preamble) be combined with certain other characteristics/attributes/aspects of "second portion" (as described in some other portion(s) of the present disclosure in relation to a packet and/or a preamble), unless such combination(s) is recited in the claims. As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some examples, one or more characteristics/attributes/aspects described herein with reference to a "third portion" (in relation to a packet and/or a preamble) may (or may not be) combined with any other one or more characteristics/attributes/aspects described herein (in relation to a packet and/or a preamble). Although, in some configurations, some characteristics/attributes/aspects of "third portion" (as described herein in some portion(s) of this disclosure in relation to a packet and/or a preamble) may be combined with some other characteristics/attributes/aspects of "third portion" (as described herein in some other portion(s) of this disclosure in relation to a packet and/or a preamble), it is not a requirement of the present disclosure that that every/all or even a particular set of characteristics/attributes/aspects of "third portion" (as described herein in some portion(s) of the this disclosure in relation to a packet and/or a preamble) be combined with certain other characteristics/attributes/aspects of "third portion" (as described in some other portion(s) of the present disclosure in relation to a packet and/or a preamble), unless such combination(s) is recited in the claims. As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some examples, one or more characteristics/attributes/aspects described herein with reference to a "fourth portion" (in relation to a packet and/or a preamble) may (or may not be) combined with any other one or more characteristics/attributes/aspects described herein (in relation to a packet and/or a preamble). Although, in some configurations, some characteristics/attributes/aspects of "fourth portion" (as described herein in some portion(s) of this disclosure in relation to a packet and/or a preamble) may be combined with some other characteristics/attributes/aspects of "fourth portion" (as described herein in some other portion(s) of this disclosure in relation to a packet and/or a preamble), it is not a requirement of the present disclosure that that every/all or even a particular set of characteristics/attributes/aspects of "fourth portion" (as described herein in some portion(s) of the this disclosure in relation to a packet and/or a preamble) be combined with certain other characteristics/attributes/aspects of "fourth portion" (as described in some other portion(s) of the present disclosure in relation to a packet and/or a preamble), unless such combination(s) is recited in the claims. As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some examples, the first portion (of a packet and/or a preamble) precedes the second portion (of a packet and/or a preamble). In some examples, the second portion (of a packet and/or a preamble) precedes the third portion (of a packet and/or a preamble). In some examples, the third portion (of a packet and/or a preamble) precedes the fourth portion. However, although some examples may exist where a certain order, sequence, or chronology is possible, such order/sequence/chronology is not a requirement of the present disclosure, unless so required by the claims. Accordingly, any of the one or more portions (e.g., first portion, second portion, third portion, fourth portion, and/or any other portion(s) in relation to a packet and/or preamble) may be ordered, sequenced, or have any chronology with respect to any other one or more portions (e.g., first portion, second portion, third portion, fourth portion, and/or any other portion(s) in relation to a packet and/or preamble) without deviating from the scope of the present disclosure. As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

Although this disclosure may describe one or more portions (e.g., first portion, second portion, third portion, fourth portion, and/or any other portion(s) in relation to a packet and/or preamble), any combination/permutation of such one or more portions (e.g., first portion, second portion, third portion, fourth portion, and/or any other portion(s) in relation to a packet and/or preamble) may exist without deviating from the scope of the present disclosure. However, such combination is not a requirement of the present disclosure and embodiments of the present disclosure exist where only one (or more) of such one or more portions (e.g., first portion, second portion, third portion, fourth portion, and/or any other portion(s) in relation to a packet and/or preamble) exist without necessarily any other one or more portions (e.g., first portion, second portion, third portion, fourth portion, and/or any other portion(s) in relation to a packet and/or preamble). As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some circumstances, as described further herein, an apparatus (e.g., AP, or its PR(s) and/or SR(s)) may transmit and/or an apparatus (e.g., STA, or its PR(s) and/or SR(s)) may receive a packet (e.g., data packet). In some circumstances, in accordance with certain aspects described in greater detail herein, a portion of the packet (e.g., at least a portion of the preamble, least a portion of the data/payload, and/or at least a portion of any other portion of the packet) may be configured in such a way that provides certain technical benefits and advantages to a communication system (e.g., including one or more STAs (or its PR(s) and/or SR(s)) and/or one or more APs (or its PR(s) and/or SR(s)) over certain existing systems. For example, the aforementioned portion of such packet may be configured in such a way that enables a transmitting apparatus (e.g., AP, or its PR(s) and/or SR(s)) to communicate, and for a receiving apparatus (e.g., STA, or its PR(s) and/or SR(s)) to understand, which portion(s) of one or more frequency value(s)/range(s)/portion(s) and/or one or more bandwidth value(s)/range(s)/portion(s) is/are allocated/assigned/intended/destined for (e.g., access/use by) a particular apparatus (e.g., STA, or its PR(s) and/or SR(s)), as oppose to perhaps one or more other apparatuses (e.g., STA(s), or its PR(s) and/or SR(s)). And, according to various aspects described in greater detail herein, to do so in a way that ultimately conserves power and computational resources that might otherwise be needlessly expended to process/understand/demodulate other portion(s) of one or more frequency value(s)/range(s)/portion(s) and/or one or more bandwidth value(s)/range(s)/portion(s) that is/are not allocated/assigned/intended/destined for (e.g., access/use by) that particular apparatus (e.g., STA, or its PR(s) and/or SR(s)), and perhaps may be so allocated/assigned/intended/destined for one or more other apparatus(es) (e.g., STAs, or its PR(s) and/or SR(s)). Such features can also reduce the degree of complexity and/or an amount of time consumed in effectively and efficiently communicating information from one apparatus (e.g., AP, or its PR(s) and/or SR(s)) to another apparatus (e.g., STA, or its PR(s) and/or SR(s)). As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, a particular communication channel (e.g., frequency range or bandwidth) may not be available, possibly in its entirety, for communication by some apparatuses (e.g., STA1, or its PR(s) and/or SR(s)). Many possible reasons may contribute to a portion of that communication channel being at least in part or temporarily unavailable. In some examples, that portion of that communication channel may at least in part or temporarily be unavailable due to concurrent use of that portion of that communication channel by one or more other apparatuses (e.g., STA2, or its PR(s) and/or SR(s)). In some aspects, any apparatus (e.g., AP, STA, or their respective PR(s) and/or SR(s)) performing communication that utilizes at least in part some of that communication channel may benefit from aspects that enable efficient and power-conserving features that enable such apparatus (e.g., AP, STA, or their respective PR(s) and/or SR(s)) to communicate, understand, and process the appropriate portions of that communication channel and the information contained respectively therein, thereby leading to improved throughput and overall benefits to performance and thus user experience. Such aspects are described in greater detail throughout the present disclosure.

In some aspects, the communication channel may include a plurality of communication sub-channels (or, alternatively called, "channels" or "communication channels"). In some aspects, one or more communication channels/sub-channels may be referred to as primary communication channel(s)/sub-channel(s). In some aspects, one or more communication channels/sub-channels may be referred to as a secondary communication channel(s)/sub-channel(s). In some aspects, there may exist a plurality of communication channels, and each of the plurality of communication channels may have their own respective primary communication channel(s)/sub-channel(s) and/or respective secondary communication channel(s)/sub-channel(s). In some aspects, the bandwidth value (e.g., the width/span of the frequency values used for communication and/or a high frequency value minus a low value frequency value used for communication) of each of the primary and/or secondary communication channel(s)/sub-channel(s) may be the same/identical/similar. In some aspects, the bandwidth value and/or span/range of frequency values of each of the primary and/or secondary communication channel(s)/sub-channel(s) may be referred to herein as a Least Common Bandwidth (LCB). Some non-limiting examples of the value of such LCB include but are not limited to 1 MHz, 5 MHz, 10 MHz, 20 MHz, 40 MHz, 60 MHz, 80 MHz, 120 MHz, 160 MHz, 150 MHz, and 320 MHz.

In some aspects, the third portion of the packet and/or preamble may include a first plurality of bits/values. In some aspects, the fourth portion of the packet and/or preamble may include a second plurality of bits/values. In some aspects, the first plurality of bits provides information sufficient for an apparatus (e.g., AP, STA, or their respective PR(s) and/or SR(s)) to communicate, and/or for an apparatus (e.g., STA, AP, or their respective PR(s) and/or SR(s)) to understand/determine, a Communication Channel Configuration (CCC), as is described in greater detail herein. In some aspects, the third portion (and/or the aforementioned first plurality of bits thereof) is/are repeated, identical, same, not permitted to at least in part vary relative to and/or at least convey the same/similar substantive information in a plurality of communication channels/sub-channels. In some aspects, each of the plurality of communication channels/sub-channels (e.g., over/in which the third portion (and/or the aforementioned first plurality of bits thereof) is/are repeated, identical, same, not permitted to at least in part vary and/or at least conveyed with the same/similar substantive information) comprises a first bandwidth value, which in some aspects may be equal to the LCB. In some aspects, each of the plurality of communication channels/sub-channels (e.g., over/in which the third portion (and/or the aforementioned first plurality of bits thereof) is/are repeated, identical, same, not permitted to at least in part vary and/or at least conveyed with the same/similar substantive information) are repeated, identical, same, not permitted to at least in part vary relative to and/or convey the same/similar information for a number of communication channels/sub-channels that in aggregate span a bandwidth equal to some multiple of the LCB. In some aspects, such multiple of the LCB bandwidth may be/include (and/or may be limited to) a positive integer value (e.g., one, two, three, four, five, etc.). In some aspects, such multiple of the LCB may be referred to herein as a Group Channel Bandwidth (GCB). In some aspects, a GCB may refer to a bandwidth value and/or span/range of frequency values for a group/plurality of communication channels. Some non-limiting examples of the value of such LCB include but are not limited to 2 MHz, 10 MHz, 20 MHz, 40 MHz, 60 MHz, 80 MHz, 120 MHz, 160 MHz, 150 MHz, and 320 MHz. In some aspects, each of the plurality of communication channels/sub-channels (e.g., over/in which the third portion (and/or the aforementioned first plurality of bits thereof) is/are repeated, identical, same, not permitted to at least in part vary and/or at least conveyed with the same/similar substantive information) are contiguous/adjacent (e.g., with at least one other such communication channels/sub-channels). That is, in some aspects, the GCB includes at least some of each of the plurality of communication channels/sub-channels (e.g., over/in which the third portion (and/or the aforementioned first plurality of bits thereof) is/are repeated, identical, same, not permitted to at least in part vary and/or at least conveyed with the same/similar substantive information).

In some aspects, there may exist more than one plurality of communication channels/sub-channels. In some aspects, each of such plurality have a common/same/similar/identical GCB. In some aspects, a first one of a plurality of communication channels/sub-channels may in aggregate span a first GCB and a second one of a plurality of a communication channels/sub-channels may in aggregate span a second GCB, which may or may not have the same value without deviating from the scope of this disclosure. In some aspects, the first one of the plurality of communication channels/sub-channels may include a first version of the aforementioned third portion (of the packet and/or preamble) (and, in some aspects, such first version of the third portion may not (or may) include any version of one or more of the aspects described herein with respect to such third portion, such as a first version of the aforementioned first plurality of bits/values). In some aspects, the second one of the plurality of communication channels/sub-channels may include a second version of the aforementioned third portion (of the packet and/or preamble) (and, in some aspects, such second version of the third portion may not (or may) include any version of one or more of the aspects described herein with respect to such third portion, such as a second version of the aforementioned first plurality of bits/values, which may be the same as, different from, or at least permitted to at least in part vary relative to the aforementioned first version of the second plurality of bits). In some aspects, such first version may be different from, or at least permitted to at least in part vary relative to, the second version (e.g., the first version may have one or more aspects (described further herein with respect to a third portion of a data packet and/or preamble) that is/are different from, or at least permitted to at least in part vary relative to, one or more aspects (described further herein with respect to a third portion of a data packet and/or preamble) of a second version). In some aspects, such first version may have some similarities/commonalities in relation to the second version (e.g., the first version may have one or more aspects (described further herein with respect to a third portion of a data packet and/or preamble) that is/are the same as one or more aspects (described further herein with respect to a third portion of a data packet and/or preamble) of a second version). As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, the aforementioned third portion (of the packet and/or preamble) (including the aforementioned first plurality of bits) provides information (e.g., CCC information) that is useable/used by, sufficient for, configured to/for, intended to/for, related to, and/or associated with an apparatus (e.g., AP, STA, or their respective PR(s) and/or SR(s)) communicating/informing, and/or for another apparatus (e.g., STA, AP, or their respective PR(s) and/or SR(s)) understanding/determining, a Communication Channel Configuration (CCC), as described in greater detail herein. In some aspects, a CCC may include or refer to a configuration of at least a portion of communication channel(s) (e.g., any one or more communication channel(s) and/or one or more group(s) of communication channels as described in greater detail herein). In some aspects, a CCC may include or refer to how (e.g., an information indicating how), that (e.g., information indicating that), and/or whether (e.g., information indicating whether) at least a portion (e.g., a subsequent/remaining portion) of one or more communication channel(s) (as described herein) and/or at least a portion (e.g., a subsequent/remaining portion) of one or more group(s) of communication channels (as described herein) is modulated, transformed, amplified, coded, changed, added, removed, blank (e.g., blanked or blanked-out), punctured, zero (e.g., zeroed or zeroed out), excluded, shifted, fragmented, omitted, partitioned, and/or otherwise having a configuration affecting how that communication channel is utilized to communicate information from one apparatus to another apparatus. In some aspects, a CCC may include or refer to how (e.g., an information indicating how), that (e.g., information indicating that), and/or whether (e.g., information indicating whether) at least a portion (e.g., a subsequent/remaining portion) of one or more packet(s) (e.g., data packet(s), as described in greater detail herein) and/or at least a portion (e.g., a subsequent/remaining portion) of one or more preamble(s) (e.g., a preamble of a packet or a data packet, as described in greater detail herein) (e.g., either/any of which may be communicated in one or more communication channel(s), as described herein, and/or one or more group(s) of communication channels, as described herein) is modulated, transformed, amplified, coded, changed, added, removed, blank (e.g., blanked or blanked-out), punctured, zero (e.g., zeroed or zeroed out), excluded, shifted, fragmented, partitioned, and/or otherwise having a configuration affecting how such one or more packet(s) and/or preamble(s) is/are communicated (e.g., using such communication channel(s)). As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, an apparatus (e.g., AP, STA, or their respective PR(s) and/or SR(s)) may communicate by using (e.g., in/using the aforementioned third portion of the packet and/or preamble, or in/using the aforementioned first plurality of bits (of such third portion)), and/or another apparatus (e.g., STA, AP, or their respective PR(s) and/or SR(s)) may utilize information (e.g., CCC information) (e.g., in/using the aforementioned third portion of the packet and/or preamble, or in/using the aforementioned first plurality of bits (of such third portion)) communicated using/in, a first LCB (e.g., of a first GCB, or another GCB) to determine/understand a CCC of, associated with, and/or related to at least a second LCB (e.g., in some aspects, of the first GCB, or another GCB, such as the second GCB; and/or, in some other aspects, not/never of the other GCB, such as the second GCB), a plurality of other LCBs (e.g., in some aspects, of the first GCB, or another GCB, such as the second GCB; and/or, in some other aspects, not/never of the other GCB, such as the second GCB), and/or more than one LCB but less than all of the LCBs (e.g., in some aspects, of the first GCB, or another GCB, such as the second GCB; and/or, in some other aspects, not/never of the other GCB, such as the second GCB). In some aspects, the aforementioned communication, determining, and/or understanding may be performed without using at least some or up to all information (e.g., concurrently/simultaneously communicated/transmitted/received) in the second LCB (e.g., in some aspects, of the first GCB, or another GCB, such as the second GCB; and/or, in some other aspects, not/never of the other GCB, such as the second GCB). In some aspects, the first LCB (e.g., of the first GCB, or another GCB) is not utilized by either apparatus (e.g., AP, STA) to communication a CCC of, associated with, and/or related to at least one or more (and, in some aspects, any) LCB of one or more other GCB (e.g., the second GCB, or another GCB). As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, such information (e.g., CCC information) may include or refer to one or more bits, values, indexes (e.g., bit(s)/value(s) linked to index(es)), sequences, patterns, arrangements, configurations, repetitions, or other similar aspects that can be utilized by an apparatus (e.g., AP, STA, or their respective PR(s) and/or SR(s)) to transmit/communicate, and/or another apparatus (e.g., STA, AP) to receive/communicate, information related to, associated with, or corresponding to a CCC (as described in greater detail herein). In some aspects, a (e.g., or each, or a plurality of) potential/possible version(s) of such information (e.g., CCC information) may indicate, correspond to, and/or have information that can be used by an apparatus (e.g., STA, AP, or their respective PR(s) and/or SR(s)) to determine/communicate how (e.g., information indicating how), that (e.g., information indicating that), and/or whether (e.g., information indicating whether) one or more communication channels (e.g., in/having any one or more of the LCB(s) and/or GCB(s)) is at least in part configured, is at least in part arranged, is at least in part utilized, or is at least in part not utilized (e.g., according to the CCC and/or CCC information described in greater detail herein).

In some aspects, how the aforementioned one or more communication channels (e.g., in/having any of one or more of the LCB(s) and/or GCB(s)) is/are configured/arranged/utilized/not-utilized (e.g., according to the CCC and/or CCC information described in greater detail herein) may (1) at least in part differ/vary relative to at least another one of the one or more communication channels, and/or (2) at least in part be the same/similar relative to at least another one of the one or more communication channels. For example, how a secondary communication channel is configured/arranged/utilized/not-utilized (e.g., according to the CCC and/or CCC information described in greater detail herein) may vary/differ relative to how another secondary communication channel is configured/arranged/utilized/not-utilized (e.g., according to the CCC and/or CCC information described in greater detail herein). For example, how a primary communication channel is configured/arranged/utilized/not-utilized (e.g., according to the CCC and/or CCC information described in greater detail herein) may be the same or not vary/differ relative to how another primary communication channel is configured/arranged/utilized/not-utilized (e.g., according to the CCC and/or CCC information described in greater detail herein).

In some aspects, as described herein, the packet (e.g., data packet) and/or preamble (e.g., of the packet or data packet) may include a fourth portion, which is described in greater detail herein. In some aspects, the fourth portion may include a plurality of communication channels. In some aspects, at least some of each of the communication channels of the fourth portion may include a bandwidth value and/or range of frequency values that is greater than or equal to the LCB described in greater detail herein. In some aspects, at least some of each of the communication channels of the fourth portion may include a bandwidth value and/or range of frequency values that is less than or equal to the GCB described in greater detail herein. In some aspects, at least some of each of the communication channels of the fourth portion may include a bandwidth value and/or range of frequency values that is equal to a multiple (e.g., two times, three times, four times, etc.) of the LCB described in greater detail herein. In some aspects, at least some of each of the communication channels of the fourth portion may include a bandwidth value and/or range of frequency values that is equal to a fraction (e.g., one half, one third, one quarter, etc.) of the GCB described in greater detail herein. As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, the same or similar information is not, or is not mandated/permitted to be, repeated/replicated in each (e.g., every one) of the one or more communication channels (e.g., each having a LCB, or a multiple/fraction thereof) in/of a single GCB of the fourth portion of the packet and/or preamble. In some aspects, the same or similar information is, or is permitted/mandated to be, repeated/replicated in at least two of the one or more communication channels (e.g., each having a LCB, or a multiple/fraction thereof) in/of a single GCB of the fourth portion of the packet and/or preamble. In some aspects, the same or similar information is not, or is not mandated/permitted to be, repeated/replicated in each (e.g., every one) of the one or more communication channels (e.g., each having a LCB, or a multiple/fraction thereof) in/of a plurality of GCBs of the fourth portion of the packet and/or preamble. In some aspects, the same or similar information is, or is permitted/mandated to be, repeated/replicated in at least two of the one or more communication channels (e.g., each having a LCB, or a multiple/fraction thereof) in/of a plurality of GCBs of the fourth portion of the packet and/or preamble. As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, at least some of the communication channels of the fourth portion may include different information relative to at least some other one(s) of the communication channels of the fourth portion. For example, in some aspects, a first communication channel of the fourth portion may comprise information that is different from information included in a second communication channel of the fourth portion, and such first and second communication channels may be contiguous relative to each other, in some embodiments. In some aspects, an apparatus (e.g., AP/STA, or its respective PR(s) and/or SR(s)) determines which of, and/or how many of, the one or more communication channels of the fourth portion to intended/assign/allocate for communication with a particular apparatus (e.g., STA) before initiating communication of the packet (e.g., data packet) and/or preamble (e.g., of the packet, or data packet) (in which that fourth portion is included). As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

As described herein, an apparatus (e.g., AP, STA, or their respective PR(s) and/or SR(s)) may perform or at least initiate communication in accordance with one or more aspects of concerted communication (as described in greater detail herein). Furthermore, in some aspects, such concerted communication may include (e.g., concurrent/simultaneous) communication (e.g., transmission/reception) using a plurality of links/channels of one or more apparatuses (e.g., STA, AP, or their respective PR(s) and/or SR(s)). In some circumstances, if one link operates completely independently from, or at least without any awareness or planning relative to another link, the ability or fairness of channel access by at least one of such devices (e.g., STA, AP, or their respective PR(s) and/or SR(s)) may be affected. For example, such situations may affect whether one of those apparatuses (e.g., STA, AP, or their respective PR(s) and/or SR(s)) may be able to fairly access a particular communication channel. Such circumstances may sometimes reduce communication speed, throughput, and/or efficiency, thereby resulting in increased consumption of power and computational resources.

Accordingly, in some aspects, one or more apparatuses (e.g., AP, STA, or their respective PR(s) and/or SR(s)) may communicate (e.g., transmit, receive) at least a first packet (e.g., data packet), or any one or more portion thereof (as described herein), using a first link/channel/antenna/radio and may communicate (e.g., transmit, receive) at least a second packet (e.g., data packet), or any one or more portion thereof (as described herein), using a second link/channel/antenna/radio, wherein such first and second packets (e.g., first and second data packets) are coordinated, harmonized, matched, align, and/or synchronized (e.g., in time) such that at least a beginning and/or an end of such first and/or second packets (e.g., first and second data packets) occurs at the same time or within a particular period or duration of time. In some aspects, such period or duration of time may refer to a period or duration of time that begins (1) upon the time that the first (in time) of the first or second packet initiates/starts/begins and/or terminates/ends communication (e.g., transmission, reception) and (2) a fixed or variable period of time after (1). In some aspects, such period or duration of time may refer to any fixed or variable period of time (e.g., a fixed, variable, or predetermined inter-frame spacing). As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, one or more of such apparatuses (e.g., AP, STA, or their respective PR(s) and/or SR(s)) may communicate (e.g., transmit/receive) an indication (e.g., a bit, a field, a value, etc.) indicating/advertising/communicating that (e.g., that it can/will perform), whether (e.g., whether it can/will perform), and/or preference/capability information related to and/or associated with one or more aspects of the foregoing communication(s) as described above (e.g., communication (e.g., transmission, reception) of at least a first packet (e.g., data packet), or any one or more portion thereof (as described herein), using a first link/channel/antenna/radio and may communicate (e.g., transmit, receive) at least a second packet (e.g., data packet), or any one or more portion thereof (as described herein), using a second link/channel/antenna/radio, wherein such first and second packets (e.g., first and second data packets) are coordinated, harmonized, matched, align, and/or synchronized (e.g., in time) such that at least a beginning and/or an end of such first and/or second packets (e.g., first and second data packets) occurs at the same time or within a particular period or duration of time; wherein, in some aspects, such period or duration of time may refer to a period or duration of time that begins (1) upon the time that the first (in time) of the first or second packet initiates/starts/begins and/or terminates/ends communication (e.g., transmission, reception) and (2) a fixed or variable period of time after (1), and, in some aspects, such period or duration of time may refer to any fixed or variable period of time (e.g., a fixed, variable, or predetermined inter-frame spacing)). As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, after, based on, or in response to such communicated indication (as described above), one or more of such apparatuses (e.g., STA, AP, or their respective PR(s) and/or SR(s)) may perform an algorithm that includes at least one of: (1) determining whether to communicate with an apparatus that communicated such indication, (2) determining a preference for communicating with an apparatus that communicated such indication (e.g., where that indication indicates that such apparatus does or has a preference/capability of communicating such first and second packets in a manner such that at least a beginning and/or an end of such first and/or second packets (e.g., first and second data packets) occurs at the same time or within a particular period or duration of time), (3) initiating/performing one or more operations to facilitate or enable such communication (e.g., communicating such first and second packets in a manner such that at least a beginning and/or an end of such first and/or second packets (e.g., first and second data packets) occurs at the same time or within a particular period or duration of time), and/or (4) determining a preference for not communicating with an apparatus that either (a) did not communicate such indication (e.g., where that indication indicates that such apparatus does or has a preference/capability of communicating such first and second packets in a manner such that at least a beginning and/or an end of such first and/or second packets (e.g., first and second data packets) occurs at the same time or within a particular period or duration of time), or (b) did communicate such indication but such indication did not indicate that such apparatus does or has a preference/capability of communicating such first and second packets in a manner such that at least a beginning and/or an end of such first and/or second packets (e.g., first and second data packets) occurs at the same time or within a particular period or duration of time. As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some circumstances, a particular apparatus (e.g., STA, AP, or their respective PR(s) and/or SR(s)) may determine to, be incapable of, or otherwise configured such that it cannot (e.g., due to its physical hardware/antenna configuration/arrangements, etc.) perform one or more aspect of concerted communication, as is described in greater detail herein. Accordingly, in some circumstances, such apparatus (e.g., STA, AP, or their respective PR(s) and/or SR(s)) may benefit from coordinating/communicating such aspects to one or more apparatuses (e.g., AP, STA, or their respective PR(s) and/or SR(s)) with which it may communicate. Such coordination/communication can facilitate more efficient communication protocols, which can reduce consumption of power and computational resources, thus contributing to a beneficial user experience.

In some aspects, an apparatus (e.g., STA, AP, or their respective PR(s) and/or SR(s)) (e.g., having a plurality of links/channels/antennas/radios for communication) may communicate (e.g., transmit, receive) information (e.g., data, bit(s), value(s), bitmap(s), table(s), vector(s), or other suitable encapsulations of information) to/from another apparatus (e.g., AP, STA, or their respective PR(s) and/or SR(s)) that informs/indicates whether (e.g., whether it is allowed/capable/permitted/enabled), when (e.g., a time, a timing, or a sequence) and/or which of (e.g., which one or ones of a plurality of a links/channels/antennas/radios) one or more of a/its plurality of links/channels/antennas/radios can be utilized in accordance with one or more aspects of concerted communication, as is described in greater detail herein. For example, such an apparatus (e.g., STA, AP, or their respective PR(s) and/or SR(s)) may communicate (e.g., transmit, receive), in such information, that its first link/channel/antenna/radio can (or cannot) be utilized in accordance with one or more aspects of such concerted communication (as described herein; e.g., including concurrent/simultaneous communication) and/or that its second link/channel/antenna/radio cannot (or can) be utilized in accordance with such concerted communication (as described herein; e.g., including concurrent/simultaneous communication). As another example, such an apparatus (e.g., STA, AP, or their respective PR(s) and/or SR(s)) may communicate (e.g., transmit, receive), in such information, that a first set/combination of two or more links/channels/antennas/radios can (or cannot) be utilized in accordance with one or more aspects of such concerted communication (as described herein; e.g., including concurrent/simultaneous communication) and/or that a second set/combination of two or more links/channels/antennas/radios cannot (or can) be utilized in accordance with one or more aspects of such concerted communication (as described herein; e.g., including concurrent/simultaneous communication). In some examples, the plurality of links/channels/antennas/radios may comprise at least a first link/channel/antenna/radio, a second link/channel/antenna/radio, and a third link/channel/antenna/radio. In some aspects, the frequency utilized for/by the first link/channel/antenna/radio may differ from the frequency utilized for/by the second link/channel/antenna/radio; in some examples, such difference may be various values, such as (1) equal to or greater than 1 GHz, 2 GHz, or 3 GHz, and/or (2) less than or equal to 5 GHz, 4 GHz, or 3 GHz. In some aspects, the frequency utilized for/by the second link/channel/antenna/radio may differ from the frequency utilized for/by the third link/channel/antenna/radio; in some examples, such difference may be various values, such as (1) equal to or greater than 0.5 GHz, 1 GHz, or 2 GHz, and/or (2) less than or equal to 3 GHz, 3.5 GHz, or 2 GHz.

In some circumstances, an apparatus (e.g., STA, AP, or their respective PR(s) and/or SR(s)) may determine that at least one of its links/channels/antennas/radios (of up to a plurality of its links/channels/antennas/radios) is available for communication (e.g., after performing virtual carrier sensing, possibly including checking its NAV, and/or physical carrier sensing, possibly including energy or signal detection). However, in some circumstances, such as where the utilization of such at least one of its links/channels/antennas/radios may possibly negatively affect any ongoing or near-future communication(s) utilizing another one of its plurality of links/channels/antennas/radios (e.g., due to any same-apparatus-induced interference and/or packet collision/corruption), such apparatus (e.g., STA, AP, or their respective PR(s) and/or SR(s)) may perform one or more steps/processes/actions to minimize or avoid any such possibly negative effect, thereby increasing the performance of the overall apparatus (e.g., STA, AP, or their respective PR(s) and/or SR(s)) and reducing power and resource consumption required for wireless communication.

Accordingly, in some aspect, one or more first apparatus (e.g., AP(s), or its PR(s) and/or SR(s), which may be any apparatus that may be a holder and/or responder of a TXOP) may transmit and one or more second apparatus (e.g., STA(s), or its PR(s) and/or SR(s), which may be any apparatus that may be a holder and/or responder of a TXOP) may receive at least one set of at least one first packet. In some aspects, the set of at least one first packet may include or be referred to as an ULTR (e.g., in DL communication(s) 356, 357 and/or in packet 320), as is described in greater detail herein. In some aspects, such ULTR (e.g., in DL communication(s) 356, 357 and/or in packet 320) may have one or more of various configurations without deviating from the present disclosure. In some configurations, the ULTR (e.g., in DL communication(s) 356, 357 and/or in packet 320) may include information configured to protect one or more DL transmissions from the one or more first apparatus (e.g., AP(s), or its PR(s) and/or SR(s), as described herein) to the one or more second apparatus (e.g., STAs, or its PR(s) and/or SR(s)). In some configurations, such ULTR (e.g., in DL communication(s) 356, 357 and/or in packet 320) may include information configured to request that the one or more second apparatus (e.g., STA(s), or its PR(s) and/or SR(s), as described herein) determine/inform whether/that a particular link/channel/antenna/radio is available, enabled, ready, or otherwise permitted to be utilized for one or more DL transmissions from the one or more first apparatus (e.g., AP(s), or its PR(s) and/or SR(s), as described herein) to the one or more second apparatus (e.g., STA(s), or its PR(s) and/or SR(s), as described herein). In some configurations, such set of at least one first packet and/or ULTR (e.g., in DL communication(s) 356, 357 and/or in packet 320) may include or be referred to as a version of a request-to-send packet or a clear-to-send packet. In some aspects, after receiving, in response to, or based on information included in such set of at least one first packet (e.g., including/having one or more configurations of such ULTR, such as in DL communication(s) 356, 357), the one or more second apparatus (e.g., STA(s), or its PR(s) and/or SR(s), as described herein) may transmit, or determine to/whether to initiate a transmission, of one or more sets of at least one second packets (e.g., via an UL transmission from the one or more second apparatus (e.g., STA(s), or its PR(s) and/or SR(s), as described herein)) to the one or more first apparatus (e.g., AP(s), or its PR(s) and/or SR(s), as described herein). In some aspects, the one or more sets of at least one second packet may include information indicating that/whether the one or more apparatus may transmit the DL transmission using one or more links/channels/antennas/radios (e.g., of a plurality of links/channels/antennas/radios) available to the one or more first apparatus (e.g., AP(s), or its PR(s) and/or SR(s), as described herein) and/or one or more second apparatus (e.g., STA(s), or its PR(s) and/or SR(s), as described herein). In some configurations, such at least one second packet may include or be referred to as a version of a clear-to-send packet or a request-to-send packet. In some aspects, the one or more sets of at least one second packet may be communicated utilized at least a first set of one or more of the links/channels/antennas/radios. As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, the one or more sets of at least one second packet may be communicated without utilizing at least a second set of one or more of the links/channels/antennas/radios. In other words, in some aspects, after receiving, in response to, or based on information included in such set of at least one first packet (e.g., including/having one or more configurations of such ULTR, such as in DL communication(s) 356, 357), the one or more second apparatus (e.g., STA(s), as described herein) may not transmit (e.g., may determine to not, or may refrain from transmitting) such one or more sets of at least one second packet at least via the second set of one or more of the links/channels/antennas/radios (e.g., if the aforementioned first packet (e.g., ULTR, such as in DL communication(s) 356, 357) (e.g., request-to-send packet or clear-to-send packet) received from the one or more first apparatus (e.g., AP(s), or its PR(s) and/or SR(s), as described herein) and/or received via at least the first or second set of one or more of the links/channels/antennas/radios). As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, after receiving, in response to, or based on information included in such set of at least one first packet (e.g., including/having one or more configurations of such ULTR, such as in DL communication(s) 356, 357), the one or more second apparatus (e.g., STA(s), or its PR(s) and/or SR(s), as described herein) may determine to disable, disallow, refrain, or otherwise determine as unavailable a second set of one or more of the links/channels/antennas/radios is (e.g., at least temporarily) unavailable for communication (e.g., DL transmission(s)) from the one or more first apparatus (e.g., AP(s), or its PR(s) and/or SR(s), as described herein) and/or UL transmission(s) from the one or more second apparatus (e.g., AP(s), or its PR(s) and/or SR(s), as described herein) to the one or more first apparatus (e.g., STA(s), or its PR(s) and/or SR(s), as described herein), perhaps even though such second set of one or more of the links/channels/antennas/radios is (e.g., at least temporarily) otherwise available (e.g., after/because the one or more second apparatus (e.g., STA(s), or its PR(s) and/or SR(s), as described herein) checks its NAV (e.g., in some aspects, during process 358) (e.g., which may indicate that such second set of one or more of the links/channels/antennas/radios is available/idle) and/or performs physical carrier sensing (e.g., energy or signal detection) (e.g., which may indicate that such second set of one or more of the links/channels/antennas/radios is available)). As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, the one or more second apparatus (e.g., STA(s), or its PR(s) and/or SR(s), as described herein) may make such determination (e.g., determine to disable, disallow, refrain, or otherwise determine as unavailable a second set of one or more of the links/channels/antennas/radios is (e.g., at least temporarily) unavailable for communication) after determining, in response to a determination, or based on a determination that one or more criteria has been satisfied. In some aspects, such one or more criteria may include a determination that, or the expectation/anticipation/understanding that, a first set of one or more of the links/channels/antennas/radios would be utilizing at least a portion of a frequency value, frequency range, or bandwidth that would be too close to at least a portion of a frequency value, frequency range, or bandwidth that would be utilized by a second set of one or more of the links/channels/antennas/radios. In some aspects, such aspects may be 'too close' when/if the frequency utilized for/by the first set of one or more of the links/channels/antennas/radios may differ from the frequency utilized for/by the second set of one or more of the links/channels/antennas/radios, and, in some examples, such difference may be various values, such as equal to or less than 4 GHz, 3.5 GHz, 3 GHz, 2.5 GHz, 2 GHz, 1.5 GHz, 1 GHz, 0.5 GHz, or various values there between. In some aspects, such aspects may not be 'too close' when/if the frequency utilized for/by the first set of one or more of the links/channels/antennas/radios may differ from the frequency utilized for/by the second set of one or more of the links/channels/antennas/radios, and, in some examples, such difference may be various values, such as equal to or greater than 4 GHz, 3.5 GHz, 3 GHz, 2.5 GHz, 2 GHz, 1.5 GHz, 1 GHz, 0.5 GHz, or various values there between.

In some aspects, such one or more criteria may include a correlation or determination that, or the expectation/anticipation/understanding/presence/existence that, utilizing at least a portion of a frequency value, frequency range, or bandwidth may cause/induce/result-in/correlate-to, or be affected by, interference ((e.g., intra-apparatus (e.g., intra-STA or intra-AP) interference) that is equal to a (e.g., interference-related or device/hardware-related) criteria, threshold, or value) (e.g., if/when communication occurs utilizing at least a portion of a frequency value, frequency range, or bandwidth as utilized by a second set of one or more of the links/channels/antennas/radios).

In some aspects, the at least one second packet (e.g., communicated utilized at least a first set of one or more of the links/channels/antennas/radios) may include an indication that indicates (e.g., to the one or more first apparatus (e.g., AP(s), or its PR(s) and/or SR(s), as described herein) that a second set of one or more of the links/channels/antennas/radios is (e.g., at least temporarily) unavailable for communications (e.g., DL transmission(s)) from the one or more first apparatus (e.g., AP(s), or its PR(s) and/or SR(s), as described herein) to the one or more second apparatus (e.g., STAs, or its PR(s) and/or SR(s)), perhaps even though/if/when such second set of one or more of the links/channels/antennas/radios is (e.g., at least temporarily) at least sometimes otherwise available (e.g., after/because the one or more second apparatus (e.g., STA(s), or its PR(s) and/or SR(s), as described herein) checks its NAV (e.g., in some aspects, during process 358) (e.g., which may indicate that such second set of one or more of the links/channels/antennas/radios is available/idle) and/or performs physical carrier sensing (e.g., energy or signal detection) (e.g., which may indicate that such second set of one or more of the links/channels/antennas/radios is available)). As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, such determination (e.g., determining to disable, disallow, refrain, or otherwise determine as unavailable a second set of one or more of the links/channels/antennas/radios (e.g., at least temporarily) for communication) may result in the second set of one or more of the links/channels/antennas/radios is (e.g., at least temporarily) being unavailable for communication for at least a particular duration (e.g., period of time). In some aspects, such duration (e.g., period of time) (e.g., of unavailability) may be for at least a duration (e.g., period of time) that is stored in or determined by the one or more second apparatus (e.g., STA(s), or its PR(s) and/or SR(s), as described herein). In some aspects, such duration (e.g., period of time) is determined by the one or more second apparatus (e.g., STA(s), or its PR(s) and/or SR(s), as described herein) based on information received from the one or more first apparatus (e.g., AP(s), or its PR(s) and/or SR(s), as described herein). In some aspects, such information may have been at least in part included or indicated by at least a field of the aforementioned set of at least one first packet (e.g., ULTR, such as in DL communication(s) 356, 357) (e.g., request-to-send packet or clear-to-send packet) (e.g., as received from the one or more first apparatus (e.g., AP(s), or its PR(s) and/or SR(s), as described herein). In some aspects, such duration (e.g., period of time) (e.g., of unavailability) may be at least until (e.g., at least a first and/or at least a last/final) acknowledgement message is transmitted by the one or more second apparatus (e.g., STA(s), or its PR(s) and/or SR(s), as described herein) and/or received by the one or more first apparatus (e.g., AP(s), or its PR(s) and/or SR(s), as described herein), where such acknowledgement message indicates that/whether a DL transmission (e.g., a multi-user DL transmission or any configuration of an ULTR, such as in DL communication(s) 356, 357, as described in detail herein) was receive by the one or more second apparatus (e.g., STA(s), or its PR(s) and/or SR(s), as described herein) after the communication (e.g., reception/transmission) of the aforementioned set of at least one first packet (e.g., ULTR, such as in DL communication(s) 356, 357) (e.g., request-to-send packet or clear-to-send packet) (e.g., as received from the one or more first apparatus (e.g., AP(s), or its PR(s) and/or SR(s), as described herein) (e.g., utilizing the first set of one or more of the plurality of links/channels/antennas/radios). As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, the aforementioned first packet (as described herein) is communicated (e.g., transmitted/received) in duplicate (e.g., repeated) in/for each of a plurality of (and possibly up to every one of) the first set of one or more of the links/channels/antennas/radios. However, in some aspects, the aforementioned first packet (as described herein) is not communicated (e.g., transmitted/received) in duplicate (e.g., repeated) in/for any/each one of the first set of one or more of the links/channels/antennas/radios that is indicated as busy, not idle/available, or punctured (e.g., for DL communication of a first packet, as described herein). In some aspects, the aforementioned second packet (as described herein) is communicated (e.g., transmitted/received) in duplicate (e.g., repeated) in/for each of a plurality of (and possibly up to every one of) the second set of one or more of the links/channels/antennas/radios. However, in some aspects, such the aforementioned second packet (as described herein) is not communicated (e.g., transmitted/received) in duplicate (e.g., repeated) in/for any/each one of the second set of one or more of the links/channels/antennas/ radios that is indicated as busy, not idle/available, or punctured (e.g., for UL communication of a second packet, as described herein). As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, the aforementioned set of at least one first packet (as described herein) may include information (e.g., value(s), table(s), bitmap(s), lists, or other data) indicating one or more of the links/channels/antennas/radios that are unavailable, disallowed, disabled, or otherwise not able to (e.g., at least temporarily) be accessed/utilized by the one or more first apparatus (e.g., AP(s), as described herein) and/or the one or more second apparatus (e.g., STA(s), or its PR(s) and/or SR(s), as described herein). In some aspects, the one or more second apparatus (e.g., STA(s), or its PR(s) and/or SR(s)) may utilize such information in the set of at least one first packet to determine which of the plurality of possible links/channels/antennas/radios to utilize for communication of the aforementioned at least one second packet, as described herein. For example, the one or more second apparatus (e.g., STA(s), or its PR(s) and/or SR(s)) may utilize such information in the set of at least one first packet to determine/select which of the plurality of possible links/channels/antennas/radios is/are or will be the second set of one or more links/channels/antennas/radios (as described in detail herein) that can/will be utilized for the UL transmission of the at least one second packet, as described in detail herein. As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some circumstances, there may exist a plurality of STAs that are communicating with an AP, and some of those STAs may be communicating according to one or more first type(s) (e.g., legacy type(s)) of protocol(s), configuration(s), and/or communication standard(s), while some of those STAs may be communicating according to one or more second type(s) (e.g., non-legacy type(s)) of protocol(s), configuration(s), and/or communication standard(s). Furthermore, in some circumstances, the AP may be able to utilize a relatively large bandwidth to communicate with the plurality of STAs. In some circumstances, using different frames or packets (e.g., DL data packets) (e.g., at different times) for each of the aforementioned types may not be as efficient as using the same frame or packet (e.g., a DL packet possibly having sub-packets or sub-frames therein) (e.g., at the same/contiguous time(s)) for those aforementioned different types.

Accordingly, in some aspects, a communication/transmission (e.g., DL and/or UL) (e.g., a single DL communication/transmission) (e.g., single UL communication/transmission) (e.g., packet, frame, data packet, or any other suitable term as described herein) may include information configured, arranged, encoded, packetized, or processed according to a mixture (e.g., plurality of) of different communication protocols, communication standards, schemes, arrangements and/or configurations. For example, a first portion (e.g., using or included in a first resource unit, a first frequency range, a first communication channel, a first time period, and/or other resource allocation) of such communication/transmission may include information configured, arranged, encoded, packetized, or processed according to a first communication protocol, a first communication standard, a first scheme, a first arrangement and/or a first configuration, whereas a second portion (e.g., using or included in a second resource unit, a second frequency range, a second communication channel, a second time period, and/or other resource allocation) of such communication/transmission may include information configured, arranged, encoded, packetized, or processed according to a second communication protocol, a second communication standard, a second scheme, a second arrangement and/or a second configuration. In some aspects, such first portion may be contiguous in the frequency domain relative to the second portion. In some aspects, such first portion may not be contiguous in the frequency domain relative to the first portion. In some aspects, such first portion and such second portion may be communicated concurrently or simultaneously. As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, such first portion may be communicated by a first apparatus (e.g., AP or STA) to a second apparatus (e.g., STA or AP, or their PR(s) and/or SR(s)) that (1) is utilizing, parked on, or camped on a first resource unit, a first frequency range, a first communication channel, and/or (2) is understood to, indicated for, configured to, capable to, and/or is enabled to/for receive/receiving communication (e.g., DL or UL) according to a first communication protocol, a first communication standard, a first scheme, a first arrangement and/or a first configuration, whereas such second portion may be communicated by the first apparatus (e.g., AP or STA, or their PR(s) and/or SR(s)) to the second apparatus (e.g., STA or AP, or their PR(s) and/or SR(s)) that (1) is utilizing, parked on, or camped on a second resource unit, a second frequency range, a second communication channel, and/or (2) is understood to, indicated for, configured to, capable to, and/or is enabled to/for receive/receiving communication (e.g., DL or UL) according to a second communication protocol, a second communication standard, a second scheme, a second arrangement and/or a second configuration.

In some aspects, such first apparatus (e.g., AP or STA, or their PR(s) and/or SR(s)) may make a determination to (e.g., how to) generate (e.g., configure, arrange, frequency-multiplex, time-multiplex, etc.) at least some of such communication (e.g., DL or UL) comprising such first portion and/or second portion based on, in consideration of, or in accordance with such second apparatus (e.g., STA or AP, or their PR(s) and/or SR(s)) (1) utilizing, parking on, or camping on a first resource unit, a first frequency range, a first communication channel, and/or (2) being understood to, indicated for, configured to, capable to, and/or enabled to/for receive/receiving communication (e.g., DL or UL) according to (i) a first communication protocol, a first communication standard, a first scheme, a first arrangement and/or a first configuration, and/or (ii) a second communication protocol, a second communication standard, a second scheme, a second arrangement and/or a second configuration.

In some aspects, such communication may include such first portion and/or second portion only if the bandwidth, frequency range, or resource unit allocation meets a threshold value. For example, such threshold value may be a particular size of the bandwidth (e.g., 160 MHz, or any value that is lower or higher), and/or the resource unit allocation includes at least a certain number of tones, symbols, and/or resource units.

In some aspects, such second apparatus (e.g., STA or AP, or their PR(s) and/or SR(s)) may receive communication (e.g., DL or UL) comprising such first and/or second portion and—e.g., based on, in consideration of, or in accordance with how such second apparatus (e.g., STA or AP, or their PR(s) and/or SR(s)) is (1) utilizing, parking on, or camping on a first resource unit, a first frequency range, a first communication channel, and/or (2) being understood to, indicated for, configured to, capable to, and/or enabled to/for receive/receiving communication (e.g., DL or UL) according to (i) a first communication protocol, a first communication standard, a first scheme, a first arrangement and/or a first configuration, and/or (ii) a second communication protocol, a second communication standard, a second scheme, a second arrangement and/or a second configuration—(A) determine or select which portion (e.g., such first portion and/or second portion of such communication) is (i) destined for and/or intended for such second apparatus, and/or (ii) which portion (e.g., such first portion and/or second portion of such communication) to process, demodulate, decode, or other suitable processes (e.g., in accordance with the appropriate communication protocol, communication standard, scheme, arrangement, and/or configuration), and/or (B) determine or select one (or which one) of one or more communication protocol(s), communication standard(s), scheme(s), arrangement(s), and/or configuration(s) (e.g., the aforementioned first one(s), or the aforementioned second one(s)) (e.g., of the aforementioned plurality of them) to utilize/use for processing, demodulation, decoding, or other suitable processes.

In some aspects, the first communication protocol, the first communication standard, the first scheme, the first arrangement and/or the first configuration may be a legacy communication protocol, legacy communication standard, legacy scheme, legacy arrangement, and/or legacy configuration, whereas the second communication protocol, the second communication standard, the second scheme, the second arrangement and/or the second configuration may be a non-legacy communication protocol, non-legacy communication standard, non-legacy scheme, and/or non-legacy arrangement.

In some aspects, the first communication protocol, the first communication standard, the first scheme, the first arrangement and/or the first configuration may be a non-legacy communication protocol, non-legacy communication standard, non-legacy scheme, non-legacy arrangement, and/or non-legacy configuration, whereas the second communication protocol, the second communication standard, the second scheme, the second arrangement and/or the second configuration may be a legacy communication protocol, legacy communication standard, legacy scheme, and/or legacy arrangement.

In some aspects, an attribute, characteristic, size (e.g., unit size, or total size), duration, tones, symbols, or other suitable aspect of the resource unit, frequency range, communication channel, time period or other resource allocation of such first portion of such communication may be greater than, smaller than, or the same size as an attribute, characteristic, size (e.g., unit size, or total size), duration, tones, symbols, or other suitable aspect of the resource unit, frequency range, communication channel, time period or other resource allocation of such second portion of such communication. In some aspects, such first portion of such communication may be in a primary communication channel, whereas such second portion of such communication may in a secondary communication channel. In some aspects, such first portion of such communication may be in a secondary communication channel, whereas such second portion of such communication may in a primary communication channel. In some aspects, such communication may include additional portions (other than or in addition to such first portion and/or second portion). For example, such communication may include a third portion (and forth portion, etc.), each of which may have attributes or characteristics that are similar to or the same as at least some of the above-described first portion and/or second portion. As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, such communication may be preceded (in time) by at least one frame/packet. In some aspects, such frame/packet may include an ULTR (e.g., in DL communication(s) 356, 357 and/or in packet 320), an announcement frame, or any other suitable type of frame/packet. In some aspects, such frame/frame may be configured to (1) inform two or more second apparatuses (e.g., STAs or APs) about the transmission of such communication comprising such first portion and/or second portion, and/or (2) cause, induce, or result in the two or more apparatuses (e.g., STAs or APs, or their PR(s) and/or SR(s)) adjusting the resource unit, frequency range, communication channel, time period and/or resource allocation for use in relation to receiving, decoding, demodulating, or processing of such communication comprising such first portion and/or second portion. As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some circumstances, a first apparatus (e.g., AP or STA, or their PR(s) and/or SR(s)) may intend to allocate more than a single resource (e.g., resource unit, resource size, etc.) to another apparatus (e.g., STA or AP, or their PR(s) and/or SR(s)). For example, the first apparatus (e.g., AP or STA, or their PR(s) and/or SR(s)) may wish to assign a plurality of resources to that second apparatus (e.g., STAs or APs, or their PR(s) and/or SR(s)). If the first apparatus (e.g., AP or STA, or their PR(s) and/or SR(s)) is restricted or limited in doing so (e.g., cannot allocate a plurality of resources at/for one time or one time period), the first apparatus (e.g., AP or STA, or their PR(s) and/or SR(s)) may have to transmit a plurality of communications (e.g., each including a single resource, resource unit, etc.) to the second apparatus (e.g., STA or AP, or their PR(s) and/or SR(s)) just to communicate approximately the same amount of information that would otherwise be communicated if the first apparatus (e.g., AP or STA, or their PR(s) and/or SR(s)) could have simply allocated a plurality of resources (e.g., plurality of resource units, etc.).

In some aspects, a first apparatus (e.g., AP or STA, or their PR(s) and/or SR(s)) may transmit and a second apparatus (e.g., STA or AP, or their PR(s) and/or SR(s)) may receive a communication (e.g., data packet, packet, etc.) that includes a portion configured to allocate one or more resources to a plurality of apparatuses (e.g., STAs or APs, or their PR(s) and/or SR(s)), including at least the second apparatus (e.g., STA or AP, or their PR(s) and/or SR(s)). In some aspects, such portion includes information that is usable by at least one of the plurality of apparatuses (e.g., STAs or APs, or their PR(s) and/or SR(s)), including the second apparatus (e.g., STA or AP, or their PR(s) and/or SR(s)), to determine at least (1) allocation or assignment of one or more resource units or resources for wireless communication, (2) a quantity or size of one or more of the resource units or resources for wireless communication, and/or (3) information indicating where the one or more resources units or resources for wireless communication are located in at least one domain (e.g., the frequency domain, the time domain, or a combination of the time and frequency domains). As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, the information included in such portion (configured to allocate one or more resources) of such communication may include a plurality of subsets of information. In some aspects, a first subset of such information has a first value or first set of values when the allocation or assignment of one or more resource units or resources for wireless communication for a particular apparatus (e.g., second apparatus, such as a STA or AP, or their PR(s) and/or SR(s)) comprises a plurality of resource units or resources for wireless communication, whereas the first subset of such information has a second value or second set of values when the allocation or assignment of one or more resource units or resources for wireless communication for a particular apparatus (e.g., second apparatus, such as a STA or AP, or their PR(s) and/or SR(s)) comprises a single resource unit or resource for wireless communication. Accordingly, in some aspects, the second apparatus (e.g., STA or AP, or their PR(s) and/or SR(s)) may determine that a plurality of resource units or resources for wireless communication are assigned or allocated to the second apparatus (e.g., STA or AP, or their PR(s) and/or SR(s)) when, in accordance with, based at least in part on, or in association with the first subset of such information has the first value or first set of values, whereas the second apparatus (e.g., STA or AP, or their PR(s) and/or SR(s)) may determine that a single resource unit or resource for wireless communication is assigned or allocated to the second apparatus (e.g., STA or AP, or their PR(s) and/or SR(s)) when, in accordance with, based at least in part on, or in association with the first subset of such information has the second value or second set of values.

Using at least a second subset of such information included in such portion of such communication, the second apparatus (e.g., STA or AP, or their PR(s) and/or SR(s)) may determine at least (A) a quantity or size of one or more of the resource units or resources for wireless communication, and/or (B) information indicating where the one or more resources units or resources for wireless communication are located in at least one domain (e.g., the frequency domain, the time domain, or a combination of the time and frequency domains).

In some aspects, the information included in such portion (configured to allocate one or more resources) of such communication may include a duration, segment, or group of one or more values that varies according to, or at least in part based on, a bandwidth or range of frequency values in which such communication is transmitted. For example, such portion may have a first duration, first segment, or first group of one or more values when the bandwidth or range of frequency values in which such communication is transmitted comprises a first value, and such portion may have a second duration, second segment, or second group of one or more values when the bandwidth or range of frequency values in which such communication is transmitted comprises a second values. In some aspects, the second value may be greater than the first value when the second duration, second segment, or second group of one or more values is greater than the first duration, first segment, or first group of one or more values.

In some circumstances, a first apparatus (e.g., AP or STA, or their PR(s) and/or SR(s)) wishes to communicate information pertaining to a bandwidth or frequency range of a communication or transmission to a second apparatus (e.g., STA or AP, or their PR(s) and/or SR(s)). However, utilizing too many bits, symbols, tones, fields or other communication resources for communicating such information can result in a less efficient communication system and ultimately result in unnecessary utilization of computational resources as well as power, possibly resulting in a less-than-optimal communication throughput and/or user experience.

In some aspects, a first apparatus (e.g., AP or STA, or their PR(s) and/or SR(s)) may communicate information associated with, relating to, and/or corresponding to bandwidth(s), frequency range(s), communication channel(s), center frequency/frequencies, and/or resource allocation(s) (the foregoing of which may each individually or together collectively be referred to herein as communication channel (CC)-related information) to a second apparatus (e.g., STA or AP, or their PR(s) and/or SR(s)). In some aspects, CC-related information may be in the form of a plurality of bits, tones, symbols, fields, values, or other suitable form for communicating information.

In some aspects, such CC-related information may include a 1st portion that has/includes (or is set to) a 1st portion value/number/bit when, if, only, or only when the bandwidth(s), frequency range(s), communication channel(s), center frequency/frequencies, and/or resource allocation(s) of a communication/transmission (e.g., a communication/transmission that includes the CC-related information) comprises a value, comprises a first set of values, comprises one or more values that is less than (or greater than) a first threshold value, and/or is different from the first set of values.

In some aspects, (e.g., when/if the 1st portion of such CC-related information has/includes (or is set to) a 1st portion value/number/bit, or when/if the 1st portion of such CC-related information does not have/include (or is not set to) a 1st portion value/number/bit), a 2nd portion (e.g., that precedes or follows the 1st portion) of such CC-related information comprises (1) a first 2nd portion value when, if, only when, or only if the bandwidth(s), frequency range(s), communication channel(s), center frequency/frequencies, and/or resource allocation(s) of such communication/transmission (e.g., a communication/transmission that includes the CC-related information) comprises a second value, comprises a second set of values, comprises one or more values that is less than (or greater than) a second threshold value, and/or is different from the second set of values, (2) a second 2nd portion value when, if, only when, or only if the bandwidth(s), frequency range(s), communication channel(s), center frequency/frequencies, and/or resource allocation(s) of such communication/transmission (e.g., a communication/transmission that includes the CC-related information) comprises a third value, comprises a third set of values, comprises one or more values that is less than (or greater than) a third threshold value, and/or is different from the third set of values, and (3) a third 2nd portion value when, if, only when, or only if the bandwidth(s), frequency range(s), communication channel(s), center frequency/frequencies, and/or resource allocation(s) of such communication/transmission (e.g., a communication/transmission that includes the CC-related information) comprises a fourth value, comprises a fourth set of values, comprises one or more values that is less than (or greater than) a fourth threshold value, and/or is different from the fourth set of values; wherein, the 'first,' 'second,' 'third,' and 'fourth' may be at least partly the same and/or may be at least partly different without deviating from the scope of the present disclosure (e.g., "first set of values" may be the same as or different from "second set of value," "third set of values," and/or "fourth set of value" without deviating from the scope of the present disclosure).

In some aspects, the first apparatus (e.g., AP or STA, or their PR(s) and/or SR(s)) may include such CC-related information in a packet, frame, data packet, communication, transmission, or other suitable encapsulation of information. Such packet, frame, data packet, communication, transmission, or other suitable encapsulation of information may include other information, including but not limited to non-CC-related information. For the sake of clarity, such "non-CC-related information" refers to information that is different from or not exactly the same as the plurality of bits, tones, symbols, fields, and/or values that constitute the CC-related information; therefore, non-CC-related information may, in some aspects, include information associated with, relating to, and/or corresponding to bandwidth(s), frequency range(s), communication channel(s), center frequency/frequencies, and/or resource allocation(s). As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, the first apparatus (e.g., AP or STA, or their PR(s) and/or SR(s)) may use/utilize some or all of the CC-related information to at least in part encode, randomize, scramble, encrypt, manipulate at least some of the non-CC-related information (that is included in the same packet, frame, data packet, communication, or transmission as the CC-related information) (e.g., prior to communication to the second apparatus (e.g., STA or AP, or their PR(s) and/or SR(s)). In some aspects, the second apparatus (e.g., STA or AP, or their PR(s) and/or SR(s)) may use/utilize some or all of the CC-related information to at least in part decode, re-/un-randomize, de-/un-scramble, de-/un-encrypt, and/or de-/un-manipulate at least some of the non-CC-related information (that is included in the same packet, frame, data packet, communication, or transmission as the CC-related information).

In some circumstances, when/if communicating in accordance with one or more aspects of concerted communication (as described in greater detail herein), an apparatus (e.g., STA or AP, or their PR(s) and/or SR(s)) may benefit from greater awareness, information, and/or understanding about any actual, potential, or anticipated interference resulting from, caused by, or existing between any one, two or more radio(s)/link(s)/transmission(s)/reception(s) of or by that apparatus. Without such awareness, information, and/or understanding, that apparatus (e.g., STA or AP, or their PR(s) and/or SR(s)) may initiate one or more communications that induce and/or suffers from an amount of interference that deteriorates communication with another apparatus (e.g., AP or STA, or their PR(s) and/or SR(s)), thereby potentially resulting in overall diminution of throughput and/or user experience. As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, e.g., prior to performing and/or in relation/accordance with performing any one or more aspects of concerted communication (as described in greater detail herein), an apparatus (e.g., STA or AP, or their PR(s) and/or SR(s)) may utilize, consider, evaluate, compute, or look-up various information to determine whether to, that it can, that it cannot, when to, when not to, how to, and/or how not to perform such one or more aspects of concerted communication (as described in greater detail herein). For example, such apparatus (e.g., STA or AP, or their PR(s) and/or SR(s)) may determine which of its links/radios/antennas/channels to utilize for one or more communications (e.g., in accordance with concerted communication, as described in greater detail herein) (e.g., so as to minimize interference). As another example, such apparatus (e.g., STA or AP, or their PR(s) and/or SR(s)) may determine when to utilize each of its links/radios/antennas/channels for one or more communications (e.g., in accordance with concerted communication, as described in greater detail herein) (e.g., so as to minimize interference). As yet another example, such apparatus (e.g., STA or AP, or their PR(s) and/or SR(s)) may determine what power levels to utilize for each of its links/radios/antennas/channels for one or more communications (e.g., in accordance with concerted communication, as described in greater detail herein) (e.g., so as to minimize interference).

Non-limiting examples of such information (that such apparatus may utilize to determine whether, that, when, and/or how to perform such one or more communication) may include: (1) transmission power(s) for each of the one or more links/radios/antennas/channels of the one or more communications (e.g., in accordance with concerted communication, as described in greater detail herein); (2) one or more times at which, or during which, each of the one or more links/radios/antennas/channels is, will be, or is expected to be utilized for the one or more communications (e.g., in accordance with concerted communication, as described in greater detail herein); (3) a duration during which each of the one or more links/radios/antennas/channels is, will be, or is expected to be utilized for the one or more communications (e.g., in accordance with concerted communication, as described in greater detail herein); (4) a direction/directionality (e.g., DL or UL) of each of communication across each of the one or more links/radios/antennas/channels of the one or more communications (e.g., in accordance with concerted communication, as described in greater detail herein); (5) information about which of the one or more links/radios/antennas/channels of the one or more communications (e.g., in accordance with concerted communication, as described in greater detail herein) is, will be, or is expected to be utilized for reception/receiving a communication; (6) information about which of the one or more links/radios/antennas/channels of the one or more communications (e.g., in accordance with concerted communication, as described in greater detail herein) is, will be, or is expected to be utilized for transmission/transmitting a communication; (7) a frequency separation/difference/delta between the communication channels of each of the one or more links/radios/antennas/channels of the one or more communications (e.g., in accordance with concerted communication, as described in greater detail herein) (e.g., wherein frequency separation/difference/delta may, in some aspects, refer to the difference between (i) the lowest frequency value of a first communication channel occupying a relatively higher frequency range and (ii) the highest frequency value of a second communication channel occupying a relatively lower frequency range); (8) an amount of separation (e.g., physically, in the device) between the (e.g., physical) location of each of the one or more links/radios/antennas/channels that is, will be, or is expected to be utilized for the one or more communications (e.g., in accordance with concerted communication, as described in greater detail herein); and/or (9) any information that combines, considers, considers, or provides information relevant to, or associated with, any two or more of the foregoing enumerated information (e.g., (1) through (8)), and their respectively suitable equivalents as will be apparent to one of ordinary skill in the art.

In some circumstances, an apparatus (e.g., STA or AP, or their PR(s) and/or SR(s)) may enter into a low power mode (e.g., power save mode, doze mode, sleep mode, etc.). And, in some aspects, such apparatus may be able to configure, enable, cause, induce, or trigger one or more of its radios/antennas/channels/links to enter into such a low power mode when one or more conditions/circumstance exist. However, prematurely entering into such a low power mode by one or more of its radios/antennas/channels/links may hamper such apparatus' ability to utilize that/those one or more radios/antennas/channels/links for certain transmissions (e.g., re-transmission(s) following a failed or unsuccessful transmission), thereby possibly resulting in delays caused in part by relatively fewer radios/antennas/channels/links being available for communication (e.g., of that re-transmission).

In some aspects, an apparatus (e.g., STA or AP, or their PR(s) and/or SR(s)) may, e.g., in accordance with one or more aspects of concerted communication (as described in greater detail herein), perform a first process that comprises: (1) transmitting, using a first link/radio/antenna/channel of a plurality of links/radios/antennas/channels, a packet/frame comprising a preamble and a payload, wherein the packet/frame includes an indication indicating that additional/more payload/data (e.g., associated with a first identifier, such as a first data/traffic identifier) will be transmitted using that first link/radio/antenna/channel, (2) not cause/allow/induce at least that first link/radio/antenna/channel enter into a low power mode (e.g., power save mode, doze mode, sleep mode, etc.), and (3) after (e.g., only after) any (e.g., zero, at least one, or all) other link(s)/radio(s)/antenna(s)/channel(s) have communicated (e.g., transmitted/received) one or more (or all) packet(s)/frame(s) each comprising a preamble and a payload (e.g., such packet(s)/frame(s) being associated with the first identifier, such as the first data/traffic identifier), subsequently transmit, using the first link/radio/antenna/channel (of the plurality of links/radios/antennas/channels) a frame/packet (e.g., comprising a preamble but without a payload or data payload (e.g., null data packet)) comprising an indication indicating that additional/more payload/data (e.g., associated with the first identifier, such as the first data/traffic identifier) will be transmitted using that first link/radio/antenna/channel, and/or (4) subsequently cause/allow/induce at least that first link/radio/antenna/channel to enter into a low power mode (e.g., power save mode, doze mode, sleep mode, etc.). As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, the foregoing first process (or one or more of its sub-processes (1) through (4)) when or if at least one other link/radio/antenna/channel (e.g., a second link/radio/antenna/channel) of the plurality of links/radios/antennas/channels is currently, will later, or is scheduled to communicate (e.g., transmit or receive) at least one packet/frame each comprising a preamble and a payload (e.g., data payload) (e.g., associated with the first identifier, such as the first data/traffic identifier). Accordingly, in some aspects, such apparatus (e.g., STA or AP, or their PR(s) and/or SR(s)) will not perform such first process (or one or more of its sub-processes (1) through (4)) if at least one other link/radio/antenna/channel (e.g., the second link/radio/antenna/channel) of the plurality of links/radios/antennas/channels is not currently, will not later, or is not scheduled to communicate (e.g., transmit or receive) at least one packet/frame each comprising a preamble and a payload (e.g., data payload) (e.g., associated with the first identifier, such as the first data/traffic identifier).

In some circumstances, two or more apparatuses communicating (or preparing to, or setting up to, communicate) with each other in accordance with any one or more aspects of concerted communication (as described in greater detail herein) may be able to further improve efficiencies associated with computational resource, power utilization, delays in setup of one or more links/radios/channels/antennas for such one or more aspects of concerted communication (as described in greater detail herein) through certain protocols where particular information is exchanged between such two or more apparatuses.

As described in greater detail herein, such two or more apparatuses (e.g., AP(s) and/or STA(s), or their PR(s) and/or SR(s)) may communicate with each other according to one or more aspects of concerted communication. In some aspects, as described in greater detail herein, such two or more apparatuses (e.g., AP(s) and/or STA(s), or their PR(s) and/or SR(s)) may have the ability to enable for communication, and/or communicate using, a plurality of links/radios/antennas/channels; in some aspects, such communication may be concurrent/simultaneous in various scenarios (as described in greater detail herein). Prior to communicating according to such concerted communication (as described in greater detail herein), a first apparatus (e.g., AP(s) or STA(s), or their PR(s) and/or SR(s)) may utilize one or more of its links/radios/antennas/channels to communicate a set of information to a second apparatus (e.g., STA(s) or AP(s), or their PR(s) and/or SR(s)). In some aspects, a first subset of such set of information includes information common to all of the (e.g., possible/potential) links/radios/antennas/channels (e.g., plurality of links/radios/antennas/channels) that such apparatus (e.g., AP(s) or STA(s), or their PR(s) and/or SR(s)) of such first apparatus. In some aspects, a second subset of such set of information includes information relating to, corresponding to, and/or describing the (or, in some aspects, each of the) one or more links/radios/antennas/channels (e.g., of the plurality of links/radios/antennas/channels) of such first apparatus (e.g., AP(s) or STA(s), or their PR(s) and/or SR(s)), wherein such (or, in some aspects, each of the) one or more links/radios/antenna/channels is/are different from the one or more links/radios/antenna/channels that such first apparatus (e.g., AP(s) or STA(s), or their PR(s) and/or SR(s)) is utilizing/using to communicate such second subset of information, such first subset of information, or such information (that includes the first and/or second subset of information). For example, in some aspects, such first apparatus (e.g., AP(s) or STA(s), or their PR(s) and/or SR(s)) may utilize a first link/radio/antenna/channel of its plurality of links/radios/antennas/channels to communicate the aforementioned information (containing at least the first subset and the second subset), (1) the first subset of information relates to, corresponds to, pertains to, and/or describes one or more aspects common to the first link/radio/antenna/channel as well as the second link/radio/antenna/channel (and/or a third link/radio/antenna/channel, and/or a fourth link/radio/antenna/channel, and so on) (e.g., all links/radios/antennas/channels the plurality of links/radios/antennas/channels) and (2) the second subset of information relates to, corresponds to, pertains to, and/or describes one or more aspects specific to (or, in some aspects, each of) a second link/radio/antenna/channel (and/or a third link/radio/antenna/channel, and/or a fourth link/radio/antenna/channel, and so on) (e.g., any link(s)/radio(s)/antenna(s)/channel(s) different from the first link/radio/antenna/channel). In some aspects, such second subset of information excludes (e.g., does not include) information that relates to, corresponds to, pertains to, and/or describes one or more aspects specific to the first link/radio/antenna/channel.

Such information (e.g., the first subset of information and/or the second subset of information) may include various data/fields/information without deviating from the scope of the present disclosure. In some aspects, such information (e.g., the first subset of information and/or the second subset of information) may include information that (i) is usable by another apparatus (e.g., the second apparatus (e.g., STA(s) or AP(s), or their PR(s) and/or SR(s))) to determine or (ii) relates to, corresponds to, pertains to, and/or describes one or more capabilities, capacities, configurations, characteristics, or attributes associated with wireless communication using (1) any one or more of the plurality of links/radios/antennas/channels (e.g., of the first apparatus (e.g., AP(s) or STA(s), or their PR(s) and/or SR(s)), (2) each link/radio/antenna/channel of the plurality of links/radios/antennas/channels (e.g., of the first apparatus (e.g., AP(s) or STA(s), or their PR(s) and/or SR(s)), and/or (3) at least one but not all links/radios/antennas/channels (e.g., a subset of, or only a subset of) the plurality of links/radios/antennas/channels (e.g., of the first apparatus (e.g., AP(s) or STA(s), or their PR(s) and/or SR(s)) (e.g., the first link/radio/antenna/channel but not any other link/radio/antenna/channel of the plurality of links/radios/antennas/channels) (e.g., the second link/radio/antenna/channel (and/or the third link/radio/antenna/channel, etc.) but not the first link/radio/antenna/channel)).

In some aspects, such one or more capabilities, capacities, configurations, characteristics, or attributes may include (1) physical properties of one or more antennas links/radios/channels of the first apparatus (e.g., AP(s) or STA(s), or their PR(s) and/or SR(s)), (2) preference, priority, or identification information indicating which, or whether, one or more of the links/radios/antennas/channels is a primary link/radio/antenna/channel and/or preference, priority, or identification information indicating which, or whether, one or more of the links/radios/antennas/channels is a non-primary link/radio/antenna/channel (e.g., a secondary link/radio/antenna/channel, a tertiary link/radio/antenna/channel, etc.), (3) a number of space time streams that one or more of (or, in some aspects, each of) the links/radios/antennas/channels is capable of, enabled to, configured to, or configurable to communicate, (4) information that relates to, corresponds to, pertains to, and/or describes the state, condition, availability, and/or buffer status of one or more of (or, in some aspects, each of) the links/radios/antennas/channels, (5) information that relates to, corresponds to, pertains to, and/or describes the bandwidth, frequency range, and/or center frequency of one or more of (or, in some aspects, each of) the links/radios/antennas/channels, (6) information that relates to, corresponds to, pertains to, and/or describes a number (e.g., quantity), and/or order/sequence of one or more of (or, in some aspects, each of) the links/radios/antennas/channels, and/or (7) information that relates to, corresponds to, pertains to, and/or describes any one or more aspects of concerted communication (as described in greater detail herein).

In some circumstances, a first apparatus (e.g., AP or STA, or their PR(s) and/or SR(s)), e.g., when communicating in accordance with any one or more aspects of concerted communication (as described in greater detail herein), may transmit a message indicate that a previously transmitted frame/packet/etc. (e.g., from a second apparatus, such as a STA or AP, or their PR(s) and/or SR(s)) was successfully received by that first apparatus. In the event that the first apparatus can utilize up to a plurality of links/radios/antennas/channels for transmitting that/such message(s) to the second apparatus, minimizing the time and resources utilized (e.g., by using fewer links/radios/antennas/channels or by using less time to perform such transmission(s)) can improve efficiencies, thereby providing various technical advantages to the first apparatus and/or the second apparatus (e.g., reduced power consumption, reduced use of computational resources, less contention/interference) as well as benefits to the overall user experience (e.g., greater throughput, and faster communication). As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, a first apparatus (e.g., STA or AP, or their PR(s) and/or SR(s)) receives (1) (e.g., using a first link/radio/antenna/channel of a plurality of links/radios/antennas/channels) a first packet/frame/communication/information (e.g., from a second apparatus (e.g., any AP or any STA, or their PR(s) and/or SR(s)) (e.g., wherein such first packet/frame/communication/information contains a first set of portions/sub-frames/sub-packets) and (2) (e.g., using a second link/radio/antenna/channel of a plurality of links/radios/antennas/channels) a second packet/frame/communication/information (e.g., from a second apparatus (e.g., any AP or any STA, or their PR(s) and/or SR(s)) (e.g., wherein such second packet/frame/communication/information contains a second set of portions/sub-frames/sub-packets). In some aspects, the first apparatus (e.g., STA or AP, or their PR(s) and/or SR(s)) (1) transmits (e.g., using a single link/radio/antenna/channel of a plurality of links/radios/antennas/channels) at least one packet/frame/communication comprising acknowledgement information that combines/consolidates/indicates that/whether/if at least some (e.g., in some aspects, up to all) of the first set of the portions/sub-frames/sub-packets of the first packet/frame/communication/information was received (e.g., in some aspects, regardless of the link/radio/antenna/channel on which it was received). As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, such acknowledgment information may include a sequence/series of bits, a bitmap, or any other organized structure of information that will be understandable by at least one other apparatus. In some aspects, such acknowledgement information may include (1) a first value (e.g., a first number (e.g., '1' or '0', or a first information (e.g., 'true' or 'false')) corresponding to each of at least one portion/sub-frame/sub-packet (e.g., of any one or more portion(s)/sub-frame(s)/sub-packet(s) of the first set of portions/sub-frames/sub-packets and/or second set of portions/sub-frames/sub-packets), wherein such first value exists when such at least one portion(s)/sub-frame(s)/sub-packet(s) was successfully received/processed (e.g., at/by the first apparatus (e.g., STA or AP, or their PR(s) and/or SR(s)), and/or (2) a second value (e.g., a second number (e.g., '0' or '1', or a second information (e.g., 'false' or 'true')) corresponding to each of at least one other portion(s)/sub-frame(s)/sub-packet(s) (e.g., of any one or more portion/sub-frame/sub-packet of the first set of portions/sub-frames/sub-packets and/or second set of portions/sub-frames/sub-packets), wherein such second value exists when (A) such at least one other portion(s)/sub-frame(s)/sub-packet was not successfully received/processed (e.g., at/by the first apparatus (e.g., STA or AP, or their PR(s) and/or SR(s)) and/or (B) no update or new information is available about whether (or not) such at least one other portion(s)/sub-frame(s)/sub-packet was (or was not) successfully received/processed (e.g., at/by the first apparatus (e.g., STA or AP, or their PR(s) and/or SR(s)). As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some circumstances, an apparatus (e.g., STA or AP, or their PR(s) and/or SR(s)) may (e.g., while operating in accordance with any one or more aspects of concerted communication, as described in greater detail herein) may benefit from avoiding scenarios where its reception/transmission activities using at least one of its links/radios/antennas/channels potentially conflict, collide, interfere, interrupt, or otherwise negatively impact its transmission/reception activities using at least another one of its links/radio/antennas/channels. Accordingly, aspects that increase coordination and avoid such outcomes (conflict, collision, interference, interruption, etc.) can improve efficiencies in communication, which reduces power consumption, conserves resources, and improves the overall speed, reliability, and performance of the system.

In some aspects, a first apparatus (e.g., STA or AP, or their PR(s) and/or SR(s)) may receive an indication (e.g., in a frame/packet/etc. that may include various other information/communication/data/frame described in greater detail herein). In some aspects, such indication may be received using a first link/antenna/radio/channel of a plurality of links/antennas/radios/channels of the first apparatus (e.g., STA or AP, or their PR(s) and/or SR(s)). Such an indication may inform/indicate to the first apparatus (e.g., STA or AP, or their PR(s) and/or SR(s)) (or be used for a determination or understanding by the first apparatus (e.g., STA or AP, or their PR(s) and/or SR(s))) that at least one other data/frame/communication/information will be, or is expected/planned/scheduled to be, (e.g., within, by, or at a time period, possibly in relation to the reception of such indication) (1) received by or communicated to the first apparatus (e.g., using a second link/antenna/radio/channel of a plurality of links/antennas/radios/channels of the first apparatus (e.g., STA or AP, or their PR(s) and/or SR(s))) and/or (2) transmitted/communicated by the first apparatus (e.g., using a second link/antenna/radio/channel of a plurality of links/antennas/radios/channels of the first apparatus (e.g., STA or AP, or their PR(s) and/or SR(s))). As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, in accordance with, in response to, or at least in part based on such an indication (or determination, as described above), the first apparatus (e.g., STA or AP, or their PR(s) and/or SR(s)) may make a determination, alteration, change, decision in relation to one or more aspect of its communication using one or more of its plurality of links/antennas/radios/channels.

As an example, if/when such indication informs/indicates to the first apparatus (e.g., STA or AP, or their PR(s) and/or SR(s)) (or is used for a determination or understanding by the first apparatus (e.g., STA or AP, or their PR(s) and/or SR(s))) that at least one other data/frame/communication/information will be, or is expected/planned/scheduled to be, received by or communicated to the first apparatus (e.g., using a second link/antenna/radio/channel of a plurality of links/antennas/radios/channels of the first apparatus (e.g., STA or AP, or their PR(s) and/or SR(s))), the first apparatus (e.g., STA or AP, or their PR(s) and/or SR(s)) may determine not to perform (or otherwise not perform) transmission using the second link/antenna/radio/channel of a plurality of links/antennas/radios/channels (e.g., within, by, or during/for a time period, possibly in relation to such indication).

As another example, if/when such indication informs/indicates to the first apparatus (e.g., STA or AP, or their PR(s) and/or SR(s)) (or is used for a determination or understanding by the first apparatus (e.g., STA or AP, or their PR(s) and/or SR(s))) that at least one other data/frame/communication/information will be, or is expected/planned/scheduled to be, transmitted by communicated by the first apparatus (e.g., using a second link/antenna/radio/channel of a plurality of links/antennas/radios/channels of the first apparatus (e.g., STA or AP, or their PR(s) and/or SR(s))), the first apparatus (e.g., STA or AP, or their PR(s) and/or SR(s)) may determine not to perform (or otherwise not perform) reception using the second link/antenna/radio/channel of a plurality of links/antennas/radios/channels (e.g., within, by, or during/for a time period, possibly in relation to such indication).

In some circumstances, an apparatus (e.g., STA or AP, or their PR(s) and/or SR(s)) may not be able (e.g., due to physical limitations, such as limited numbers of antennas/radios, or due to inter-device interference, etc.) to during at least some times perform one or more aspects of concerted communication (as described in greater detail herein). However, there may exist protocols and processes that such apparatus (e.g., STA or AP, or their PR(s) and/or SR(s)) may be able to implement that would still enable outcomes that increase the overall system performance, throughput, and user experience. For example, such an apparatus (e.g., STA or AP, or their PR(s) and/or SR(s)) may be able to utilize a single/individual antenna/radio to perform communication that bears notable relationship with certain aspects of concerted communication (as described in greater detail herein).

In some aspects, a first apparatus (e.g., STA or AP, or their PR(s) and/or SR(s)) may utilize a single/individual antenna/radio to monitor (e.g., listen for or process communication signals from) two or more channels/links. In some aspects, such monitoring may be performed in various way, such as (1) concurrently/simultaneously (e.g., at least some of the first channel/link is monitored at the same time that at least some of the second channel/link is monitored), (2) time-multiplexed (e.g., a first channel/link is monitored at a first time or during a first time period, and a second channel/link is monitored at a second time or during a second time period (wherein the first time is at least in part different from the second time, and/or the first time period is at least in part different from the second time period).

In some aspects, while performing such monitoring (e.g., listening for or processing communication signals from) two or more channels/links using a single/individual antenna/radio, the first apparatus (e.g., STA or AP, or their PR(s) and/or SR(s)) may receive (e.g., from a second apparatus, such as an AP or STA) a first frame/packet. In some aspects, such first frame/packet may include information indicating or announcing that the other apparatus (e.g., AP or STA, or their PR(s) and/or SR(s)) will (e.g., expects to, has buffered/scheduled, etc.) another frame/packet (e.g., a second frame/packet) for transmission to the first apparatus (e.g., STA or AP, or their PR(s) and/or SR(s)). In some aspects, such first frame/packet may be transmitted by the second apparatus (e.g., AP or STA, or their PR(s) and/or SR(s)) to the first apparatus (e.g., STA or AP, or their PR(s) and/or SR(s)) while the first apparatus (e.g., STA or AP, or their PR(s) and/or SR(s)) is utilizing that single/individual antenna/radio to monitor (e.g., listen for or process communication signals from) the first channel/link or the second channel/link. In some aspects, such first frame/packet may indicate which channel/link (e.g., the first channel/link or the second channel/link) to monitor (e.g., listen to or process communication signals from) (e.g., for the second frame/packet). In some aspects, in response to, in accordance with, or based at least in part on information in the first frame/packet, the first apparatus (e.g., STA or AP, or their PR(s) and/or SR(s)) may adjust or determine to monitor (e.g., listen to or process communications from) one of two or more possible channels/links. For example, the first apparatus may switch or determine to monitor/listen/process wireless signals (e.g., using/utilizing that single/individual antenna/radio) (e.g., in some aspects, exclusively for at least a period of time) on a particular channel/link instead of another channel/link (e.g., possibly in response to, in accordance with, or based at least in part on information in the first frame/packet). As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, when (e.g., during at least some of the period of time that) the first apparatus (e.g., STA or AP, or their PR(s) and/or SR(s)) is utilizing that individual/single antenna/radio for such communication (e.g., reception/transmission of the first frame/packet) using a particular channel/link instead of another channel/link, the first apparatus (e.g., STA or AP, or their PR(s) and/or SR(s)) may/does not use (e.g., may actively avoid from using, or otherwise not use) that same individual/single antenna/radio for communication using another (e.g., different) channel/link. In some aspects, (e.g., after, in response to, or even if without communication of the aforementioned second frame/packet) the first apparatus (e.g., STA or AP, or their PR(s) and/or SR(s)) may receive a second frame/packet (e.g., transmitted by the second apparatus (e.g., AP or STA, or their PR(s) and/or SR(s))). In some aspects, the second frame/packet includes an indication/request/message for the first apparatus (e.g., STA or AP, or their PR(s) and/or SR(s)) to avoid, protect from, or otherwise not communicate via at least one channel/link (e.g., first channel/link and/or second channel/link) (e.g., utilizing that single/individual antenna/radio). In some aspects, the second frame/packet may be or include a request to send message or something similar. In response to, in accordance with, or at least based in part on the second frame/packet, the first apparatus (e.g., STA or AP, or their PR(s) and/or SR(s)) (or the second apparatus (e.g., AP or STA, or their PR(s) and/or SR(s)) may set a parameter (e.g., of a NAV, a timer or counter, and/or any carrier sensing technology (e.g., virtual carrier sensing, physical carrier sensing, energy detection, and/or collision avoidance)). As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, such second frame/packet may indicate which channel/link (e.g., the first channel/link or the second channel/link) to monitor (e.g., listen to or process communication signals from) (e.g., for the second frame/packet). In some aspects, in response to, in accordance with, or based at least in part on information in the second frame/packet, the first apparatus (e.g., STA or AP, or their PR(s) and/or SR(s)) may subsequently adjust or determine to monitor (e.g., listen to or process communications from) one of two or more possible channels/links. For example, the first apparatus may switch or determine to monitor/listen/process wireless signals (e.g., using/utilizing that single/individual antenna/radio) (e.g., in some aspects, exclusively for at least a period of time) on a particular channel/link instead of another channel/link (e.g., possibly in response to, in accordance with, or based at least in part on information in the second frame/packet). In some aspects, when (e.g., during at least some of the period of time that) the first apparatus (e.g., STA or AP, or their PR(s) and/or SR(s)) is utilizing that individual/single antenna/radio for such communication (e.g., reception/transmission of the second frame/packet) using a particular channel/link instead of another channel/link, the first apparatus (e.g., STA or AP, or their PR(s) and/or SR(s)) may/does not use (e.g., may actively avoid from using, or otherwise not use) that same individual/single antenna/radio for communication using another (e.g., different) channel/link. As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, (e.g., after, in response to, or even if without communication of the aforementioned second frame/packet) the first apparatus (e.g., STA or AP, or their PR(s) and/or SR(s)) may transmit a third frame/packet (e.g., received by the second apparatus (e.g., AP or STA, or their PR(s) and/or SR(s))) (e.g., utilizing/using the same channel/link or the reception of the second frame/packet, and using/utilizing that same individual/single radio/antenna). In some aspects, the third frame/packet may include an indication/confirmation/message that the first apparatus (e.g., STA or AP, or their PR(s) and/or SR(s)) is ready to receive on, monitor for, or communicate using the first channel/link or the second channel/link (e.g., as, in some aspects, may have been indicated in the second frame/packet). In some aspects, such third frame/packet may be or include a clear to send message or something similar. In response to, in accordance with, or at least based in part on the third frame/packet, the first apparatus (e.g., STA or AP, or their PR(s) and/or SR(s)) and/or second apparatus (e.g., STA or AP, or their PR(s) and/or SR(s)) may set a parameter (e.g., a NAV, a timer or counter, and/or any carrier sensing technology (e.g., virtual carrier sensing, physical carrier sensing, energy detection, and/or collision avoidance)).

In some aspects, such third frame/packet may indicate which channel/link (e.g., the first channel/link or the second channel/link) the second apparatus (e.g., AP or STA, or their PR(s) and/or SR(s)) to utilize (e.g., transmit communication signals on). In some aspects, in response to, in accordance with, or based at least in part on information in the third frame/packet, the second apparatus (e.g., AP or STA, or their PR(s) and/or SR(s)) may subsequently adjust or determine to utilize (e.g., transmit communication signals on) one of two or more possible channels/links. For example, the second apparatus (e.g., AP or STA, or their PR(s) and/or SR(s)) may switch or determine to transmit wireless signals using that particular channel/link (e.g., instead of another channel/link) (e.g., to be received by that single/individual antenna/radio of the first apparatus (e.g., STA or AP, or their PR(s) and/or SR(s))) (e.g., in some aspects, exclusively for at least a period of time on a particular channel/link instead of another channel/link). In some aspects, (e.g., after, in response to, or even if without communication of the aforementioned third frame/packet) the first apparatus (e.g., STA or AP, or their PR(s) and/or SR(s)) may receive a fourth frame/packet (e.g., transmitted by the second apparatus (e.g., AP or STA, or their PR(s) and/or SR(s))) (e.g., utilizing/using the same channel/link or the reception of the third frame/packet, and using/utilizing that same individual/single radio/antenna). In some aspects, the fourth frame/packet may include data, a data packet, payload, or any suitable encapsulation of information that the second apparatus (e.g., AP or STA) intends to communicate/transmit to the first apparatus (e.g., STA or AP, or their PR(s) and/or SR(s)). As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, when (e.g., during at least some of the period of time that) the first apparatus (e.g., STA or AP, or their PR(s) and/or SR(s)) is utilizing that individual/single antenna/radio for such communication (e.g., reception/transmission of the third frame/packet) using a particular channel/link instead of another channel/link, the first apparatus (e.g., STA or AP, or their PR(s) and/or SR(s)) may/does not use (e.g., may actively avoid from using, or otherwise not use) that same individual/single antenna/radio for communication using another (e.g., different) channel/link. In some circumstances, an apparatus (e.g., STA or AP, or their PR(s) and/or SR(s)) may (e.g., while operating in accordance with any one or more aspects of concerted communication, as described in greater detail herein) may benefit from avoiding scenarios where its reception/transmission activities using at least one of its links/radios/antennas/channels potentially conflict, collide, interfere, interrupt, or otherwise negatively impact its transmission/reception activities using at least another one of its links/radio/antennas/channels. Accordingly, aspects that increase coordination and avoid such outcomes (conflict, collision, interference, interruption, etc.) can improve efficiencies in communication, which reduces power consumption, conserves resources, and improves the overall speed, reliability, and performance of the system. As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, a first apparatus (e.g., AP or STA, or their PR(s) and/or SR(s)) may transmit (and a second apparatus (e.g., STA or AP, or their PR(s) and/or SR(s)) may receive) one or more of a first frame/packet/ULTR/information (e.g., in DL communication(s) 356, 357) (as described in greater detail herein). In some aspects, such frame/packet/ULTR/ information (e.g., in DL communication(s) 356, 357) may be configured to induce/trigger (e.g., at least in part simultaneously or concurrently) UL transmission by/in a plurality of channels/links/radios/antennas of a second apparatus (e.g., STA or AP, or their PR(s) and/or SR(s)). Various aspects related to such frame/packet/ULTR/information (e.g., in DL communication(s) 356, 357) as well as UL transmission are described in greater detail herein. Among the many aspects described in greater detail herein is that such frame/packet/ ULTR/information (e.g., in DL communication(s) 356, 357) may be or include a request to send message, an acknowledgement request message, and/or various other types of messages. Among the many aspects described in greater detail herein is that such UL transmission (e.g., at least in part simultaneously or concurrently by/in a plurality of channels/links/radios/antennas as triggered/induced by frame/packet/ULTR/information, such as, e.g., in DL communication(s) 356, 357) may be or includes a clear to send message, an acknowledgement message, and/or various other types of messages.

In some aspects, such frame/packet/ULTR/information (e.g., DL communication(s) 356, 357) may include one or more portions. In some aspects, at least a first portion of such one or more portions includes information indicating whether/that the second apparatus (e.g., STA or AP, or their PR(s) and/or SR(s)) performs carrier sensing (e.g., virtual carrier sensing, physical carrier sensing, energy detection, collision avoidance, and/or other suitable processes). In some aspects, such first portion may have/include a first value (e.g., indicating that the second apparatus (e.g., STA or AP, or their PR(s) and/or SR(s)) should or is required to perform carrier sensing, such as carrier sensing after (e.g., maybe during an inter-frame spacing) receiving the first frame/packet and/or before transmitting a response/frame/ packet (e.g., in response to or based at least in part on information received in the first frame/packet). In some aspects such first portion may have/include a second value (different from the first value) (e.g., indicating that the second apparatus (e.g., STA or AP, or their PR(s) and/or SR(s)) should not or is not required to perform carrier sensing, such as carrier sensing after (e.g., maybe during an inter-frame spacing) receiving the first frame/packet and/or before transmitting a response/frame/packet (e.g., in response to or based at least in part on information received in the first frame/packet). One of ordinary skill in the art will understand that such first value and/or second value can be any number (e.g., integer, whole number, etc.) or non-numerical value (e.g., 'true' or 'false') without deviating from the scope of the present disclosure. As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, the first portion of the first frame/packet includes the second value when/if an amount of time expected/necessary to perform such carrier sensing exceeds or is greater than an amount of time separating complete transmission of the first frame/packet (e.g., a time when the first frame/packet is received by second apparatus (e.g., STA or AP, or their PR(s) and/or SR(s))). In some aspects, when/if an amount of time expected/necessary to perform such carrier sensing exceeds or is greater than an amount of time separating complete transmission of the first frame/packet (e.g., a time when the first frame/packet is received by second apparatus (e.g., STA or AP, or their PR(s) and/or SR(s))), and the first portion of the first frame/packet includes the first value, the second apparatus (e.g., STA or AP, or their PR(s) and/or SR(s)) may determine to not perform carrier sensing prior to performing UL transmission by/in one or more of the channels/links/radios/antennas of the second apparatus (e.g., STA or AP, or their PR(s) and/or SR(s)). In some aspects, the first frame/packet may include a second portion. In some aspects, the second portion may include information/data/value(s) indicating, relating, or associated with a duration of at least a portion of one or more UL transmission by/in one or more of the channels/links/radios/antennas of the second apparatus (e.g., STA or AP, or their PR(s) and/or SR(s)) (e.g., in response to, based at least in part on, or in accordance with the first frame/packet communicated by the first apparatus (e.g., AP or STA, or their PR(s) and/or SR(s)) to the second apparatus (e.g., STA or AP, or their PR(s) and/or SR(s))). In some aspects, such information/data/value(s) may comprise (1) first information/data/value(s) indicating, relating, or associated with a first duration of at least a portion of UL transmission by a first channel/link/radio/antenna of the second apparatus (e.g., STA or AP, or their PR(s) and/or SR(s)) and/or (2) second information/data/value(s) indicating, relating, or associated with a second duration of at least a portion of UL transmission by a second channel/link/radio/antenna of the second apparatus (e.g., STA or AP, or their PR(s) and/or SR(s)). In some aspects, the first information/data/value(s) may be the same as the second information/data/value(s) (e.g., when the at least portions of the UL transmissions by the first and second channels/links/radios/antennas have the same or similar duration). In some aspects, the first information/data/value(s) may be different from the second information/data/value(s) (e.g., when the at least portions of the UL transmissions by the first and second channels/links/radios/antennas have varying/different durations). As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, one or more apparatus (e.g., first apparatus (e.g., AP or STA, or their PR(s) and/or SR(s)) or second apparatus (e.g., STA or AP, or their PR(s) and/or SR(s))) may set/determined/generate/vary the first information/data/value(s) and/or the second information/data/value(s). In some aspects, such setting/determining/generating/varying may be performed in accordance with (or in order to achieve an objective of) aligning (e.g., making them the same, similar, or occurring within a certain period/duration of time, such as an inter-frame spacing) a first end time (e.g., a time at which communication of a particular frame/packet is complete or substantially complete) of a/one first frame/packet (e.g., first frame #1) (e.g., communicated from the first apparatus (e.g., AP or STA, or their PR(s) and/or SR(s)) to the second apparatus (e.g., STA or AP, or their PR(s) and/or SR(s)) using a first channel/link/radio/antenna of a plurality of channels/links/radios/antennas) with a second end time (e.g., a time at which communication of a particular frame/packet is complete or substantially complete) of another first frame/packet (e.g., first frame #2) (e.g., communicated from the first apparatus (e.g., AP or STA, or their PR(s) and/or SR(s)) to the second apparatus (e.g., STA or AP, or their PR(s) and/or SR(s)) using a second channel/link/radio/antenna of a plurality of channels/links/radios/antennas).

As such, in some aspects, the first apparatus (e.g., AP or STA, or their PR(s) and/or SR(s)) may generate/transmit (and/or the second apparatus (e.g., STA or AP, or their PR(s) and/or SR(s)) may receive) the first frame #1 and first frame #2 such that: (1) a/one frame/packet (e.g., first frame #1) may have an end time (e.g., first end time) that is aligned (e.g., same, similar, or occurring within a certain period/duration of time, such as an inter-frame spacing) with or relative to an end time (e.g., second end time) of another first frame/packet (e.g., first frame #2); and/or (2) a/one frame/packet (e.g., first frame #1) may have an overall/total length/duration (e.g., first total length/duration) that is different/varies from (e.g., not the same as, not similar to, or not within a certain period/duration of time, such as an inter-frame spacing) relative to an overall/total length/duration (e.g., first total length/duration) (e.g., second end time) of another first frame/packet (e.g., first frame #2). In accordance with the foregoing, in some aspects, the first apparatus (e.g., AP or STA, or their PR(s) and/or SR(s)) may add/include one or more added bits/portions (e.g., such that the aforementioned end times are similar, even though the aforementioned total length/durations may or may not vary). In some aspects, such one or more added bits may include additional payload/data, such as information that the first apparatus (e.g., AP or STA, or their PR(s) and/or SR(s)) wishes/desired/intends to communicate to the second apparatus (e.g., STA or AP, or their PR(s) and/or SR(s)) (e.g., null bits/portions, padding, etc.). In some aspects, such one or more added bits may include additional portions/bits that do not include payload, such as null bits, padding, etc. As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, the first apparatus (e.g., AP or STA, or their PR(s) and/or SR(s)) may determine/calculate/compute an amount/duration/quantity/extent of such one or more added bits/portions to include in the first frame/packet(s) (e.g., the first frame #1 and/or first frame #2 mentioned above) based at least in part on, in accordance with, and/or in association with: a/one frame/packet (e.g., first frame #1) having an end time (e.g., first end time) that is aligned (e.g., same, similar, or occurring within a certain period/duration of time, such as an inter-frame spacing) with or relative to an end time (e.g., second end time) of another first frame/packet (e.g., first frame #2). Accordingly, the second apparatus (e.g., STA or AP, or their PR(s) and/or SR(s)) may receive a/one first frame/packet (e.g., first frame #1) (e.g., communicated from the first apparatus (e.g., AP or STA, or their PR(s) and/or SR(s)) to the second apparatus (e.g., STA or AP, or their PR(s) and/or SR(s)) using a first channel/link/radio/antenna of a plurality of channels/links/radios/antennas) having a first end time that is aligned (e.g., same, similar, or occurring within a certain period/duration of time, such as an inter-frame spacing) with or relative to a second end time (e.g., a time at which communication of a particular frame/packet is complete or substantially complete) of another first frame/packet (e.g., first frame #2) (e.g., communicated from the first apparatus (e.g., AP or STA, or their PR(s) and/or SR(s)) to the second apparatus (e.g., STA or AP, or their PR(s) and/or SR(s)) using a second channel/link/radio/antenna of a plurality of channels/links/radios/antennas).

Although the aforementioned examples describe various non-limiting examples of such first frame/packet (e.g., first frame #1 and/or first frame #2), various other non-limiting examples of the present disclosure perform operations and processes without necessarily requiring such first frame/packet. For example, in some aspects, the second apparatus (e.g., STA or AP, or their PR(s) and/or SR(s)) may transmit/communicate (or determine to transmit/communicate) one or more second frame(s)/packet(s) to the first apparatus (e.g., AP or STA, or their PR(s) and/or SR(s)). For example, the one or more second frame(s)/packet(s) may include (1) a/one second frame/packet (e.g., second frame #1) communicated using a first channel/link/radio/antenna of a plurality of channels/links/radios/antennas (e.g., of the second apparatus) and/or (2) another second frame/packet (e.g., second frame #2) communicated using a second channel/link/radio/antenna of the plurality of channels/links/radios/antennas (e.g., of the second apparatus).

In some aspects, the second apparatus (e.g., STA or AP, or their PR(s) and/or SR(s)) may set/determined/generate/transmit the second frame(s)/packet(s) (e.g., second frame #1 and/or second frame #2) in accordance with (or in order to achieve an objective of) aligning (e.g., making them the same, similar, or occurring within a certain period/duration of time, such as an inter-frame spacing) a first end time (e.g., a time at which communication of a particular frame/packet is complete or substantially complete) of a a/one second frame/packet (e.g., second frame #1) (e.g., communicated from the second apparatus (e.g., STA or AP, or their PR(s) and/or SR(s)) to the first apparatus (e.g., AP or STA, or their PR(s) and/or SR(s)) using a first channel/link/radio/antenna of a plurality of channels/links/radios/antennas) with a second end time (e.g., a time at which communication of a particular frame/packet is complete or substantially complete) of another second frame/packet (e.g., second frame #2) (e.g., communicated from the second apparatus (e.g., STA or AP, or their PR(s) and/or SR(s)) to the first apparatus (e.g., AP or STA, or their PR(s) and/or SR(s)) using a second channel/link/radio/antenna of a plurality of channels/links/radios/antennas). As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

As such, in some aspects, the second apparatus (e.g., STA or AP, or their PR(s) and/or SR(s)) may generate/transmit (and/or the first apparatus (e.g., AP or STA, or their PR(s) and/or SR(s)) may receive) the second frame #1 and second frame #2 such that: (1) a/one frame/packet (e.g., second frame #1) may have an end time (e.g., first end time) that is aligned (e.g., same, similar, or occurring within a certain period/duration of time, such as an inter-frame spacing) with or relative to an end time (e.g., second end time) of another second frame/packet (e.g., second frame #2); and/or (2) a/one frame/packet (e.g., second frame #1) may have an overall/total length/duration (e.g., first total length/duration) that is different/varies from (e.g., not the same as, not similar to, or not within a certain period/duration of time, such as an inter-frame spacing) relative to an overall/total length/duration (e.g., first total length/duration) (e.g., second end time) of another second frame/packet (e.g., second frame #2). In accordance with the foregoing, in some aspects, the second apparatus (e.g., STA or AP, or their PR(s) and/or SR(s)) may add/include one or more added/included bits/portions (e.g., such that the aforementioned end times are similar, even though the aforementioned total length/durations may or may not vary). In some aspects, such one or more added/included bits/portions may include additional payload/data, such as information that the second apparatus (e.g., STA or AP, or their PR(s) and/or SR(s)) wishes/desired/intends to communicate to the first apparatus (e.g., AP or STA, or their PR(s) and/or SR(s)) (e.g., null bits/portions, padding, etc.). In some aspects, such one or more added/included bits/portions may include additional portions/bits that do not include payload, such as null bits, padding, etc. As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

In some aspects, the second apparatus (e.g., AP or STA, or their PR(s) and/or SR(s)) may determine/calculate/compute an amount/duration/quantity/extent of such one or more added/included bits/portions to include in the second frame/packet(s) (e.g., the second frame #1 and/or second frame #2 mentioned above) based at least in part on, in accordance with, and/or in association with: a/one frame/packet (e.g., second frame #1) having an end time (e.g., first end time) that is aligned (e.g., same, similar, or occurring within a certain period/duration of time, such as an inter-frame spacing) with or relative to an end time (e.g., second end time) of another first frame/packet (e.g., second frame #2). Accordingly, the second apparatus (e.g., STA or AP, or their PR(s) and/or SR(s)) may transmit a/one second frame/packet (e.g., second frame #1) (e.g., communicated from the second apparatus (e.g., STA or AP, or their PR(s) and/or SR(s)) to the first apparatus (e.g., AP or STA, or their PR(s) and/or SR(s)) using a first channel/link/radio/antenna of a plurality of channels/links/radios/antennas) having a first end time that is aligned (e.g., same, similar, or occurring within a certain period/duration of time, such as an inter-frame spacing) with or relative to a second end time (e.g., a time at which communication of a particular frame/packet is complete or substantially complete) of another second frame/packet (e.g., second frame #2) (e.g., communicated from the second apparatus (e.g., STA or AP, or their PR(s) and/or SR(s)) to the first apparatus (e.g., AP or STA, or their PR(s) and/or SR(s)) using a second channel/link/radio/antenna of a plurality of channels/links/radios/antennas). As mentioned above, in some aspects, any one or more of the aforementioned packets (and, to the extent applicable, any corresponding preamble(s), portion(s), etc.) may be or may be included in any one or more of the DL and/or UL communications 310, 312, 320, 330, 332, 350-357, 362-364 described in greater detail herein.

As described herein, an apparatus (e.g., being/including AP(s)/STA(s), or its PR(s) and/or SR(s)) may perform concerted communication (as described in greater detail herein) using a plurality of links/radios/antennas/channels/ transceivers/communications. In some circumstances, it may be possible that one or more of such links/radios/ antennas/channels/transceivers/communications could possibly interfere or cause interference for another one or more of those links/radios/antennas/channels/transceivers/communications. Such interference could be in the form of corrupting or damaging the information being transmitting, or simply preventing that information from being received/ processed/demodulated properly at the destination to which the information is intended. Such interference could result in undesirable impacts to the information being transmitted/ received on one or more of those links/radios/antennas/ channels/transceivers/communications, thereby possibly necessitating such apparatus (e.g., being/including AP(s)/ STA(s), or its PR(s) and/or SR(s)) to re-transmit/re-receive such information, in addition to other possible undesirable outcomes. Such undesirable aspects could possibly reduce operational efficiency, increase power consumption, increase compute resources utilized, diminish communication throughput/speed, reduce spectral efficiency, and/or adversely impact the user experience.

In some aspects, such an apparatus (e.g., being/including STA(s)/AP(s), or its PR(s) and/or SR(s)) may utilize a process that at least (1) selects a particular/initial value (e.g., a number, a time, a quantity, a count, or other suitable value) and/or (2) increments, decrements, or otherwise adjusts that value (or another value corresponding to that value) (e.g., such value or its corresponding value being a number, a time, a quantity, a count, or other suitable value), for example, one or more times by a certain increment/amount/ duration/etc. In some aspects, such a process may involve or utilize one or more timers, counters, clocks, or any other suitable input signals that can be utilized for such a process. In some aspects, such timer(s)/counter(s)/clock(s)/etc. may select a particular/initial value based at least in part on a set of pre-determined set of one or more rules. In some aspects, such selection may be a random selection from one or more values (e.g., from a predetermined set of possible values). In some aspects, the aforementioned process could involve (a) separate/different/independent timer(s)/counter(s)/clock(s)/ etc. for each of the aforementioned links/radios/antennas/ channels/transceivers.

In some aspects, such apparatus (e.g., being/including STA(s)/AP(s), or its PR(s) and/or SR(s)) may determine to initiate/perform communication (e.g., transmission/reception) on/using a first set of one or more links/radios/antennas/channels/transceivers when at least (1) the aforementioned process indicates that the adjusted/incremented/ decremented value (e.g., a number, a time, a quantity, a count, or other suitable value) has reached a first threshold value/condition, and/or (2) the timer(s)/counter(s)/clock(s) corresponding to the first set of one or more links/radios/ antennas/channels/transceivers has reached a first threshold value/condition.

In some aspects, such apparatus (e.g., being/including STA(s)/AP(s), or its PR(s) and/or SR(s)) may determine not to initiate/perform (e.g., may refrain from performing/initiating) communication (e.g., transmission/reception) on/using a second set of one or more links/radios/antennas/ channels/transceivers (e.g., which may be at least in part the same or different from the first set of one or more links/ radios/antennas/channels/transceivers) even though/when at least (1) the aforementioned process indicates that the adjusted/incremented/decremented value (e.g., a number, a time, a quantity, a count, or other suitable value) has reached a second threshold value/condition (e.g., which may be the same or different from the first threshold value/condition), (2) the timer(s)/counter(s)/clock(s) corresponding to the first set of one or more links/radios/antennas/channels/transceivers has reached a second threshold value/condition (e.g., which may be the same or different from the first threshold value/condition), (3) the communication medium corresponding to the first set of one or more links/radios/antennas/channels/transceivers is available/idle/not-busy, and/or (4) the apparatus (e.g., being/including STA(s)/AP(s), or its PR(s) and/or SR(s)) (i) performs carrier sensing (virtual and/or physical), energy detection, etc. and/or (ii) determines that the first set of one or more links/radios/antennas/ channels/transceivers is available/idle/not-busy.

In some aspects, e.g., when/after/upon/if such apparatus (e.g., being/including STA(s)/AP(s), or its PR(s) and/or SR(s)) making such determination (e.g., not to initiate/ perform the aforementioned communication on/using the second set of one or more links/radios/antennas/channels/ transceivers), such apparatus may determine to initiate/ perform communication on/using the second set of one or more links/radios/antennas/channels/transceivers transmit, e.g., after a period of waiting, or once one or more conditions/criteria has/have been satisfied. In some aspects, such one or more conditions/criteria has/have been satisfied when (e.g., such period of waiting may end when, upon, in accordance with) at least (1) another process indicating that the adjusted/incremented/decremented value (e.g., a number, a time, a quantity, a count, or other suitable value) associated with a different/another set of one or more links/radios/antennas/channels/transceivers (e.g., the first set, or another set, of one or more links/radios/antennas/ channels/transceivers) has reached a second threshold value/ condition (e.g., which may be the same or different from the first threshold value/condition) (e.g., even though/when at least (1) the process corresponding to the second set of one or more links/radios/antennas/channels/transceivers had previously/already indicated an adjusted/incremented/decremented value having a first threshold value/condition, (2) another timer(s)/counter(s)/clock(s) corresponding to a different/another set of one or more links/radios/antennas/ channels/transceivers (e.g., the first set, or another set, of one or more links/radios/antennas/channels/transceivers) had previously/already reached a first threshold value/condition, and/or (3) the first set of one or more links/radios/antennas/ channels/transceivers are/were (e.g., determined to be) available/idle/not-busy).

In some aspects, even though/when at least (1) the aforementioned process indicates that the adjusted/incremented/ decremented value (e.g., a number, a time, a quantity, a count, or other suitable value) has reached a first/second threshold value/condition (as described herein)), (2) the timer(s)/counter(s)/clock(s) corresponding to the first/second set of one or more links/radios/antennas/channels/transceivers has reached a first/second threshold value/condition (as described herein), (3) the communication medium corresponding to the first/second set of one or more links/ radios/antennas/channels/transceivers is/are available/idle/ not-busy, and/or (4) the apparatus (e.g., being/including STA(s)/AP(s), or its PR(s) and/or SR(s)) (i) performs carrier sensing (virtual and/or physical), energy detection, etc. and/or (ii) determines that the first set of one or more links/radios/antennas/channels/transceivers is available/idle/ not-busy, the apparatus (e.g., being/including STA(s)/AP(s), or its PR(s) and/or SR(s)) may, instead of initiating/performing communication (transmission/reception), determine to perform yet another process that involves or utilizes one or more timers, counters, clocks, or any other suitable input signals that can be utilized for such a process, wherein at least: (1) such timer(s)/counter(s)/clock(s)/etc. may select a particular/initial value based at least in part on a set of pre-determined set of one or more rules, and/or (2) such selection may be a random selection from one or more values (e.g., from a predetermined set of possible values) or a continuation or value corresponding to a value of a previously-utilized process/timer/counter/clock (as described in greater detail above).

In some aspects, the aforementioned first threshold value/ condition and/or second threshold value/condition merely refers to a value (e.g., a number, a time, a quantity, a count, or other suitable value) (e.g., without requiring additional conditions/criteria being met/satisfied). In some other aspects, the aforementioned first threshold value/condition and/or second threshold value/condition refers to more than just a value (e.g., a number, a time, a quantity, a count, or other suitable value) (e.g., may involve other condition(s)/ criteria being met/satisfied). In aspects where the first threshold value/condition and/or second threshold value/condition refer to more than just a value, non-limiting examples of possible conditions may include but are not limited to: (1) a particular (e.g., first and/or second) set of one or more links/radios/antennas/channels/transceivers is/are available/ ide/not-busy, e.g., when a particular value is reached, e.g., by a timer/counter/clock or some other process determination (as described in greater detail herein), (2) the communication that would be performed/initiated (should the apparatus determine to do so) (i) could be completed within the TXOP that would be available to the apparatus and/or (ii) is ready/buffered for such communication (e.g., transmission/ reception) at/around/before a time that a particular value is reached, e.g., by a timer/counter/clock or some other process determination (as described in greater detail herein), (3) a particular value is reached, e.g., by a timer/counter/clock or some other process determination (as described in greater detail herein), by a particular portion (e.g., beginning, end, boundary, inter-frame spacing) of, or corresponding to, a transmission/communication time/opportunity/slot, and/or (4) that such apparatus (e.g., being/including STA(s)/AP(s), or its PR(s) and/or SR(s)) is an initiator or holder of a/the TXOP.

As described herein, an apparatus (e.g., being/including AP(s)/STA(s), or its PR(s) and/or SR(s)) may perform concerted communication (as described in greater detail herein) using a plurality of links/radios/antennas/channels/ transceivers/communications. However, in some circumstances (as also referenced at least in part herein), interference (e.g., intra-apparatus/inter-component interference) between any two (or more) links/radios/antennas/channels/ transceivers of an apparatus (e.g., being/including AP(s)/ STA(s), or its PR(s) and/or SR(s)) may adversely impact the concurrent/simultaneous utilization of those two (or more) links/radios/antennas/channels/transceivers. Accordingly, in such circumstances, protocols/algorithms that enable efficient utilization of such links/radios/antennas/channels/ transceivers, even if not always concurrent/simultaneous, can improve system performance by increasing operational efficiency, reducing power consumption, reducing compute resources utilized, increasing communication throughput/ speed, increasing spectral efficiency, and/or benefiting the user experience.

In some aspects, a transmitting apparatus (e.g., being/ including AP(s)/STA(s), or its PR(s) and/or SR(s)) may determine whether a transmission (e.g., downlink/uplink) contains information intended/destined for a plurality (e.g., a multiplicity/group) of receiving apparatuses (e.g., being/ including STA(s)/AP(s), or its PR(s) and/or SR(s)). Such information may be intended/destined for a plurality (e.g., multiplicity/group) of such receiving apparatuses (e.g., being/including STA(s)/AP(s), or its PR(s) and/or SR(s)) when/if/because that transmission is addressed to, includes an individual/group identifier corresponding to, or otherwise indicated as being intended/destined for those receiving apparatuses (e.g., being/including STA(s)/AP(s), or its PR(s) and/or SR(s)).

When/If a transmission (e.g., downlink/uplink) that at least (1) contains information intended/destined for a plurality (e.g., multiplicity/group) of other receiving apparatuses (e.g., being/including STA(s)/AP(s), or its PR(s) and/ or SR(s)), (2) will be transmitted by a first set of one or more transmitting links/radios/antennas/channels/transceivers of plurality of transmitting links/radios/antennas/channels/ transceivers of such transmitting apparatus (e.g., being/ including AP(s)/STA(s), or its PR(s) and/or SR(s)), and/or (3) will be received by a first set of one or more links/radios/ antennas/channels/transceivers of at least a first receiving apparatus (e.g., being/including first STA(s)/AP(s), or its PR(s) and/or SR(s)), then the apparatus (e.g., being/including AP(s)/STA(s), or its PR(s) and/or SR(s)) may determine to not (e.g., may refrain from) transmit (e.g., initiating/ performing/scheduling transmission), using one or more other sets of one or more other links/radios/antennas/channels/transceivers (e.g., different from the first set of one or more links/radios/antennas/channels/transceivers) of that transmitting apparatus (e.g., being/including AP(s)/STA(s), or its PR(s) and/or SR(s)), information/signals/transmissions to (e.g., information/signals/transmissions intended/destined for) any other set of one or more links/radios/antennas/ channels/transceivers (different from the first set of one or more links/radios/antennas/channels/transceivers of the first receiving apparatus).

In some aspects, the other set of one or more links/radios/ antennas/channels/transceivers is/are either/both (A) included in a different device/apparatus (relative to the device/apparatus in which the first receiving apparatus is disposed) and/or (B) included in the same device/apparatus (relative to the device/apparatus in which the first receiving apparatus is disposed) but constitutes a different set of one or more components (e.g., a second set of one or more links/radios/antennas/channels/transceivers of that first receiving apparatus) of that device/apparatus.

In some aspects, such period of time may be, by way of non-limiting example(s): (1) for at least the duration of a one-way communication (e.g., including the time for transmission, propagation, reception, and processing of a downlink communication/transmission from AP(s) to STA(s) having such communication/transmission containing information intended/destined for a plurality (e.g., multiplicity/group) of other apparatuses), and/or (2) for at least the duration of a two-way communication (e.g., including (A) the time for transmission, propagation, reception, and processing of a downlink communication/transmission from AP(s) to STA(s) having such communication/transmission containing information intended/destined for a plurality (e.g., multiplicity/group) of other apparatuses, and (B) the time for (transmission, propagation, reception, and processing of an uplink communication/transmission sent in response to, or following, that downlink communication/ transmission from AP(s) to STA(s), or its PR(s) and/or SR(s)).

In some aspects, a first apparatus (being/including AP(s)/ STA(s)) may transmit, and/or a second apparatus (being/ including STA(s)/AP(s), or its PR(s) and/or SR(s)) may receive, at least a first (e.g., DL or UL) packet/data/signal (e.g., an ULTR, such as in DL communication(s) 356, 357, as described in greater detail herein) that may intend to elicit (e.g., at least in part cause, induce, trigger, or otherwise result in) one or more first response packet(s)/data/signal(s). In some aspects, such (e.g., DL or UL) packet/data/signal (e.g., an ULTR, such as in DL communication(s) 356, 357, as described in greater detail herein) may include at least a first field that comprises a first indication that indicates (e.g., at least one value, identifier, or other suitable indicia) that the second apparatus (e.g., being/including STA(s)/AP(s), or its PR(s) and/or SR(s)) can utilize to determine/ascertain/process/calculate/confirm at least one communication protocol, packet/data/signal format/type/version/configuration/arrangement associated with, or relating/corresponding to, the first response (e.g., UL or DL) packet(s)/data/signal(s) (e.g., that is being, or intended to be, elicited (e.g., at least in part caused, induced, triggered, or otherwise resulted) by the first (e.g., DL or UL) packet/data/signal (e.g., an ULTR, such as in DL communication(s) 356, 357, as described in greater detail herein)).

In some aspects, when/if such first field comprises a first indication (e.g., indicating at least a first value/identifier/indicia), such second apparatus (being/including AP(s)/STA(s), or its PR(s) and/or SR(s)) may determine/ascertain/process/calculate/confirm that at least a first response (e.g., UL or DL) packet(s)/data/signal(s) (e.g., that is being, or intended to be, elicited (e.g., at least in part caused, induced, triggered, or otherwise resulted) by the first (e.g., DL or UL) packet/data/signal (e.g., an ULTR, such as in DL communication(s) 356, 357, as described in greater detail herein)) is to comprise, be associated with, correspond to, or otherwise at least in part to be comporting/complying/compatible with a first communication protocol, packet/data/signal format/type/version/configuration/arrangement.

In some aspects, when/if such first field comprises a second indication (e.g., indicating at least a second value/identifier/indicia) (e.g., which may be at least in part different from the first indication, as described above), such second apparatus (being/including AP(s)/STA(s), or its PR(s) and/or SR(s)) may determine/ascertain/process/calculate/confirm that at least a first response (e.g., UL or DL) packet(s)/data/signal(s) (e.g., that is being, or intended to be, elicited (e.g., at least in part caused, induced, triggered, or otherwise resulted) by the first (e.g., DL or UL) packet/data/signal (e.g., an ULTR, such as in DL communication(s) 356, 357, as described in greater detail herein)) is to comprise, be associated with, correspond to, or otherwise at least in part to be comporting/complying/compatible with a second communication protocol, packet/data/signal format/type/version/configuration/arrangement (e.g., which may be at least in part different from the first communication protocol, packet/data/signal format/type/version/configuration/arrangement, as described above).

In some aspects, such first field may comprise a plurality of first fields that are each at least in part different from each other. Accordingly, in such aspects, a plurality of different (intended) recipients (e.g., the second apparatus (e.g., being/including STA(s)/AP(s), or itsPR(s) and/or SR(s)) and at least another (e.g., third) apparatus (e.g., being/including STA(s)/AP(s), or itsPR(s) and/or SR(s)) may (e.g., after, based on, in response to, or in accordance with processing such first field(s)) each transmit an aforementioned first response (e.g., UL or DL) packet(s)/data/signal(s), wherein each of those first responses comprises, is associated with, corresponds to, or otherwise at least in part is comporting/complying/compatible with different communication protocols, packet/data/signal formats/types/versions/configurations/arrangements. For example the aforementioned second apparatus may (e.g., after, based on, in response to, or in accordance with processing such first field(s)) determine to transmit a first response (e.g., UL or DL) packet/data/signal that comprises, is associated with, corresponds to, or otherwise at least in part is comporting/complying/compatible with a first communication protocol, packet/data/signal format/type/version/configuration/arrangement, and the aforementioned third apparatus may (e.g., after, based on, in response to, or in accordance with processing such first field(s)) determine to transmit a second response (e.g., UL or DL) packet/data/signal that comprises, is associated with, corresponds to, or otherwise at least in part is comporting/complying/compatible with a second communication protocol, packet/data/signal format/type/version/configuration/arrangement (e.g., that is different from the first communication protocol, packet/data/signal format/type/version/configuration/arrangement).

In some aspects, if/when/as an apparatus (e.g., including/being STA(s)/AP(s), or itsPR(s) and/or SR(s)) determines to transmit an aforementioned first response (e.g., UL or DL) packet(s)/data/signal(s) that comprises, is associated with, corresponds to, or otherwise at least in part is comporting/complying/compatible with a first communication protocol, packet/data/signal format/type/version/configuration/arrangement, such transmission (of such first response (e.g., UL or DL) packet(s)/data/signal(s)) may include a preamble/header field that has a value that is at least in part the same as a preamble/header field of the aforementioned (e.g., DL or UL) packet/data/signal (e.g., an ULTR, such as in DL communication(s) 356, 357, as described in greater detail herein, and/or that included at least the aforementioned first field). In comparison, in some aspects, if/when/as an apparatus (e.g., including/being STA(s)/AP(s), or its PR(s) and/or SR(s)) determines to transmit an aforementioned first response (e.g., UL or DL) packet(s)/data/signal(s) that comprises, is associated with, corresponds to, or otherwise at least in part is comporting/complying/compatible with a second (e.g., different from the first) communication protocol, packet/data/signal format/type/version/configuration/arrangement, such transmission (of such first response (e.g., UL or DL) packet(s)/data/signal(s)) may include a preamble/header field that has a value that is not at least in part the same as the aforementioned preamble/header field of the aforementioned (e.g., DL or UL) packet/data/signal (e.g., an ULTR, such as in DL communication(s) 356, 357, as described in greater detail herein, and/or that included at least the aforementioned first field). Such preamble/header field may be any preamble/header field/portion (or sub-field/sub-portion) known to one of ordinary skill in the art without deviating from the scope of the present disclosure.

In some aspects, such first field (as described above) may be included in a field/portion (of the aforementioned (e.g., DL or UL) packet/data/signal (e.g., an ULTR, such as in DL communication(s) 356, 357, as described in greater detail herein)) that is used/useable by, or common to, up to a plurality of (or even up to all of the) apparatuses (e.g., being/including STA(s)/AP(s), or its PR(s) and/or SR(s), and/or including the aforementioned second apparatus mentioned above) that receive (or are intended to receive) the first (e.g., DL or UL) packet/data/signal (e.g., an ULTR, such as in DL communication(s) 356, 357, as described in greater detail herein) (e.g., that may intend to elicit (e.g., at least in part cause, induce, trigger, or otherwise result in) one or more first response packet(s)/data/signal(s)).

In some aspects, such first field (as described above) may be included in each of one a plurality of fields/portions (of the aforementioned (e.g., DL or UL) packet/data/signal (e.g., an ULTR, such as in DL communication(s) 356, 357, as described in greater detail herein)) that is/are each used/useable by different sets of one or more (intended) users (e.g., which may include/be one or more STA(s)/AP(s), or its PR(s) and/or SR(s)); in such aspects, each of the plurality of field/portions include different values/identifier/indicia relative to each other.

In some aspects, such second apparatus (e.g., being/including STA(s)/AP(s), or its PR(s) and/or SR(s)) may utilize at least one or more of such first field(s) to determine not to process (e.g., refrain from processing and/or to consider/determine/process as padding) at least some of the remaining portion(s) of the aforementioned (e.g., DL or UL) packet/data/signal (e.g., which, as described herein, may be an aforementioned ULTR, such as in DL communication(s) 356, 357, and/or may include at least the first field that comprises the first indication that such second apparatus can utilize to determine/ascertain/process/calculate/confirm at least one communication protocol, packet/data/signal format/type/version/configuration/arrangement associated with, or relating/corresponding to, the first response (e.g., UL or DL) packet(s)/data/signal(s)); furthermore, in some aspects, such remaining portion(s) may (or may not) be potentially up to all of the subset/portion (of such packet/data/signal) having such first field(s)).

In some aspects, the aforementioned first field and/or aforementioned first indication (that indicates (e.g., at least one value, identifier, or other suitable indicia) that the second apparatus (e.g., being/including STA(s)/AP(s), or its PR(s) and/or SR(s)) can utilize to determine/ascertain/process/calculate/confirm at least one communication protocol, packet/data/signal format/type/version/configuration/arrangement associated with, or relating/corresponding to, the first response (e.g., UL or DL) packet(s)/data/signal(s) (e.g., that is being, or intended to be, elicited (e.g., at least in part caused, induced, triggered, or otherwise resulted) by the first (e.g., DL or UL) packet/data/signal (e.g., an ULTR, such as in DL communication(s) 356, 357, as described in greater detail herein)) may not be included in all circumstances.

In some aspects, a second field (e.g., at least in part different from the first field, and/or which may precede or follow the first field in the aforementioned first (e.g., DL or UL) packet/data/signal (e.g., an ULTR, such as in DL communication(s) 356, 357, as described in greater detail herein) (e.g., that may intend to elicit (e.g., at least in part cause, induce, trigger, or otherwise result in) one or more first response packet(s)/data/signal(s)) may comprise information/bits/values that may indicate (or be used/useable by such second apparatus to understand/determine) that/whether at least (1) such first packet/data/signal even includes such first indication, and/or (2) such first packet/data/signal is associated with, or relating/corresponding to, at least a first set of one or more communication protocols, packet/data/signal formats/types/versions/configurations/arrangements rather than a second set of one or more communication protocols, packet/data/signal formats/types/versions/configurations/arrangements.

In some aspects, such second field may include at least one value/bit/field/data/information indicating a communication protocol, packet/data/signal format/type/version/configuration/arrangement associated with, or relating/corresponding to, such first (e.g., DL or UL) packet/data/signal (as described herein). In some aspects, such second indication may include at least one value/bit/field/data/information that can be utilized/used/processed by such second apparatus (e.g., including/being STA(s)/AP(s), or its PR(s) and/or SR(s)) to understand/determine that/whether at least (1) such first packet/data/signal even includes such first indication, and/or (2) such first packet/data/signal is associated with, or relating/corresponding to, at least a first set of one or more communication protocols, packet/data/signal formats/types/versions/configurations/arrangements rather than a second set of one or more communication protocols, packet/data/signal formats/types/versions/configurations/arrangements.

In some aspects, such utilization/use/processing may include such second apparatus (e.g., including/being STA(s)/AP(s), or its PR(s) and/or SR(s)) determining at least one characteristic of at least a portion of such second field. In some aspects, such characteristic may include a modulation, a coding, a type, a duration, a number of bits/bytes/octets, a bandwidth, a carrier/resource size, a length, an identifier, a link characteristic (e.g., UL vs. DL), any other suitable characteristic, and/or any combination of any two or more of the foregoing characteristics. In such aspects, such second apparatus (e.g., being/including STA(s)/AP(s), or its PR(s) and/or SR(s)) may, at least in part using (e.g., based at least in part on, in association with, in accordance with, etc.) such at least one characteristic(s), reach the aforementioned understanding/determination regarding the aforementioned first packet (e.g., as mentioned above, that/whether at least (1) such first packet/data/signal even includes such first indication, and/or (2) such first packet/data/signal is associated with, or relating/corresponding to, at least a first set of one or more communication protocols, packet/data/signal formats/types/versions/configurations/arrangements rather than a second set of one or more communication protocols, packet/data/signal formats/types/versions/configurations/arrangements).

In some circumstances, an apparatus (being/including STA(s)/AP(s), or its PR(s) and/or SR(s)) may receive a packet/signal/communication comprising one or more bits/values. In certain situations, such apparatus (being/including STA(s)/AP(s), or its PR(s) and/or SR(s)) may not need to process/validate/etc. information associated with, following, or included in a same field/portion (of such packet/signal/communication) as that one or more bits/values. In such situations, processing such information may needlessly utilize compute resources, consume power, delay other processes that such apparatus would otherwise perform, and/or result in an overall reduction in the quality of the user experience.

Accordingly, such apparatus (being/including STA(s)/AP(s), or its PR(s) and/or SR(s)) may benefit from processes/protocols that enable less processing of such information and/or certain portions of such packet/signal/communication. Such less processing may vary depending on the particular scenario. In some scenarios, such less processing can include less processing of just a portion of such packet/signal/communication; in some scenarios, such less processing can include not processing up to all of such packet/signal/communication. Hence, such apparatus (e.g., being/including STA(s)/AP(s), or its PR(s) and/or SR(s)) may benefit (e.g., conserve power, reduce compute resources utilized, increase efficiency, etc.) from processes/protocols/algorithms that intelligently/efficiently enable such apparatus (e.g., being/including STA(s)/AP(s), or its PR(s) and/or SR(s)) to process less (e.g., less than all) of such packet/signal/communication without material detriments (e.g., losing/missing data/information intended/critical to it).

As mentioned, such apparatus (e.g., being/including STA(s)/AP(s), or its PR(s) and/or SR(s)) may receive one or more bits/values. In some aspects, such one or more bits/values is/are included in the aforementioned packet/signal/communication. In some aspects, such one or more bits/values may be useable to perform/enable/trigger/cause/result-in different functions/determinations/processes/decisions by such apparatus (e.g., being/including STA(s)/AP(s), or its PR(s) and/or SR(s)). For example, in some aspects, such one or more bits/values may enable/trigger/cause/result-in an apparatus (e.g., being/including STA(s)/AP(s), or its PR(s) and/or SR(s)) (1) initiating/performing a first set of one or more functions/determinations/processes/decisions at a first time (e.g., time T1) and/or (2) initiating/performing a second (e.g., different) set of one or more functions/determinations/processes/decisions at a second (e.g., different) time (e.g., time T2).

In some aspects, such one or more bits/values may be useable to perform/enable/trigger/cause/result-in different functions/determinations/processes/decisions by two or more apparatus (e.g., being/including STA(s)/AP(s), or its PR(s) and/or SR(s)). For example, in some aspects, the (e.g., same) one or more bits/values may (1) enable/trigger/cause/result-in a first apparatus (e.g., having a first configuration or set of features enabled) (e.g., being/including STA(s)/AP(s), or its PR(s) and/or SR(s)) initiating/performing a first set of one or more functions/determinations/processes/decisions and/or (2) enable/trigger/cause/result-in a second (e.g., different) apparatus (e.g., having a second configuration or set of features enabled) (e.g., being/including STA(s)/AP(s), or its PR(s) and/or SR(s)) initiating/performing a second (e.g., different) set of one or more functions/determinations/processes/decisions.

In some aspects, such one or more bits/values may be useable to perform/enable/trigger/cause/result-in different functions/determinations/processes/decisions by such apparatus (e.g., being/including STA(s)/AP(s), or its PR(s) and/or SR(s)). For example, in some aspects, such one or more bits/values may (1) enable/trigger/cause/result-in an apparatus (e.g., being/including STA(s)/AP(s), or its PR(s) and/or SR(s)) (1) initiating/performing a first set of one or more functions/determinations/processes/decisions at a first time (e.g., time T1) and (2) initiating/performing a second (e.g., different) set of one or more functions/determinations/processes/decisions at a second (e.g., different) time (e.g., time T2).

In such some aspects, such apparatus (e.g., being/including STA(s)/AP(s), or its PR(s) and/or SR(s)) may determine/select/decide (A) which/what set of one or more functions/determinations/processes/decisions to initiate/perform, and/or (B) the specific one or more functions/determinations/processes/decisions to initiate/perform, based on, in association with, in accordance with, in response to, and/or depending on one or more factors. Such one or more factors may include, but are not limited to, any one or more of the following: (1) the field/portion in which (e.g., where) such one or more bits/values is disposed/located/positioned in such packet/signal/communication received by such apparatus (e.g., being/including STA(s)/AP(s), or its PR(s) and/or SR(s)), (2) the configuration, enabled features, functions, capabilities, or other suitable characteristics of the apparatus (e.g., being/including STA(s)/AP(s), or its PR(s) and/or SR(s)) receiving such one or more bits/values, (3) the feature/function/operation associated with or corresponding to the field/portion of such packet/signal/communication having such one or more bits/values, (4) that/whether one or more identifiers associated with, or of, such packet/signal/communication are the same as, or correspond to, one or more identifiers associated with, or of, such apparatus (e.g., being/including STA(s)/AP(s), or its PR(s) and/or SR(s)), (5) the (e.g., specific) value(s) of such one or more bits and/or one or more other different/other bits, (6) a computed/calculated value derived or at least in part based on the aforementioned factor (5) (e.g., the (e.g., specific) value(s) of such one or more bits and/or one or more other different/other bits), and/or (7) various other equivalent/suitable/similar/related factors that may be apparent to one of ordinary skill in the art based on the present disclosure.

In some aspects, any one or more of the aforementioned set(s) (e.g., first set and/or second set) of one or more functions/determinations/processes/decisions may include, but is not limited to, any one or more of the following: (1) confirm/authenticate/validate that such apparatus is an intended/destined receiver of such packet/signal/communication, (2) continue to process/receive/demodulate/decode at least a portion/field (and potentially up to all) of the remaining portion(s)/field(s) of such packet/signal/communication (3) stop/discontinue/skip processing/receiving/demodulating/decoding at least a portion/field (and potentially up to all) of the remaining portion(s)/field(s) of such packet/signal/communication, (4) disregard/overlook/ignore/skip/dispense at least a portion/field (and potentially up to all) of the remaining portion(s)/field(s) of such packet/signal/communication, and/or (5) various other equivalent/suitable/similar/related functions/determinations/processes/decisions that may be apparent to one of ordinary skill in the art based on the present disclosure.

In some aspects, a first apparatus (e.g., being/including AP(s)/STA(s), or its PR(s) and/or SR(s)) may transmit/communicate and a second apparatus (e.g., being/including STA(s)/AP(s), or its PR(s) and/or SR(s)) may receive/communicate at least one ULTR (e.g., such as in DL communication(s) 356, 357, and as described in greater detail herein) that contains one or more bits configured to allocate one and/or up to a plurality of resources (e.g., resource units, etc., as described herein) for such second apparatus to utilize/use for at least one UL transmission. In some aspects, such one or more bits include at least a first subset of one or more bits and second subset of one or more bits. In some aspects, such second apparatus may determine how to utilize one or more of the subsets (e.g., the first subset and/or the second subset) of the plurality of bits in response to, based on, in accordance with, or in association with one or more conditions/factors.

In some aspects, such one or more conditions/factors may include one or more types/pieces of information, which may (or may not) be included or corresponding to a value in another field (e.g., of the ULTR, such as in DL communication(s) 356, 357, as described herein). Such information may be, or relate to, any one or more of the following: (1) a number of STSs allocated to such second apparatus being equal to, above and/or below a threshold value, (2) a modulation and/or coding scheme for/of such second apparatus being equal to, above and/or below a threshold value, (3) a resource (or resource unit) size/length/duration allocated to or to be utilized by such second apparatus being equal to, above and/or below a threshold value, (4) a channel/tone/bandwidth (e.g., its size, range, center-value, etc.) allocated to or to be utilized by such second apparatus being equal to, above and/or below a threshold value, (5) a relative location/position/juxtaposition/center-frequency of a channel/tone/bandwidth, (6) whether the UL transmission of such second apparatus is a single-user or multi-user communication, and/or (7) various other equivalent/suitable/similar/related conditions/factors.

In some aspects, when/if at least one or more of such conditions/factors is/are not satisfied/existed, such second apparatus (e.g., being/including STA(s)/AP(s), or its PR(s) and/or SR(s)) may initiate/perform any one or more of the following operations/processes/functions: (1) using (or at least determining that) only one subset of the aforementioned one or more bits (e.g., of the aforementioned ULTR, such as in DL communication(s) 356, 357) (e.g., the first subset of one or more bits but not the second subset of one or more bits, or the second subset of one or more bits but not the first subset of one or more bits) is to be utilized by such second apparatus for determining resource (e.g., resource unit) allocation (e.g., which resource or resource unit is allocated to such second apparatus), (2) using (or at least determining that) less than the entirety of the aforementioned plurality of bits (e.g., of the aforementioned ULTR, such as in DL communication(s) 356, 357) (e.g., disregarding/excluding/omitting/ignoring/discarding at least one subset of one or more bits of the aforementioned plurality of bits) at least for purposes of determining resource (e.g., resource unit) allocation (e.g., which resource or resource unit is allocated to such second apparatus), (3) determining that at least one and/or up to all of the resources (e.g., resource units) allocated to such second apparatus are included in/at, or at least associated with, a first particular/predetermined channel characteristic (e.g., frequency range, center frequency, bandwidth, channel or its relative position/location (e.g., a primary/secondary/lower/upper channel), range of resource (e.g., resource unit) size(s)), which may be different from a second particular/predetermined channel characteristic (as described) had such one or more conditions/factors been satisfied/existed.

In some of other aspects, when/if at least one or more of such conditions/factors is/are satisfied/existed, such second apparatus (e.g., being/including STA(s)/AP(s), or its PR(s) and/or SR(s)) may initiate/perform any one or more of the following operations/processes/functions: (1) using (or at least determining that) more than one subset (e.g., up to all) of the aforementioned one or more bits (e.g., of the aforementioned ULTR, such as in DL communication(s) 356, 357) (e.g., the first subset of one or more bits and the second subset of one or more bits) for determining resource (e.g., resource unit) allocation (e.g., which resource or resource unit is allocated to such second apparatus), (2) using (or at least determining that) up to the entirety of the aforementioned plurality of bits (e.g., of the aforementioned ULTR, such as in DL communication(s) 356, 357) (e.g., not disregarding/excluding/omitting/ignoring/discarding at least one subset of one or more bits of the aforementioned plurality of bits) at least for purposes of determining resource (e.g., resource unit) allocation (e.g., which resource or resource unit is allocated to such second apparatus), (3) determining that at least one and/or up to all of the resources (e.g., resource units) allocated to such second apparatus are included in/at, or at least associated with, the second particular/predetermined channel characteristic (e.g., frequency range, center frequency, bandwidth, channel or its relative position/location (e.g., a primary/secondary/lower/upper channel), range of resource (e.g., resource unit) size(s)), which may be different from the first particular/predetermined channel characteristic (as described) had such one or more conditions/factors not been satisfied/existed.

In some aspects, the first apparatus (e.g., being/including AP(s)/STA(s), or its PR(s) and/or SR(s)) may transmit/communicate and/or such second apparatus (e.g., being/including STA(s)/AP(s), or its PR(s) and/or SR(s)) may receive/communicate at least one bit/value/field/indication for the purpose of providing at least some information (e.g., updates/status information) related to one or more parameters/settings/configurations of at least one or more of the links/radios/transceivers/channels of such second apparatus (e.g., being/including STA(s)/AP(s), or its PR(s) and/or SR(s)) (e.g., for communication with/in a/its BSS). In some aspects, such one or more of the links/radios/transceivers/channels of such second apparatus (e.g., being/including STA(s)/AP(s), or its PR(s) and/or SR(s)) may be/include a link/radio/transceiver/channel that is currently disabled/off/low-powered or otherwise not being utilized by such second apparatus to receive the aforementioned at least one bit/value/field/indication.

In some aspects, the first apparatus (e.g., being/including AP(s)/STA(s), or its PR(s) and/or SR(s)) may broadcast/communicate/transmit the aforementioned at least one bit/value/field/indication with or without solicitation from another apparatus (e.g., the second apparatus, which may be/include STA(s)/AP(s), or its PR(s) and/or SR(s)). In some aspects, such first apparatus may broadcast/communicate/transmit such at least one bit/value/field/indication (e.g., incremented/decremented/adjusted, by a particular value, relative to a previously-broadcasted/communicated/transmitted bit/value/field/indication, which may also have been for the purpose of providing at least some information (e.g., updates/status information) related to the aforementioned one or more parameters/settings/configurations) when/if/after there occurs a change with respect to any one or more parameters/settings/configurations (e.g., related to or associated with respective one or more links/radios/transceivers/channels) used by the first apparatus and/or the second apparatus for communication with one another (e.g., for communication with/in a/its BSS).

In some aspects, such first apparatus may alternatively or additionally broadcast/communicate/transmit such at least one bit/value/field/indication (e.g., not incremented/decremented/adjusted, by a particular value, relative to a previously-broadcasted/communicated/transmitted bit/value/field/indication, which may also have been for the purpose of providing at least some information (e.g., updates/status information) related to the aforementioned one or more parameters/settings/configurations) even if there occurs no (e.g., material) change with respect to any one or more parameters/settings/configurations (e.g., related to or associated with respective one or more links/radios/transceivers/channels) used by the first apparatus and/or the second apparatus for communication with one another (e.g., for communication with/in a/its BSS).

In some aspects, such second apparatus (e.g., being/including STA(s)/AP(s), or its PR(s) and/or SR(s)) may perform one or more operations/functions/processes in relation to such at least one bit/value/field/indication to determine, at least in part, whether/that/if one or more criteria/condition has been met/satisfied. In some aspects, such one or more operations/functions/processes may include comparing such at least one bit/value/field/indication with at least another one bit/value/field/indication (e.g., stored and/or previously received) to determine whether there exists a difference. In some aspects, such one or more operations/functions/processes may include determining whether/that such at least one bit/value/field/indication indicates that such apparatus (being/including STA(s)/AP(s), or its PR(s) and/or SR(s)) is to refrain or otherwise not utilize one or more of its links/radios/transceivers/channels for communication (e.g., with the first apparatus, being/including AP(s)/STA(s), or its PR(s) and/or SR(s)) (e.g., for at least a period of time, which may be set/predetermined or possibly not yet determined). In some aspects, such one or more of the links/radios/transceivers/channels of such second apparatus (e.g., being/including STA(s)/AP(s), or its PR(s) and/or SR(s)) may be/include a link/radio/transceiver/channel that is currently disabled/off/low-powered or otherwise not being utilized by such second apparatus to receive the aforementioned at least one bit/value/field/indication.

In some aspects, when/if one or more criteria/condition has/have been met/satisfied, such second apparatus (e.g., including/being STA(s)/AP(s), or its PR(s) and/or SR(s)) may initiate/consider/determine transmission of a message (e.g., in some aspects, the DLTR described above) to the first apparatus (e.g., being/including AP(s)/STA(s), or its PR(s) and/or SR(s)) to solicit/probe/request information related to any one or more parameters/settings/configurations of at least one or more of the links/radios/transceivers/channels of such second apparatus (e.g., being/including STA(s)/AP(s), or its PR(s) and/or SR(s)) (e.g., for communication with/in a/its BSS). In some aspects, such one or more of the links/radios/transceivers/channels of such second apparatus (e.g., being/including STA(s)/AP(s), or its PR(s) and/or SR(s)) may be/include a link/radio/transceiver/channel that is currently disabled/off/low-powered or otherwise not being utilized by such second apparatus to receive the aforementioned at least one bit/value/field/indication. Conversely, when/if one or more criteria/condition has/have not been met/satisfied, such second apparatus (e.g., including/being STA(s)/AP(s), or its PR(s) and/or SR(s)) may not initiate/consider/determine transmission of a message (e.g., in some aspects, the DLTR described above) to the first apparatus (e.g., being/including AP(s)/STA(s), or its PR(s) and/or SR(s)) to solicit/probe/request information related to any one or more parameters/settings/configurations of at least one or more of the links/radios/transceivers/channels of such second apparatus (e.g., being/including STA(s)/AP(s), or its PR(s) and/or SR(s)) (e.g., for communication with/in a/its BSS). In some aspects, such one or more of the links/radios/transceivers/channels of such second apparatus (e.g., being/including STA(s)/AP(s), or its PR(s) and/or SR(s)) may be/include a link/radio/transceiver/channel that is currently disabled/off/low-powered or otherwise not being utilized by such second apparatus to receive the aforementioned at least one bit/value/field/indication.

In some aspects, when/if one or more criteria/condition has/have been met/satisfied, such second apparatus (e.g., including/being STA(s)/AP(s), or its PR(s) and/or SR(s)) may refrain or otherwise not utilize one or more of its links/radios/transceivers/channels for communication (e.g., with the first apparatus, being/including AP(s)/STA(s), or its PR(s) and/or SR(s)) (e.g., for at least a period of time, which may be set/predetermined or possibly not yet determined). In some aspects, such one or more of the links/radios/transceivers/channels of such second apparatus (e.g., being/including STA(s)/AP(s), or its PR(s) and/or SR(s)) may be/include a link/radio/transceiver/channel that is currently disabled/off/low-powered or otherwise not being utilized by such second apparatus to receive the aforementioned at least one bit/value/field/indication. Conversely, when/if one or more criteria/condition has/have not been met/satisfied, such second apparatus (e.g., including/being STA(s)/AP(s), or its PR(s) and/or SR(s)) may not refrain (e.g., may continue to utilize) one or more of its links/radios/transceivers/channels for communication (e.g., with the first apparatus, being/including AP(s)/STA(s), or its PR(s) and/or SR(s)) (e.g., for at least the aforementioned period of time). In some aspects, such one or more of the links/radios/transceivers/channels of such second apparatus (e.g., being/including STA(s)/AP(s), or its PR(s) and/or SR(s)) may be/include a link/radio/transceiver/channel that is currently disabled/off/low-powered or otherwise not being utilized by such second apparatus to receive the aforementioned at least one bit/value/field/indication.

Figure 5:
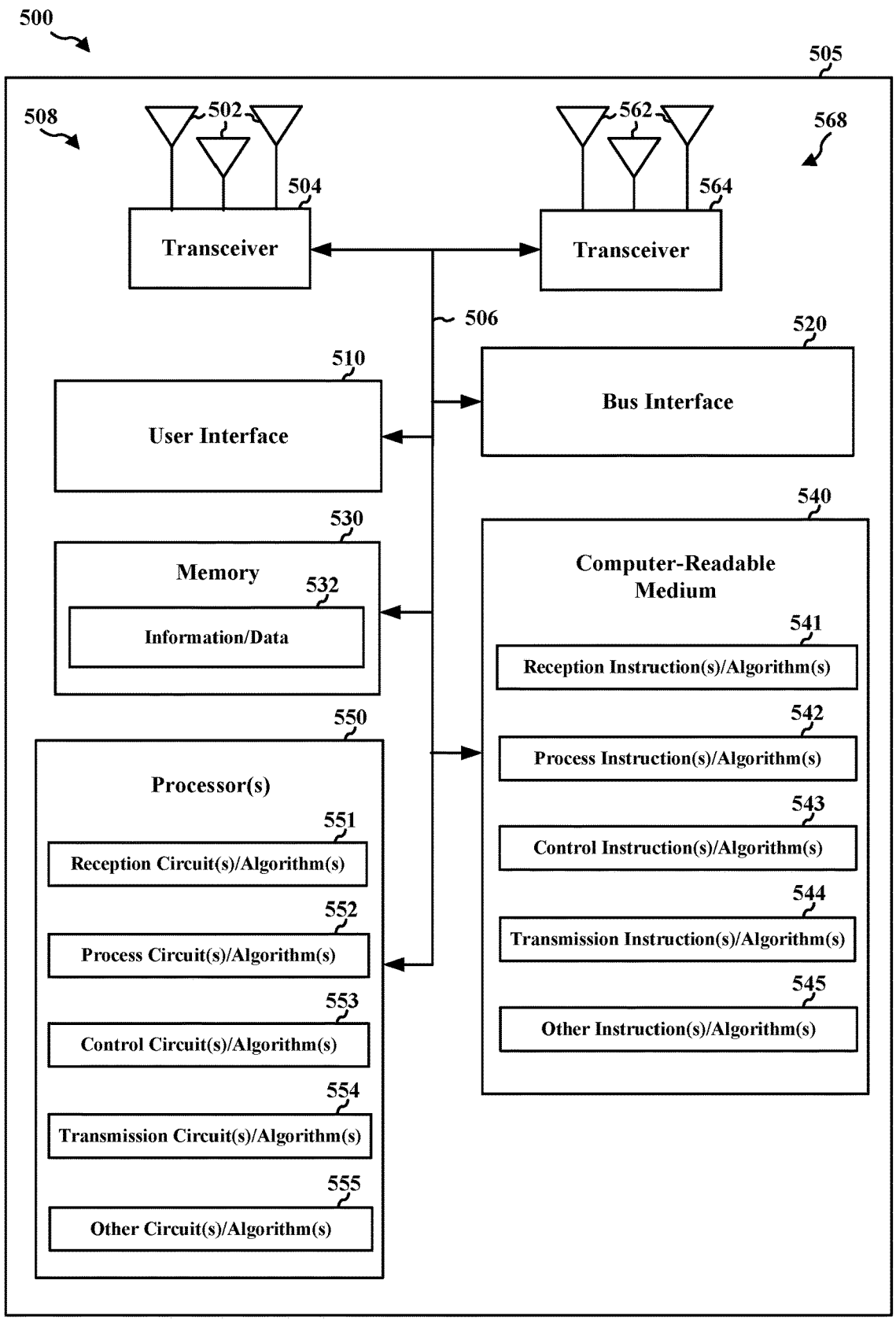
FIG. 5 is a diagram illustrating a non-limiting example of a processing system that may be related to an AP, according to some aspects of the present disclosure.

FIG. 5 is a diagram 500 illustrating a non-limiting example of a processing system 505 according to some aspects of the present disclosure. In some aspects, the processing system 505 is included in or is a component of AP 110. In some aspects, the processing system 505 is AP 110. The processing system 505 may have various circuits, algorithms, hardware components, software modules, and/or computer-readable medium storing computer-executable instructions comprising various algorithms, any of the foregoing of which, individually or in some combination, may provide the structure corresponding to the means for performing any one or more of the functions, features, steps, elements, methods, operations, and/or aspects described throughout the present disclosure.

The processing system 505 may include a bus 506. The bus 506 may include any number of interconnecting buses and/or bridges depending on the particular design of processing system 505. The bus 506 may provide a connection/link between various aspects of the processing system 505, which may include one or more of the following: processor(s) 550, computer-readable medium 540, memory 530, user interface 510, bus interface 520, first transceiver 504, second transceiver 564, first antenna 502, and/or second antenna(s) 562. The bus 506 may enable a link between/to various other aspects, such as timing sources, peripherals, voltage regulators, and/or power management circuits. The user interface 510 may exchange data via the bus interface 520. The bus interface 520 may provide an interface between the bus 506 and the transceivers 504, 564.

The transceivers 504, 564 may be respectively connected to one or more antennas 502, 562. The transceivers 504, 564 may provide a means for wirelessly communicating (e.g., receiving data and/or transmitting data) with various other apparatus over a wireless transmission medium. In some aspects, the transceivers 504, 564 may receive a signal from the one or more antennas 502, 562, extract information from the received signal, and provide the extracted information to the processor(s) 550. In some aspects, the transceivers 504, 564 may receive information from the processor(s) 550 and, based on the received information, generate a signal to be applied to the one or more antennas 502. The memory 530 may include various information/data 532 related to any one or more of the functions, features, steps, methods, processes, operations, and/or aspects described herein.

The processor(s) 550 may include one or more circuits configured to enable, may perform one or more algorithms related to, and/or may provide the structure (e.g., means for) corresponding to any one or more of the functions, features, steps, methods, processes, operations, and/or aspects described herein. In some aspects, the reception circuit(s)/algorithm(s) 551 may be configured to enable, may perform one or more algorithms related to, and/or may provide the structure (e.g., means for) corresponding to any one or more of the functions, features, steps, methods, processes, operations, and/or aspects described herein, e.g., with respect to AP 110, in relation to or involving any receiving of anything (described herein). In some aspects, the process circuit(s)/algorithm(s) 552 may be configured to enable, may perform one or more algorithms related to, and/or may provide the structure (e.g., means for) corresponding to any one or more of the functions, features, steps, methods, processes, operations, and/or aspects described herein, e.g., with respect to AP 110, in relation to or involving any processing, initiating, demodulating, modulating, encoding, and/or decoding of anything (described herein).

In some aspects, the control circuit(s)/algorithm(s) 553 may be configured to enable, may perform one or more algorithms related to, and/or may provide the structure (e.g., means for) corresponding to any one or more of the functions, features, steps, methods, processes, operations, and/or aspects described herein, e.g., with respect to AP 110, in relation to or involving any using, determining, considering, refraining from, selecting, utilizing, setting, affecting, transitioning, comparing, foregoing, and/or inferring of anything (described herein). In some aspects, the transmission circuit(s)/algorithm(s) 554 may be configured to enable, may perform one or more algorithms related to, and/or may provide the structure (e.g., means for) corresponding to any one or more of the functions, features, steps, methods, processes, operations, and/or aspects described herein, e.g., with respect to AP 110, in relation to or involving any transmitting, generation, and/or communicating of anything (described herein). In some aspects, the other circuit(s)/algorithm(s) 555 may be configured to enable, may perform one or more algorithms related to, and/or may provide the structure (e.g., means for) corresponding to any one or more of the functions, features, steps, methods, processes, operations, and/or aspects described herein, e.g., with respect to AP 110, in relation to or involving anything else.

The processor(s) 550 may be responsible for various processing operations, including the execution of software (e.g., instructions, code, algorithms, etc.) stored in/on the computer-readable medium 540. Each of the circuits 551, 552, 553, 554, 555 described herein may be or include one or more hardware components specifically configured to carry out the stated processes/algorithm, implemented by one or more processor(s) 550 configured to perform the stated processes/algorithm, stored within a computer-readable medium 540 for implementation by the one or more processor(s) 550, memory 530, or any combination thereof.

The computer-readable medium 540 may be used for storing data that is used, processed, and/or manipulated by the processor(s) 550. The computer-readable medium 540 may be a non-transitory computer-readable medium. The computer-readable medium 540 may include one or more instructions (e.g., computer-executable code) configured to enable, may perform one or more algorithms related to, and/or may provide the structure (e.g., means for) corresponding to any one or more of the functions, features, steps, methods, processes, operations, and/or aspects described herein. In some aspects, the reception instruction(s)/algorithm(s) 541 may include one or more instructions (e.g., computer-executable code) configured to enable, may perform one or more algorithms related to, and/or may provide the structure (e.g., means for) corresponding to any one or more of the functions, features, steps, methods, processes, operations, and/or aspects described herein, e.g., with respect to AP 110, in relation to or involving any receiving of anything (described herein). In some aspects, the process instruction(s)/algorithm(s) 542 may include one or more instructions (e.g., computer-executable code) configured to enable, may perform one or more algorithms related to, and/or may provide the structure (e.g., means for) corresponding to any one or more of the functions, features, steps, methods, processes, operations, and/or aspects described herein, e.g., with respect to AP 110, in relation to or involving any processing, initiating, demodulating, modulating, encoding, and/or decoding of anything (described herein).

In some aspects, the control instruction(s)/algorithm(s) 543 may include one or more instructions (e.g., computer-executable code) configured to enable, may perform one or more algorithms related to, and/or may provide the structure (e.g., means for) corresponding to any one or more of the functions, features, steps, methods, processes, operations, and/or aspects described herein, e.g., with respect to AP 110, in relation to or involving any using, determining, considering, refraining from, selecting, utilizing, setting, affecting, transitioning, comparing, foregoing, and/or inferring of anything (described herein). In some aspects, the transmission instruction(s)/algorithm(s) 544 may include one or more instructions (e.g., computer-executable code) configured to enable, may perform one or more algorithms related to, and/or may provide the structure (e.g., means for) corresponding to any one or more of the functions, features, steps, methods, processes, operations, and/or aspects described herein, e.g., with respect to AP 110, in relation to or involving any transmitting, generation, and/or communicating of anything (described herein). In some aspects, the other instruction(s)/algorithm(s) 545 may include one or more instructions (e.g., computer-executable code) configured to enable, may perform one or more algorithms related to, and/or may provide the structure (e.g., means for) corresponding to any one or more of the functions, features, steps, methods, processes, operations, and/or aspects described herein, e.g., with respect to AP 110, in relation to or involving anything else.

In some aspects, a first radio 508 (e.g., PR(s)) includes or refers to the first transceiver 504. In some aspects, a first radio 508 (e.g., PR(s)) includes or refers to the first transceiver 504 and the one or more antennas 502. In some aspects, a first radio 508 (e.g., PR(s)) includes or refers to the transceiver 504 and one or more of the other components described herein (e.g., one or more processor(s) 550, any computer readable medium 540, the bus 506, the bus interface 520, and/or memory 530), possibly also including the one or more antennas 502. A first radio 508 (e.g., PR(s)) may additionally or alternatively be designed and implemented using various components, at least one or all of which may not be illustrated in FIG. 5 nor explicitly described herein, without necessarily deviating from the scope of the present disclosure.

In some aspects, a second radio 568 (e.g., SR(s)) may include or refer to the second transceiver 564. In some aspects, a second radio 568 (e.g., SR(s)) may include or refer to the second transceiver 564 and the one or more antennas 562. In some aspects, a second radio 568 (e.g., SR(s)) may include or refer to the second transceiver 564 and one or more of the other components described herein (e.g., one or more processor(s) 550, any computer readable medium 540, the bus 506, the bus interface 520, and/or memory 530), possibly also including the one or more antennas 562. A second radio 568 (e.g., SR(s)) may additionally or alternatively be designed and implemented using various components, at least one or all of which may not be illustrated in FIG. 5 nor explicitly described herein, without necessarily deviating from the scope of the present disclosure. The processor(s) 550 may include one or more circuits configured to enable, may perform one or more algorithms related to, and/or may provide the structure (e.g., means for) corresponding to any one or more of the functions, features, steps, methods, processes, and/or operations described herein. In some aspects, the reception circuit/algorithm 551 may provide the structure (e.g., means for) corresponding to any one or more of the functions, features, steps, methods, processes, and/or operations described herein with relation to receiving anything (described herein) and/or any related, associated, corresponding, or suitable feature, function, operation, method, aspect or element. In some aspects, the processing circuit/algorithm 552 may provide the structure (e.g., means for) corresponding to any one or more of the functions, features, steps, methods, processes, and/or operations described herein with relation to processing anything (described herein), using anything (described herein), determining anything (described herein), considering anything (described herein), refraining from considering anything (described herein), selecting anything (described herein), and/or any feature, function, operation, method, aspect or element that is related to, associated with, or corresponding to any one or more of the foregoing. In some aspects, the control circuit/algorithm 553 may provide the structure (e.g., means for) corresponding to any one or more of the functions, features, steps, methods, processes, and/or operations described herein with relation to updating anything (described herein), refraining from updating anything (described herein), eliminating anything (described herein), overriding anything (described herein), maintaining anything (described herein), entering into any mode, and/or any feature, function, operation, method, aspect or element that is related to, associated with, or corresponding to any one or more of the foregoing. In some aspects, the transmission circuit/algorithm 554 may provide the structure (e.g., means for) corresponding to any one or more of the functions, features, steps, methods, processes, and/or operations described herein with relation to generating anything (described herein), transmitting anything (described herein), and/or any feature, function, operation, method, aspect or element that is related to, associated with, or corresponding to any one or more of the foregoing. In some aspects, the other circuit(s)/algorithm(s) 555 may provide the structure (e.g., means for) corresponding to any one or more of the other functions, features, steps, methods, processes, and/or operations described throughout the present disclosure. The processor(s) 550 may be responsible for general processing, including the execution of software (e.g., instructions, code, algorithms, etc.) stored in/on the computer-readable medium 540.

The computer-readable medium 540 may include one or more instructions (e.g., computer-executable code) configured to enable, may perform one or more algorithms related to, and/or may provide the structure (e.g., means for) corresponding to any one or more of the functions, features, steps, methods, processes, and/or operations described herein. In some aspects, the reception instructions/algorithm 541 may provide the structure (e.g., means for) corresponding to any one or more of the functions, features, steps, methods, processes, and/or operations described herein with relation to receiving anything (described herein) and/or any related, associated, corresponding, or suitable feature, function, operation, method, aspect or element. In some aspects, the process instructions/algorithm 542 may provide the structure (e.g., means for) corresponding to any one or more of the functions, features, steps, methods, processes, and/or operations described herein with relation to processing anything (described herein), using anything (described herein), determining anything (described herein), considering anything (described herein), refraining from considering anything (described herein), selecting anything (described herein), and/or any feature, function, operation, method, aspect or element that is related to, associated with, or corresponding to any one or more of the foregoing. In some aspects, the control instructions/algorithm 543 may provide the structure (e.g., means for) corresponding to any one or more of the functions, features, steps, methods, processes, and/or operations described herein with relation to updating anything (described herein), eliminating anything (described herein), overriding anything (described herein), maintaining anything (described herein), entering into any mode, and/or any feature, function, operation, method, aspect or element that is related to, associated with, or corresponding to any one or more of the foregoing. In some aspects, the transmission instructions/algorithm 544 may provide the structure (e.g., means for) corresponding to any one or more of the functions, features, steps, methods, processes, and/or operations described herein with relation to generating anything (described herein), transmitting anything (described herein), and/or any feature, function, operation, method, aspect or element that is related to, associated with, or corresponding to any one or more of the foregoing. In some aspects, the other circuit(s)/algorithm(s) 545 may provide the structure (e.g., means for) corresponding to any one or more of the other functions, features, steps, methods, processes, and/or operations described throughout the present disclosure. Additional details related to the aspects described in FIG. 5 are provided throughout the present disclosure.

Several aspects are presented herein with reference to various apparatus, methods, and computer-readable medium. These apparatus, methods, and computer-readable medium are described in the detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware and/or software may depend upon the particular application and/or design constraints imposed on the overall communication system. By way of example, an element, or any portion of an element, or any combination of elements may be implemented with a processing system, e.g., as described herein, that includes one or more processors.

Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software refers broadly to instructions, instruction sets, code, code segments, program code, programs, subprograms, software modules, applications, software applications, software packages, routines, subroutines, objects, executables, threads of execution, procedures, functions, and other similar things, whether referred to as software, firmware, middleware, microcode, hardware description language, or otherwise.

Various functions, features, steps, elements, methods, operations, and/or aspects described may be implemented in hardware, software, firmware, or any combination thereof. If implemented in software, the functions, features, steps, elements, methods, operations, and/or aspects may be stored on or encoded as one or more instructions or code on a computer-readable medium. Computer-readable media may include computer storage media. Computer storage media may be any available media that can be accessed by a computer. Such computer-readable media may comprise a random-access memory (RANI), a read-only memory (ROM), an electrically erasable programmable ROM (EEPROM), an optical disk storage, a magnetic disk storage, other storage devices, or any other medium that can be used to carry or store desired program code in the form of instructions or data structures and that can be accessed by at least one processor, computing component, computing device, and/or various other suitable apparatus. Combinations of the foregoing may also be included within the scope of computer-readable media. Combinations of the foregoing may also be included within the scope of memory.

Figure 6:
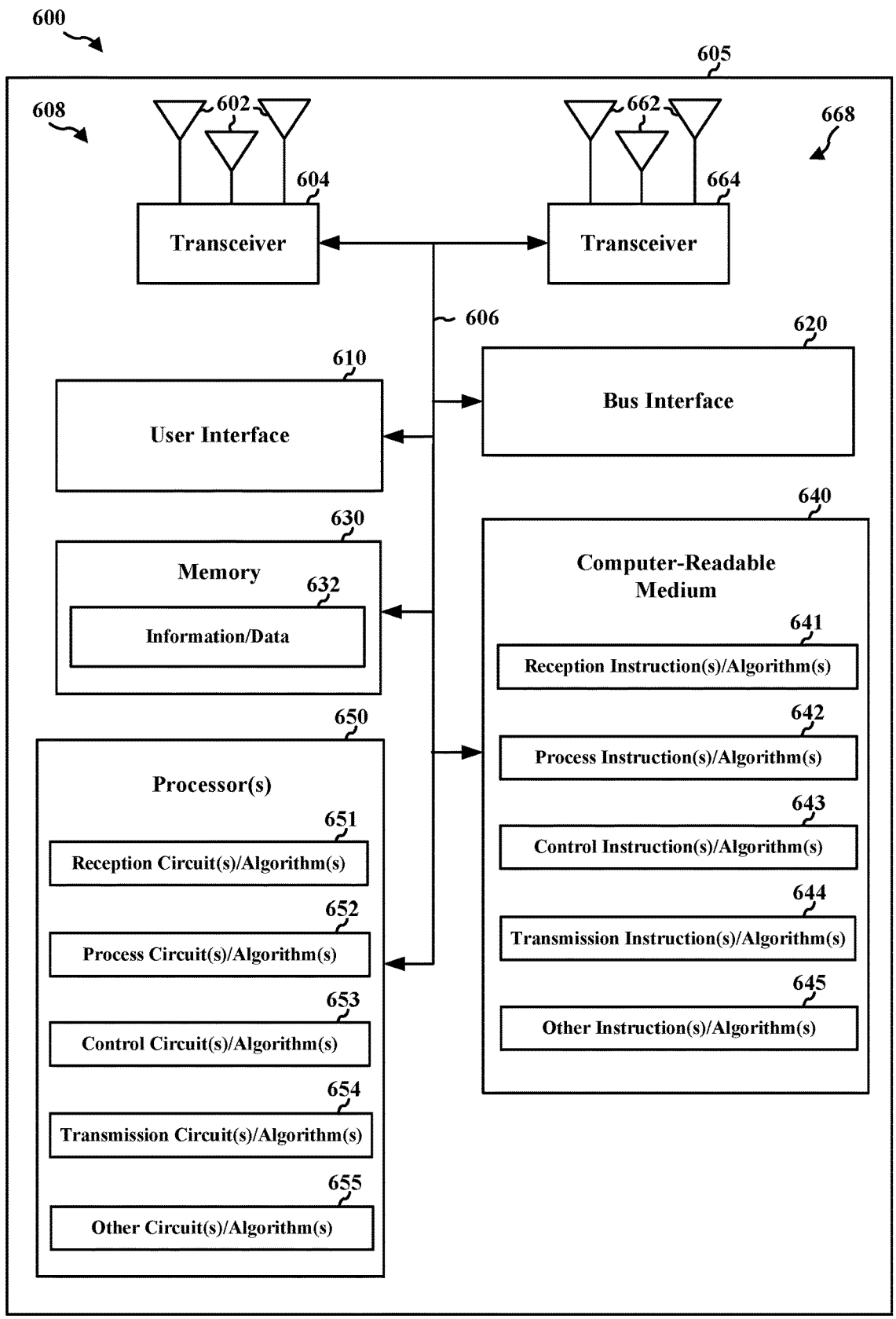
FIG. 6 is a diagram illustrating a non-limiting example of a processing system that may be related to a STA, according to some aspects of the present disclosure.

FIG. 6 is a diagram 600 illustrating a non-limiting example of a processing system 605 according to some aspects of the present disclosure. In some aspects, the processing system 605 is included in or is a component of STA(s) 120, 150. In some aspects, the processing system 605 is STA(s) 120, 150. The processing system 605 may have various circuits, algorithms, hardware components, software modules, and/or computer-readable medium storing computer-executable instructions comprising various algorithms, any of the foregoing of which, individually or in some combination, may provide the structure corresponding to the means for performing any one or more of the functions, features, steps, elements, methods, operations, and/or aspects described throughout the present disclosure.

The processing system 605 may include a bus 606. The bus 606 may include any number of interconnecting buses and/or bridges depending on the particular design of the processing system 605. The bus 606 may provide a connection/link between various aspects of the processing system 605, which may include one or more of the following: processor(s) 650, computer-readable medium 640, memory 630, user interface 610, bus interface 620, first transceiver 604, second transceiver 664, antenna(s) 662, and/or antenna(s) 602. The bus 606 may enable a link between/to various other aspects, such as timing sources, peripherals, voltage regulators, and/or power management circuits. The user interface 610 may exchange data via the bus interface 620. The bus interface 620 may provide an interface between the bus 606 and the transceivers 604, 664.

The transceivers 604, 664 may be respectively connected to one or more antennas 602, 662. The transceivers 604, 664 may provide means for wirelessly communicating (e.g., receiving data and/or transmitting data) with various other apparatus over a wireless transmission medium. In some aspects, the transceivers 604, 664 may receive a signal from the one or more antennas 602, 662, extract information from the received signal, and provide the extracted information to the processor(s) 650. In some aspects, the transceivers 604, 664 may receive information from the processor(s) 650 and, based on the received information, generate a signal to be applied to the one or more antennas 602, 662. The memory 630 may include various information/data 632 related to any one or more of the functions, features, steps, methods, processes, operations, and/or aspects described herein.

The processor(s) 650 may include one or more circuits configured to enable, may perform one or more algorithms related to, and/or may provide the structure (e.g., means for) corresponding to any one or more of the functions, features, steps, methods, processes, operations, and/or aspects described herein. In some aspects, the reception circuit(s)/algorithm(s) 651 may be configured to enable, may perform one or more algorithms related to, and/or may provide the structure (e.g., means for) corresponding to any one or more of the functions, features, steps, methods, processes, operations, and/or aspects described herein, e.g., with respect to STA(s) 120, 150, in relation to or involving any receiving of anything (described herein). In some aspects, the process circuit(s)/algorithm(s) 652 may be configured to enable, may perform one or more algorithms related to, and/or may provide the structure (e.g., means for) corresponding to any one or more of the functions, features, steps, methods, processes, operations, and/or aspects described herein, e.g., with respect to STA(s) 120, 150, in relation to or involving any processing, initiating, demodulating, modulating, encoding, and/or decoding of anything (described herein).

In some aspects, the control circuit(s)/algorithm(s) 653 may be configured to enable, may perform one or more algorithms related to, and/or may provide the structure (e.g., means for) corresponding to any one or more of the functions, features, steps, methods, processes, operations, and/or aspects described herein, e.g., with respect to STA(s) 120, 150, in relation to or involving any using, determining, considering, refraining from, selecting, utilizing, setting, affecting, transitioning, comparing, foregoing, and/or inferring of anything (described herein). In some aspects, the transmission circuit(s)/algorithm(s) 654 may be configured to enable, may perform one or more algorithms related to, and/or may provide the structure (e.g., means for) corresponding to any one or more of the functions, features, steps, methods, processes, operations, and/or aspects described herein, e.g., with respect to STA(s) 120, 150, in relation to or involving any transmitting, generation, and/or communicating of anything (described herein). In some aspects, the other circuit(s)/algorithm(s) 655 may be configured to enable, may perform one or more algorithms related to, and/or may provide the structure (e.g., means for) corresponding to any one or more of the functions, features, steps, methods, processes, operations, and/or aspects described herein, e.g., with respect to STA(s) 120, 150, in relation to or involving anything (described herein) else.

The processor(s) 650 may be responsible for various processing operations, including the execution of software (e.g., instructions, code, algorithms, etc.) stored in/on the computer-readable medium 640. Each of the circuits 651, 652, 653, 654, 655 described herein may be or include one or more hardware components specifically configured to carry out the stated processes/algorithm, implemented by one or more processor(s) 650 configured to perform the stated processes/algorithm, stored within a computer-readable medium 640 for implementation by the one or more processor(s) 650, memory 630, or any combination thereof.

The computer-readable medium 640 may be used for storing data that is used, processed, and/or manipulated by the processor(s) 650. The computer-readable medium 640 may be a non-transitory computer-readable medium. The computer-readable medium 640 may include one or more instructions (e.g., computer-executable code) configured to enable, may perform one or more algorithms related to, and/or may provide the structure (e.g., means for) corresponding to any one or more of the functions, features, steps, methods, processes, operations, and/or aspects described herein. In some aspects, the reception instruction(s)/algorithm(s) 641 may include one or more instructions (e.g., computer-executable code) configured to enable, may perform one or more algorithms related to, and/or may provide the structure (e.g., means for) corresponding to any one or more of the functions, features, steps, methods, processes, operations, and/or aspects described herein, e.g., with respect to STA(s) 120, 150, in relation to or involving any receiving of anything (described herein). In some aspects, the process instruction(s)/algorithm(s) 642 may include one or more instructions (e.g., computer-executable code) configured to enable, may perform one or more algorithms related to, and/or may provide the structure (e.g., means for) corresponding to any one or more of the functions, features, steps, methods, processes, operations, and/or aspects described herein, e.g., with respect to STA(s) 120, 150, in relation to or involving any processing, initiating, demodulating, modulating, encoding, and/or decoding of anything (described herein).

In some aspects, the control instruction(s)/algorithm(s) 643 may include one or more instructions (e.g., computer-executable code) configured to enable, may perform one or more algorithms related to, and/or may provide the structure (e.g., means for) corresponding to any one or more of the functions, features, steps, methods, processes, operations, and/or aspects described herein, e.g., with respect to STA(s) 120, 150, in relation to or involving any using, determining, considering, refraining from, selecting, utilizing, setting, affecting, transitioning, comparing, foregoing, and/or inferring of anything (described herein). In some aspects, the transmission instruction(s)/algorithm(s) 644 may include one or more instructions (e.g., computer-executable code) configured to enable, may perform one or more algorithms related to, and/or may provide the structure (e.g., means for) corresponding to any one or more of the functions, features, steps, methods, processes, operations, and/or aspects described herein, e.g., with respect to STA(s) 120, 150, in relation to or involving any transmitting, generation, and/or communicating of anything (described herein). In some aspects, the other instruction(s)/algorithm(s) 645 may include one or more instructions (e.g., computer-executable code) configured to enable, may perform one or more algorithms related to, and/or may provide the structure (e.g., means for) corresponding to any one or more of the functions, features, steps, methods, processes, operations, and/or aspects described herein, e.g., with respect to STA(s) 120, 150, in relation to or involving anything else. Additional details related to the aspects described in FIG. 6 are provided throughout the present disclosure.

In some aspects, a first radio 608 (e.g., PR(s) 222, 232) includes or refers to the first transceiver 604. In some aspects, a first radio 608 (e.g., PR(s) 222, 232) includes or refers to the first transceiver 604 and the one or more antennas 602. In some aspects, a first radio 608 (e.g., PR(s) 222, 232) includes or refers to the transceiver 604 and one or more of the other components described herein (e.g., one or more processor(s) 650, any computer readable medium 640, the bus 606, the bus interface 620, and/or memory 630), possibly also including the one or more antennas 602. A first radio 608 (e.g., PR(s) 222, 232) may additionally or alternatively be designed and implemented using various components, at least one or all of which may not be illustrated in FIG. 6 nor explicitly described herein, without necessarily deviating from the scope of the present disclosure.

In some aspects, a second radio 668 (e.g., SR(s) 224, 234) may include or refer to the second transceiver 664. In some aspects, a second radio 668 (e.g., SR(s) 224, 234) may include or refer to the second transceiver 664 and the one or more antennas 662. In some aspects, a second radio 668 (e.g., SR(s) 224, 234) may include or refer to the second transceiver 664 and one or more of the other components described herein (e.g., one or more processor(s) 650, any computer readable medium 640, the bus 606, the bus interface 620, and/or memory 630), possibly also including the one or more antennas 662. A second radio 668 (e.g., SR(s) 224, 234) may additionally or alternatively be designed and implemented using various components, at least one or all of which may not be illustrated in FIG. 6 nor explicitly described herein, without necessarily deviating from the scope of the present disclosure.

Several aspects are presented herein with reference to various apparatus, methods, and computer-readable medium. These apparatus, methods, and computer-readable medium are described in the detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware and/or software may depend upon the particular application and/or design constraints imposed on the overall communication system. By way of example, an element, or any portion of an element, or any combination of elements may be implemented with a processing system, e.g., as described herein, that includes one or more processors.

Examples of processors include microprocessors, microcontrollers, DSPs, FPGAs, PLDs, state machines, gated logic, discrete hardware circuits, and other suitable hardware configured to perform the various functionality described throughout this disclosure. One or more processors in the processing system may execute software. Software refers broadly to instructions, instruction sets, code, code segments, program code, programs, subprograms, software modules, applications, software applications, software packages, routines, subroutines, objects, executables, threads of execution, procedures, functions, and other similar things, whether referred to as software, firmware, middleware, microcode, hardware description language, or otherwise.

Various functions, features, steps, elements, methods, operations, and/or aspects described may be implemented in hardware, software, firmware, or any combination thereof. If implemented in software, the functions, features, steps, elements, methods, operations, and/or aspects may be stored on or encoded as one or more instructions or code on a computer-readable medium. Computer-readable media may include computer storage media. Computer storage media may be any available media that can be accessed by a computer. Such computer-readable media may comprise a random-access memory (RANI), a read-only memory (ROM), an electrically erasable programmable ROM (EEPROM), an optical disk storage, a magnetic disk storage, other storage devices, or any other medium that can be used to carry or store desired program code in the form of instructions or data structures and that can be accessed by at least one processor, computing component, computing device, and/or various other suitable apparatus. Combinations of the foregoing may also be included within the scope of computer-readable media. Combinations of the foregoing may also be included within the scope of memory.

In some aspects, the processing system 605 may include various circuits, algorithms, hardware components, software modules, and/or computer-readable medium storing computer-executable instructions comprising various algorithms, any of the foregoing of which, individually or in some combination, may provide the structure corresponding to the means for performing any one or more of the functions, features, steps, elements, methods, and/or operations described throughout the present disclosure.

The processor(s) 650 may include one or more circuits configured to enable, may perform one or more algorithms related to, and/or may provide the structure (e.g., means for) corresponding to any one or more of the functions, features, steps, methods, processes, and/or operations described herein. In some aspects, the reception circuit/algorithm 651 may provide the structure (e.g., means for) corresponding to any one or more of the functions, features, steps, methods, processes, and/or operations described herein with relation to receiving anything (described herein) and/or any related, associated, corresponding, or suitable feature, function, operation, method, aspect or element. In some aspects, the processing circuit/algorithm 652 may provide the structure (e.g., means for) corresponding to any one or more of the functions, features, steps, methods, processes, and/or operations described herein with relation to processing anything (described herein), using anything (described herein), determining anything (described herein), considering anything (described herein), refraining from considering anything (described herein), selecting anything (described herein), and/or any feature, function, operation, method, aspect or element that is related to, associated with, or corresponding to any one or more of the foregoing. In some aspects, the control circuit/algorithm 653 may provide the structure (e.g., means for) corresponding to any one or more of the functions, features, steps, methods, processes, and/or operations described herein with relation to updating anything (described herein), refraining from updating anything (described herein), eliminating anything (described herein), overriding anything (described herein), maintaining anything (described herein), entering into any mode, and/or any feature, function, operation, method, aspect or element that is related to, associated with, or corresponding to any one or more of the foregoing. In some aspects, the transmission circuit/algorithm 654 may provide the structure (e.g., means for) corresponding to any one or more of the functions, features, steps, methods, processes, and/or operations described herein with relation to generating anything (described herein), transmitting anything (described herein), and/or any feature, function, operation, method, aspect or element that is related to, associated with, or corresponding to any one or more of the foregoing. In some aspects, the other circuit(s)/algorithm(s) 655 may provide the structure (e.g., means for) corresponding to any one or more of the other functions, features, steps, methods, processes, and/or operations described throughout the present disclosure. The processor(s) 650 may be responsible for general processing, including the execution of software (e.g., instructions, code, algorithms, etc.) stored in/on the computer-readable medium 640.

The computer-readable medium 640 may be used for storing data that is manipulated by the processor(s) 650. The computer-readable medium 640 may be a non-transitory computer-readable medium. The computer-readable medium 640 may include one or more instructions (e.g., computer-executable code) configured to enable, may perform one or more algorithms related to, and/or may provide the structure (e.g., means for) corresponding to any one or more of the functions, features, steps, methods, processes, and/or operations described herein. In some aspects, the reception instructions/algorithm 641 may provide the structure (e.g., means for) corresponding to any one or more of the functions, features, steps, methods, processes, and/or operations described herein with relation to receiving anything (described herein) and/or any related, associated, corresponding, or suitable feature, function, operation, method, aspect or element. In some aspects, the process instructions/algorithm 642 may provide the structure (e.g., means for) corresponding to any one or more of the functions, features, steps, methods, processes, and/or operations described herein with relation to processing anything (described herein), using anything (described herein), determining anything (described herein), considering anything (described herein), refraining from considering anything (described herein), selecting anything (described herein), and/or any feature, function, operation, method, aspect or element that is related to, associated with, or corresponding to any one or more of the foregoing. In some aspects, the control instructions/algorithm 643 may provide the structure (e.g., means for) corresponding to any one or more of the functions, features, steps, methods, processes, and/or operations described herein with relation to updating anything (described herein), eliminating anything (described herein), overriding anything (described herein), maintaining anything (described herein), entering into any mode, and/or any feature, function, operation, method, aspect or element that is related to, associated with, or corresponding to any one or more of the foregoing. In some aspects, the transmission instructions/algorithm 644 may provide the structure (e.g., means for) corresponding to any one or more of the functions, features, steps, methods, processes, and/or operations described herein with relation to generating anything (described herein), transmitting anything (described herein), and/or any feature, function, operation, method, aspect or element that is related to, associated with, or corresponding to any one or more of the foregoing. In some aspects, the other circuit(s)/algorithm(s) 645 may provide the structure (e.g., means for) corresponding to any one or more of the other functions, features, steps, methods, processes, and/or operations described throughout the present disclosure. Additional details related to the aspects described in FIG. 6 are provided throughout the present disclosure.

Several aspects of communication systems are presented herein with reference to various apparatuses, methods, and computer-readable medium, which are described herein and possibly illustrated in the accompanying drawings by various blocks, modules, components, circuits, steps, processes, algorithms, etc. (collectively, "elements"). Such elements may be implemented using electronic hardware, computer software, and/or any combination thereof. Whether such elements are implemented as hardware and/or software may depend upon the particular application and/or design constraints imposed on the overall communication system.

The terms and phrases utilized in the present disclosure may have various meanings, definitions, descriptions, characterizations, classifications, and/or other attributes that are understood by one of ordinary skill in the art and which are within the scope of the present disclosure. It would be impractical to explicitly elaborate upon every single term and/or phrase in the present disclosure, and one of ordinary skill in the art will understand the meanings, definitions, descriptions, characterizations, classifications, and/or other attributes of the terms and/or phrases in the present disclosure, even if not explicitly elaborated upon. Nevertheless, for purposes of illustration but not limitation, various non-limiting examples of some meanings, definitions, descriptions, characterizations, classifications, and/or other attributes are provided herein with reference to some of those terms and/or phrases in the present disclosure. None of these examples are intended to limit the scope of such terms and/or phrases; accordingly, such terms and/or phrases may have additional or alternative meanings, definitions, descriptions, characterizations, classifications, and/or other attributes without necessarily deviating from the scope of the present disclosure.

The term(s) 'receive' and/or 'receiving' (and similar terms) may include acquiring, obtaining, collecting, analyzing, reading, processing, decoding, demodulating, deciphering, and/or various other suitable operations, features, and/or functions. The term(s) 'transmit' and/or 'transmitting' (and similar terms) may include generating, modulating, addressing, designating, encoding, processing, sending, broadcasting, conveying, relaying, transferring, transporting, channeling, forwarding, propagating, routing, and/or various other suitable operations, features, and/or functions. The terms(s)

'refrain' and/or 'refraining' (and similar terms) may include abstaining, avoiding, resisting, forgoing, desisting, renouncing, restraining, forbearing, bypassing, withholding, omitting, not performing, and/or various other suitable operations, features, and/or functions. The term(s) 'consider' and/or 'considering' (and similar terms) may include reading, processing, analyzing, inspecting, acknowledging, looking at, reviewing, comparing, processing, checking, viewing, assessing, and/or various other suitable operations, features, and/or functions. The term(s) 'determine' and/or 'determining' (and similar terms) may include processing, calculating, electing, selecting, looking up, reading, computing, using, concluding, deciding, resolving, settling, deducing, inferring, deriving, obtaining, and/or various other suitable operations, features, and/or functions. The term(s) 'use' and/or 'using' (and similar terms) may include utilizing, employing, exploiting, applying, basing upon, leveraging, working with, using to look up, using to determine, using to/for reference, processing, analyzing, looking at, and/or various other suitable operations, features, and/or functions.

The term(s) 'eliminate' and/or 'eliminating' (and similar terms) may include excluding, not considering, refraining from considering, disqualifying, ignoring, and/or various other suitable operations, features, and/or functions. The term(s) 'select' and/or 'selecting' (and similar terms) may include choosing, electing, appointing, allocating, designating, determining, deciding on, picking, using, utilizing, performing an operation (e.g., transmission/reception) using, and/or various other suitable operations, features, and/or functions. The term(s) 'random' and/or 'randomly' (and similar terms) may include arbitrarily, indiscriminately, incidentally, by chance, without allocation/assignment, without designation, haphazardly, and/or various other suitable operations, features, and/or functions. The term(s) 'override' and/or 'overriding' (and similar terms) may include replacing, annulling, overwriting, superseding, canceling, replacing, and/or various other suitable operations, features, and/or functions. The term(s) 'maintain' and/or 'maintaining' (and similar terms) may include using, considering, managing, utilizing, employing, supporting, enabling, accommodating, processing, sustaining, and/or various other suitable operations, features, and/or functions. The term(s) 'trigger' and/or 'cause' may include elicit, activate, start, initiate, bring about, generate, produce, trigger, cause, prompt, provoke, lead to, result in, precipitate, evoke, incite, kickoff, motivate, make, and/or various other suitable operations, features, and/or functions. The term 'in response to' may refer to an indirect or direct causal relationship, an association, a correspondence, a temporal relationship or association, and/or various other suitable attributes. For example, X may be in response to Y if/when X is indirectly or directly caused by Y, if/when the occurrence/existence of X is associated with the occurrence/existence of Y, if/when the occurrence/existence of X corresponds to the occurrence/existence of Y, if/when the occurrence/existence of X is within a particular period of time relative to the occurrence/existence of Y, if/when X has various other suitable attributes in relation to Y.

In some aspects, a 'NAV' refers to a virtual carrier sensing mechanism that may be utilized in various wireless communication protocols. By using virtual carrier sensing, the need for (physical/actual) carrier sensing (e.g., energy detection or sensing on a channel or subchannel) may be minimized, reduced, and/or limited, which can contribute to power conservation. In some aspects, a NAV may be an indicator maintained by each STA, and the indicator may indicate time periods when transmission onto a wireless communication medium is not, will not be, or should not be initiated by the STA, even if the STA's clear channel assessment senses that the channel is may not be busy (e.g., is idle/available). In some aspects, a NAV may be configured to regulate whether the STA accesses a wireless communication medium, channel, and/or subchannel during a period of time. In some aspects, a NAV may be thought of as a counter that counts backwards, wherein the wireless communication medium, channel, and/or subchannel is busy anytime that the counter has a positive value, and wherein the wireless communication medium, channel, and/or subchannel is available (e.g., idle) anytime that the counter does not have a positive value (e.g., has a value of zero). An apparatus (e.g., STA) may receive, read, determine, obtain, recall, utilize, ascertain, and/or otherwise interface with such information. In some aspects, such information may be received in a frame, packet, and/or data unit, as described in greater detail herein. Based on such information, the apparatus (e.g., STA) may determine whether a wireless communication medium, channel, and/or subchannel is available or busy during a particular period/duration of time. The phrase 'updating a NAV,' 'setting a parameter/setting of a NAV,' 'setting a NAV,' and/or various other similar/related phrases may refer to various functions, features, and/or operations related to such information. For example, such phrases may generally refer to updating and/or setting the information related to the duration/period during which a wireless communication medium, channel, and/or subchannel is busy or available. Various additional and alternative aspects related to at least one NAV are readily understood by one of ordinary skill in the art and are within the scope of the present disclosure.

The term(s) 'detection' and/or 'detecting' may refer to the determination, conclusion, deduction, inference, and/or other suitable operation/function that the characteristics associated with a particular signal satisfy at least one criterion, threshold, requirement, condition, parameter, and/or setting. For example, at least a portion (e.g., a preamble) of a signal may be detected if the strength (e.g., power) of the received signal satisfies a particular criterion, threshold, requirement, condition, parameter, and/or setting. The term 'time synchronization' may refer to the temporal attribute, relationship, and/or correlation of certain occurrences. In some aspects, the time synchronization of (e.g., simultaneous/concurrent) transmissions (e.g., by a plurality of STAs) may refer to the attribute, relationship, and/or correlation that those (e.g., simultaneous/concurrent) transmissions begin at the same/similar time as, occur (at least in part) concurrently with, and/or end at the same/similar time relative to each other. In some aspects, the phrase 'simultaneous UL transmissions' may refer to 'an UL transmission (by an STA) simultaneously/concurrently with another UL transmission (by at least one other STA).' The term(s) 'reduce' and/or 'reducing' may include decreasing, subtracting, lessening, lowering, decrementing, scaling, scaling down, curtailing, adjusting, and/or various other suitable operations, features, and/or functions.

The term 'plurality' refers to 'more than one' (e.g., two or more). Although the term 'plurality' may refer to 'all' in some aspects, the term 'plurality' may refer to 'some but not all' or 'some but fewer than all' in some other aspects. Therefore, recitation of 'plurality of STAs' refers to 'two or more STAs' but such recitation does not necessarily require or necessitate each and every STA in every embodiment. Accordingly, in some aspects, 'plurality' may be interchangeable with 'more than one but fewer than all/every.'

In some aspects, the term(s) 'communication,' 'transmission,' 'signal,' 'frame,' 'packet,' 'data unit,' and/or various other similar terms may be interchangeable with each other without deviating from the scope of the present disclosure. In some aspects, the term(s) 'communication,' 'transmission,' 'signal,' 'frame,' 'packet,' 'data unit,' 'UL signal,' 'DL signal,' 'ULTR,' 'UL trigger,' and/or various other similar terms may refer to any form, grouping, and/or encapsulation of one or more bits, signals, waveforms, and/or data. In some aspects, such terms may be interchangeable relative to each other without deviating from the scope of the present disclosure. Without deviating from the scope of the present disclosure, some of these terms may be referred to by various other terms, such as a protocol data unit (e.g., a PPDU, a MPDU), a service data unit (e.g., a PSDU, an MSDU), and/or various other suitable form, grouping, and/or encapsulation of one or more bits, signals, waveforms, and/or data.

In some aspects, the term 'apparatus' may refer to the singular form of the word (apparatus). In some aspects, the term 'apparatus' is not limited to the singular form of the word (apparatus) and, thus, 'apparatus' may refer to the singular form and/or the plural form of the word (apparatus) without deviating from the scope of the present disclosure. For example, in some aspects, 'apparatus' may be interchangeable with 'apparatuses,' 'one or more apparatus,' and/or 'one or more apparatuses' without deviating from the scope of the present disclosure. In some aspects, the term 'medium' may refer to the singular form of the word (medium). In some aspects, the term 'medium' is not limited to the singular form of the word (medium) and, thus, 'medium' may refer to the singular form and/or the plural form of the word (medium) without deviating from the scope of the present disclosure. For example, in some aspects, 'medium' may be interchangeable with 'mediums,' 'media,' 'one or more mediums,' and/or 'one or more media' without deviating from the scope of the present disclosure.

In some aspects, the terms 'destined for' and 'intended for' may be interchangeable without deviating from the scope of the present disclosure. In some aspects, the terms 'destined/intended for' and 'destined/intended to' may be interchangeable without deviating from the scope of the present disclosure. The coverage area of a particular transmitter (e.g., AP, STA) may include many receivers (e.g., AP(s), STA(s)); however, in some aspects, not all of those receivers are necessarily the intended receivers or destinations of every transmission from that transmitter. For example, in some aspects, the transmitter may transmit a transmission (e.g., signal, frame, packet, and/or data unit) that is destined/intended for no more than a subset (e.g., less than an entirety) of all receivers that happen to receive that transmission by virtue of being within the coverage area of that particular transmitter. In some aspects, a transmission is 'intended for' or 'destined for' one or more particular receivers when/if that transmitter intended for that transmission to include at least some data and/or information for that/those one or more particular receivers. For example, the transmitter may include some type of identifier in that transmission for that/those particular receivers to use in order to identify that they are the intended recipients or destinations of at least a portion of that transmission. Accordingly, in some aspects, the terms 'destined for' and 'intended for' shall not necessarily mean every receiver that happened to receive that particular transmission, unless every receiver was an intended recipient or destination of that particular transmission.

The term(s) 'field' and/or 'portion' (and similar terms) may refer to a subset (e.g., not an entirety) of all of the data and/or information contained in an encapsulation sometimes referred to as a frame, packet, or data unit. A frame, packet, and/or data unit may include one or more fields and/or one or more portions. Each field and/or each portion may be configured to include various types and forms of data and/or information without deviating from the scope of the present disclosure.

The term 'STS' may refer to spatial streams, bit streams, information streams, data streams, and/or streams of data and/or information that may have a time component and/or a frequency component. In some aspects, an STS may refer to a stream of modulated symbols created by applying a combination of spatial and temporal processing to one or more spatial streams of modulated symbols. In some aspects, an STS may refer to one of several streams of bits and/or modulated symbols that might be transmitted over multiple spatial dimensions that are created by the use of multiple antennas at both ends of a communication link. In some aspects, STS(s) may be generated using spatial multiplexing, which may refer to a transmission technique in which data streams are transmitted on multiple spatial channels that are provided through the use of multiple antennas at the transmitted and the receiver. In some aspects, a frame, packet, and/or data unit may include a plurality of STSs, and each STS may be independently and/or separately encoded. STSs may employ time multiplexing and/or frequency multiplexing.

The term 'number' (e.g., 'number' of STSs) may refer to the quantity, numerical quantification, count, amount, size, extent, and various other suitable measurements of the STSs. Because a frame, packet, and/or data unit may include a plurality of STS, not all of which may be destined/intended for a single STA, an STA that receives such a frame, packet, and/or data unit may select the STS(s) destined/intended for it. In some aspects, the term 'variable' refers to something that may be adjustable, changeable, configurable, flexible, and/or may consist of a range or set of potential, possible, or candidate values. The term(s) 'selection' and/or 'selecting' (e.g., 'selecting' of one or more STSs included in a frame, packet, and/or data unit) may refer to identifying, electing, picking, and/or choosing of the specific STSs destined/intended for a particular STS.

The term(s) 'UP' and/or 'UP value' may refer to an identifier, attribute, assignment, and/or allocation given to a particular user, STA, group of users, group of STAs, and/or other suitable destinations to which a frame, packet, and/or data unit may be destined/intended. A 'user' may be any intended destination or apparatus configured to utilize the information and/or data included in the frame, packet, and/or data unit. The UP of the STA(s)/user(s) may correspond to, may be associated with, and/or may correlate with a UP of the frame, packet, and/or data unit.

In some aspects, the terms 'assign,' 'assignment,' and/or 'assigned' may be interchangeable with 'allocate,' 'allocation,' and/or 'allocated' without deviating from the scope of the present disclosure. In some aspects, the terms 'duration,' 'length,' 'size,' 'period,' and similar terms may be interchangeable without deviating from the scope of the present disclosure. In some aspects, the terms 'simultaneous,' 'concurrent,' and similar terms may be interchangeable without deviating from the scope of the present disclosure. In the context of wireless communication (e.g., reception and/or transmission), two signals, frames, packets, and/or data units may be characterized as 'simultaneous' and/or 'concurrent' if they occur (at least in part) at the same or substantially similar (e.g., temporally similar or correlated) times (i.e., even if not at the exact same time) relative to each other.

In some aspects, the terms 'resource(s)' and 'RU' may be interchangeable without deviating from the scope of the present disclosure and may refer to a duration of time and/or a range of frequencies (e.g., bandwidth) assigned, allocated, dedicated, scheduled, and/or otherwise earmarked for use by one or more apparatuses. In some aspects, one or more resources/RUs may be configured for random access. Such resource(s)/RU(s) may refer to resources shared by a plurality of STAs. In some aspects, the STAs may randomly select one or more of such resource(s)/RU(s) for accessing the wireless communication channel or subchannel.

In some aspects, the phrase 'backoff counter' may refer to a timer or counter that counts or keeps track of an amount of time before an apparatus (e.g., STA) is allowed/permitted to perform an operation/function. For example, an STA may have a backoff counter that may count backwards from a particular value (e.g., Timex, X time-units, etc.) until another particular value (e.g., Timey, Y time-units, etc., wherein Y<X in this example), at which time the STA may perform a particular operation/function (e.g., utilize certain resources of a wireless communication channel). The term 'TXOP' may refer to an interval of time during which an STA is permitted/allowed to access the wireless medium and/or communicate using a particular wireless communication channel or subchannel. In some aspects, a TXOP is defined by a starting time and a maximum duration.

In some aspects, the term(s) 'acknowledgement' and/or 'acknowledgement message' may include a positive acknowledgement message/signal and/or a negative acknowledgement message/signal, and/or may be a block acknowledgement message/signal. The phrase 'feedback frame' may refer to any signal, frame, packet, and/or data unit that includes at least some feedback information and/or data, such as a feedback matrix. A feedback matrix may include information about a signal received at a receiver/beamformee (e.g., STA), and such information may be communicated from the receiver/beamformee (e.g., STA) to a transmitter/beamformer (e.g., AP). In some aspects, the term 'difference' may refer to a subtraction between two values, fields, and/or other suitable aspects, but the ordering can be re-arranged without deviating from the scope of the present disclosure. In some aspects, a difference between X and Y can mean X minus Y. In some aspects, a difference between X and Y can mean Y minus X. In some aspects, the phrase 'originating from' may refer to the origin of a transmission (e.g., an AP/STA from which a transmission originated), without regard to any relays that may extend the coverage area, communication range, and/or propagation distance of that transmission from its origin.

The term(s) 'protect' and/or 'protection' may refer to maintaining a wireless communication channel or subchannel, idle, unencumbered, utilized, reserved, available and/or otherwise accessible for a particular communication during a particular duration or period of time. A transmission configured to cause a plurality of STAs to simultaneously transmit a signal/transmission that is configured to protect a DL multiuser transmission to the plurality of STAs may referred to as a request-to-send message/signal. A signal/transmission that is configured to protect a DL multiuser transmission may be referred to as a clear-to-send message/signal. The term(s) 'transmission power' and/or 'transmit power' may refer to the amount of power with which a signal, frame, packet, and/or data unit is transmitted. In some aspects, how much transmission power an apparatus (e.g., STA, AP, etc.) remains capable of using relative to the transmission power currently/recently utilized may be referred to as transmit power margin/headroom. The term 'indication(s)' may refer to a bit, a field, a parameter, a bitstream, a modulation, and/or any other suitable indicia. The terms 'channel(s)' and/or 'subchannel(s)' may include or refer to a carrier, a subcarrier, a bandwidth, a portion of a bandwidth, a frequency range, a set of frequency values, and/or various other characteristics and attributes known to one of ordinary skill in the art. The term 'BSS' may refer to a set of one or more STAs. Such STAs may be synchronized some of their operations with one another, such as the timings of their transmissions, receptions, NAVs, and/or any other suitable aspects.

Without deviating from the scope of the present disclosure, any aspect described herein with respect to an AP may (or may not) apply to an STA and that the features described herein with respect to an STA may (or may not) apply to an AP. Aspects disclosed herein with respect to an AP and/or STA are hereby also disclosed with respect to any apparatus, method, and/or computer-readable medium that is configured in accordance with such aspects. Without deviating from the scope of the present disclosure, any aspect described herein with respect to a term (e.g., "STA") that has an "(s)" at the end (e.g., "STA(s)") is intended to disclose/capture the possibility of both the singular (e.g., "one STA") as well as the plural (e.g., "more than one STA"). Without deviating from the scope of the present disclosure, any aspect described herein with respect to two reference characters (e.g., "120" and "150") separated by a comma (e.g., as in "STA(s) 120, 150") is intended to disclose/capture the possibility of both the singular (e.g., "STA 120" or "STA 150") as well as the plural (e.g., "STA 120 and STA 150").

The word "example" or "exemplary" may be used herein to mean "serving as a non-limiting example, instance, or illustration." Any aspect, embodiment, and/or configuration described herein as "exemplary" or an "example" shall not necessarily be construed as preferred or advantageous over other aspects, configurations, and/or configurations. The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "A, B, and/or C," "at least A, B, or C," "at least one of A, B, or C," "at least one of A, B, and C," and "A, B, C, or any combination thereof" include any combination of A, B, and/or C, which may include any one of the following possibilities: (i) one or more of A; (ii) one or more of B; (iii) one or more of C; (iv) one or more of A and one or more of B; (v) one or more of A and one or more of C; (vi) one or more of B and one or more of C; or (vii) one or more of A, one or more of B, and one or more of C. Without deviating from the scope of the present disclosure, any aspect described herein with respect to, any aspect described herein with respect to "and/or" (e.g., A and/or B) refers to the possibility of both cumulative aspects (e.g., A and B) as well as alternative aspects (e.g., A or B). Furthermore, including "and/or" in a list of three or more aspects (e.g., A, B, and/or C) shall not omit, negate, or exclude any possible set of one or more of those aspects if such set of one or more aspects includes at least one of those aspects; that is, "A, B, and/or C" refers to any set that includes "at least one A, at least one B, or at least one C."

The description set forth below in connection with the appended drawings is intended as a description of various configurations and is not intended to represent the only configurations in which the concepts described herein may be practiced. All structural and functional equivalents to the elements of the various aspects described throughout this disclosure that are known or later come to be known to those of ordinary skill in the art are expressly incorporated herein by reference and may be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The description herein is provided to enable any person skilled in the art to practice the various aspects described herein. Various modifications to these aspects are readily apparent to those skilled in the art. The claims are not necessarily intended to be limited to the specific aspects described herein, unless such aspect(s) is/are explicitly and expressly recited in the claims. Reference to an element in the singular (e.g., "an apparatus") is intended to mean "at least one" (e.g., "at least one apparatus") and is not intended to mean "one and only one" (e.g., not "one and only one apparatus"), unless explicitly and expressly recited as "one and only one" in the claims. Without deviating from the scope of the present disclosure, various modifications to the foregoing aspects may be readily apparent to those skilled in the art.

The specific order or hierarchy of the processes disclosed herein is provided for non-limiting, illustrative purposes. Based upon design or implementation preferences, the specific order or hierarchy of methods, operations, steps, functions, features, and/or aspects may be re-arranged without deviating from the scope of the present disclosure. Some methods, operations, steps, functions, features, and/or aspects may be combined or omitted without deviating from the scope of the present disclosure. The accompanying claims present elements of the various methods, operations, steps, functions, features, and/or aspects is one of many examples, and many other examples of methods, operations, steps, functions, features, and/or aspects exist without deviating from the scope of the present disclosure. The present disclosure is not limited to any specific order or hierarchy, unless such specific order or hierarchy is explicitly and expressly required by the claims.

The particular order, sequence, chronology, and/or combination of the aspects described herein are not intended to limit the scope of the present disclosure nor any aspect of the claims, unless explicitly required by the claims. Any of the aspects described herein may be configured or implemented in additional or alternative orders, sequences, chronologies, and/or combinations without deviating from the scope of the present disclosure. Each and every aspect described herein is not necessarily required in all configurations and embodiments of the present disclosure. Accordingly, any aspect not recited or otherwise required by the claims shall not be construed as limiting the scope of the claims. That is, the scope of the claims shall not be construed any more narrowly than required by the claims simply because there may exist a possibility of any additional and/or alternative aspects described throughout the present disclosure. The scope of the claims shall not be construed as limited to the examples provided herein, unless a corresponding aspect is expressly and explicitly recited in the claims.

The invention claimed is:

1. A method of wireless communication by at least a station (STA), the method comprising:

receiving a plurality of frames, the plurality of frames comprising: (1) a first uplink (UL) transmission request (ULTR) configured to trigger UL transmission by a plurality of STAs, (2) a field indicating resource allocation for one or more UL transmissions triggered by the ULTR, and (3) an indication of a transmission opportunity (TXOP) duration for setting at least one network allocation vector (NAV) of at least the STA; and entering a doze mode after at least receiving or transmitting of a message comprising scheduling information, remaining in the doze mode until a time corresponding to the scheduling information included in the message, and subsequently receiving a second ULTR that (1) is configured to trigger UL transmission by a plurality of STAs within a period of time after receiving the second ULTR and (2) comprises (A) an allocation of at least one resource for each UL transmission by the plurality of STAs and (B) a field common to the plurality of STAs.

2. The method of claim 1, further comprising:

determining to perform concerted communication, wherein the concerted communication comprises two or more apparatuses transmitting the same information at the same time or time period in accordance with a setup protocol, wherein the setup protocol comprises negotiating at least (1) how many links or channels to be enabled by the apparatus, (2) which radios of the apparatus to use for that determine quantity of links or channels, and (3) which types of information will be communicated in each of those links or channels.

3. The method of claim 1, wherein the plurality of frames further comprise information for determining use of a process that sets one or more times for at least the STA to access transmission medium.

4. The method of claim 1, wherein the field common to the plurality of STAs (i) indicates a duration of at least a portion of UL transmission and (ii) indicates whether communication of the second ULTR will be followed by communication of a third ULTR, the third ULTR configured to trigger another UL transmission within a period of time after communication of the third ULTR.

5. A method of wireless communication by a first apparatus comprising at least a first station (STA) and a second STA, the method comprising:

after at least the first STA of the first apparatus or the second STA of the first apparatus transitions from a doze state or low power state to an active state or high power state, initiating communication using at least the first STA of the first apparatus or the second STA of the first apparatus, the communication comprising at least a setup protocol, wherein the setup protocol comprises initiating an association between the first apparatus and a second apparatus different from the first apparatus, determining how many links can be established between the first apparatus and the second apparatus, and communicating capability information of at least the first apparatus or the second apparatus to participate in concerted communication, the concerted communication comprising at least uplink communication between the first STA of the first apparatus and a first access point (AP) of the second apparatus with concurrent downlink communication between the second STA of the first apparatus and a second AP of the second apparatus;

determining first traffic information associated with a first packet for communication between the first STA of the first apparatus and the first AP of the second apparatus and second traffic information associated with a second packet different from the first packet between the second STA of the first apparatus and the second AP of the second apparatus, wherein the first packet comprises first address information associated with at least the first STA of the first apparatus or the first AP of the second apparatus and second address information different from the first address information and associated with at least the second STA of the first apparatus or the second AP of the second apparatus; and using the first traffic information and the second traffic information in a process for routing or mapping the first packet and the second packet among at least one or more links between the first STA of the first apparatus and the first AP of the second apparatus or one or more links between the second STA of the first apparatus and the second AP of the second apparatus, wherein the first apparatus uses a first medium access (MAC) layer and a first physical (PHY) layer for communication between the first STA of the first apparatus and the first AP of the first apparatus and uses a second MAC layer different from the first MAC layer and a second PHY layer different from the first PHY layer for communication between the second STA of the first apparatus and the second AP of the second apparatus.

6. The method of claim 5, further comprising:
not performing the concerted communication after the first apparatus determines that use of a first link for communication between the first STA of the first apparatus and the first AP of the second apparatus is expected to result in intra-apparatus interference with a second link for communication between the second STA of the first apparatus and the second AP of the second apparatus.

7. A method of wireless communication by a first apparatus comprising at least a first station (STA) and a second STA, the method comprising:
after at least the first STA of the first apparatus or the second STA of the first apparatus transitions from a doze state or low power state to an active state or high power state, initiating communication using at least the first STA of the first apparatus or the second STA of the first apparatus, the communication comprising at least a setup protocol, wherein the setup protocol comprises initiating an association between the first apparatus and a second apparatus different from the first apparatus, and determining how many links can be established between the first apparatus and the second apparatus;

determining first traffic information associated with a first packet for communication between the first STA of the first apparatus and a first access point (AP) of the second apparatus and second traffic information associated with a second packet different from the first packet between the second STA of the first apparatus and a second AP of the second apparatus, wherein the first packet comprises first address information associated with at least the first STA of the first apparatus or the first AP of the second apparatus and second address information different from the first address information and associated with at least the second STA of the first apparatus or the second AP of the second apparatus;

using the first traffic information and the second traffic information in a process for routing or mapping the first packet and the second packet among at least one or more links between the first STA of the first apparatus and the first AP of the second apparatus or one or more links between the second STA of the first apparatus and the second AP of the second apparatus; and performing concerted communication using the one or more links between the first STA of the first apparatus and the first AP of the second apparatus and the one or more links between the second STA of the first apparatus and the second AP of the second apparatus.

8. The method of claim 7, further comprising:
not performing the concerted communication using the one or more links between the first STA of the first apparatus and the first AP of the second apparatus and the one or more links between the second STA of the first apparatus and the second AP of the second apparatus when use of a first link for communication between the first STA of the first apparatus and the first AP of the second apparatus is expected to result in intra-apparatus interference with a second link for communication between the second STA of the first apparatus and the second AP of the second apparatus.

9. The method of claim 7, wherein the first apparatus uses a first medium access (MAC) layer and a first physical (PHY) layer for communication between the first STA of the first apparatus and the first AP of the first apparatus and uses a second MAC layer different from the first MAC layer and a second PHY layer different from the first PHY layer for communication between the second STA of the first apparatus and the second AP of the second apparatus.

10. The method of claim 7, wherein the concerted communication comprises at least uplink communication between the first STA of the first apparatus and the first AP of the second apparatus with sequential or time-multiplexed downlink communication between the second STA of the first apparatus and the second AP of the second apparatus.

11. The method of claim 7, wherein the concerted communication comprises at least uplink communication between the first STA of the first apparatus and the first AP of the second apparatus with concurrent downlink communication between the second STA of the first apparatus and the second AP of the second apparatus.

12. The method of claim 7, wherein the setup protocol further comprises communicating capability information of at least the first apparatus or the second apparatus to participate in the concerted communication.

13. An apparatus for wireless communication by at least a first station (STA) and a second STA of the apparatus, the apparatus comprising:
memory; and
one or more processors configured to:
receive a plurality of frames, the plurality of frames comprising: (1) a first uplink (UL) transmission request (ULTR) configured to trigger UL transmission by a plurality of STAs, (2) a field indicating resource allocation for one or more UL transmissions triggered by the ULTR, and (3) an indication of a transmission opportunity (TXOP) duration for setting at least one network allocation vector (NAV) of at least the STA; and
initiate entering a doze mode after at least receiving or transmitting of a message comprising scheduling information, remaining in the doze mode until a time corresponding to the scheduling information included in the message, and subsequently receiving a second ULTR that (1) is configured to trigger UL transmission by a plurality of STAs within a period of time after receiving the second ULTR and (2) comprises (A) an allocation of at least one resource for each UL transmission by the plurality of STAs and (B) a field common to the plurality of STAs.

14. The apparatus of claim 13, wherein the one or more processors are further configured to:
  determine to perform concerted communication, wherein the concerted communication comprises two or more apparatuses transmitting the same information at the same time or time period in accordance with a setup protocol, wherein the setup protocol comprises negotiating at least (1) how many links or channels to be enabled by the apparatus, (2) which radios of the apparatus to use for that determine quantity of links or channels, and (3) which types of information will be communicated in each of those links or channels.

15. The apparatus of claim 13, wherein the plurality of frames further comprise information for determining use of a process that sets one or more times for at least the STA to access transmission medium.

16. The apparatus of claim 13, wherein the field common to the plurality of STAs (i) indicates a duration of at least a portion of UL transmission and (ii) indicates whether communication of the second ULTR will be followed by communication of a third ULTR, the third ULTR configured to trigger another UL transmission within a period of time after communication of the third ULTR.

17. A first apparatus for wireless communication by at least a first station (STA) and a second STA of the first apparatus, the first apparatus comprising:
  memory; and
  one or more processors configured to:
    after at least the first STA of the first apparatus or the second STA of the first apparatus transitions from a doze state or low power state to an active state or high power state, performing communication using at least the first STA of the first apparatus or the second STA of the first apparatus, the communication comprising at least a setup protocol, wherein the setup protocol comprises an association between the first apparatus and a second apparatus different from the first apparatus, determining how many links can be established between the first apparatus and the second apparatus, and communicating capability information of at least the first apparatus or the second apparatus to participate in concerted communication, the concerted communication comprising at least uplink communication between the first STA of the first apparatus and a first access point (AP) of the second apparatus with concurrent downlink communication between the second STA of the first apparatus and a second AP of the second apparatus;
    determining first traffic information associated with a first packet for communication between the first STA of the first apparatus and the first AP of the second apparatus and second traffic information associated with a second packet different from the first packet between the second STA of the first apparatus and the second AP of the second apparatus, wherein the first packet comprises first address information associated with at least the first STA of the first apparatus or the first AP of the second apparatus and second address information different from the first address information and associated with at least the second STA of the first apparatus or the second AP of the second apparatus; and
    using the first traffic information and the second traffic information in a process for routing or mapping the first packet and the second packet among at least one or more links between the first STA of the first apparatus and the first AP of the second apparatus or one or more links between the second STA of the first apparatus and the second AP of the second apparatus, wherein the first apparatus uses a first medium access (MAC) layer and a first physical (PHY) layer for communication between the first STA of the first apparatus and the first AP of the first apparatus and uses a second MAC layer different from the first MAC layer and a second PHY layer different from the first PHY layer for communication between the second STA of the first apparatus and the second AP of the second apparatus.

18. The first apparatus of claim 17, wherein the one or more processors are further configured to:
  not perform the concerted communication after the first apparatus determines that use of a first link for communication between the first STA of the first apparatus and the first AP of the second apparatus is expected to result in intra-apparatus interference with a second link for communication between the second STA of the first apparatus and the second AP of the second apparatus.

19. An first apparatus for wireless communication by at least a first station (STA) and a second STA of the first apparatus, the first apparatus comprising:
  memory; and
  one or more processors configured to:
    after at least the first STA of the first apparatus or the second STA of the first apparatus transitions from a doze state or low power state to an active state or high power state, perform communication using at least the first STA of the first apparatus or the second STA of the first apparatus, the communication comprising at least a setup protocol, wherein the setup protocol comprises an association between the first apparatus and a second apparatus different from the first apparatus, and determining how many links can be established between the first apparatus and the second apparatus;
    determine first traffic information associated with a first packet for communication between the first STA of the first apparatus and a first access point (AP) of the second apparatus and second traffic information associated with a second packet different from the first packet between the second STA of the first apparatus and a second AP of the second apparatus, wherein the first packet comprises first address information associated with at least the first STA of the first apparatus or the first AP of the second apparatus and second address information different from the first address information and associated with at least the second STA of the first apparatus or the second AP of the second apparatus;
    use the first traffic information and the second traffic information in a process for routing or mapping the first packet and the second packet among at least one or more links between the first STA of the first apparatus and the first AP of the second apparatus or one or more links between the second STA of the first apparatus and the second AP of the second apparatus; and
    perform concerted communication using the one or more links between the first STA of the first apparatus and the first AP of the second apparatus and the one or more links between the second STA of the first apparatus and the second AP of the second apparatus.

20. The first apparatus of claim 19, wherein the one or more processors are further configured to:
  not perform the concerted communication using the one or more links between the first STA of the first apparatus and the first AP of the second apparatus and the one or more links between the second STA of the first apparatus and the second AP of the second apparatus when use of a first link for communication between the first STA of the first apparatus and the first AP of the second apparatus is expected to result in intra-apparatus interference with a second link for communication between the second STA of the first apparatus and the second AP of the second apparatus.

21. The first apparatus of claim 19, wherein the first apparatus uses a first medium access (MAC) layer and a first physical (PHY) layer for communication between the first STA of the first apparatus and the first AP of the first apparatus and uses a second MAC layer different from the first MAC layer and a second PHY layer different from the first PHY layer for communication between the second STA of the first apparatus and the second AP of the second apparatus.

22. The first apparatus of claim 19, wherein the concerted communication comprises at least uplink communication between the first STA of the first apparatus and the first AP of the second apparatus with sequential or time-multiplexed downlink communication between the second STA of the first apparatus and the second AP of the second apparatus.

23. The first apparatus of claim 19, wherein the concerted communication comprises at least uplink communication between the first STA of the first apparatus and the first AP of the second apparatus with concurrent downlink communication between the second STA of the first apparatus and the second AP of the second apparatus.

24. The first apparatus of claim 19, wherein the setup protocol further comprises communicating capability information of at least the first apparatus or the second apparatus to participate in the concerted communication.

25. A method of wireless communication by at least an access point (AP), the method comprising:
    transmitting a plurality of frames, the plurality of frames comprising: (1) a first uplink (UL) transmission request (ULTR) configured to trigger UL transmission by a plurality of stations (STAs), (2) a field indicating resource allocation for one or more UL transmissions triggered by the ULTR, and (3) an indication of a transmission opportunity (TXOP) duration for setting at least one network allocation vector (NAV),
    wherein transmitting the plurality of frames results in one or more STAs entering a doze mode after at least receiving or transmitting of a message comprising scheduling information, remaining in the doze mode until a time corresponding to the scheduling information included in the message, and subsequently receiving a second ULTR that (1) is configured to trigger UL transmission by a plurality of STAs within a period of time after receiving the second ULTR and (2) comprises (A) an allocation of at least one resource for each UL transmission by the plurality of STAs and (B) a field common to the plurality of STAs.

26. The method of claim 25, wherein the one or more processors are further configured to:
    determine to perform concerted communication, wherein the concerted communication comprises two or more apparatuses transmitting the same information at the same time or time period in accordance with a setup protocol, wherein the setup protocol comprises negotiating at least (1) how many links or channels to be enabled by the apparatus, (2) which radios of the apparatus to use for that determine quantity of links or channels, and (3) which types of information will be communicated in each of those links or channels.

27. The method of claim 25, wherein the plurality of frames further comprise information for determining use of a process that sets one or more times for at least the STA to access transmission medium.

28. The method of claim 25, wherein the field common to the plurality of STAs (i) indicates a duration of at least a portion of UL transmission and (ii) indicates whether communication of the second ULTR will be followed by communication of a third ULTR, the third ULTR configured to trigger another UL transmission within a period of time after communication of the third ULTR.

29. A method by a second apparatus comprising at least a first access point (AP) and a second AP, the second apparatus for wireless communication with a first apparatus comprising at least a first station (STA) and a second STA, the method comprising:
    after at least a first STA of the first apparatus or the second STA of the first apparatus transitions from a doze state or low power state to an active state or high power state, performing communication using at least the first STA of the first apparatus or the second STA of the first apparatus, the communication comprising at least a setup protocol, wherein the setup protocol comprises an association between the first apparatus and the second apparatus different from the first apparatus, determining how many links can be established between the first apparatus and the second apparatus, and communicating capability information of at least the first apparatus or the second apparatus to participate in concerted communication, the concerted communication comprising at least uplink communication between the first STA of the first apparatus and a first access point (AP) of the second apparatus with concurrent downlink communication between the second STA of the first apparatus and a second AP of the second apparatus; and
    determining first traffic information associated with a first packet for communication between the first STA of the first apparatus and the first AP of the second apparatus and second traffic information associated with a second packet different from the first packet between the second STA of the first apparatus and the second AP of the second apparatus, wherein the first packet comprises first address information associated with at least the first STA of the first apparatus or the first AP of the second apparatus and second address information different from the first address information and associated with at least the second STA of the first apparatus or the second AP of the second apparatus,
    wherein the first traffic information and the second traffic information is usable in a process for routing or mapping the first packet and the second packet among at least one or more links between the first STA of the first apparatus and the first AP of the second apparatus or one or more links between the second STA of the first apparatus and the second AP of the second apparatus,
    wherein the first apparatus uses a first medium access (MAC) layer and a first physical (PHY) layer for communication between the first STA of the first apparatus and the first AP of the first apparatus and uses a second MAC layer different from the first MAC layer and a second PHY layer different from the first PHY layer for communication between the second STA of the first apparatus and the second AP of the second apparatus.

30. The method of claim 29, further comprising:
    not performing the concerted communication after the first apparatus determines that use of a first link for communication between the first STA of the first apparatus and the first AP of the second apparatus is expected to result in intra-apparatus interference with a second link for communication between the second STA of the first apparatus and the second AP of the second apparatus.

31. A method by a second apparatus comprising at least a first access point (AP) and a second AP, the second apparatus for wireless communication with a first apparatus comprising at least a first station (STA) and a second STA, the method comprising:

after at least the first STA of the first apparatus or the second STA of the first apparatus transitions from a doze state or low power state to an active state or high power state, performing communication comprising at least a setup protocol, wherein the setup protocol comprises an association between the first apparatus and the second apparatus different from the first apparatus, and determining how many links can be established between the first apparatus and the second apparatus;

determining first traffic information associated with a first packet for communication between the first STA of the first apparatus and a first access point (AP) of the second apparatus and second traffic information associated with a second packet different from the first packet between the second STA of the first apparatus and a second AP of the second apparatus, wherein the first packet comprises first address information associated with at least the first STA of the first apparatus or the first AP of the second apparatus and second address information different from the first address information and associated with at least the second STA of the first apparatus or the second AP of the second apparatus;

using the first traffic information and the second traffic information in a process for routing or mapping the first packet and the second packet among at least one or more links between the first STA of the first apparatus and the first AP of the second apparatus or one or more links between the second STA of the first apparatus and the second AP of the second apparatus; and performing concerted communication using the one or more links between the first STA of the first apparatus and the first AP of the second apparatus and the one or more links between the second STA of the first apparatus and the second AP of the second apparatus.

32. The method of claim 31, further comprising:
not performing the concerted communication using the one or more links between the first STA of the first apparatus and the first AP of the second apparatus and the one or more links between the second STA of the first apparatus and the second AP of the second apparatus when use of a first link for communication between the first STA of the first apparatus and the first AP of the second apparatus is expected to result in intra-apparatus interference with a second link for communication between the second STA of the first apparatus and the second AP of the second apparatus.

33. The method of claim 31, wherein the first apparatus uses a first medium access (MAC) layer and a first physical (PHY) layer for communication between the first STA of the first apparatus and the first AP of the first apparatus and uses a second MAC layer different from the first MAC layer and a second PHY layer different from the first PHY layer for communication between the second STA of the first apparatus and the second AP of the second apparatus.

34. The method of claim 31, wherein the concerted communication comprises at least uplink communication between the first STA of the first apparatus and the first AP of the second apparatus with sequential or time-multiplexed downlink communication between the second STA of the first apparatus and the second AP of the second apparatus.

35. The method of claim 31, wherein the concerted communication comprises at least uplink communication between the first STA of the first apparatus and the first AP of the second apparatus with concurrent downlink communication between the second STA of the first apparatus and the second AP of the second apparatus.

36. The method of claim 31, wherein the setup protocol further comprises communicating capability information of at least the first apparatus or the second apparatus to participate in the concerted communication.

37. An apparatus for wireless communication using at least a first access point (AP) and a second AP of the apparatus, the apparatus comprising:

memory; and
one or more processors configured to:
initiate transmission of a plurality of frames, the plurality of frames comprising: (1) a first uplink (UL) transmission request (ULTR) configured to trigger UL transmission by a plurality of stations (STAs), (2) a field indicating resource allocation for one or more UL transmissions triggered by the ULTR, and (3) an indication of a transmission opportunity (TXOP) duration for setting at least one network allocation vector (NAV),
wherein transmitting the plurality of frames results one or more STAs entering a doze mode after at least receiving or transmitting of a message comprising scheduling information, remaining in the doze mode until a time corresponding to the scheduling information included in the message, and subsequently receiving a second ULTR that (1) is configured to trigger UL transmission by a plurality of STAs within a period of time after receiving the second ULTR and (2) comprises (A) an allocation of at least one resource for each UL transmission by the plurality of STAs and (B) a field common to the plurality of STAs.

38. The apparatus of claim 37, wherein the one or more processors are further configured to:
determining to perform concerted communication, wherein the concerted communication comprises two or more apparatuses transmitting the same information at the same time or time period in accordance with a setup protocol, wherein the setup protocol comprises negotiating at least (1) how many links or channels to be enabled by the apparatus, (2) which radios of the apparatus to use for that determine quantity of links or channels, and (3) which types of information will be communicated in each of those links or channels.

39. The apparatus of claim 37, wherein the plurality of frames further comprise information for determining use of a process that sets one or more times for at least the STA to access transmission medium.

40. The apparatus of claim 37, wherein the field common to the plurality of STAs (i) indicates a duration of at least a portion of UL transmission and (ii) indicates whether communication of the second ULTR will be followed by communication of a third ULTR, the third ULTR configured to trigger another UL transmission within a period of time after communication of the third ULTR.

41. A second apparatus comprising at least a first access point (AP) and a second AP, the second apparatus for wireless communication with a first apparatus comprising at least a first station (STA) and a second STA, the second apparatus further comprising:
  memory; and
  one or more processors configured to:
    after at least a first STA of the first apparatus or the second STA of the first apparatus transitions from a doze state or low power state to an active state or high power state, performing communication using at least the first STA of the first apparatus or the second STA of the first apparatus, the communication comprising at least a setup protocol, wherein the setup protocol comprises an association between the first apparatus and the second apparatus different from the first apparatus, determining how many links can be established between the first apparatus and the second apparatus, and communicating capability information of at least the first apparatus or the second apparatus to participate in concerted communication, the concerted communication comprising at least uplink communication between the first STA of the first apparatus and a first access point (AP) of the second apparatus with concurrent downlink communication between the second STA of the first apparatus and a second AP of the second apparatus; and
    determining first traffic information associated with a first packet for communication between the first STA of the first apparatus and the first AP of the second apparatus and second traffic information associated with a second packet different from the first packet between the second STA of the first apparatus and the second AP of the second apparatus, wherein the first packet comprises first address information associated with at least the first STA of the first apparatus or the first AP of the second apparatus and second address information different from the first address information and associated with at least the second STA of the first apparatus or the second AP of the second apparatus,
  wherein the first traffic information and the second traffic information is usable in a process for routing or mapping the first packet and the second packet among at least one or more links between the first STA of the first apparatus and the first AP of the second apparatus or one or more links between the second STA of the first apparatus and the second AP of the second apparatus, wherein the first apparatus uses a first medium access (MAC) layer and a first physical (PHY) layer for communication between the first STA of the first apparatus and the first AP of the first apparatus and uses a second MAC layer different from the first MAC layer and a second PHY layer different from the first PHY layer for communication between the second STA of the first apparatus and the second AP of the second apparatus.

42. The second apparatus of claim 41, wherein the one or more processors are further configured to:
  not perform the concerted communication after the first apparatus determines that use of a first link for communication between the first STA of the first apparatus and the first AP of the second apparatus is expected to result in intra-apparatus interference with a second link for communication between the second STA of the first apparatus and the second AP of the second apparatus.

43. A second apparatus comprising at least a first access point (AP) and a second AP, the second apparatus for wireless communication with a first apparatus comprising at least a first station (STA) and a second STA, the second apparatus further comprising:
  memory; and
  one or more processors configured to:
    after at least the first STA of the first apparatus or the second STA of the first apparatus transitions from a doze state or low power state to an active state or high power state, performing communication comprising at least a setup protocol, wherein the setup protocol comprises an association between the first apparatus and the second apparatus different from the first apparatus, and determining how many links can be established between the first apparatus and the second apparatus;
    determining first traffic information associated with a first packet for communication between the first STA of the first apparatus and a first access point (AP) of the second apparatus and second traffic information associated with a second packet different from the first packet between the second STA of the first apparatus and a second AP of the second apparatus, wherein the first packet comprises first address information associated with at least the first STA of the first apparatus or the first AP of the second apparatus and second address information different from the first address information and associated with at least the second STA of the first apparatus or the second AP of the second apparatus;
    using the first traffic information and the second traffic information in a process for routing or mapping the first packet and the second packet among at least one or more links between the first STA of the first apparatus and the first AP of the second apparatus or one or more links between the second STA of the first apparatus and the second AP of the second apparatus; and
    performing concerted communication using the one or more links between the first STA of the first apparatus and the first AP of the second apparatus and the one or more links between the second STA of the first apparatus and the second AP of the second apparatus.

44. The second apparatus of claim 43, wherein the one or more processors are further configured to:
  not perform the concerted communication using the one or more links between the first STA of the first apparatus and the first AP of the second apparatus and the one or more links between the second STA of the first apparatus and the second AP of the second apparatus when use of a first link for communication between the first STA of the first apparatus and the first AP of the second apparatus is expected to result in intra-apparatus interference with a second link for communication between the second STA of the first apparatus and the second AP of the second apparatus.

45. The second apparatus of claim 43, wherein the first apparatus uses a first medium access (MAC) layer and a first physical (PHY) layer for communication between the first STA of the first apparatus and the first AP of the first apparatus and uses a second MAC layer different from the first MAC layer and a second PHY layer different from the first PHY layer for communication between the second STA of the first apparatus and the second AP of the second apparatus.

46. The second apparatus of claim 43, wherein the concerted communication comprises at least uplink communication between the first STA of the first apparatus and the first AP of the second apparatus with sequential or time-multiplexed downlink communication between the second STA of the first apparatus and the second AP of the second apparatus.

47. The second apparatus of claim 43, wherein the concerted communication comprises at least uplink communication between the first STA of the first apparatus and the first AP of the second apparatus with concurrent downlink communication between the second STA of the first apparatus and the second AP of the second apparatus.

48. The second apparatus of claim 43, wherein the setup protocol further comprises communicating capability information of at least the first apparatus or the second apparatus to participate in the concerted communication.

* * * * *